(12) United States Patent
Hara

(10) Patent No.: US 8,107,145 B2
(45) Date of Patent: Jan. 31, 2012

(54) REPRODUCING DEVICE AND REPRODUCING METHOD

(75) Inventor: Masaaki Hara, Tokyo (JP)

(73) Assignee: Sony Corporation, Tokyo (JP)

( * ) Notice: Subject to any disclaimer, the term of this patent is extended or adjusted under 35 U.S.C. 154(b) by 429 days.

(21) Appl. No.: 12/474,103

(22) Filed: May 28, 2009

(65) Prior Publication Data

US 2009/0316240 A1    Dec. 24, 2009

(30) Foreign Application Priority Data

Jun. 19, 2008 (JP) ................................. 2008-160661

(51) Int. Cl.
*G03H 1/26* (2006.01)
*G03H 1/12* (2006.01)
*G11B 7/00* (2006.01)

(52) U.S. Cl. ........................ 359/22; 359/11; 369/103

(58) Field of Classification Search .............. 359/10, 359/11, 22; 369/103
See application file for complete search history.

(56) References Cited

U.S. PATENT DOCUMENTS

| 7,262,892 B1 | 8/2007 | Yasuda et al. |
| 2004/0218241 A1 | 11/2004 | Roh |
| 2005/0286388 A1* | 12/2005 | Ayres et al. ............ 369/103 |
| 2007/0268538 A1 | 11/2007 | Ishioka et al. |

FOREIGN PATENT DOCUMENTS

| JP | 2006-107663 | 4/2006 |
| JP | 2007-079438 | 3/2007 |
| WO | WO 2007/126235 | 11/2007 |

* cited by examiner

*Primary Examiner* — Alessandro Amari
(74) *Attorney, Agent, or Firm* — Robert J. Depke; Rockey, Depke & Lyons, LLC

(57) ABSTRACT

A reproducing device for performing reproduction regarding a hologram recording medium where a hologram page is recorded in accordance with signal light, by interference between the signal light where bit data is arrayed with the information of light intensity difference in pixel increments, and reference light, includes: a reference light generating unit to generate reference light irradiated when obtaining a reproduced image; a coherent light generating unit to generate coherent light of which the intensity is greater than the absolute value of the minimum amplitude of the reproduced image, with the same phase as the reference phase within the reproduced image; an image sensor to receive an input image in pixel increments; and an optical system to guide the reference light to the hologram recording medium, and also guide the obtained reproduced image according to the irradiation of the reference light, and the coherent light to the image sensor.

23 Claims, 72 Drawing Sheets

VOLTAGE OFF
(PHASE: d×nh)

VOLTAGE ON
(PHASE: d×nv)

WHITE ⋯ 1
BLACK ⋯ 0

WHITE ⋯ +1
GRAY ⋯ 0
BLACK ⋯ −1

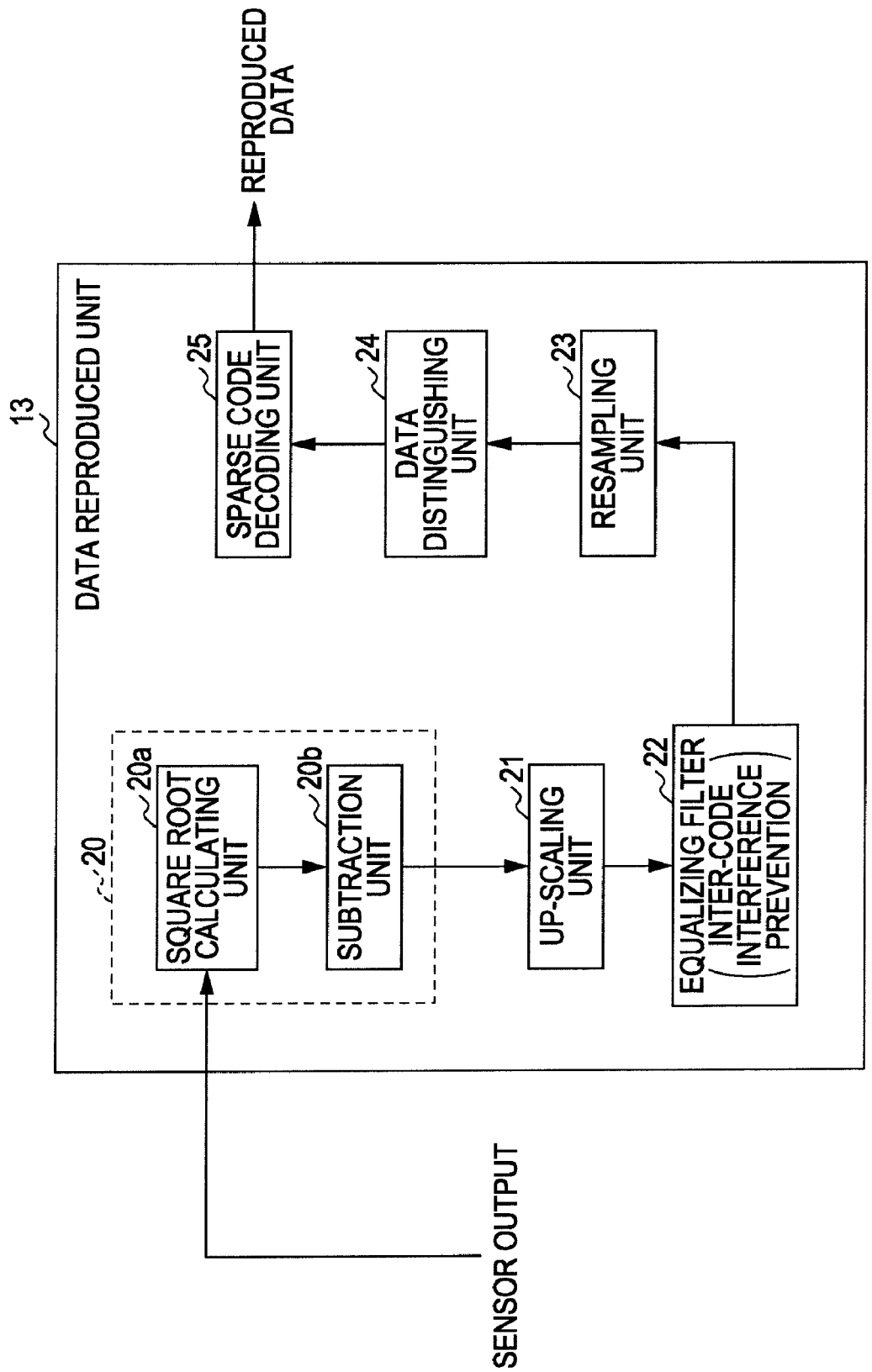

FIG. 11
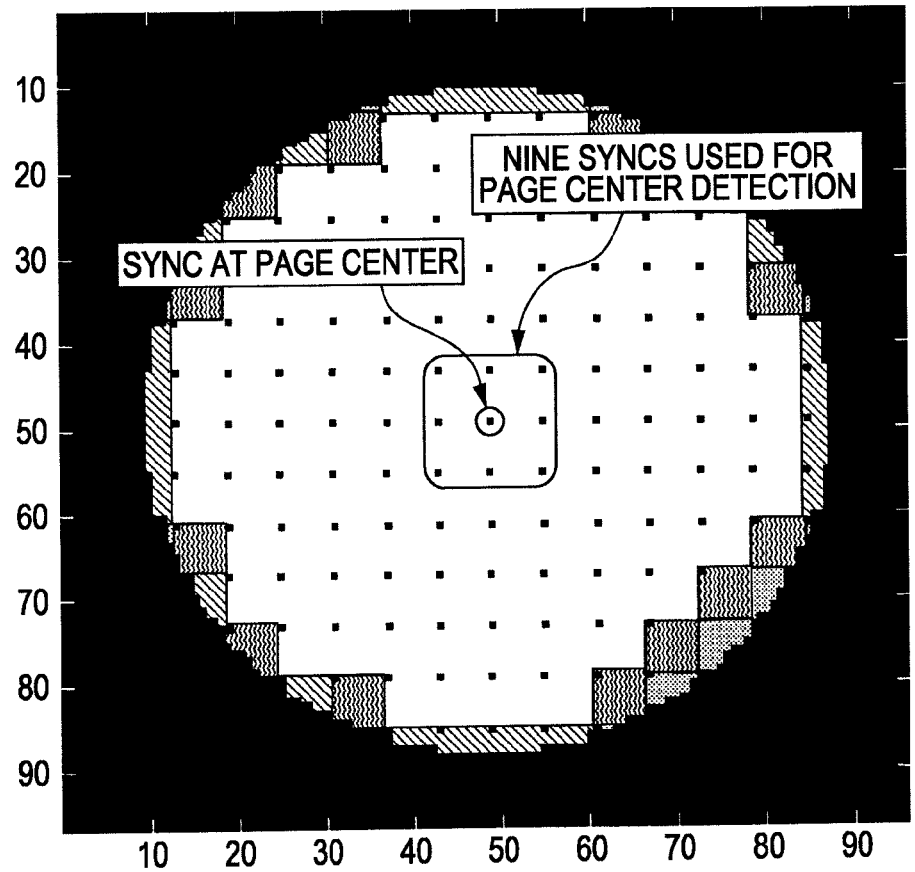
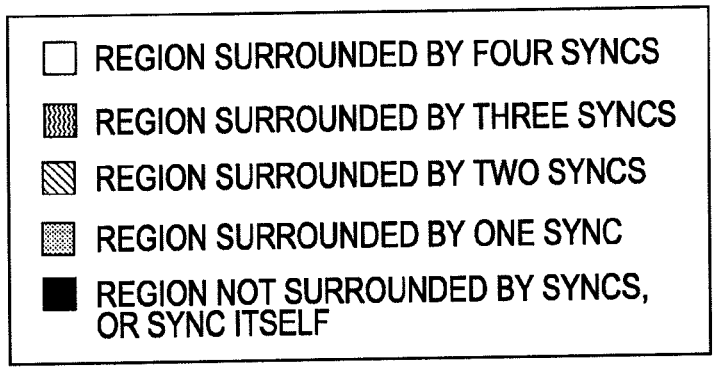

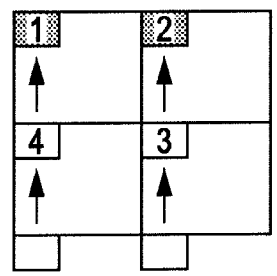
FIG. 14A
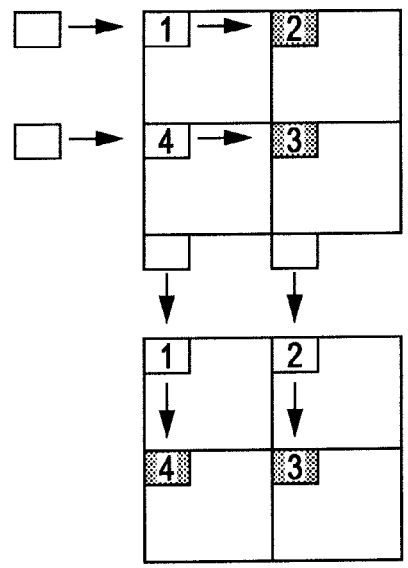
FIG. 14B
FIG. 14C
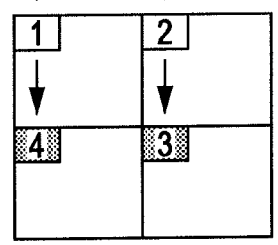
FIG. 14D
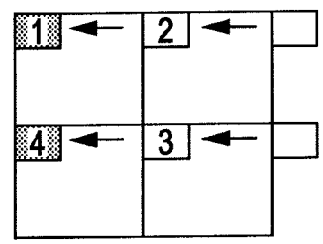
FIG. 14E
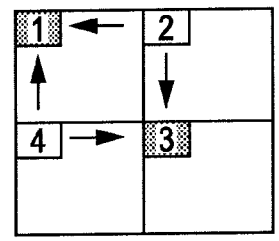
FIG. 14F
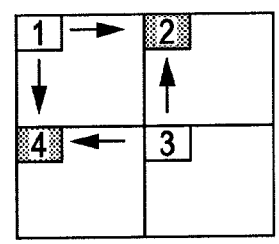

SER(1:4)=2.06E-002=96/4657
SER(2:4)=1.92E-002=88/4586
SER(3:4)=8.92E-003=38/4262
SER(4:4)=4.16E-003=16/3850

SER(1:4)=2.06E−002=96/4657
SER(2:4)=1.92E−002=88/4586
SER(3:4)=8.92E−003=38/4262
SER(4:4)=4.16E−003=16/3850

OSR (OVER SAMPLING RATE)

| | |
|---|---|
| ─×─ | 2.000 |
| ─□─ | 1.600 |
| ─△─ | 1.333 |
| ─▽─ | 1.143 |
| ─○─ | 1.000 |

OSR (OVER SAMPLING RATE)

| ─×─ 2.000 |
| ─□─ 1.600 |
| ─△─ 1.333 |
| ─▽─ 1.143 |
| ─○─ 1.000 |

X-DIRECTIONAL DIFFERENTIATION

Y-DIRECTIONAL DIFFERENTIATION

○ ・・・ SAMPLING VALUE
● ・・・ ZERO CROSS POSITION

LOW-RESOLUTION IMAGE OF LOWBAND COMPONENT

RING-SHAPED TEMPLATE

- 2048×2048 PIXELS
- RATE: 2×2

SEARCH RANGE OF X-CLOCK SIGNAL COMPONENT

SEARCH RANGE OF Y-CLOCK SIGNAL COMPONENT

CALCULATE ONLY COLUMNS INCLUDING SEARCH RANGES OF EACH

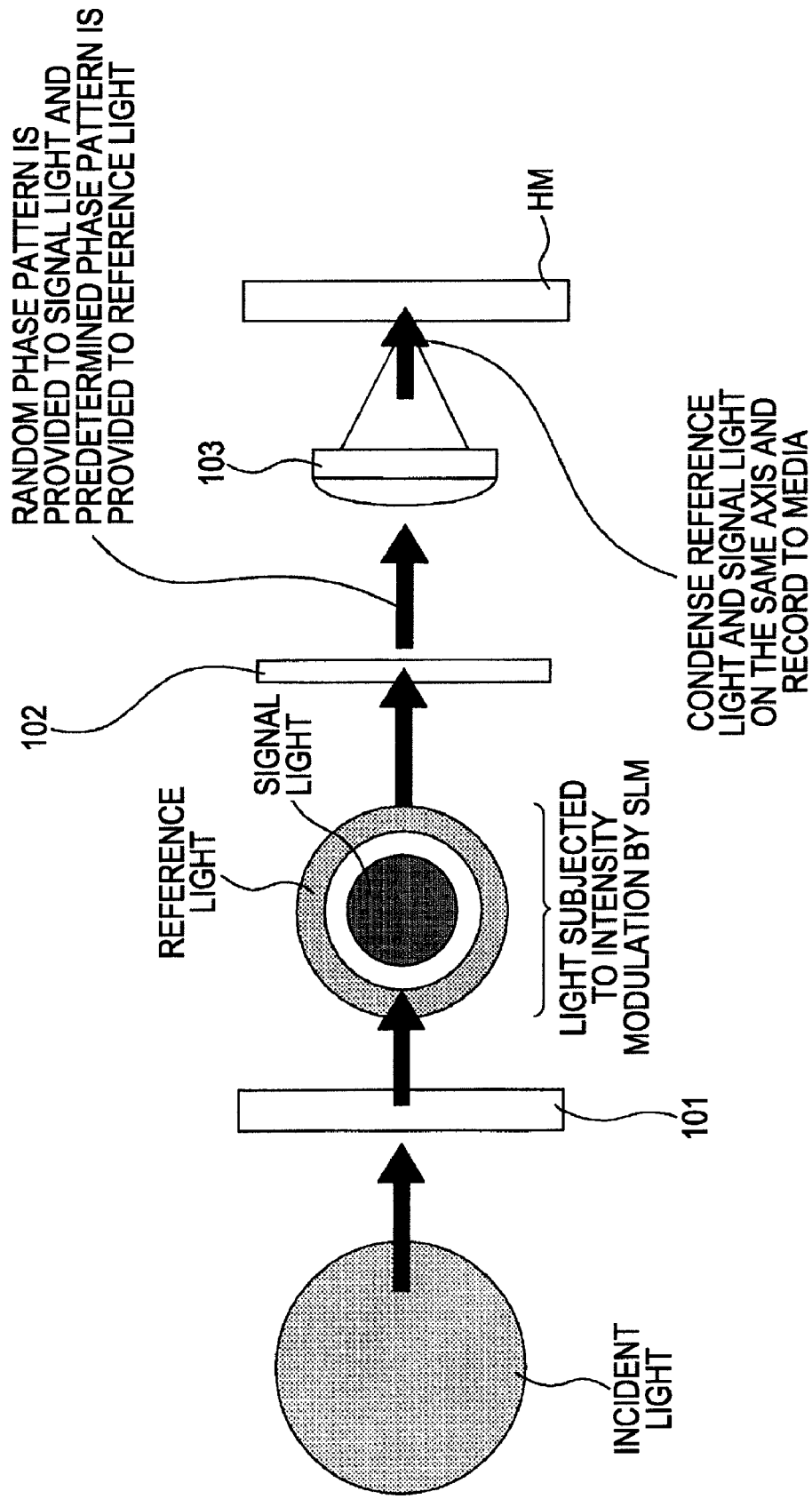

BLACK ··· 0
WHITE ··· 1

BLACK ··· −1
GRAY ··· 0
WHITE ··· +1

REPRODUCING DEVICE AND REPRODUCING METHOD

BACKGROUND OF THE INVENTION

1. Field of the Invention

The present invention relates to a reproducing device for performing reproduction from a hologram recording medium in which data is recorded with interference fringes between reference light and signal light, and the method thereof.

2. Description of the Related Art

For example, such as disclosed in Japanese Unexamined Patent Application Publication No. 2006-107663, and Japanese Unexamined Patent Application Publication No. 2007-79438, there is a hologram recording/reproducing method wherein recording of data is performed with the interference fridges between signal light and reference light, and the data recorded with the interference fridges is reproduced by irradiation of the reference light. As for the hologram recording/reproducing method, there is a so-called coaxial method wherein recording is performed by disposing the signal light and the reference light on the same axis.

Recording Employing Phase Mask

FIGS. 64, 65A, and 65B are diagrams for describing a hologram recording/reproducing technique by employing the coaxial method, wherein FIG. 64 illustrates a recording technique, and FIGS. 65A and 65B illustrate a reproducing technique.

First, in FIG. 64, at the time of recording, incident light from a light source is subjected to spatial light intensity modulation (hereafter, also simply referred to as intensity modulation) at an SLM (spatial light modulator) 101, thereby generating signal light and reference light disposed on the same axis. The SLM 101 is configured of, for example, a liquid crystal panel or the like.

At this time, the light signal is generated by subjecting the incident light to intensity modulation according to recorded data in pixel increments. Also, the reference light is generated by subjecting the incident light to intensity modulation according to a predetermined pattern.

The signal light and reference light thus generated at the SLM 101 are subjected to spatial phase modulation by a phase mask 102. As shown in the drawing, according to the phase mask 102, a random phase pattern is provided to the signal light, and a predetermined phase pattern determined beforehand is provided to the reference light.

The reason why the reference light is subjected to phase modulation is, as disclosed in Japanese Unexamined Patent Application Publication No. 2006-107663, to enable multiplex recording to a hologram recording medium.

Description will be made here for confirmation wherein multiplex recording is to perform recording so as to overlap hologram pages (increments capable of recording at a time by interference fringes between signal light and reference light), for example, such as shown in FIG. 66.

With the hologram recording/reproducing method, a hologram page (data) recorded by employing reference light having a certain phase configuration can be read out only by irradiating reference light having the same phase configuration at the time of reproduction. This point is utilized, i.e., multiplex recording of data is performed by employing reference light having a different phase configuration at the time of recording each, the reference light according to a different phase configuration is selectively irradiated at the time of reproducing each, whereby each data of which the multiplex recording was performed can be selectively read out.

Also, the reason why a random phase modulation pattern is provided to the signal light is to improve the interference efficiency between the signal light and reference light, and realize diffusion of the spectrum of the signal light, thereby suppressing DC components to realize high recording density.

As for a phase modulation pattern as to the signal light, for example, a random pattern according to a binary of "0" or "π" is set. Specifically, a random phase modulation pattern is set wherein pixels not to be subjected to phase modulation (i.e., phase=0) and pixels to be modulated by π (180 degrees) alone are set such that the number of the former pixels and the number of the latter pixels are the same.

Here, according to the intensity modulation by the SLM 101, light of which the intensity was modulated to "0" or "1" according to recorded data is generated as signal light. Such signal light is subjected to phase modulation according to "0" or "π", thereby generating light having "−1", "0", or "1 (+1)" as the wavefront thereof, respectively. Specifically, when modulation according to phase "0" is provided to a pixel of which the light intensity is modulated to "1", the amplitude thereof is "1", and when modulation according to phase "π" is provided, the amplitude thereof is "−1". Note that, with regard to a pixel of which the light intensity is "0", the amplitude thereof is kept to "0" as to either modulation of a phase "0" or modulation of a phase "π".

FIGS. 67A and 67B illustrate the difference regarding signal light and reference light in the case of no phase mask 102 being provided (FIG. 67A) and in the case of the phase mask 102 being provided (FIG. 67B) for confirmation. Note that, in FIGS. 67A and 67B, the magnitude relation of the amplitude of light according to color density is represented. Specifically, in FIG. 67A, black→white is represented by amplitude "0"→"1", and in FIG. 67B, black →gray→white is represented by amplitude "−1"→"0"→"1 (+1)".

Signal light is generated of which the intensity is modulated according to recorded data. Therefore, intensities (amplitudes) "0" and "1" are not necessarily disposed randomly, and consequently, occurrence of a DC component is promoted.

The above-mentioned phase pattern by the phase mask 102 is set to a random pattern. Thus, pixels of which the light intensity is "1" within the signal light output from the SLM 101 are arranged so as to be divided to amplitudes "1" and "−1" randomly (half-and-half). Thus, the pixels are divided to amplitudes "1" and "−1" randomly, spectrums can be distributed evenly on a Fourier plane (frequency plane: this case can be conceived as an image on a medium), and thus, suppression of a DC component within signal light can be realized.

Thus, if suppression of a DC component of signal light is realized, improvement of data recording density can be realized.

A DC component occurs in signal light, and thus, a recording material reacts greatly to the DC component thereof, and accordingly, multiplex recording such as shown in FIG. 66 fails to be performed. This is because more data is prevented from multiplex recording as to a portion where a DC component is recorded.

Suppression of a DC component is realized with such a random phase pattern, thereby enabling multiplex recording of data to realize high recording density.

Returning to the description above, the signal light and reference light subjected to the above-mentioned phase modulation by the phase mask 102 are both condensed by an objective lens 103, and are irradiated on a hologram recording medium HM. Thus, interference fringes (diffraction gratings, i.e., hologram) according to the signal light (recorded image)

are formed on the hologram recording medium HM. That is to say, recording of data is performed with formation of the interference fringes thereof.

Subsequently, at the time of reproduction, first, as shown in FIG. 65A, reference light is generated with the spatial light modulation (intensity modulation) of the SLM 101 as to incident light. Subsequently, according to the spatial light phase modulation by the phase mask 102, the same predetermined phase pattern as at the time of recording is given to the reference light thus generated.

In FIG. 65A, the above-mentioned reference light subjected to the phase modulation by the phase mask 102 is irradiated on the hologram recording medium HM through the objective lens 103.

At this time, as described above, the same phase pattern as at the time of recording is provided to the reference light. Such reference light is irradiated on the hologram recording medium HM, as shown in FIG. 65B, thereby obtaining diffracted light according to the recorded hologram, and consequently, the diffracted light thereof is output as the reflected light from the hologram recording medium HM. That is to say, a reproduced image (reproduced light) according to the recorded data is obtained.

Subsequently, the reproduced image thus obtained is received at an image sensor 104, for example, such as a CCD (Charge Coupled Device) sensor, CMOS (Complementary Metal Oxide Semiconductor) sensor, or the like, and reproduction of the recorded data is performed based on the reception signal of the image sensor 104 thereof.

Aperture

Now, with the above-mentioned hologram recording/reproducing technique, suppression of a DC component of signal light by the phase mask 102 is realized at the time of recording, thereby realizing high recording density. Such a technique employing the phase mask 102 achieves high recording density at a plane where multiplex recording of a hologram page can be performed.

On the other hand, heretofore, a technique for realizing reduction in the size of a hologram page has been proposed as another approach for achieving high recording density.

Specifically, as shown in FIG. 68, an aperture 105 is provided so as to input the signal light (and reference light) irradiated on the hologram recording medium HM at the time of recording, and the aperture 105 allows only light of a predetermined range from the optical axis center of the signal light to be transmitted. The aperture 105 is provided in a position serving as the above-mentioned Fourier plane (i.e., the same frequency plane as the recorded plane of a hologram page as to the medium).

Reduction in the size of a hologram page to be recorded on the hologram recording medium HM can be realized by the aperture 105 provided on the Fourier plane, and consequently, high recording density at the plane of reduction in the occupied area of each hologram page on the medium can be achieved.

Note that, in the case of employing the above-mentioned technique for realizing high recording density by employing the aperture 105, as the transmission region at the aperture 105 is narrowed, reduction in the size of a hologram page can be realized, and accordingly, further high recording density is realized. However, the transmission region is thus narrowed, which is equivalent to narrowing a passage band regarding the spatial frequency of incident light (image). Specifically, as the transmission region is narrowed, only components of a low-frequency band are allowed to be passed through, and accordingly, the transmission region serves as a so-called low-pass filter.

Determination of Pixel Position, and Over-Sampling

Incidentally, with the above-mentioned hologram recording/reproducing system, in order to reproduce data of 0 and 1 included in a hologram page correctly, the correspondence relationship of the position of each data pixel (each pixel of the SLM 101) serving as a delimiter of one data bit corresponding to which position within an image signal obtained at the image sensor 104 has to be found.

At this time, if the optics are adjusted such that each pixel of the SLM 101 (data pixel) strictly corresponds to each pixel of the image sensor 104 (detector pixel) one-on-one, processing for identifying the correspondence relationship can be eliminated. Specifically, thus, in a state in which optical pixel matching is realized strictly, it becomes self-evident whether or not an image received at a certain pixel of the image sensor 104 is an image recorded through which pixel of the SLM 101, and accordingly, processing for identifying the correspondence relationship does not have to be performed in particular.

However, in reality, it is extremely difficult and impractical to realize strict pixel matching. Therefore, heretofore, based on the premise of no strict optical pixel matching being taken, signal processing for identifying each data pixel position from a readout signal by the image sensor 104 has been performed.

In the case of no strict pixel matching being taken, irradiation is performed in a state in which a data pixel deviates from a detector pixel. At this time, in a case where a ratio according to the number of data pixels: the number of detector pixels is 1:1, resolution as to the deviation of the data pixel to the detector pixel such as described above is one time, and accordingly, deviation in increments of less than a pixel fails to be handled. Therefore, with identifying processing of a data pixel position, for example, such as shown in FIG. 69, the number of pixels, and optical system of the SLM 101 and image sensor 104 are adjusted such that the image of one pixel worth of the SLM 101 is received at n pixels (n>1) on the image sensor 104.

Such a technique for performing sampling of a reproduced image such that the image of one pixel worth of the SLM 101 is received at n pixels worth of the image sensor 104 is called over-sampling.

Note that FIG. 69 exemplifies a case where the image of one pixel worth of the SLM 101 is received at four pixels worth (2×2) on the image sensor 104, and the over-sampling rate is double, but of course, the over-sampling rate is not restricted to this.

A specific example will be described of an identifying method of a data pixel position according to the related art. First, in order to perform identifying of a data pixel position, a predetermined data pattern called a sync is inserted into a hologram page (signal light) at the time of recording beforehand.

FIG. 70 illustrates an insertion example of syncs into signal light. The example in FIG. 70 illustrates a case where syncs illustrated with outline square marks in the drawing are inserted such that a predetermined interval is provided both in the vertical and horizontal directions.

The insertion position of each sync is determined with a recorded format beforehand. The entire data array within signal light including the insertion positions of the above-mentioned syncs is determined according to a recorded format. Specifically, the insertion position of each sync such as shown in FIG. 70, the number of pixels (the number of data pixels) to be inserted therebetween, and so forth are determined with a recorded format beforehand.

From this perspective, if the insertion position of each sync can be identified from the image read out by the image sensor 104 at the time of reproduction, the position of each data pixel can be estimated in accordance with the information of a recorded format.

Specifically, as for processing at the time of reproduction, first, search of the insertion position of a sync is performed from the image read out by the image sensor 104. That is to say, the position where the above-mentioned predetermined data pattern has been obtained as syncs (the position of a detector pixel) is identified of the image read out by the image sensor 104.

Subsequently, upon the insertion positions of syncs being identified, the position of each data pixel is identified in accordance with the information of a recorded format. For example, according to a recorded format, the distance from a identified sync to a data pixel to be processed (by how many pixels the pixels are separated) can be found, and accordingly, based on the information thereof, identifying of each data pixel position is performed from the information of a identified sync position.

Such identifying processing of a data pixel position is performed, whereby the position of each data pixel within the readout image can be comprehended appropriately even in a case where optical pixel matching has not been performed.

Amplitude Value Calculation by Linear Interpolation

Also, with a hologram recording/reproducing device according to the related art, after identifying of a data pixel position as described above is performed, the amplitude value at the identified data pixel position is also calculated by linear interpolation employing amplitude values around the identified data pixel position.

In general, with the reproducing system of a data storage system, interference between codes (interference between pixels with hologram recording) can be deemed as the linear superposition of the same signal properties. Accordingly, from the perspective of this premise, the amplitude value of each adjacent data pixel can be deemed to have predetermined linear relationship.

Linear interpolation processing performed here is processing for obtaining the amplitude value of a data pixel to be processed from surrounding amplitude values on the premise of such linearity.

Sampling Theorem

Incidentally, with regard to the hologram recording/reproducing method described so far, the operation of the reproducing system thereof is, as can also be understood with reference to FIG. 65A, generally equivalent to each pixel of the image sensor 104 sampling (digital sampling) the original continuous signal (analog signal) serving as a reproduced image.

According to the Nyquist sampling theorem, the original continuous signal is sampled with a clock having a higher frequency than double of the highest frequency included therein to digitize this (digital data), whereby the original analog signal can be restored accurately from the digital data through an appropriate LPF (Low Pass Filter).

In the case of the hologram recording/reproducing system, the highest frequency of the original readout signal is determined with an aperture size (the size of the transmission region of the aperture 105 shown in FIG. 68). Specifically, one-half of the aperture size becomes the highest frequency. On the other hand, sampling frequency is determined with the over-sampling rate.

Therefore, according to the Nyquist sampling theorem, in the event that the over-sampling rate is greater than the aperture size, the original signal (i.e., reproduced image) can be restored. That is to say, with the hologram recording/reproducing system, conceptually, the relation between the over-sampling rate and aperture size should be over-sampling rate>aperture size.

SUMMARY OF THE INVENTION

However, the hologram recording/reproducing system has non-linearity in that the information of light intensity and phase can be recorded as to the media, but the information of light intensity alone can be detected by the image sensor 104 at the time of reproduction. Specifically, description has been made regarding a point that amplitudes of three values of "0", "+1", and "−1" (the combination of intensity of 1 and a phase of $\pi$) can be recorded by the phase mask 102, with reference to FIG. 64, but as can also be understood from this point, the information of a phase can also be recorded in the hologram recording medium HM along with the information of light intensity. On the other hand, the image sensor 104 can detect only the information of light intensity obtained by squaring the value of the amplitude and converting this into an absolute value. From the perspective of this point, the hologram recording/reproducing system according to the related art has non-linearity.

FIGS. 71A and 71B illustrate simulation results for describing such non-linearity. Each of FIGS. 71A and 71B illustrates the comparison results between the amplitude of the readout signal to be obtained originally, calculated by employing a simulator of the hologram recording/reproducing system, and the amplitude of a signal to be read out actually by the image sensor 104. The amplitude of the readout signal to be obtained originally has been obtained by integrating the signal input to each pixel of the image sensor 104 by the simulator according to the size of the pixel thereof without changing the signal. Also, the amplitude of the signal to be read out actually by the image sensor 104 has been obtained by calculating the square root of the results obtained by squaring the signal input to the image sensor 104 and integrating this according to the size of the pixel.

In each drawing, the amplitude of the readout signal to be obtained originally is taken as the horizontal axis, and the amplitude of the signal to be read out actually by the image sensor 104 is taken as the vertical axis, and the relation between both is illustrated by plotting. In the event that the vertical axis serving as output has linear relationship as to the horizontal axis serving as input, the plot thereof becomes a straight line, and accordingly, in general, such diagrams are called "diagrams for viewing linearity".

Note that, with the simulator in this case, one pixel of the SLM 101 is divided into 16×16 blocks, and also the size of one pixel of the image sensor 104 is set to the size of 8×8 blocks. That is to say, the over-sampling rate is double (over-sampling of 2×2). In this case, integration is performed assuming that only the region of 5×5 blocks at the center portion of one pixel of the image sensor 104 is valid. This condition has been set based on the actual fill factor of the image sensor 104. Also, the aperture size has been set to 1.2×1.2 which is the Nyquist aperture size.

It should be noted that, with the simulations in FIGS. 71A through 72B, intentional irradiation position shifting of a reproduced image has not been performed. Thus, in the case of employing the over-sampling of 2×2 (i.e., over-sampling of an integral multiple), one data pixel is accommodated within a region of 2×2 pixels of the image sensor 104 (same as the state in FIG. 69). Also, as can be understood from this, with the simulation in this case, the data pixel position is found beforehand, and accordingly, the processing for position identifying has not been performed.

FIG. 71A illustrates a "diagram for viewing linearity" in the case of no phase mask 102 being provided (in the case of including no phase mask), and FIG. 71B illustrates a "diagram for viewing linearity" in the case of the phase mask 102 being provided (in the case of including the phase mask). As can be understood with reference to FIG. 71A, confirmation can be made that, even in the case of including no phase mask, the negative amplitude included within the signal is rectified, and thus, folding back occurs.

Also, in the case of including the phase mask in FIG. 71B, confirmation can be made clearly that a region where the amplitude of the original signal on the horizontal axis becomes negative has no linearity at all.

Also, the following FIGS. 72A and 72B illustrate diagrams for viewing linearity in a case where the over-sampling rate has been set to a rate other than an integral multiple, and also amplitude value calculation by linear interpolation has been performed. FIG. 72A illustrates the case of including no phase mask, and FIG. 72B illustrates the case of including the phase mask. FIG. 72A illustrates, with the horizontal axis as the amplitude value of 1×1 pixel obtained by simply thinning out the results of over-sampling of 2×2 calculated in FIG. 71A, and with the vertical axis as the results obtained by calculating the amplitude value of a data pixel position to be processed from the results of over-sampling of 1.33×1.33 by linear interpolation, the relations between both by plot points.

Also, FIG. 72B illustrates, with the horizontal axis as the amplitude value of 1×1 pixel obtained by simply thinning out the results of over-sampling of 2×2 calculated in FIG. 71B, and with the vertical axis as the results obtained by calculating the amplitude value of a data pixel position to be processed from the results of over-sampling of 1.33×1.33 by linear interpolation, the relations between both by plot points.

It should be noted that, as described above, with the simulation in this case, intentional irradiation position shifting of a reproduced image has not been performed, and accordingly, a value on the horizontal axis can be handled as the amplitude of a signal when pixel matching is taken such as shown in the drawing.

Note that FIGS. 72A and 72B also illustrate results obtained by employing the simulator employed in FIGS. 71A and 71B, but as described above, with this simulator, the size of one pixel of the SLM 101 is taken as 16×16 blocks, and accordingly, if one pixel size of the image sensor 104 is set to 12×12 blocks, an over-sampling rate according to 16/12≈1.33 times can be set. In this case as well, a valid region within one pixel of the image sensor 104 is set to a region of 5×5 of the center portion.

As can be understood with reference to FIGS. 72A and 72B, in a case where the over-sampling rate is set to a halfway value other than an integer, and the amplitude value of a data pixel position is calculated by linear interpolation, the mismatched level of the amplitudes of the vertical and horizontal axes (i.e., lowness of linearity) becomes great both in the case of including no phase mask and in the case of including the phase mask. The mismatch level of the amplitude values in the case of no phase mask in FIG. 72A becomes considerably great, but the mismatched level of the amplitude values in the case of including the phase mask in FIG. 72B becomes exceedingly great, which is a problem prior to a practical realization level.

As these simulation results in FIGS. 71A through 72B illustrate, a hologram recording/reproducing system according to the related art has non-linearity. With a recording/reproducing system according to the related art, the above-mentioned sampling theorem is not established appropriately due to such a non-linearity problem. That is to say, with a recording/reproducing system according to the related art, even if a condition of over-sampling rate>aperture size is set, reproduction of data fails to be performed appropriately in some cases.

Specifically, with a recording/reproducing systems according to the related art, temporary reproduction performance sufficient for practical realization can be secured with settings of the aperture size of around 2.0, and over-sampling rate of around 2.0.

Here, as described above, with regard to the aperture size, high recording density can be realized by reducing the value thereof. Accordingly, from the perspective of this, it is desirable to reduce the aperture size as small as possible.

However, it has been determined that it is difficult to reduce the aperture size to the above-mentioned 2.0 or less from the above-mentioned non-linear problem. That is to say, in the case of reducing the aperture size, the band limit width of high-frequency components is also enlarged, and distortion readily occurs as to the readout signal by the image sensor 104 by the worth thereof. However, with a non-linear system, it becomes extremely difficult to appropriately correct such distortion which occurred as to the readout signal, and as a result thereof, it has been determined that it is difficult to reduce the aperture size to at or below a predetermined value, specifically the above-mentioned around 2.0.

Also, with such a recording/reproducing system, it has been found that it is difficult to reduce the over-sampling rate to at or below 2.0 due to such a restriction regarding the aperture size. That is to say, according to the above-mentioned sampling theorem, the value of the over-sampling rate has to be set to at least a value greater than the value of the aperture size, and accordingly, the over-sampling rate has to be set greater than 2.0.

If the over-sampling rate is great, the data amount to be handled at the time of reproduction of data is apt to increase, which prevents realization of a high transfer rate. From this point of view, unless the restriction regarding the aperture size is eliminated, realization of a high transfer rate is also prevented.

As described above, with hologram recording/reproducing systems according to the related art, it is difficult to realize high recording density and a high transfer rate.

A reproducing device according to an embodiment of the present invention for performing reproduction regarding a hologram recording medium in which a hologram page is recorded in accordance with signal light, by interference between the signal light in which bit data is arrayed with the information of light intensity difference in pixel increments, and reference light, the reproducing device includes: a reference light generating unit configured to generate the reference light to be irradiated when obtaining a reproduced image regarding the hologram page recorded in the hologram recording medium; a coherent light generating unit configured to generate coherent light of which the intensity is greater than the absolute value of the minimum value of the amplitude of the reproduced image, and the phase becomes the same phase as the reference phase within the reproduced image; an image sensor configured to receive an input image in pixel increments to obtain an image signal; and an optical system configured to guide the reference light to the hologram recording medium, and also guide the reproduced image obtained from the hologram recording medium according to the irradiation of the reference light, and the coherent light to the image sensor.

According to such an embodiment of the present invention, the number of pixels of the image sensor, and the optical system are adjusted such that an over-sampling rate representing a ratio regarding whether to receive the image of one data pixel worth representing the information of one data bit worth within the reproduced image at the region of how many pixels worth of the image sensor side is greater than at least one.

With such an arrangement as the basis, the reproducing device according to the embodiment of the present invention further includes: a square root calculating unit configured to input an image signal obtained based on light-receiving operation by the image sensor to calculate the square root of each value making up the image signal; a removing unit configured to remove the components of the coherent light from an image signal serving as the square root calculation result by the square root calculating unit; a pixel position identifying unit configured to identify the position of each data pixel included in the reproduced image from an image signal after removal processing by the removing unit; a pixel amplitude value obtaining unit configured to obtain the amplitude value at each data pixel position within the image signal based on the information of the position of each data pixel identified by the pixel position identifying unit; and a reproducing unit configured to reproduce recorded data based on the amplitude value at each data pixel position obtained by the pixel amplitude value obtaining unit.

With the above configuration, an arrangement is made wherein a reproduced image is read out by the image sensor through over-sampling, and the position of each data pixel is identified according to signal processing regarding the image signal read out by the image sensor. That is to say, with the present invention, a case where optical pixel matching is not performed is taken as a premise.

As described above, with a hologram reproducing system according to the related art, phase information included in a reproduced image is not detected, and detection regarding light intensity alone is performed. This intensity is equivalent to the absolute value (square value) of the amplitude of a reproduced image being detected. Accordingly, with the above-mentioned embodiment of the present invention, coherent light of which the intensity is greater than the absolute value of the minimum value of the amplitude of the reproduced image is also irradiated at the time of performing readout of data by irradiating reference light, and thus, the value according to the intensity of the coherent light is added to the original amplitude value. Based on this, the square root of each value of the image signal obtained by detecting the square value of the amplitude thereof is calculated regarding the reproduced image obtained by adding the coherent light components thus described above, and moreover, reproduction of data is performed after the added components are removed.

Thus, a value which is greater than the absolute value of the minimum value (e.g., −1) of the amplitude of the reproduced image (e.g., 1.5) is added, and the square root regarding each value of the image signal detected as the square value thereof is calculated, and further, the added coherent light components are removed, and thus, a negative amplitude (−1) is read out appropriately. Specifically, thus, in a case where three values according to "+1", "0", and "−1" are recorded by employing a phase mask, these "+1", "0", and "−1" can be read out appropriately, and thus, linear readout is realized.

Note that, with the present invention, it is taken as a condition that the phase of coherent light is set to the same phase as a reproduced image, which is because the amplitude value according to coherent light fails to be added to a reproduced image appropriately in a case where the phase of coherent light is not set to the same phase tentatively.

As described above, according to the present invention, information recorded in a hologram recording medium can be read out linearly. Thus, linear readout is realized, whereby the restriction regarding the aperture size according to the related art can be eliminated, and accordingly, the aperture size according to the present invention can be reduced as compared to the related art. If the aperture size can be reduced, the over-sampling rate can be reduced according to the Nyquist sampling theorem (condition of over-sampling rate>aperture size) as compared to the related art.

Thus, reduction in the aperture size, and decrease in the over-sampling rate can be realized, whereby high recording density of data as to a hologram recording medium, and improvement in a data transfer rate can also be realized.

BRIEF DESCRIPTION OF THE DRAWINGS

FIG. 8 is a block diagram illustrating the internal configuration of a data reproducing unit included in the reproducing device according to the embodiment;

FIG. 11 is a diagram for describing a detection technique for the page center position;

FIGS. 14A through 14F are diagrams for describing a technique for extrapolating two syncs in the case of being surrounded by two syncs;

FIG. 64 is a diagram for describing a technique for recording information to a hologram recording medium;

DESCRIPTION OF THE PREFERRED EMBODIMENTS

Preferred embodiments for carrying out the present invention (hereinafter referred to as "embodiments") will be described.

First Embodiment

Configuration of Reproducing Device

Figure 1:
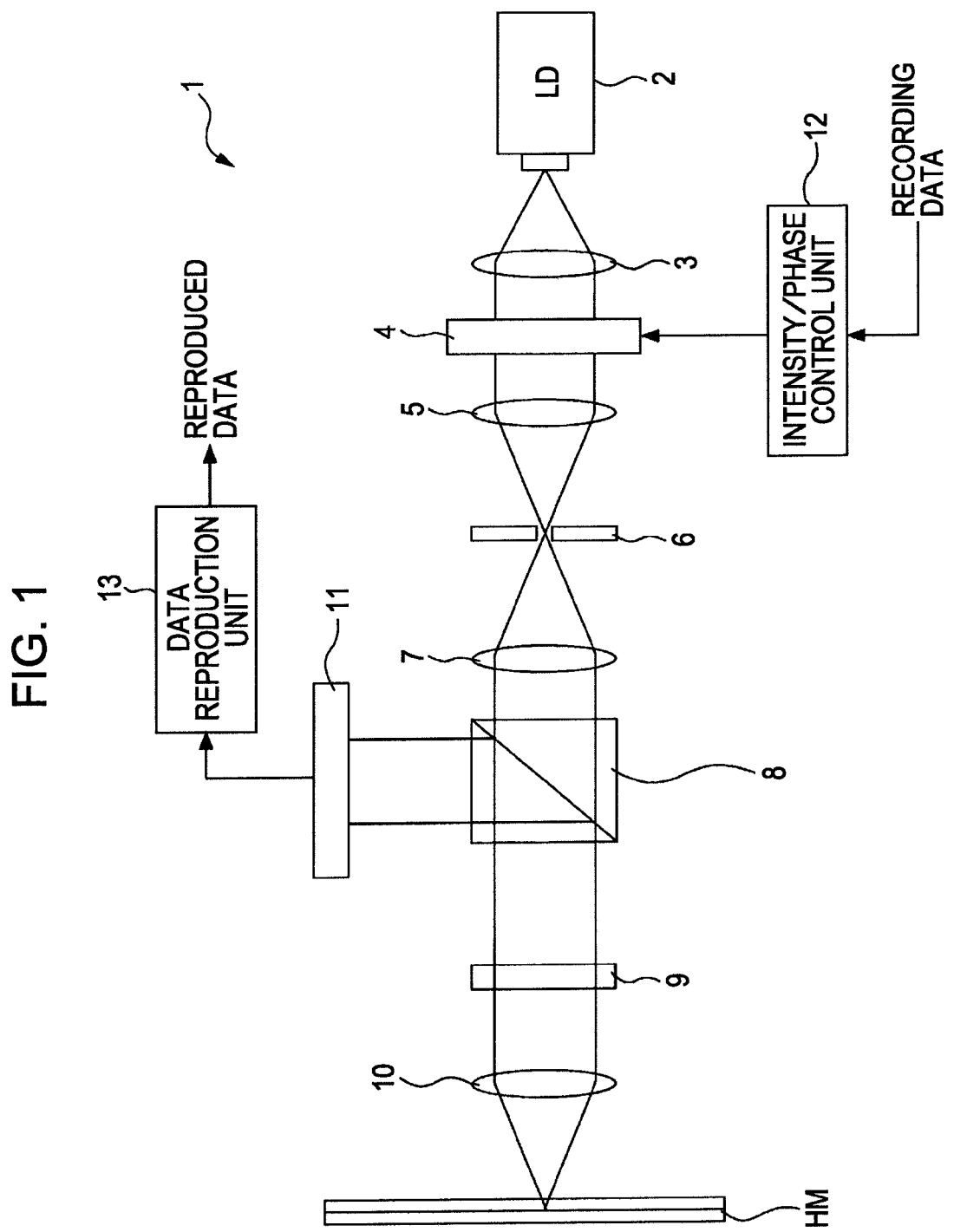
FIG. 1 is a block diagram illustrating the internal configuration of a reproducing device according to an embodiment of the present invention.

FIG. 1 is a block diagram showing the internal configuration of a recording/reproducing device 1 according to an embodiment of a reproducing device according to the present invention. In FIG. 1, the structure of an optical system, a recording data modulating system, and a reproducing system, of the recording/reproducing device 1 is primarily shown, and other components have been omitted from the drawing.

In this embodiment, a so-called coaxial system is employed as a hologram recording and reproducing system.

With the coaxial system, signal light and reference light are arranged on the same axis, both the signal light and the reference light are irradiated on a hologram recording medium HM to record data using interference fringes, and at the time of reproduction, only the reference light is irradiated on the hologram recording medium HM to reproduce the data recorded in accordance with the interference fringes. In this case, the hologram recording medium HM in FIG. 1 is a so-called reflection type hologram recording medium including a reflection film, and the recording/reproducing device 1 has a configuration adapted to such a reflection type hologram recording medium HM.

In FIG. 1, a laser diode (hereinafter may be abbreviated to "LD") 2 is provided as a light source for obtaining a laser beam for recording/reproduction. A laser diode with an external oscillator is employed as the laser diode 2, with a wavelength of 410 NM. Light emitted from the laser diode 2 is transmitted through a collimator lens 3, converted into parallel light, and then input to a spatial light modulator (hereinafter may be abbreviated to "SLM") 4.

The spatial light modulation which the SLM 4 performs on incident light includes both spatial light intensity modulation (hereinafter may be referred to simply as "intensity modulation") and spatial light phase modulation (hereinafter may be referred to simply as "phase modulation").

Now, in spatial light modulation performed by the SLM 4, signal light and reference light used for performing data recording to the hologram recording medium HM are generated. The signal light is light which has been affected by the intensity modulation corresponding to the recording data, and the reference light is data used for forming interference fringes on the hologram recording medium HM by interference with the signal light.

Figure 2:
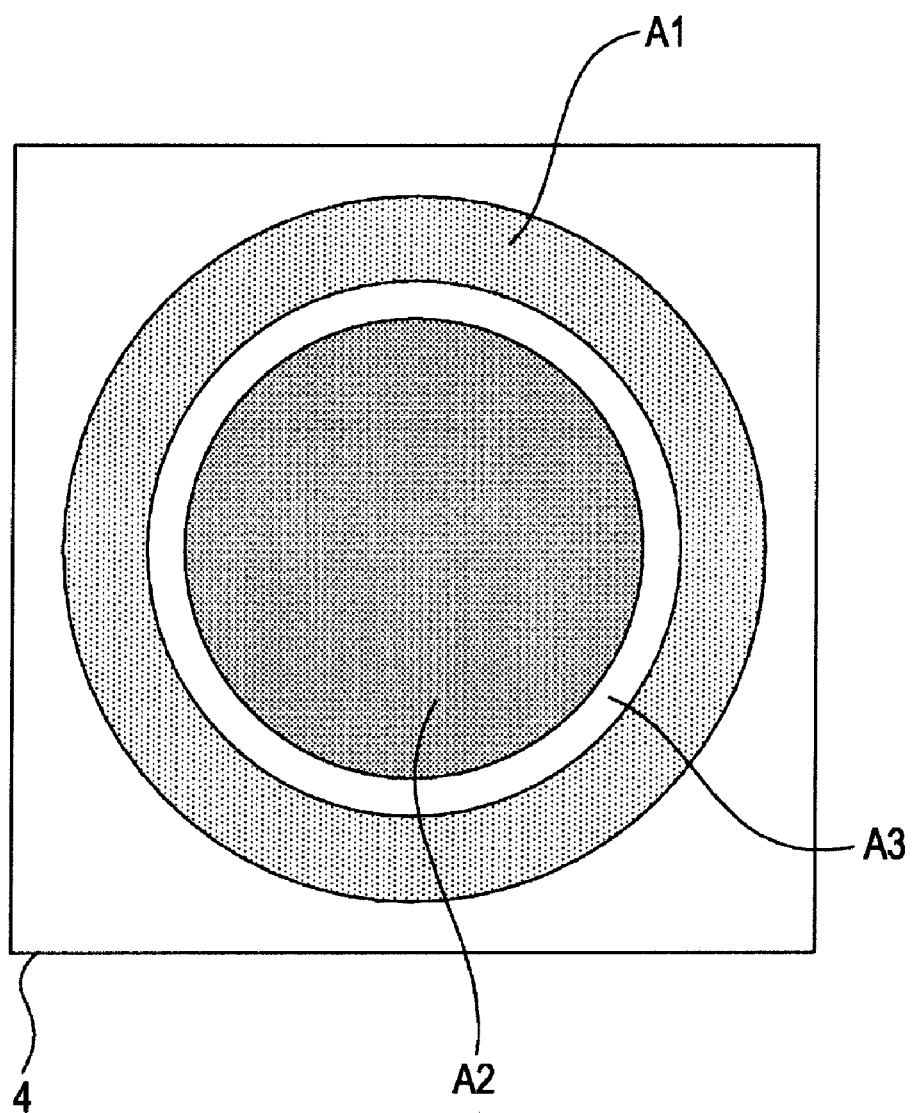
FIG. 2 is a diagram for describing the areas of a reference light area, signal light area, and gap area, stipulated in an SLM.

A reference light area A1, a signal light area A2, and a gap area A3, are stipulated in the SLM 4, so as to enable generating of the signal light and reference light, as shown in FIG. 2. Specifically, a circular area including the center portion of the SLM 4 is defined as the signal light area A2, as shown in FIG. 2. Across the gap area A3 on the perimeter portion thereof, the reference light area A1 is defined concentrically with the signal light area A2. Note that the gap area A3 has been provided as region to avoid reference light from leaking into the signal light area A2 and causing noise.

In FIG. 1, the operations of intensity modulation and phase modulation by the SLM 4 are performed under control of an intensity/phase control unit 12. While specific spatial light modulation operations realized by the SLM 4 and intensity/phase control unit 12 as an embodiment will be described later, it should be noted that the spatial light modulation in this case is no different from that according to the related art in that the signal light and the reference light are generated at the time of recording, and that the reference light is generated at the time of reproducing.

Light subjected to spatial light modulation at the SLM 4 passes through a relay lens 5, and is condensed so as to arrive at a focal point at a predetermined position as shown in FIG. 1, following which diffused light after condensing is input to a relay lens 7 so as to be converted into parallel light.

An aperture 6 is provided at position of the focal point formed by condensing at the relay lens 5, i.e., at the position of the Fourier panel (frequency plane). The aperture 6 is configured such that only incident light within a predetermined range from the center of the optical axis is transmitted. At the time of recording, the diameter of the signal light is reduced by the aperture 6, so as to achieve high-density recording.

Light which has passed through the relay lens 7 passes through a polarization beam splitter 8, and further a quarter-wave plate 9, and then is condensed by an object lens 10 so as to be cast on the hologram recording medium HM.

At the time of recording as described above, signal light and reference light is generated at the SLM 4. Accordingly, at the time of recording, the signal light and reference light are cast on the hologram recording medium HM hologram recording medium HM via the path described above, and consequently, interference fringes (diffraction grating, hologram) of the signal light and reference light are formed on the hologram recording medium HM. Thus, data is recorded.

Also, at the time of reproduction, the reference light is reproduced by the SLM 4. Due to this reference light being cast on the hologram recording medium HM via the path described above, at the time of reproducing the diffracted light corresponding to the hologram formed on the hologram recording medium HM is obtained as reproduced light (a reproduced image).

The hologram recording medium HM according to this example is a reflecting type. Accordingly, the reproduced image is returned to the recording/reproducing device 1 side as reflected light from the hologram recording medium HM, and upon passing through the object lens 10 and then quarter-wave plate 9, is cast into the polarization beam splitter 8. The reproduced light cast into the polarization beam splitter 8 is reflected off of the polarization beam splitter 8, and guided to the image sensor 11, as shown in FIG. 1.

The image sensor 11 has an imaging device such as a CCD (Charge Coupled Device) sensor or a CMOS (Complementary Oxide Semiconductor) sensor for example, which receives the reproduced image from the hologram recording medium HM guided thereto as shown in FIG. 1, and converts the received reproduced image into electrical signals. Accordingly, at the time of reproducing, photoreception signals (image signals) representing the intensity detection results regarding the reproduced image (recorded image) are obtained. That is to say, readout signals regarding the recorded data are obtained. The image signals corresponding to the reproduced image obtained by the image sensor 11 is supplied to a data reproducing unit 13.

The data reproducing unit 13 reproduces recorded data by performing predetermined reproduced signal processing and decoding processing on the image signals. The operations and component configuration of the data reproducing unit 13 will be described later.

Over-sampling

Now, with a hologram recording/reproducing system such as shown in FIG. 1, it is considered to be extremely difficult to match the image of individual pixels of the SLM 4 within the reproduced image (also called "data pixels") and the individual pixels at the image sensor 11 side (also called "detector pixels") precisely in a one-on-one manner, due to problems such as optical distortion and enlargement/reduction ratio and so forth. In other words, configuring an optical system capable of pixel matching in such a strict sense is unrealizable, for all practical purposes.

With the present embodiment, an assumption will be laid forth that no such strict optical pixel matching is performed; with this understanding, processing is performed to identify at which positions in the image signals obtained at the image sensor 11 the individual data pixels are situated. Over-sampling is performed to enable such data pixel position identification in an effective manner.

Figure 69:
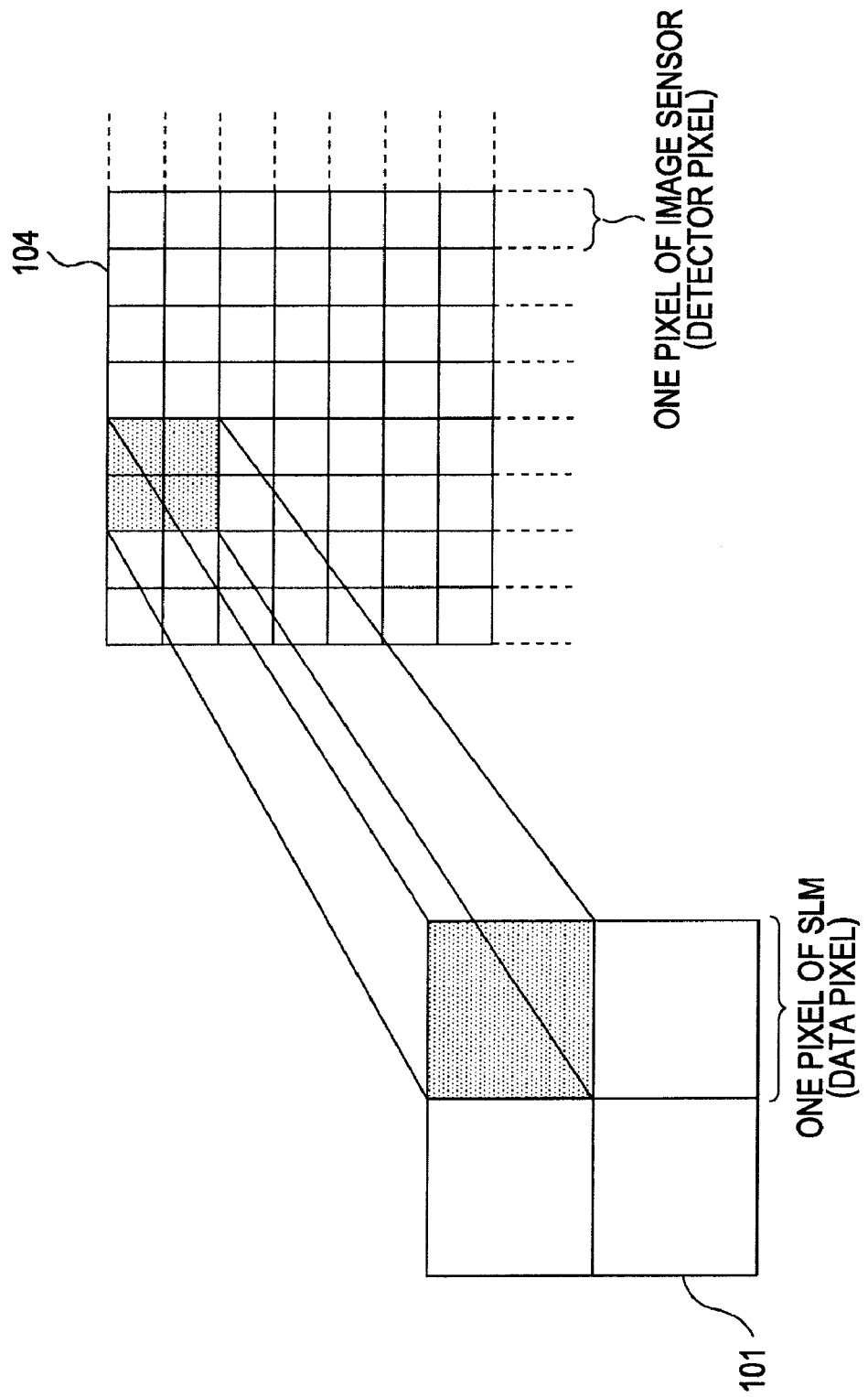
FIG. 69 is a diagram for describing over-sampling.

As can be understood from the description of FIG. 69 given earlier, this over-sampling is performed by receiving one data pixel worth of image at a region of n pixels worth (where n>1) on the image sensor 11. This over-sampling is performed so as to enable cases where shifting of the reproduced image occurs in increments smaller than pixels to be handled as well. For example, in the event that the over-sampling rate is set to 2×2=4 times (i.e., one data pixel worth of image is to be received at a region of 2×2=4 pixels worth at the image sensor 11), an image signal having fourfold resolution will be output from the image sensor 11.

Though omitted from description with reference to the drawings, the recording/reproducing device 1 shown in FIG. 1 performs setting of the number of pixels between the SLM 4 and image sensor 11, and adjustment of the optical system (particularly adjustment of scale) with such over-sampling.

Phase Modulation Recording and Insertion of Syncs

As can be understood from the above description, with the recording/reproducing device 1 shown in FIG. 1, the diameter of the signal light is reduced by the aperture 6 having been provided, thereby achieving high-density recording in accordance with reduction in the area occupied by a hologram page on the media. It should be noted that the term "hologram page" and means the same thing as interference fringes formed by one irradiation of signal light and reference light. In other words, this hologram page is be defined as indicating the smallest data increment which can be recorded on the hologram recording medium HM.

With the present embodiment, in addition to high-density recording relating to reduction in the area occupied by a hologram page with the aperture 6, the signal light is provided with phase modulation of "0" and "π" (binary random phase pattern) as with the phase mask 102 described earlier with reference to FIG. 64, thereby suppressing the DC component generated at the time of signal light being cast on the hologram recording medium HM, whereby multiplexed recording of hologram pages can be realized and recording density improved. With the present embodiment, phase modulation corresponding to the phase mask for realizing such high-density recording by multiplexed recording is performed by the SLM 4.

Figure 3:
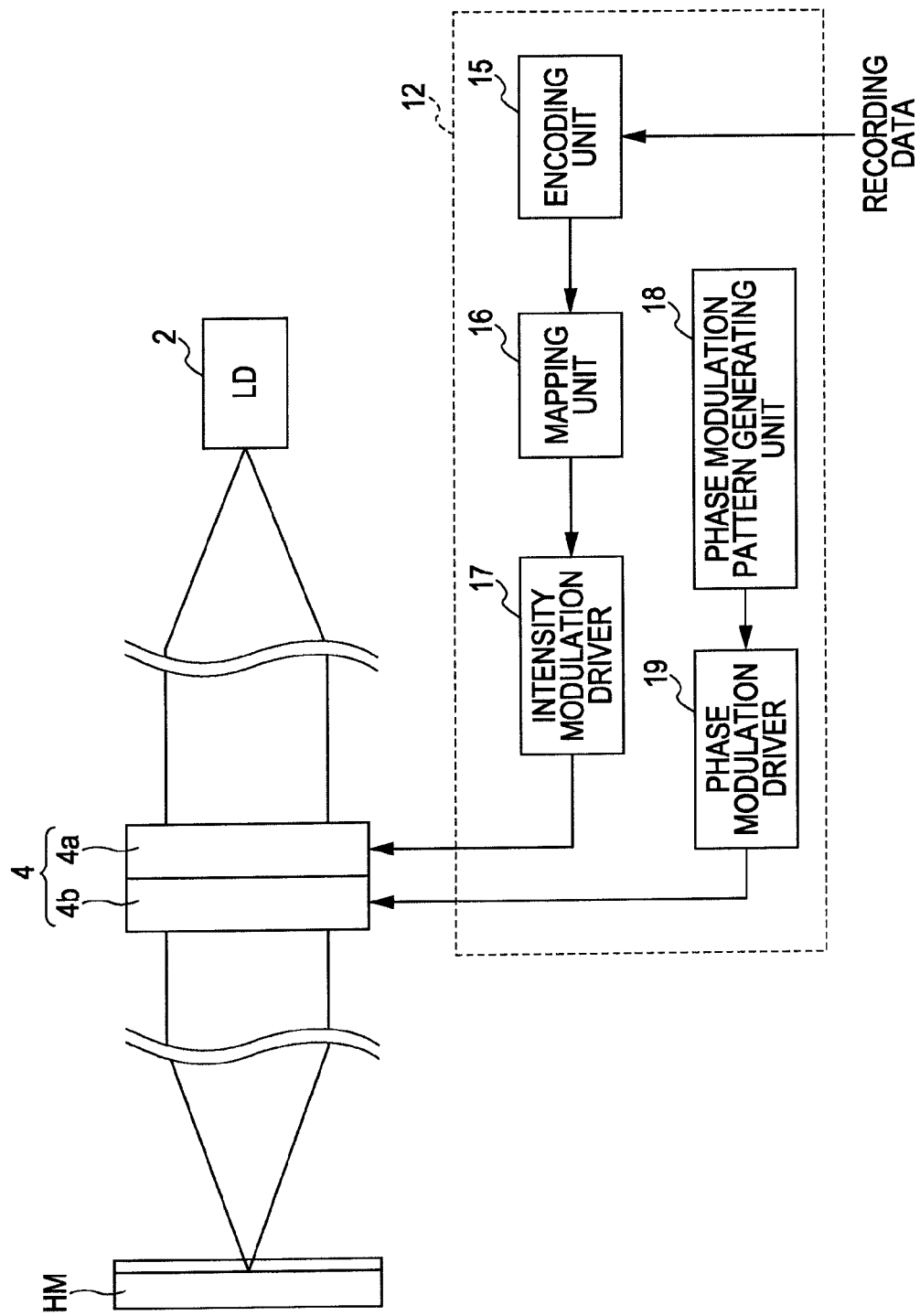
FIG. 3 is a block diagram primarily illustrating the internal configuration of an SLM and intensity/phase modulation control unit included in a reproducing device according to the embodiment.

FIG. 3 is a diagram primarily illustrating the internal configuration of the SLM 4 and intensity/phase control unit 12 which are shown in FIG. 1. Note that in FIG. 3, along with the laser diode 2 and hologram recording medium HM are illustrated light emitted from the laser diode 2 and guided to the SLM 4, and light guided to the hologram recording medium HM via the SLM 4.

As shown in FIG. 3, the SLM 4 has an intensity modulator 4a which performs intensity modulation to generate the above-described signal light and reference light, and a phase modulator 4b which subjects the light subjected to intensity modulation by the intensity modulator 4a to phase modulation. With the present embodiment, a transmissive liquid crystal panel capable of phase modulation variable in increments of pixels is used for the phase modulator 4b.

Figure 4A:
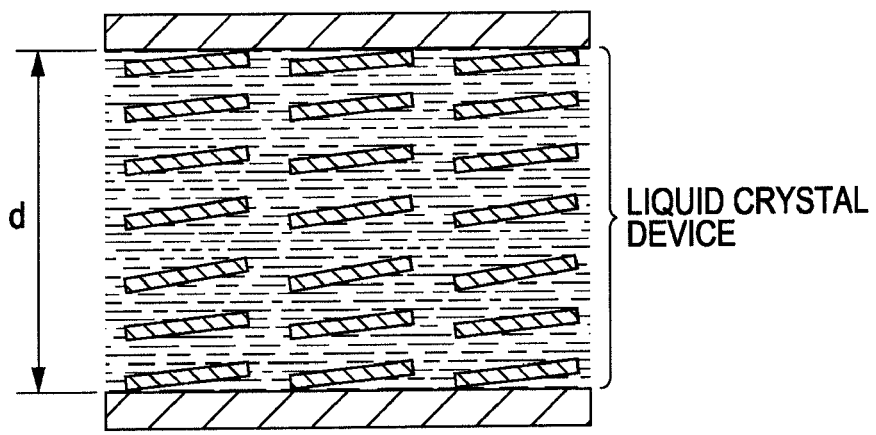
FIGS. 4A and 4B are diagrams for describing the structure of a liquid crystal device capable of phase modulation in increments of pixels.
Figure 4B:
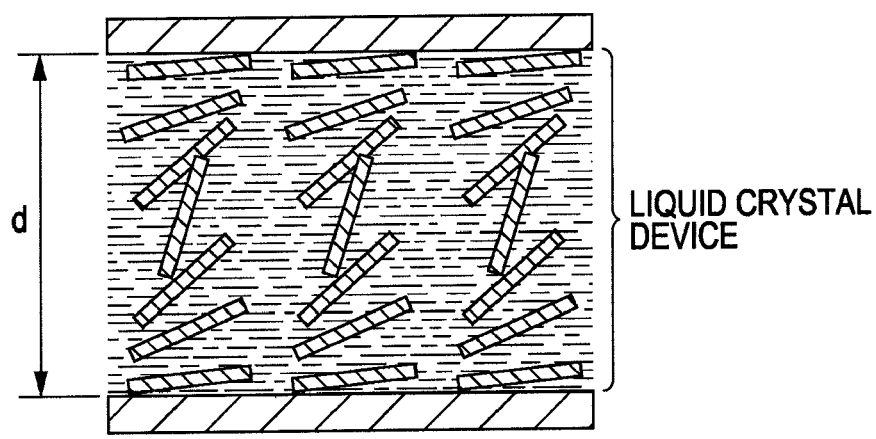

A liquid crystal panel capable of such phase modulation variable in increments of pixels can be realized by an internal liquid crystal device having a configuration based on the idea illustrated in FIGS. 4A and 4B. FIG. 4A illustrates the state of liquid crystal molecules with no driving voltage applied to the liquid crystal device within the liquid crystal panel (i.e., a state where the driving voltage is off), and FIG. 4B illustrates the state of the liquid crystal molecules with a predetermined driving voltage applied to the liquid crystal device (i.e., a state where the driving voltage is on). As can be seen from these drawings, the liquid crystal molecules exhibit horizontal orientation in the state with the driving voltage off shown in FIG. 4A, and the liquid crystal molecules change to a vertical orientation in the state with the driving voltage on shown in FIG. 4B.

Now, expressing the refractive index of the liquid crystal device as n, and more particularly the refractive index when in the horizontal orientation due to the driving voltage being off as "nh" and the refractive index when in the vertical orientation due to the driving voltage being on as "nv", and the thickness of the liquid crystal device as d, the amount of change in phase provided when the driving voltage is off is "d×nh", and the amount of change in phase provided when the driving voltage is on is "d×nv". Accordingly, the phase difference Δnd which can be provided by on/off of the driving voltage is expressed by $$\Delta nd = d \times nh - d \times nv.$$

As can be understood from this relational expression, providing a predetermined phase difference in increments of pixels can be realized by adjusting the thickness d of the liquid crystal device.

The phase modulator 4b according to the present embodiment is set such that the phase difference Δnd=π, for example, by adjusting the thickness d of the liquid crystal device. Thus, driving voltage switchover of on/off is performed for each pixel, thereby enabling light phase modulation with the two values of "0" and "π".

Also, enabling modulation of phases "0" and "π" between the driving voltage on at a predetermined level and the driving voltage off, means that the phase can be changed in steps from "0" to "π" by controlling the driving voltage level in steps to the predetermined level. For example, a modulation with a phase "π/2" can be realized with a driving voltage level of ½ that of the above predetermined level.

Returning to FIG. 3, the SLM 4 is configured with the phase modulator 4b, capable of performing phase modulation for each pixel, formed integrally with the intensity modulator 4a. That is to say, the intensity modulator 4a and the phase modulator 4b are integrally formed such that each of the pixels of the intensity modulator 4a and each of the pixels of the phase modulator 4b match in range in a one-on-one positional relation. Such a structure allows phase modulation to be performed on the light which is to become the signal light and reference light obtained by passing through the intensity modulator 4a, with a phase modulation pattern strictly matching in increments of pixels.

Note that with the present example, the reason that the phase modulator 4b capable of variable phase modulation in increments of pixels is used for phase modulation, as a phase mask, is as follows. At the time of recording, the signal light is subjected to phase modulation with the binary random phase pattern of "0" and "π", in line with suppressing the DC component as the phase mask, but with the present embodiment, at the time of reproduction, all pixels within the signal light area A2 have to be provided with a predetermined phase (specifically, phase modulation of "π/2") in order to add coherent light, which will be described later. From this perspective, with the case of the present embodiment, phases provided to the signal light area A2 have to be capable of being switched between when recording and when reproducing, and accordingly, the phase modulator 4b capable of variable phase modulation has to be used.

Figure 70:
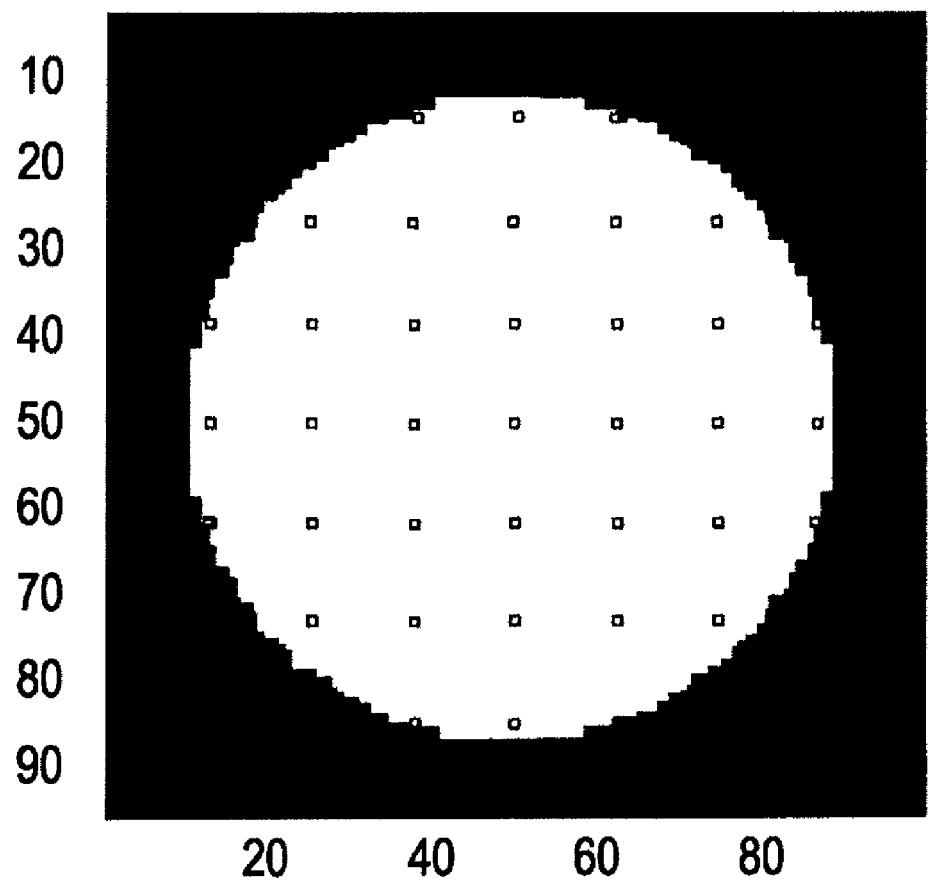
FIG. 70 is a diagram illustrating an example of inserting syncs into a hologram page.

Also, with the present embodiment, at the time of recording, a predetermined data pattern called a "sync" is inserted in the signal light, following a predetermined recording format. Specifically, with the recording format according to the present embodiment, the syncs are inserted in the signal light area A2 at predetermined equidistant pixel intervals. More specifically, the size of each sync in this case is 4×4 pixels. Syncs are placed at predetermined intervals of i_sper in both the horizontal direction and vertical direction within the signal light area A2 (see FIGS. 70 and 10), for example.

Syncs, such as described earlier with reference to FIG. 70, are used for identifying the position of data pixels in image signals regarding the reproduced image obtained at the image sensor 11 when reproducing.

The above-described phase modulation as a phase mask, and signal light generating operations following a recording format, are realized by the intensity/phase control unit 12 shown in FIG. 3 controlling the intensity modulator 4a and the phase modulator 4b of the SLM 4. In FIG. 3, the intensity/phase control unit 12 includes an encoding unit 15, a mapping unit 16, an intensity modulation driver 17, a phase modulation pattern generating unit 18, and a phase modulation driver 19.

First, at the time of recording, recording data shown in FIG. 1 is input to the encoding unit 15, and this recording data is subjected to predetermined recording modulation encoding processing following the recording format. For example, as a commonly-used sparse code in hologram recording/reproducing, 1 byte (8 bits) of recording data is converted into a square block-shaped data array of 4×4=16 bits. This 4×4=16-bit data array is called a "symbol", and is the smallest increment of recording code.

At the time of recording, the mapping unit 16 arrays the data encoded at the encoding unit 15 in the signal light area A2 following the recording format. At this time, the mapping unit 16 inserts the above-described syncs at the predetermined interval i_sper following the recording format. Due to this mapping processing, one hologram page worth of data pattern is generated.

The mapping unit 16 performs such mapping of data to the signal light area A2, and also sets predetermined pixels in the reference light area A1 to "1" and other pixels to "0", and further generates a data pattern wherein the gap area A3 and portions outwards from the perimeter of the reference light area A1 are all "0", and moreover generates a data pattern of all valid pixels of the intensity modulator 4a by combining this data pattern with the data pattern within the signal light area A2.

The data pattern of all valid pixels of the intensity modulator 4a by thus generated is supplied to the intensity modulation driver 17, and the intensity modulation driver 17 performs driving control of the pixels of the intensity modulator 4a based on this data pattern. Accordingly, light serving as the base for signal light that has been subjected to intensity modulation in accordance with the pattern according to the recording data, and further light serving as the base for signal light that has been subjected to intensity modulation in accordance with a predetermined pattern, are generated.

Also, at the time of recording, the intensity/phase control unit 12 performs operations for driving control of the intensity modulator 4a, and also performs operations for driving control of the phase modulator 4b.

Now, the phase modulation pattern generating unit 18 generates a phase modulation pattern to be set within the signal light area A2 of the phase modulator 4b, based on the predetermined data pattern set beforehand, in order to perform phase modulation as a phase mask. In the case of the present embodiment as well, the phase modulation pattern serving as the phase mask, has a binary random phase pattern set. Also, the phase modulation pattern generating unit 18 generates a predetermined phase modulation pattern as the phase modulation pattern to be set for the reference light area A1 of the phase modulator 4b.

The phase modulation pattern generating unit 18 then generates a phase modulation pattern for all valid pixels of the phase modulator 4b by combining the phase modulation patterns for the signal light area A2 and reference light area A1 generated in this way (control patterns of corresponding pixels). At this time, pixels other than those in the signal light area A2 and reference light area A1 can be set to a value corresponding to the phase "0", for example. The phase modulation pattern generated in this way is supplied to the phase modulation driver 19.

The phase modulation driver 19 performs driving control of the pixels of the phase modulator 4b based on the phase modulation pattern supplied from the phase modulation pattern generating unit 18. Thus, phase modulation can be performed with binary random phase pattern serving as a phase mask on the signal light ultimately output from the SLM 4, and also, light phase modulation by a predetermined phase modulation pattern is performed regarding the reference light as well.

Figure 67A:
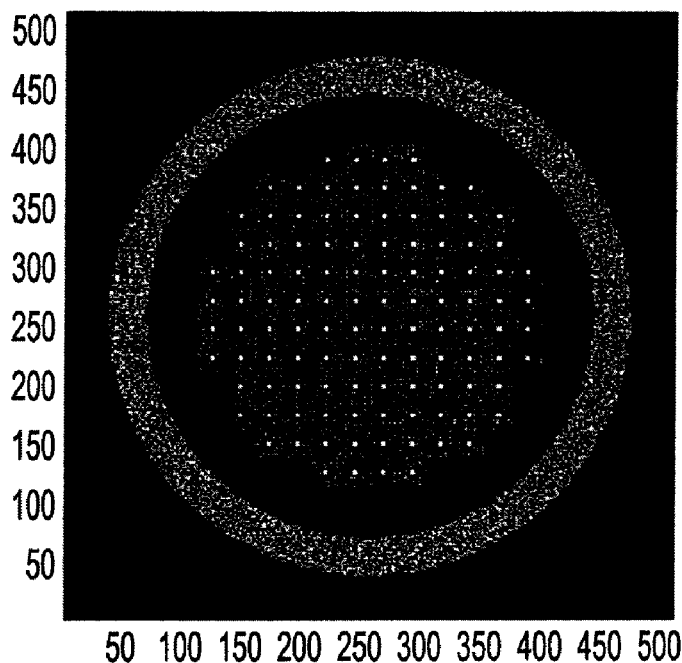
FIGS. 67A and 67B are diagrams illustrating the difference in signal light and reference light between a case with no phase mask (FIG. 67A) and a case with a phase mask (FIG. 67B)
Figure 67B:
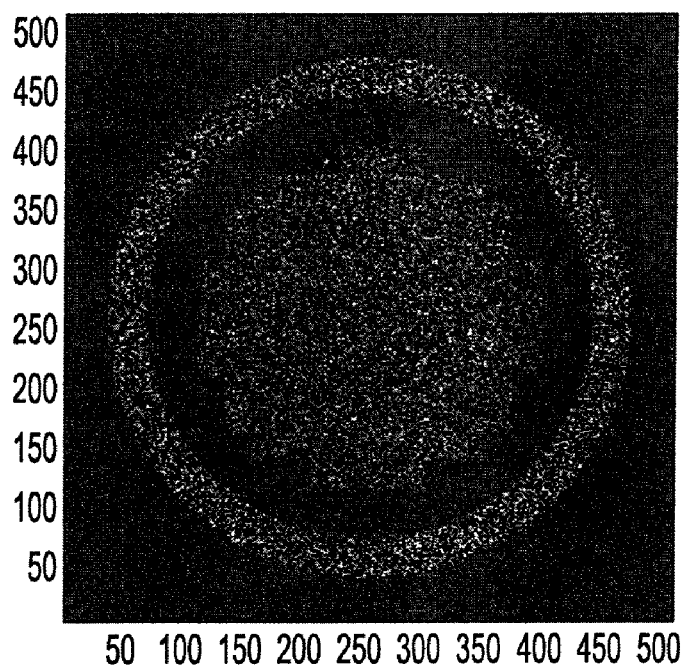
Figure 68:
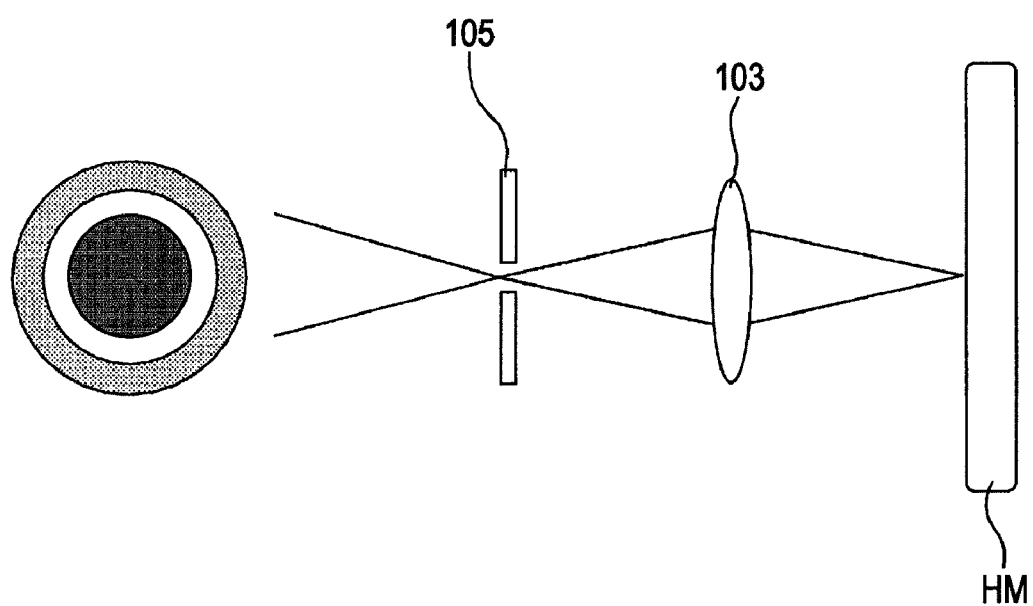
FIG. 68 is a diagram for describing an aperture.

The output image of the intensity modulator 4a and the output image of the phase modulator 4b obtained in accordance to the operations of the intensity/phase control unit 12 when recording, described above, are the same as those described earlier with reference to FIGS. 67A and 67B. That is to say, as shown in FIG. 67A, a pattern array of bits "0" and "1" is obtained within the signal light area A2 for the output image of the intensity modulator 4a. Also, for the reference light area A1, intensity modulation is performed based on the predetermined pattern of "0" and "1", thereby generating a pattern of "0" and "1" as shown in FIGS. 67A and 67B.

Also, as for the output image of the phase modulator 4b, it can be seen that "+1", "0", and "−1" are randomly generated within the signal light area A2 as shown in FIG. 67A, due to phase modulation being performed on the output image as a phase mask, with the intensity modulator 4a such as shown in FIG. 67A. Also, predetermined phase modulation is performed for the reference light area A1 as well, thereby generating the three values of "+1", "0", and "−1" which can be confirmed here.

Multiplexed recording of hologram pages has been mentioned earlier, which will be touched upon here. At the time of performing multiplexed recording, multiplexed recording of hologram pages is performed by continuously changing the patterns of reference light (intensity and phase) each time when recording. Also, at the time of reproducing recording multiplexed hologram pages, setting the reference light pattern (intensity and phase) to be the same pattern as when recording, allows intended hologram pages to be read out selectively.

Coherent Addition

As described above, a hologram recording/reproducing system according to the related art which only irradiates reference light when reproducing is non-linear, in that the image sensor which obtains image signals regarding the reproduced image does not detect phase information. This problem of non-linearity means that with recording/reproducing system according to the related art, the aperture size (determined by the size of the transmitting region of incident light at the aperture 6) can only be reduced so far, so it has been considered difficult to realize high-density recording to a hologram recording medium HM.

Also, with a hologram recording/reproducing system, an arrangement wherein at least over-sampling rate>aperture size holds has to be realized due to the Nyquist sampling theorem, and this restriction on aperture size means that the over-sampling rate is not reducible beyond a predetermined level, so consequently, it has been considered difficult to improve the data transfer rate when reproducing. The present embodiment aims to deal with this problem by enabling linear readout, enabling further reduction in the aperture size, and accordingly enabling further reduction in the over-sampling rate.

With the present embodiment, such linear readout is realized by irradiating coherent light along with the reference light at the time of reproducing. Coherent light means light wherein the amplitude and phase are uniform. Specifically, the term "coherent light" as used with the present embodiment means light of which the phase is the same phase as the reference phase within the reproduced image obtained from the hologram recording medium HM in accordance with irradiation of reference light, and of which the intensity is set so as to be greater than the absolute value of the minimum amplitude of the reproduced image.

Note that here, the term "reference phase within the reproduced image" means the phase of a data pixel which has been recorded with modulation by phase "0" having been provided.

In order to generate such coherent light, the intensity/phase control unit 12 shown in FIG. 3 performs the following operations at the time of reproducing. Note that in the description above, at the time of reproducing, the mapping unit 16 within the intensity/phase control unit 12 generates a data pattern where just the reference light area A1 is the same "0" and "1" pattern as the time of recording and the other regions are all "0", and the intensity modulation driver 17 performs driving control of the pixels of the intensity modulator 4a based on this data pattern. With the present embodiment, light is also passed through the signal light area A2 as well, thereby generating coherent light with uniform light intensity.

Specifically, the mapping unit 16 sets the reference light area A1 to the "0" and "1" pattern the same as the time of recording, and further generates a data pattern wherein the entire region of the signal light area A2 is set to a predetermined value other than "0" and all other regions are set to "0". This data pattern is supplied to the intensity modulation driver 17.

Now, at the intensity modulator 4a, the transmissivity is changed in accordance with the diving voltage level of each pixel. That is to say, instead of binary values of "0" or "1", the transmissivity can be changed variable from "0" to "1".

In accordance with this, the intensity modulation driver 17 drives the relevant pixel at a driving voltage level wherein the light intensity is maximum in accordance with "1" supplied from the mapping unit 16 (for example, in the case of 256 steps, a value corresponding to "255"), and drives the relevant pixel at a driving voltage level wherein the light intensity is minimum in accordance with "0". In the event that a predetermined value other than "0" is assigned from the mapping unit 16 as the data pattern within the signal light area A2, the pixels within the signal light area A2 of the intensity modulator 4a are driven at the driving voltage level corresponding to that value by the intensity modulation driver 17. That is to say, coherent light can be obtained with an intensity corresponding to the value assigned from the mapping unit 16 within the signal light area A2.

Thus, the intensity of coherent light can be variably set by values set within the signal light area A2 by the mapping unit 16, but according to the description made above, a condition of the intensity of coherent light is to be a value greater than the absolute value of the minimum amplitude of the reproduced image. An intensity satisfying this condition can be obtained by obtaining a value satisfying the above conditions as the result of experimentation regarding the values set at the mapping unit 16 beforehand and the intensity of coherent light obtained thereby, and assigning this value to be set within the signal light area A2.

Figure 5A:
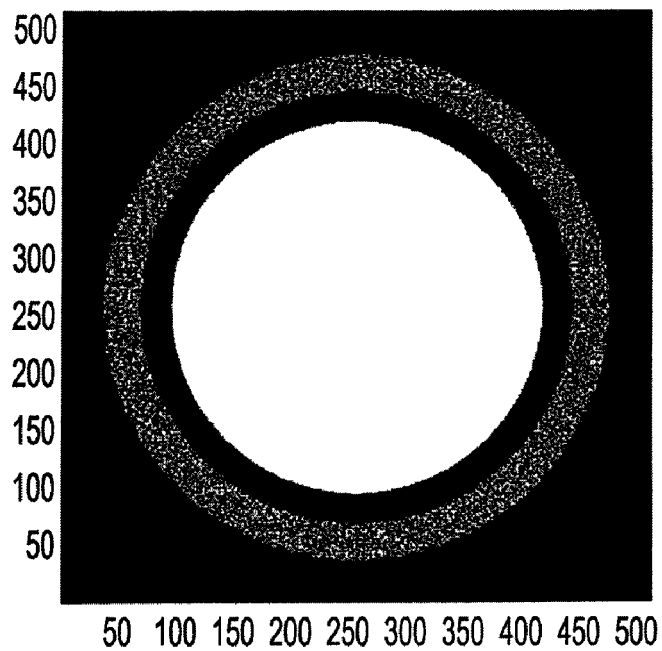
FIGS. 5A and 5B are schematic representations of output images of an intensity modulator and phase modulator when adding coherent light.

FIG. 5A schematically illustrates an output image of the intensity modulator 4a obtained based on reproduction operations of the mapping unit 16 and intensity modulation driver 17 as described above. With FIG. 5A, amplitude of "1" is represented by white and amplitude of "0" is represented by black, and according to the above description, it can be understood that the signal light area A2 transmits light by the signal light area A2 being driven by a driving voltage of a predetermined level. In FIG. 5A, a case is shown wherein the value of the entire signal light area A2 is "1", so the entire region of the signal light area A2 is white. Also, the "0" and "1" pattern, the same as with the case of recording, is obtained for the reference light area A1.

Also, in FIG. 3, at the time of recording the following operation is further performed at the phase modulation pattern generating unit 18. That is to say, the phase modulation pattern generating unit 18 generates a data pattern for the reference light area A1 of the phase modulator 4b as a phase modulation pattern the same as with the time of recording, and further generates for the signal light area A2 a data pattern wherein the entire region is filled in with a predetermined value. The phase modulation pattern generating unit 18 then combines these data patterns to generate data for all valid pixels of the phase modulator 4b, and supplies this to the phase modulation driver 19.

The phase modulator 4b also is configured so as to be capable of driving each pixel variably in accordance with the driving voltage level, the same as with the intensity modulator 4a. That is to say, the phase can be variable changed from "0" to "π" for each pixel, in accordance with the driving voltage level. Accordingly, the phase modulation driver 19 is also configured so as to drive each of the pixels of the phase modulator 4b at a driving voltage level at a value from "0" to "1" (in 256 steps, for example) from the phase modulation pattern generating unit 18.

In the event of filling in the signal light area A2 with a predetermined value in accordance with a data pattern generated by the phase modulation pattern generating unit 18 as described above, the phase modulation driver 19 drives the pixels of the signal light area A2 of the phase modulator 4b at a driving voltage level corresponding to that value. Accordingly, the phase of the coherent light obtained by passing through the signal light area A2 can be variably set in accordance with the above predetermined value.

Having the same phase as the reference phase within the reproduced image as described above is a condition for the phase of coherent light. In order to achieve such "same phase as the reference phase within the reproduced image", in the event that the phase of a pixel to which modulation of phase "0" has been provided by the phase modulator 4b at the time of recording is such that reference phase="0", the value of the phase to be provided to the coherent light (within the signal light area A2) by the phase modulator 4b should be "π/2".

The reason that phase modulation of "π/2" is provided to the coherent light is as follows. With the hologram recording/reproducing method, a phenomenon occurs wherein at the time of casting a reference light on a hologram recording medium HM to obtain a reproduced image, the phase of the reproduced image shifts from the phase of the recording signal by π/2 (see Kogelnik, H "Coupled wave theory for thick hologram grating", Bell System Technical Journal, 48, 2909-47). From this point we can see that the reference phase within the reproduced image does not remain at "0" but is shifted by "π/2", and accordingly the phase to be provided to the coherent light should be set to "π/2" as well. Accordingly, at the time of generating coherent light, modulation of phase "π/2" should be provided to each pixel within the signal light area A2 by the SLM 4 (phase modulator 4b).

Figure 5B:
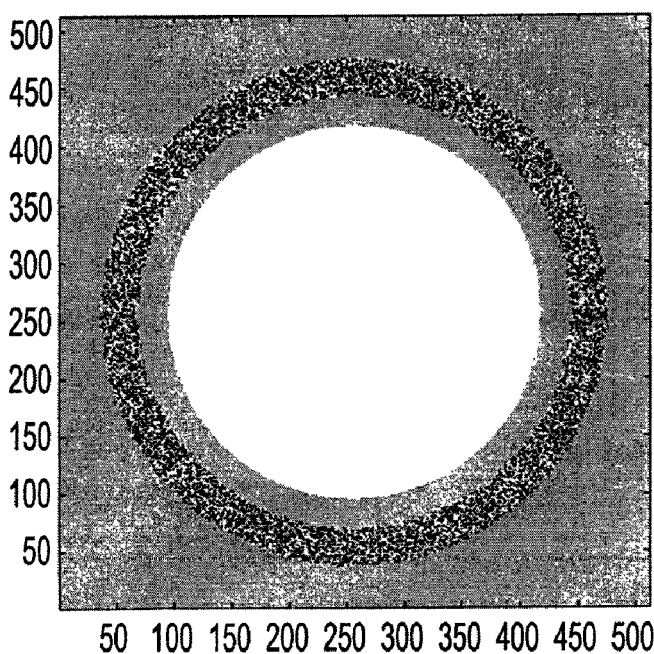

In order to provide such modulation of phase "π/2", "0.5" (in the case of 256 steps, a value equivalent to "127") is assigned as the value within the signal light area A2 by the phase modulation pattern generating unit 18. For reference, FIG. 5B schematically illustrates an output image of the phase modulator 4b obtained by operations of the phase modulation pattern generating unit 18 and phase modulation driver 19 described above. Note that in FIG. 5B, amplitude of "+1" is represented by white, amplitude of "0" is represented by gray, and amplitude of "−1" is represented by black.

Due to the operations of the intensity/phase control unit 12 as described above, at the time of reproducing, along with the reference light, a coherent light is also cast on the hologram recording medium HM, this coherent light having a phase which is the same as the reference phase within the reproduced image and an intensity which is greater than the absolute value of the minimum amplitude of the reference image. That is to say, with the present embodiment, which a reproduced image is obtained corresponding to the data recorded on the hologram recording medium HM by irradiation of the reference light, on the other hand, following coherent light being cast on the hologram recording medium HM, this coherent light is guided to the image sensor 11 as reflected light along with the reproduced image.

At this time, the phase of the coherent light is the same phase as the reproduced image, so the coherent light is added as a component having the same phase as the reproduced image, at the time of imaging on the image sensor 11. Accordingly, the image sensor 11 can obtain readout signals regarding the component wherein the coherent light has been added to the reproduced image.

Figure 6:
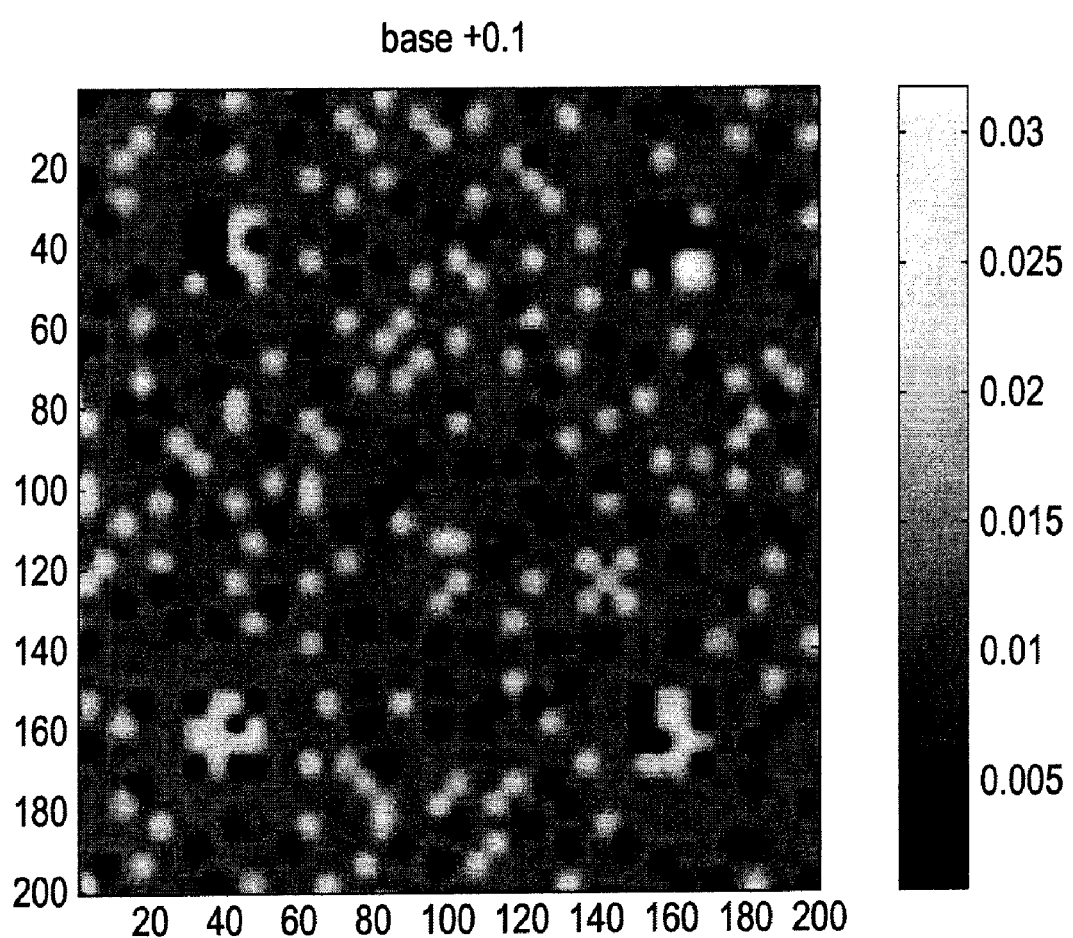
FIG. 6 is a diagram illustrating a reproduced image in a case that the coherent addition amount is 0.1.
Figure 7:
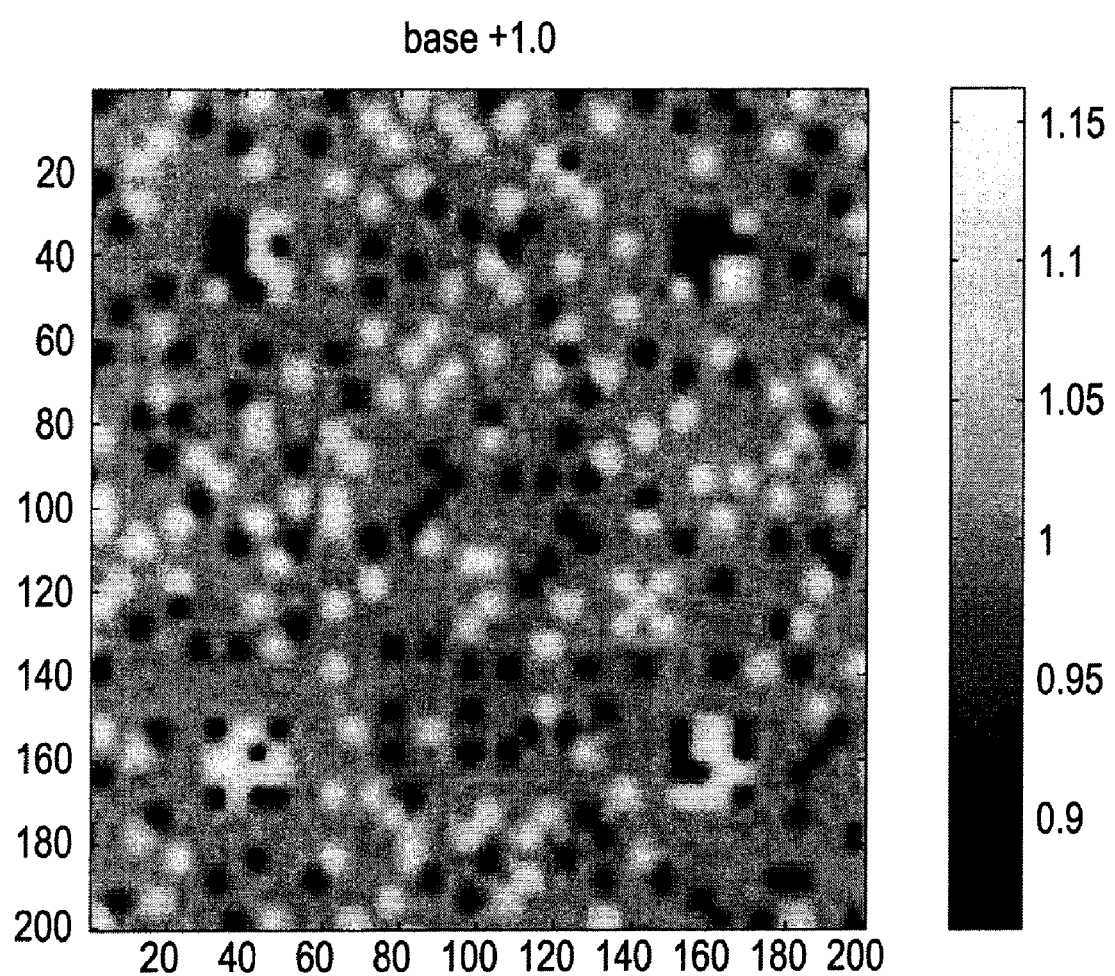
FIG. 7 is a diagram illustrating a reproduced image in a case that the coherent addition amount is 1.0.

FIGS. 6 and 7 illustrate a reproduced image following having performed addition of coherent light as described above. FIG. 6 shows a case wherein the addition amount of coherent light is 0.1 (base+0.1), and FIG. 7 shows a case wherein the addition amount of coherent light is 1.0 (base+1.0). Note that these diagrams illustrate the amplitude of the reproduced image in terms of light/dark, with dark colors representing small amplitude and light colors representing great amplitude.

With reference to these drawings, we can see that a pattern in accordance with the recording data is properly obtained in the reproduced image in the case of adding the coherent light as well. That is to say, a reproduced image properly reflecting the recorded data is obtained in a case of performing coherent addition as well.

Also, comparing FIGS. 6 and 7, it appears that in a case of greater addition amount of coherent light, the center of overall contrast is lowered, having been shifted to the white side. This shows that the amplitude of the reproduced image can be uniformly amplified over the entire region, in proportionate to the addition amount of coherent light.

Thus, in the case of irradiating the coherent light along with the reference light at the time of reproducing, the image sensor 11 can be made to perform readout of the component where coherent light has been added to the reproduced image.

With the present embodiment, an operation is performed wherein the square roots of the values making up the image signals are calculated for the readout signals (image signals) for the reproduced image to which coherent light has been thus added, and the component of coherent light is removed from the square root calculation results. Removal of the coherent light component is specifically performed by subtracting the value of intensity of added coherent light from the value of the square root calculation results. As one example, if we say that the minimum amplitude of the reproduced image is −0.078, and that the intensity of the coherent light is set to 0.1, which is greater than the absolute value 0.078 thereof, this value 0.1 is subtracted from the square root calculation results.

Now, description will be made regarding realization of linear readout by removing the coherent light component from the readout image signals of reproduced image+coherent light, by performing square root calculation and removing the coherent light component from the square root calculation results.

First, in general, an optical system in a hologram recording/reproducing device is of a configuration based on a 4f optical system which has each of the SLM, object lens, media, ocular lens, and image sensor, placed so as to be distanced by the lens focal distance. This is true with the optical system of the recording/reproducing device 1 shown in FIG. 1 as well. This is a configuration called Fourier Transform Hologram.

With such a Fourier Transform Hologram configuration, the series of operations of recording and reproducing described above can be understood as follows. That is to say, the recorded data pattern of the SLM is subjected to Fourier transform and projected on the media, and the readout signals (reproduced image) of the media is subjected to inverse Fourier transform and project on the image sensor. The image sensor detects intensity of light wherein the absolute value of the amplitude of the wavefront of the light input thereto is squared.

Based on this assumption, let us consider a case of performing readout with only irradiation of reference light as with the related art, without performing such coherent addition in the present embodiment. An example will be illustrated herein wherein the maximum and minimum amplitudes of the recording image corresponding to "+1" and "−1" with the phase mask are 0.078 and −0.078, respectively.

With the above assumption, the output value of the image sensor 11 obtained in accordance with the maximum and minimum amplitudes of the recording image are the same value at 6.1E-3, which is the square thereof. Thus, values equivalent to "+1" and "−1" are detected at the same value at the image sensor 11, so regardless of whatever signal processing is performed hereafter, the lost phase information is not accurately restored. In other words, non-linear distortion has occurred.

On the other hand, with the case of the present embodiment wherein coherent light is irradiated, a value corresponding to the intensity of the coherent light can be added to the reproduced image. Now, the coherent light is a DC component wherein the amplitude and phase are uniform, and accordingly there is no interference with the recorded hologram page. The coherent light following irradiation of the media is added as coherent light having the same phase of the reproduced image at the time of imaging on the image sensor 11 the reproduced image obtained in accordance with irradiation of the reference light. That is to say, a predetermined amplified value can be added to the reproduced image. Thus, we can see from FIGS. 6 and 7 that this phenomenon has been demonstrated.

Now, if we say that the added amount of coherent light satisfying the condition of "greater than the absolute value of the minimum amplitude of the reproduced image" is set to 0.1 for example, adding the component of 0.1 to the reproduced image results in the maximum value 0.078 being $0.178^2=0.032$ and the minimum value −0.078 being $0.022^2=4.8E-4$ in intensity as detected by the image sensor 11. In this case, the output of the image sensor 11 is subjected to processing wherein the square root of the intensity read out thus is calculated and the added component is removed. Accordingly, the maximum amplitude 0.078 can be restored to the original value by 0.178−0.1=0.078, and the minimum amplitude −0.078 can also be restored to the original value by 0.022−0.1=−0.078. Thus, with the present embodiment, linear readout wherein phase information added by the phase mask is not lost, can be realized.

Also, FIG. 7 illustrates a case wherein the coherent addition amount is 1.0, in which the intensity information $(0.078+1.0)^2=1.162$, $(-0.078+1.0)^2=0.850$ detected by the image sensor 11 have the square roots thereof (1.078, 0.922) calculated, and the added amount is subtracted (1.078−1.0, 0.922−1.0), thereby restoring the original amplitude of ±0.078.

That is to say, the only condition which the magnitude of the coherent addition has to clear is "a value greater than the absolute value of the minimum amplitude of the reproduced image", so that there is no negative folding regarding the intensity detection by the image sensor 11 (squaring).

This, performing the coherent light addition readout according to the present embodiment allows information to be correctly read out even in cases that ternary information of amplitude "−1", "0", and "+1" is recorded to the hologram recording medium HM. That is to say, in addition to the amplitude "0", amplitudes "−1" and "+1" including phase information can be correctly read out, and linear readout can be realized.

Now, of the operations described above with the present embodiment, the processing for calculating the square root and for removing the coherent light component is performed by the data reproducing unit 13 shown in FIG. 1. The internal configuration of this data reproducing unit 13 shown in FIG. 1 is shown in FIG. 8. The data reproducing unit 13 shown in FIG. 8 includes a linearization processing unit 20, an up-scaling unit 21, an equalizing filter 22, a resampling unit 23, a data distinguishing unit 24, and a sparse code decoding unit 25.

The signal processing for the above-described linear readout is performed by the linearization processing unit 20. As shown in FIG. 8, the linearization processing unit 20 includes a square root calculating unit 20a and a subtraction unit 20b. The square root calculating unit 20a calculates the square roots of the values making up the image signals obtained by the image sensor 11, and supplies the results to the subtraction unit 20b. It should be noted that the image sensor 11 represents the intensity of light detected in amplitude values in predetermined steps, such as 256 steps for example. The square root calculating unit 20a performs square root calculation for the amplitude values of each of the pixels of the image sensor 11.

Also, the subtraction unit 20b subtracts a value corresponding to the coherent light addition amount from the square root values obtained from the square root calculating unit 20a. Specifically, the intensity of the coherent light in this case is set to a predetermined value greater than the absolute value of the minimum amplitude of the reproduced image, so a value whereby this can be cancelled out is set beforehand, and this value is substrate. In a case wherein the minimum amplitude of the reproduced image is −0.078 as with the example described above, and the intensity of the coherent light is set to 0.1, which is greater than 0.078 which is the absolute value thereof, this value 0.1 is subtracted from the value of the square root.

Also, with the linearization processing unit 20, linearization is obtained regarding readout signals from the image sensor 11, but in order to reproduce the recorded data shown in FIG. 1, resampling processing has to be performed wherein the positions of each of the data pixels are identified from the image signals obtained by the linearization processing, and the amplitude values of each of the data pixels are obtained, as well as data identification processing wherein the bit values of "0" and "1" arrayed within the hologram are identified from the amplitude values of the data pixels obtained by theresampling processing, and further decoding processing regarding the aforementioned sparse code. To this end, the data reproducing unit 13 is provided with the up-scaling unit 21, equalizing filter 22, resampling unit 23, data distinguishing unit 24, and sparse code decoding unit 25.

First, the up-scaling unit 21 is provided with the calculation results from the subtraction unit 20b, i.e., the linear readout signals (image signals) obtained from the linearization processing unit 20. The up-scaling unit 21 up-scales the readout signals to a predetermined scale by performing interpolation processing, for example, on the readout signals.

Note that with the recording/reproducing device 1 according to the present embodiment, as described earlier, over-sampling is performed in which 1 data pixel with of image is received with n pixels (where n>1) of the image sensor 11. That is to say, the up-scaling unit 21 enables high resolution with further up-scaling on the over-sampled image signals. For example, if we say that the over-sampling rate is twofold (2×2=4) and the up-scaling scale is twofold (2×2=4), the resolution as to 1 data pixel worth of image can be made to be twofold 4×4=16. Improving resolution in this way allows positioning in accordance with irradiation position offset of the reproduced image to be performed with higher precision.

The image signal following up-scaling by the up-scaling unit 21 is supplied to the equalizing filter 22. The equalizing filter 22 receives input of the image signals following the above up-scaling, and waveform equalizing processing to prevent inter-code interference. Such equalizing processing for preventing inter-code interference can understood as a two-dimensional adaptation of waveform equalizing processing on one-dimensional signals, which is widely employed in the fields of optical discs, communication, and so forth.

The resampling unit 23 obtains amplitude values of each of the data pixels from the image signals following equalization processing by the equalizing filter 22. That is to say, upon having identified the positions of each of the data pixels in the image signals, the amplified values at each of the data pixel positions are obtained. The processing for this identifying of the positions of the data pixels form the readout image signals and obtaining the amplitude values at each of the data pixel positions, is called "resampling processing" here.

With the first embodiment, processing using linear interpolation is performed as such resampling processing, but description of the internal configuration of the resampling unit 23 which performs this resampling processing, and specific processing performed thereby, will be described later, for the sake of convenience.

The data distinguishing unit 24 performs data distinguishing (bit determination) based on the amplitude values of the data pixels obtained by the resampling unit 23. Now, in accordance with the description made earlier, at the time of recording, 8 bits of recording data are converted into a block-shaped data array (symbol) of 4×4=16 bits by sparse coding, and the symbols are mapped into the hologram page.

This sparse coding involves taking just m bits of the 16 bits as "1", and the rest as "0", for example. Thus, the data distinguishing unit 24 performs data distinguishing (also called "sort detection") by taking the bits of the m data pixels having the greatest amplitude values out of all of the data pixels in that symbol as "1", and the rest as "0". The bit values obtained in increments of symbols by the data distinguishing performed in increments of symbols by such sort detection, are supplied to the downstream sparse code decoding unit 25.

The sparse code decoding unit 25 inputs the bit values in increments of symbols obtained as described above, and performs decoding of the sparse code for each symbol. That is to say, the 4×4=16 bits are decoded into the original 8 bits of data, thereby reproducing the recording data shown in FIG. 1, i.e., recording data is obtained.

Effects of Coherent Addition

With the recording/reproducing device 1 according to the present embodiment which performs the readout using coherent addition described above, the phase information recorded in the hologram recording medium HM can also be correctly read out, thereby realizing linear readout. Realizing linear readout means that restrictions on the aperture size, which the non-linear systems according to the related art had, can be done away with. Doing away with the restrictions on aperture size in this way means that the only condition determining the over-sampling rate and aperture size is the Nyquist sampling theorem, i.e., the only restrictive condition determining the over-sampling rate and aperture size is that over-sampling rate>aperture size holds.

With this understanding, we can say that by enabling linear readout, the conditions for the sampling theorem to be correctly established are all present.

For example, with a system according to the related art, an aperture size of around 2.0 has been the lower limit, and further reduction has been difficult, but doing away with the restriction on the aperture size means that aperture sizes smaller than 2.0 can be realized. This means that the over-sampling rate can also be reduced to 2.0 or lower, due to the sampling theorem. Such enabling of reduction in size of the aperture size, and reduction of the over-sampling rate, enables realizing of high recording density to the hologram recording medium HM and improved data transfer rate.

Figure 9A:
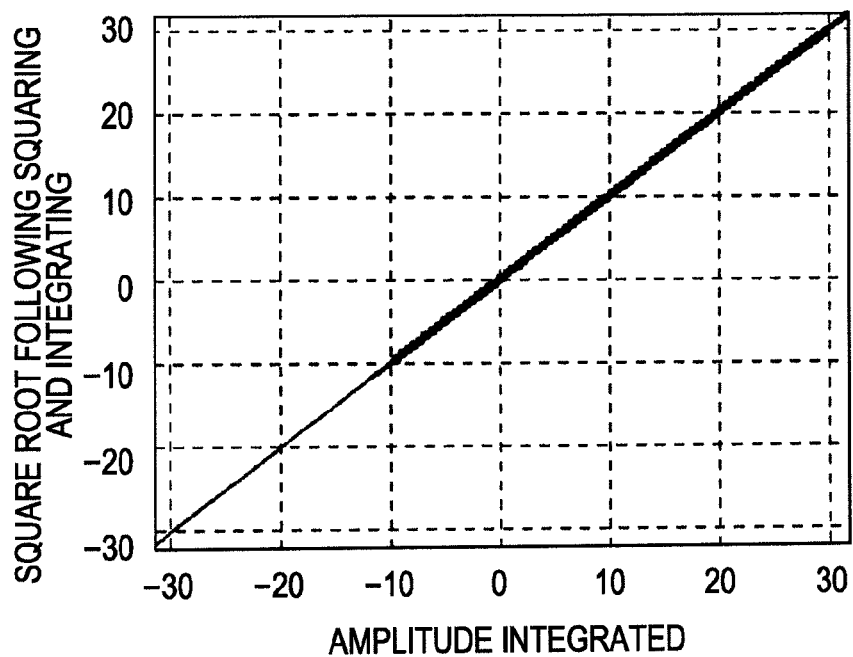
FIGS. 9A and 9B are "diagrams for viewing linearity" in the case of performing coherent addition according to the embodiment.
Figure 9B:
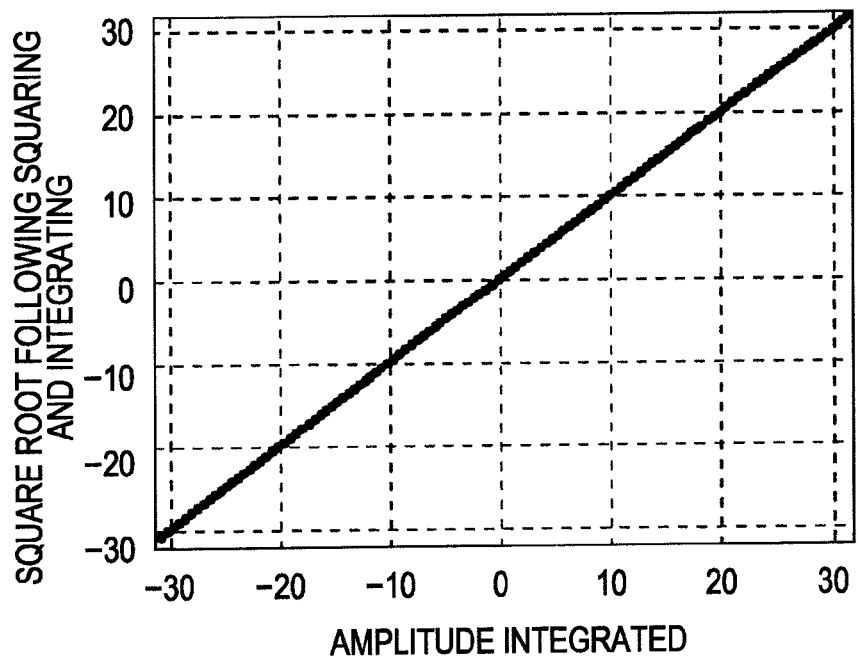

FIGS. 9A and 9B illustrate "diagrams for viewing linearity", calculated using a simulator of a hologram recording/reproducing system, which performs coherent addition readout according to the present embodiment. FIGS. 9A and 9B are diagrams illustrating the results of comparison between the amplitude of readout signals which should be obtained, and the amplitude of signals actually read out by the image sensor 11. The amplitude of readout signals which should be obtained is obtained by the input signal simply integrated in accordance with the size of the pixel. Also, the amplitude of signals actually read out by the image sensor 11 in this case is obtained by calculating the square root of the signal input to the image sensor 11 having been squared and integrated in accordance with the size of the pixel, and then subtracting a value in accordance with the intensity of the coherent light.

Note that the "amplitude of signals actually read out by the image sensor 11" has been subjected to coherent addition, and the "signal input to the image sensor 11" has added thereto the coherent light component which is of the same phase as the reference phase within the reproduced image and greater than the absolute value of the minimum amplitude of the reproduced image.

With FIGS. 9A and 9B, the horizontal axis represents the amplitude of the readout signal which originally should be obtained, and the vertical axis represents the amplitude of the signal actually read out by the image sensor 11, with the relation therebetween plotted.

Figure 71A:
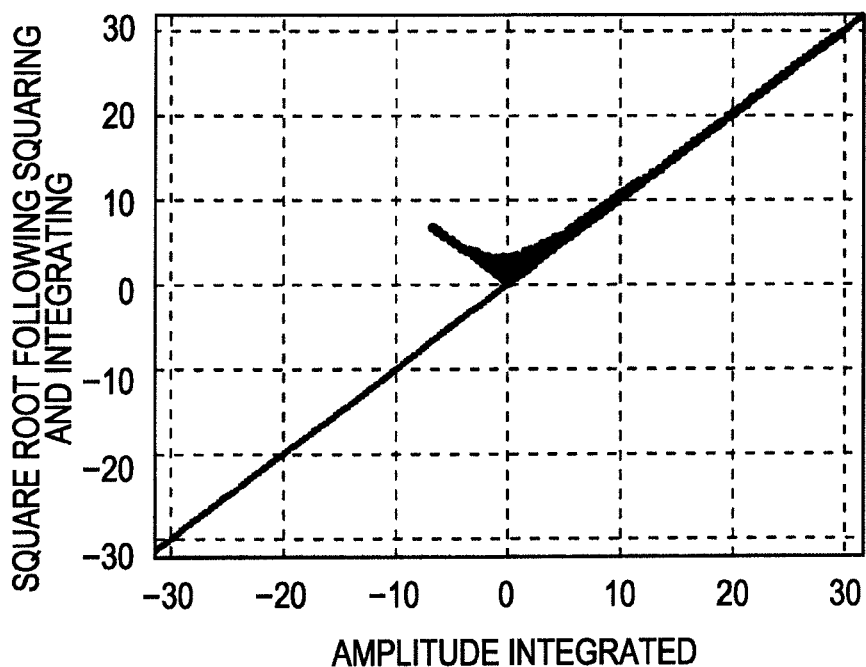
FIGS. 71A and 71B are diagrams illustrating simulation results for describing non-linearity which a hologram recording/reproducing system according to the related art has.
Figure 71B:
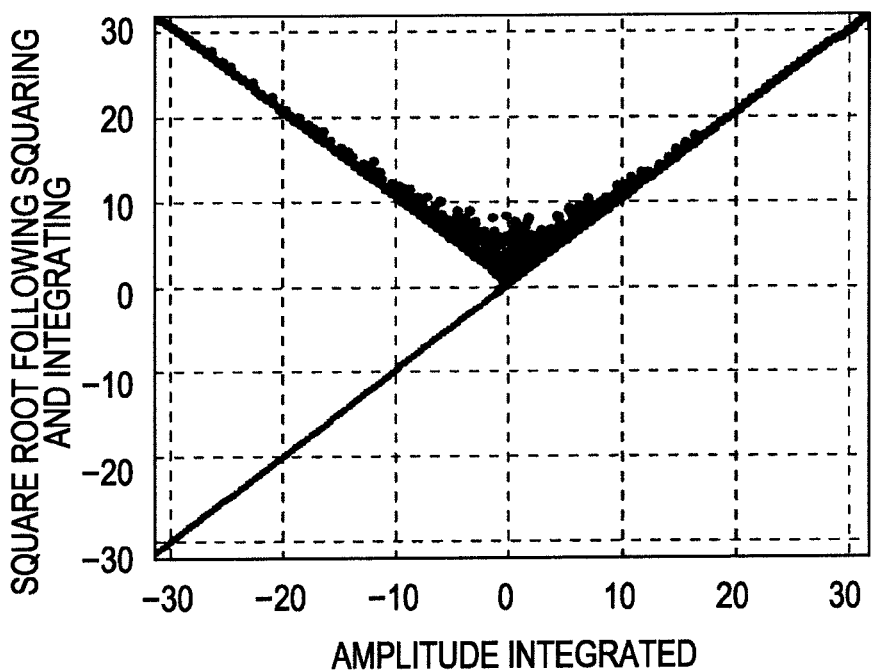
Figure 72A:
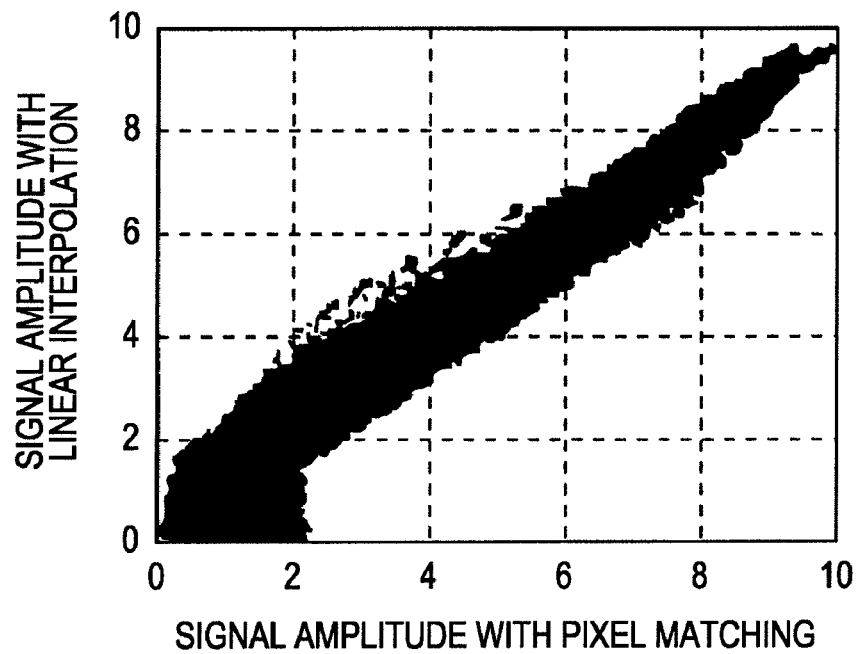
FIGS. 72A and 72B are diagrams illustrating "diagrams for viewing linearity" in the case of setting the over-sampling rate to a rate other than a multiple of an integer, and performing amplitude value calculation with linear interpolation.
Figure 72B:
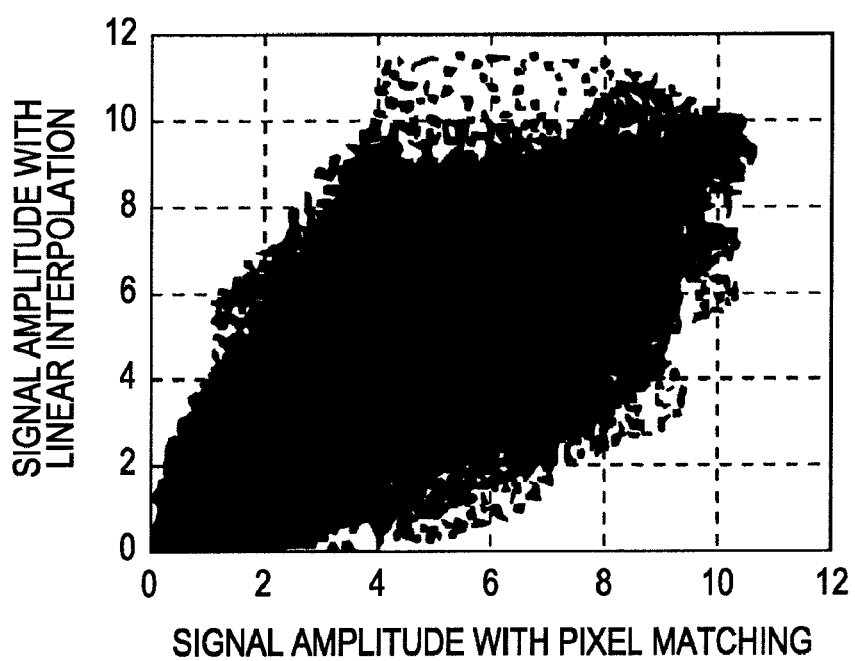

With the simulator in this case, one pixel of the SLM 4 is divided into 16×16 blocks, and also one pixel of the image sensor 11 is set to a size of 8×8 blocks, as with the case of the simulator shown in FIGS. 71A and 71B. That is to say, the over-sampling rate is 2.0 times (over-sampling of 2×2). In this case as well, integration is performed with the understanding that only the region of the 5×5 blocks at the center portion of the one pixel of the image sensor 11 is valid. This condition has been set based on the actual fill factor of the image sensor 11.

Also, in this case as well, the aperture size has been set to the 1.2×1.2 of the Nyquist aperture size. Moreover, in this case as well, no intentional positional shifting of the recording image has been performed in the simulation.

FIG. 9A illustrates the results of a case of no phase modulation as a phase mask at the time of recording (case of no phase mask), and FIG. 9B illustrates the results of a case of performing phase modulation as a phase mask at the time of recording (case with phase mask). As can be understood from comparison with the "diagrams for viewing linearity" in FIGS. 71A and 71B, in the case of the present embodiment where coherent addition readout is performed, the values of the vertical and horizontal axes almost perfectly match for both cases of no mask/with mask, and approximately perfect linearity is obtained. The simulation results in FIGS. 9A and 9B here as well show that linear readout is enabled by performing the coherent addition according to the present embodiment.

Resampling Processing Using Linear Interpolation (Resampling Processing According to First Embodiment)

1) Recording Format

Next, the resampling processing according to the first embodiment which is performed by theresampling unit 23 shown in FIG. 8 will be described, with reference to FIGS. 10 through 16.

Figure 10:
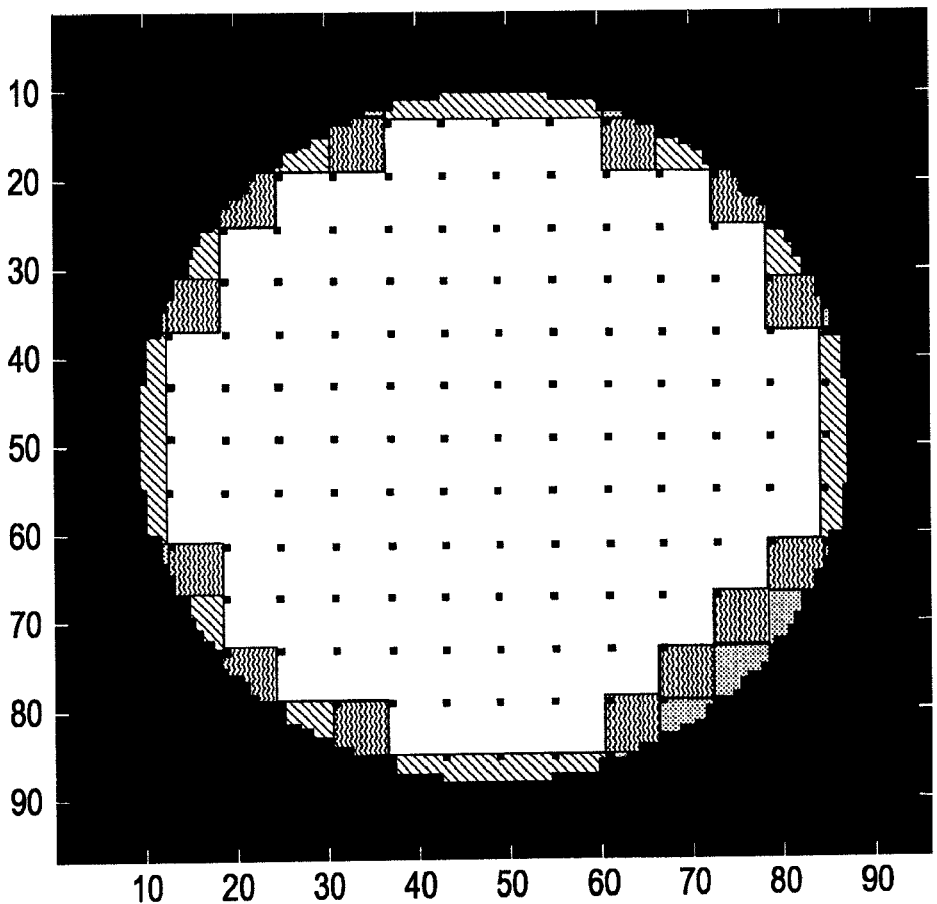
FIG. 10 illustrates distribution within a signal light are for each region divided according to the number of surrounding syncs.

First, we will consider again a data array in a hologram page based on the recording format described earlier, with reference to FIG. 10. FIG. 10 illustrates an example of a data array in the signal light area A2, wherein the minimum laying increment is set to 1 symbol (4×4=16 pixels), the sync interval i_sper is set to 24 bits (pixels), and the radius i_rad of the signal light area A2 is set to 156 pixels.

In FIG. 10, a whiteout portion indicates an area surrounded by four syncs, a wavy line portion indicates an area surrounded by three syncs, a diagonal line portion indicates an area surrounded by two syncs, a screened portion indicates an area surrounded by one sync, and a black portion indicates an area not surrounded by syncs, or a sync itself.

As shown in FIG. 10, with the recording format according to the present embodiment, in the signal light area A2, most areas are areas surrounded by syncs at four corners thereof, but in the outer peripheral portion of the signal light area A2, there are areas not surrounded by syncs at four corners thereof. As patterns of the areas, there are three patterns in total, i.e., those where three of the four corners are surrounded by syncs (the wavy line portion), those where two are surrounded by syncs (the diagonal line portion), and those where only one is surrounded by a sync (the screened portion).

Figure 12:
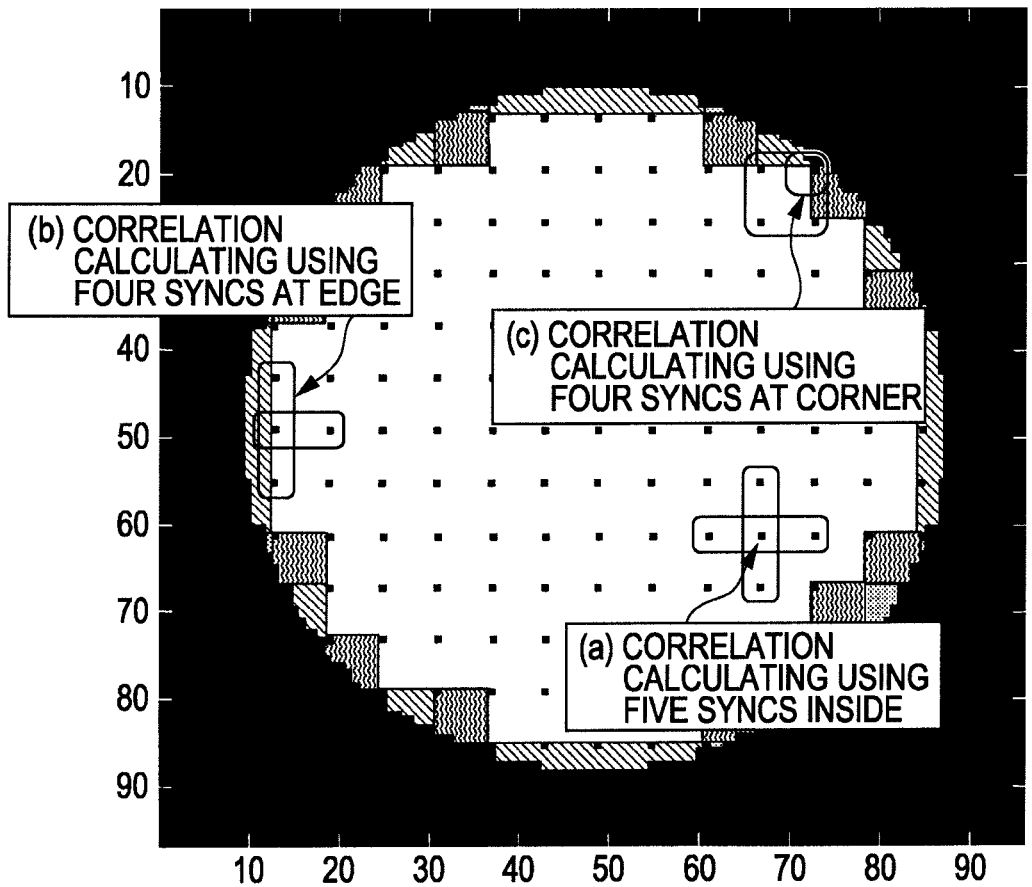
FIG. 12 is a diagram for describing a detection technique for the sync positions.

In FIGS. 11 and 12, as with FIG. 10, the whiteout portion indicates an area surrounded by four syncs, the wavy line portion indicates an area surrounded by three syncs, the diagonal line portion indicates an area surrounded by two syncs, the screened portion indicates an area surrounded by one sync, and the black portion indicates an area not surrounded by syncs, or a sync itself.

2) Detection of Sync Positions

First, a technique for detecting a center position of a page will be explained with reference to FIG. 11. Detection of the center position of the page is performed as rough alignment of the entire page, with a center sync, positioned so as to be a symbol position at the center of the page, as a reference. By performing such rough alignment of the entire page, as in the past, the search range for performing detecting of sync positions, which will be described later, can be narrowed down, and accordingly, reduction in the calculation processing load during the sync position detection, and reduction in a detection time, can be realized.

Such position detection of a page center is performed using multiple syncs selected with reference to a sync which should be detected at the page center. Specifically, as shown in FIG. 11, the detection of a sync position in the center is performed using nine syncs in total including the sync in the page center and the nearest eight syncs around the sync. In other words, the detection of a sync position in the center is performed using nine syncs in total arrayed in a square shape of 3×3 around the sync in the center.

As a specific procedure of the sync position detection in this case, first, a position where a sync in a page center should be present in the image signals subjected to equalization processing by the equalizing filter 22 is estimated from the recording format. Correlation values between amplitude values in the sync positions and the sync patterns, at the time when the nine syncs in the interval/positional relation set beforehand as shown in FIG. 11 are moved such that the nine syncs are moved within a predetermined range including the estimated position where the sync in the center should be present, are calculated, and the total value of the correlation values is calculated. As a result, the position of the sync in the center when the total value of the correlation values in the sync positions is greatest, is ultimately specified as the position of the page center.

The multiple syncs used for the detection of such a page center position can be increased to, for example, 5×5, 7×7, and so forth. In this case, the position detection accuracy can be improved, but on the other hand, when the number of syncs used for sync detection is increased thus, correlation calculation becomes complicated, leading to a problem of increase in calculation processing load and delay in detection. In this way, the improvement of the position detection accuracy and reduction in the processing load and detection time are in a tradeoff relation. The number of syncs used for sync detection should be appropriately set to an optimal value according to the actual processing speed.

When the detection of a page center position is performed, detection of the sync positions is performed based on the center position. In the case of the present embodiment, detection of respective sync positions is also performed using multiple syncs selected with an object sync as a reference.

The detection of respective sync positions using the multiple syncs is performed as shown in FIG. 12. First, basically, as indicated by (a) in FIG. 12, the detection of the object sync is performed using five syncs in total, i.e., the object sync and four syncs adjacent to the object sync horizontally and vertically. Specifically, first, with the detected page center position as a reference, a position where the object sync should be present in the image signals which have been subjected to equalization processing by the equalizing filter 22, is estimated from the recording format. For example, the distance from the page center to the object sync can be found from the recording format, so a position at that distance from the detected sync position in the page center can be estimated as the object sync position.

Correlation values between amplitude values in the sync positions and sync patterns, when the center sync (i.e., object sync) of the five syncs in the interval/positional relation set beforehand as illustrated in (a) in FIG. 12 are moved as a whole so as to be moved within a predetermined range including the estimated position where the object sync should be present, are calculated, and the total value of the correlation values are calculated. The position of the center sync when the total value of the correlation values in the respective sync positions is the greatest is ultimately specified as a position of the object sync.

Now, the precision of the sync position estimated based on the page center position identified beforehand as described above can be made to be higher than the precision of a sync position estimated only from the recording format without performing detection of page center position. Thus, the accuracy of the estimated position of the object sync is high, and accordingly even if the range of the correlation calculation (search range) during the detection of a sync is set narrower than that at the time when detection of page center position is not performed, deterioration in detection precision can be suppressed. That is, in the case of the present embodiment in which, after detection of page center position, detection of the sync positions is performed based on the center position, reduction in the search range (correlation calculation range) and reduction in calculation processing load and detection time can be realized.

In the signal light area A2, it is assumed that syncs adjacent to the object sync horizontally and vertically (i.e., nearest to the center sync) are present in most sync positions as described above. However, as shown in FIG. 12, in the outer peripheral portions of the signal light area A2, there are cases wherein there may not be all of the syncs horizontally and vertically nearest to the object sync. Specifically, there is the case wherein only one sync of the syncs horizontally and vertically adjacent is missing, as shown in (b) in FIG. 12, and the case wherein two syncs of the syncs horizontally and vertically adjacent are missing, as shown in (c) in FIG. 12.

When only one sync of the syncs horizontally and vertically adjacent is missing as shown in (b) in FIG. 12, the position detection of the object sync is performed using total four syncs excluding the missing sync. For example, as shown in (b) in FIG. 12, when the sync on the left of the syncs horizontally and vertically adjacent is missing, a position of the object sync is detected using four syncs in total, i.e., the object sync and the three syncs adjacent above, below, and on the right of the object sync.

In this case as well, the detection operation itself can be simply performed by the correlation detection method the same as when five syncs are used, described above. It should be noted that the position where the object sync should be present in the image signals following equalization processing is estimated from the recording format, with the detected page center position as a reference. Correlation values between amplitude values in respective sync positions and sync patterns at the time when the four syncs in interval/ positional relation set beforehand, as shown in (b) in FIG. 12, are moved as a whole in such a manner as to move the sync in the center (i.e., the object sync) within a predetermined range around the position where the object sync should be present, are calculated and the total value of the correlation values is calculated. The position of the center sync, when the total value of the correlation values is the greatest, is ultimately identified as the position of the object sync.

When two syncs among the syncs horizontally and vertically are missing as indicated by (c) in FIG. 12, position detection is performed using a total of four syncs including a sync in a diagonal position nearest to the object sync. For example, as indicated by (c) in FIG. 12, when syncs above and on the right of the object sync of syncs horizontally and vertically adjacent are missing, the position detection of the object sync is performed using four syncs in total, i.e., the present syncs on the left and below the object sync and a sync diagonally below the object sync in a diagonal position nearest to the object sync of the present syncs. In this case as well, the sync detection operation itself can be performed based on the correlation detection method.

When performing detection of the syncs as well, further improvement of position detection precision can be realized by performing correlation detection using a greater number of syncs. However, since improvement of accuracy and complication of calculation are in a tradeoff relation as described above, an optimal value should be set for the number of syncs used for sync detection, in accordance with the actual processing speed.

3) Identifying Data Pixel Position

Following detection of respective sync positions as described above, in order to perform data distinguishing of values of the data pixels (recording bit values) corresponding to one pixel increment of the SLM 4, the positions of the pixels are identified and amplitude values at the data pixel positions are calculated.

A feature of the resampling according to the present embodiment is in that, rather than identifying a position of an object pixel from only one sync to identify the positions of the data pixels, the position of the object pixel is identified based on multiple syncs. In a generally-used technique according to the related art, a hologram page is internally divided into increments called "sub-pages", and syncs called "sub-page syncs" are inserted into the sub-pages, one sub-page sync to a sub-page. Accordingly, at the time of identifying the position of the data pixels, first, the position of a sub-page sync within a sub-page is identified, and the position of each data pixel within the sub-page is identified based on the position of the sub-page sync. In regard to this point, with the technique according to the related art, identifying of the object data pixel position is performed based only on one sync, which is the sub-page sync. On the other hand, with the present embodiment, the positions of the data pixels are identified using multiple syncs.

As a specific technique for identifying data pixel positions using multiple syncs in this way, with the present embodiment, a technique is employed wherein four syncs that surround a position of an object pixel are used to calculate a pixel position by performing two-dimensional linear interpolation processing therefrom.

However, when employing such an identifying method (calculation method) of pixel positions, we must keep in mind that the number of syncs that surround the position of an object pixel may be less than four. This is because, for example, as it is seen with reference to FIG. 10, in the outer peripheral portion of the signal light area A2, there are areas in which the number of syncs that surround a position of an object pixel is only three, two, or even one. Therefore, in portions where the number of syncs that surround a position of an object pixel is less than four, missing syncs are extrapolated using the syncs on the inner side to enable calculation of the pixel position, using four syncs in all areas.

FIGS. 13A through 15D are diagrams describing a specific technique for such extrapolation of syncs in this way. Here, an area of just four units (2×2=4 units) is extracted and shown, one unit being a region of 24 pixels×24 pixels in the hologram page. Syncs inserted in the respective regions corresponding to individual units in the regions for four units will be referred to as "sync_1", "sync_2", "sync_3", and "sync_4", in order of upper left, upper right, lower right, and lower left.

In the following description, a coordinate plane with an ordinate i and an abscissa j is assumed. The coordinates of sync_1 through sync_4 are defined as follows.

sync_1(i,j,1): ordinate of sync_1
sync_1(i,j,2): abscissa of sync_1
sync_2(i,j,1): ordinate of sync_2
sync_2(i,j,2): abscissa of sync_2
sync_3(i,j,1): ordinate of sync_3
sync_3(i,j,2): abscissa of sync_3
sync_4(i,j,1): ordinate of sync_4
sync_4(i,j,2): abscissa of sync_4

The "s_row" and "s_col" in the following description indicate sync intervals in increments of symbols (4 pixels×4 pixels). In a case where the intervals i_sper are set to 24 as in the present embodiment, s_row=s_col=24/4=6 holds.

Figure 13A:
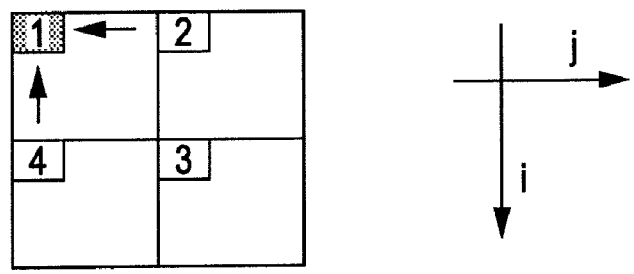
FIGS. 13A through 13D are diagrams for describing a technique for extrapolating one sync in the case of being surrounded by three syncs.
Figure 13B:
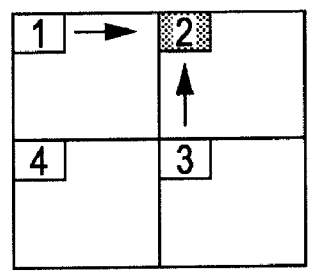
Figure 13C:
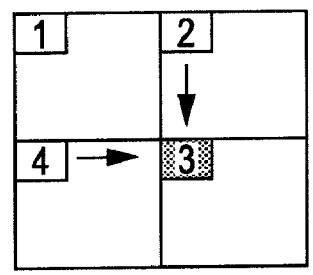
Figure 13D:
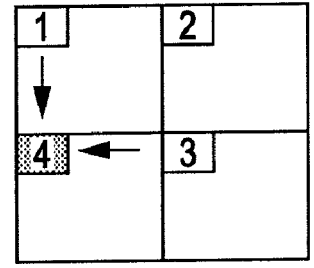

FIGS. 13A through 13D illustrate a technique for extrapolating a sync when there are three syncs that surround a position of an object pixel. Here, FIG. 13A illustrates a case wherein sync_1 is missing as a surrounding sync, FIG. 13B illustrates a case wherein sync_2 is missing, FIG. 13C a case of sync_3 missing, and FIG. 13D a case of sync_4 missing.

First, to describe a case wherein when sync_1 is missing as shown in FIG. 13A, the ordinate of sync_2 is substituted in the ordinate of sync_1 according to sync_1(i,j,1)←sync_2(i,j,1)

and the abscissa of the sync_4 is substituted as the abscissa of the sync_1 according to sync_1(i,j,2)←sync_4(i,j,2).

Consequently, the missing sync_1 can be extrapolated in this case.

In this way, when one sync among four syncs that should surround the position of the object pixel is missing, an ordinate of a sync present exponentially in the abscissa direction of the missing sync and an ordinate of a sync present exponentially in the ordinate direction of the missing sync are substituted, respectively, to perform extrapolation of the missing sync.

Figure 15A:
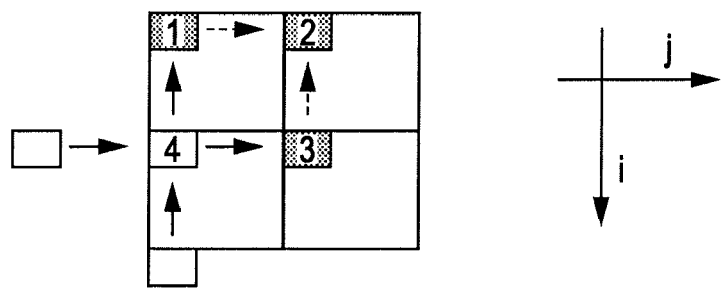
FIGS. 15A through 15D are diagrams for describing a technique for extrapolating three syncs in the case of being surrounded by one sync.
Figure 15B:
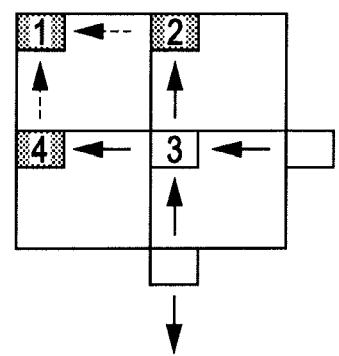
Figure 15C:
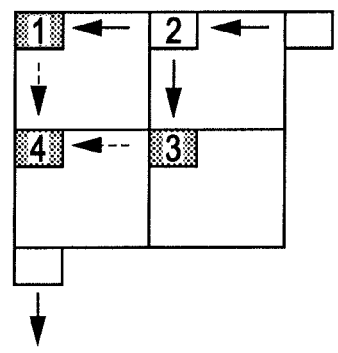
Figure 15D:
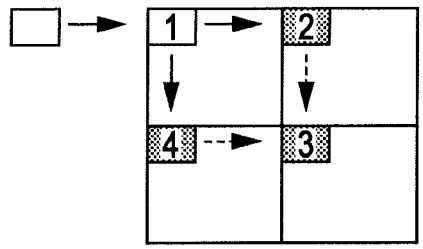

The same technique can be used for the case of FIGS. 15B, 15C, and 15D. Specific extrapolation techniques are as follows.

Case of FIG. 15B: sync_2 is extrapolated.
 sync_2(i,j,1)←sync_1(i,j,1)
 sync_2(i,j,2)←sync_3(i,j,2)
Case of FIG. 15C: sync_3 is extrapolated.
 sync_3(i,j,1)←sync_4(i,j,1)
 sync_3(i,j,2)←sync_2(i,j,2)
Case of FIG. 15D: sync_4 is extrapolated.
 sync_4(i,j,1)←sync_3(i,j,1)
 sync_4(i,j,2)←sync_1(i,j,2)

In FIGS. 14A to 14F, there are two syncs that surround the position of an object pixel. FIG. 14A illustrates a case wherein sync_1 and sync_2 are missing, FIG. 14B a case wherein sync_2 and sync_3 are missing, FIG. 14C wherein sync_3 and sync_4 are missing, FIG. 14D wherein sync_4 and sync_1 are missing, FIG. 14E wherein sync_1 and sync_3 are missing, and FIG. 14F wherein sync_2 and sync_4 are missing.

An example shown in FIG. 14A of a case of sync_1 and sync_2 being extrapolated will be described. Assuming that the difference between ordinate sync_4(i,j,1)=sync_1(i+s_row,j,1) of sync_4 below sync_1 and sync_1(i+2*s_row,j,1) below sync_4 is equal to the difference between sync_1(i,j,1) and sync_1(i+s_row,j,1), sync_1(i,j,1) which is the ordinate of sync_1 can be calculated by $$\text{sync\_1}(i,j,1) \leftarrow -2*\text{sync\_1}(i+s\_row,j,1) - \text{sync\_1}(i+2*s\_row,j,1).$$

Also, assuming that sync_1(i,j,2) which is the abscissa of sync_1 is the same as sync_4(i,j,2)=sync_1(i+s_row,j,2), the abscissa of sync_1 can be substituted by
 sync_1(i,j,2)←sync_4(i,j,2)

Similarly, assuming that the difference between ordinate sync_3(i,j,1) sync_2(i+s_row,j,1) of sync_3 below sync_2 and sync_2(i+2*s_row,j,1) below sync_3 is equal to a difference between sync_2(i,j,1) and sync_2(i+s_row,j,1), sync_2 (i,j,1) which is the ordinate of sync_2 can be calculated by $$\text{sync\_2}(i,j,1) \leftarrow -2*\text{sync\_2}(i+s\_row,j,1) - \text{sync\_2}(i+2*s\_row,j,1).$$

Also, assuming that sync_2(i,j,2) which is the abscissa of sync_2 is the same as sync_3(i,j,2)=sync_2(i+s_row,j,2), the abscissa of sync_2 can be substituted by
 sync_2(i,j,2)←sync_3(i,j,2).

In FIGS. 14B to 14D, while there is a difference in vertical and horizontal directions, the same procedures can be followed.

Case of FIG. 14B: sync_2 and sync_3 are extrapolated.
 sync_2(i,j,1)←sync_1(i,j,1)
 sync_2(i,j,2)←2*sync_2(i,j-s_col,2)-sync_2(i,j-2*s_col,2)
 sync_3(i,j,1)←sync_4(i,j,1)
 sync_3(i,j,2)←2*sync_3(i,j-s_row col,2)-sync_3(i,j-2*s_col,2)
Case of FIG. 14C: sync_3 and sync_4 are extrapolated.
 sync_3(i,j,1)←2*sync_3(i-s_row,j,1)-sync_3(i-2*s_row,j,1)
 sync_3(i,j,2)←sync_2(i,j,2);
 sync_4(i,j,1)←2*sync_4(i-s_row,j,1)-sync_4(i-2*s_row,j,1)

sync_4(i,j,2)←sync_1(i,j,2).
Case of FIG. 14D: sync_4 and sync_1 are extrapolated
 sync_4(i,j,1)←sync_3(i,j,1);
 sync_4(i,j,2)←2*sync_4(i,j+s_col,2)-sync_4(i,j+2*s_col,2)
 sync_1(i,j,1)←sync_2(i,j,1)
 sync_1(i,j,2)←2*sync_1 (i,j+s_col,2)-sync_1(i,j+2*s_col,2)

On the other hand, in FIGS. 14E and 14F, two syncs present in diagonal directions of the object sync are extrapolated. To describe the example in FIG. 16E wherein sync_1 and sync_3 are extrapolated, assuming that the ordinate of sync_1 matches the ordinate of sync_2 and the abscissa of sync_1 matches the abscissa of sync_4, sync_1 can be extrapolated by the following.
 sync_1(i,j,1)←sync_2(i,j,1)
 sync_1(i,j,2)←sync_4(i,j,2)

Also, assuming that the ordinate of sync_3 matches the ordinate of sync_4 and the abscissa of sync_3 matches the abscissa of sync_2, sync_3 can be extrapolated by the following.
 sync_3(i,j,1)←sync_4(i,j,1)
 sync_3(i,j,2)←sync_2(i,j,2)

Similarly, in the case of FIG. 14F, sync_2 and sync_4 can be extrapolated as follows.
 sync_2(i,j,1)←sync_1(i,j,1)
 sync_2(i,j,2)←sync_3(i,j,2)
 sync_4(i,j,1)←sync_3(i,j,1)
 sync_4(i,j,2)←sync_1(i,j,2)

The situations in FIGS. 14E and 14F do not occur when the recording format described above as an example (the minimum laying unit is 1 symbol, the radius i_rad is 154 pixels, the sync size is 1 symbol, and the sync intervals i_sper are 24 bits) is employed. However, when formats other than the recording format are employed, it is probable that such situations may occur, in which case the extrapolation of syncs by the methods described above can be performed.

FIGS. 15A to 15D illustrate cases wherein there is only one sync that surrounds a position of an object pixel. FIG. 15A illustrates a case wherein there is only sync_4, FIG. 15B illustrates a case of only sync_3, FIG. 15C illustrates a case of only sync_2, and FIG. 15D illustrates a case of only sync_1.

To describe the example in FIG. 15A where only sync_4 is present, assuming that the difference between ordinate sync_4(i,j,1)=sync_1(i+s_row,j,1) of sync_4 immediately below sync_1 and sync_1(i+2*s_row,j,1) two syncs below sync_1 is equal to the difference between sync_1(i,j,1) and sync_1(i+s_row,j,1), ordinate sync_1(i,j,1) of sync_1 can be interpolated by $$\text{sync\_1}(i,j,1) \leftarrow 2*\text{sync\_1}(i+s\_row,j,1) - \text{sync\_1}(i+2*s\_row,j,1).$$

In this case, the abscissa sync_1(i,j,2) of sync_1 may be the same as the abscissa sync_4(i,j,2) of sync_4.

Also, ordinate sync_3(i,j,1) of sync_3 may be the same as sync_4(i,j,1). Assuming that the difference between the abscissa sync_4(i,j,2)=sync_3(i,j-s_col, ) of sync_4 immediately on the left of sync_3 and sync_3(i,j-2*s_col,2) two syncs on the left of sync_3 is equal to the difference between sync_3(i,j,2) and sync_3(i,j-s_col,2), the abscissa sync_3(i,j,2) of sync_3 can be extrapolated by $$\text{sync\_3}(i,j,2) \leftarrow 2*\text{sync\_3}(i,j-s\_col,2) - \text{sync\_3}(i,j-2*s\_col,2).$$

Moreover, assuming that the ordinate of sync_2 is equal to the ordinate of sync_1 and the abscissa of sync_2 is equal to the abscissa of sync_3, sync_2 can be extrapolated by the following.

sync_2(i,j,1)←sync_1(i,j,1)
sync_2(i,j,2)←sync_3(i,j,2)
In the cases in FIGS. 15B to 15D, the syncs can be extrapolated based on the same idea.
Case of FIG. 15B: sync_2, sync_4, and sync_1 are extrapolated.
sync_2(i,j,1)←2*sync_2(i+s_row,j,1)−sync_2(i+2*s_row,j,1)
sync_2(i,j,2)←sync_3(i,j,2)
sync_4(i,j,1)←sync_3(i,j,1)
sync_4(i,j,2)←2*sync_4(i,j+s_col,2)−sync_4(i,j+2*s_col,2)
sync_1(i,j,1)←sync_2(i,j,1)
sync_1(i,j,2)←sync_4(i,j,2)
Case of FIG. 15C: sync_1, sync_3, and sync_4 are extrapolated.
sync_1(i,j,1)←sync_2(i,j,1)
sync_1(i,j,2)←2*sync_1(i,j+s_col,2)−sync_1(i,j+2*s_col,2)
sync_3(i,j,1)←2*sync_3(i−s_row,j,1)−sync_3(i−2*s_row,j,1)
sync_3(i,j,2)←sync_2(i,j,2)
sync_4(i,j,1)←sync_3(i,j,1)
sync_4(i,j,2)←sync_1(i,j,2)
Case of FIG. 15D: sync_2, sync_4, and sync_3 are extrapolated.
sync_2(i,j,1)←sync_1(i,j,1)
sync_2(i,j,2)←2*sync_2(i,j−s_col,2)−sync_2(i,j−2*s_col,2)
sync_4(i,j,1)←2*sync_4(i−s_row,j,1)−sync_4(i−2*s_row,j,1)
sync_4(i,j,2)←sync_1(i,j,2)
sync_3(i,j,1)←sync_4(i,j,1)
sync_3(i,j,2)←sync_2(i,j,2)

For example, according to the method described above, it is possible to extrapolate syncs such that respective pixel positions in a page are surrounded by the syncs from the four directions. In the present embodiment, after setting all the pixel positions to be surrounded by the syncs from the four directions, a position of an object pixel is calculated (identified) by performing linear interpolation using the four syncs that surround the pixel position.

Figure 16A:
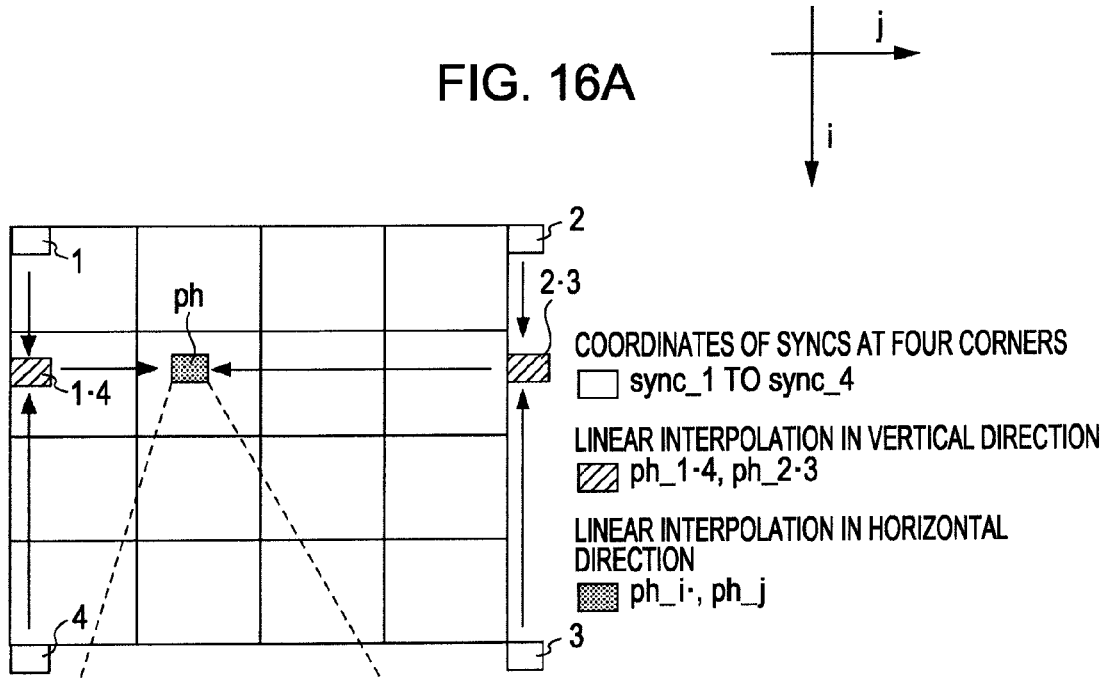
FIGS. 16A and 16B are diagrams for describing a resampling technique according to a first embodiment.

FIG. 16A describes such a resampling method according to the present embodiment and illustrates an object pixel position (ph) and four syncs (sync_1 to sync_4) that surround the pixel position. In FIG. 16A, an area surrounded by the syncs at four corners (sync_1 to sync_4) is shown as an area for 4×4=16 pixels. However, as described above, when the sync intervals i_sper=24 bits are set as the recording format according to the present embodiment, the region surrounded by the four syncs (sync_1 to sync_4) is a region for one unit (6 symbols×6 symbols).

First, in performing resampling for a certain pixel position (object pixel position), four syncs that surround the object pixel position are determined from coordinates of the object pixel position. The data pixel position is calculated and identified with the procedure described below, using the four syncs determined in this way.

First, let us say that for example, with a position of sync_1 at the upper left end as a reference, the object pixel position is in a position from sync_1 downward by nr bits and to the right by mc bits. Upon defining the object pixel position with the position of sync_1 and nr and mc, and after performing the following linear interpolation in the vertical direction to calculate ph_1·4_i and ph_2·3_i in FIGS. 16A and 16B using sync_1·sync_4 and sync_2·sync_3 ph_1·4_i={(i_sper−nr)*sync_1(i,j,1)+nr*sync_4(i,j,1)}/i_sper ph_2·3_i={(i_sper−nr)*sync_2(i,j,1)+nr*sync_3(i,j,1)}/i_sper, an ordinate phi of the object pixel can be calculated by further performing the following linear interpolation in the vertical direction using ph_1·4_i and ph_2·3_i.

$$phi=\{(i\_sper-mc)*ph\_1\cdot4\_i+mc\,ph\_2\cdot3\_i\}/i\_sper$$

It is expected that this value has a value of decimals because positioning (detection of the sync positions) is performed after over-sampling and up-scaling. Thus, the value is divided into an integer part phi_int of the ordinate and a decimal part phi_flt of the ordinate as follows.
phi_int=floor(phi)
phi_flt=phi−phi_int Similarly, after performing the following linear interpolation in the horizontal direction ph_1·4_j={(i_sper−nr)*sync_1(i,j,2)+nr*sync_4(i,j,2)}/i_sper ph_2·3_j={(i_sper−nr)*sync_2(i,j,2)+nr*sync_3(i,j,2)}/i_sper, abscissa phj of the object pixel position can be calculated by further performing the following linear interpolation in the horizontal direction using ph_1·4_j and ph_2·3_j.

$$phj=\{(i\_sper-mc)*ph\_1\cdot4\_j+mc*ph\_2\cdot3\_j\}/i\_sper$$

This value is also divided into an integer part phj_int of the abscissa and a decimal part phj_flt of the abscissa as follows.
phj_int=floor(phj)
phj_flt=phj−phj_int The position of a pixel specified by the ordinate phi and the abscissa phj calculated by the linear interpolation in the vertical direction and the linear interpolation in the horizontal direction using the syncs at the four corners is the object pixel position. In other words, the calculation of the ordinate phi and the abscissa phj is equivalent to the calculation (detection) of the object pixel position. By employing such pixel position calculation by linear interpolation, respective pixel positions can be properly identified even when light of the respective pixels of the SLM 4 are not cast on ideal positions on the image sensor 11 because of optical distortion and the like.

4) Amplitude Value Calculation of Data Pixel Position

After calculating the ordinate phi and the abscissa phj of the object pixel position as described above, the amplitude value at that pixel position is calculated.

Figure 16B:
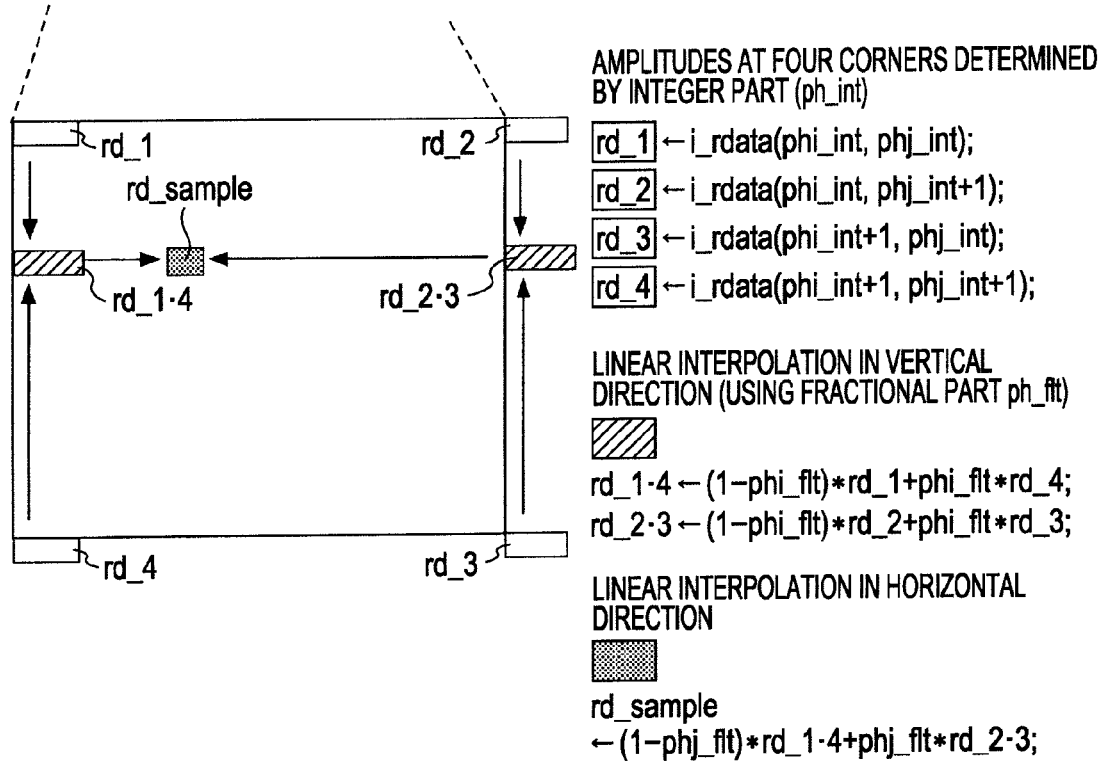

FIG. 16B illustrates a technique for calculating an amplitude value of a pixel according to the present embodiment. With the present embodiment, a method using linear interpolation is employed for the calculation of the amplitude value of a pixel as well. Specifically, linear interpolation using amplitude values (rd_1, rd_2, rd_3, and rd_4 in the figure) at four corners that surround the object pixel position identified as described above is performed to calculate the amplitude value of the object pixel.

In calculating the amplitude value, the amplitude values rd_1, rd_2, rd_3, and rd_4 at the four corners that surround the object pixel position are defined as follows.

$$rd\_1=i\_rdata(phi\_int, phj\_int)$$

$$rd\_2=i\_rdata(phi\_int, phj\_int+1)$$

$$rd\_3=i\_rdata(phi\_int+1, phj\_int)$$

$$rd\_4=i\_rdata(phi\_int+1, phj\_int+1)$$

That is to say, these amplitude values rd_1, rd_2, rd_3, and rd_4 are signal amplitude values in positions of the four corners that surround the object pixel position specified by only the integer part phi_int of the ordinate and the integer part phj_int of the abscissa obtained by the calculation described above. Also, note that strictly speaking, the amplitude value rd_1 at the upper left end of the signal amplitudes rd_1, rd_2, rd_3, and rd_4 at the four corners is a value in the object pixel position. However, for convenience of explanation, rd_2, rd_3, and rd_4 including rd_1 are defined as the amplitude values in the positions at the four corners that surround the object pixel position.

Linear interpolation in the vertical direction using the amplitude values rd_1, rd_2, rd_3, and rd_4 and the decimal coordinates obtained by the above calculation is performed as follows.

$$rd\_1\cdot 4 = (1-phi\_flt)*rd\_1 + phi\_flt*rd\_4$$

$$rd\_2\cdot 3 = (1-phi\_flt)*rd\_2 + flt*rd\_3$$

Finally, linear interpolation in the horizontal direction is performed as described below using rd_14 and rd_23, which are obtained by performing the linear interpolation in the vertical direction, and the decimal coordinates.

$$rd\_sample = (1-phj\_flt)*rd\_1\cdot 4 + phj\_flt*rd\_2\cdot 3$$

This rd_sample obtained here is an amplitude value of a pixel in the object pixel position. In FIG. 16B, an image of rd_sample determined by the linear interpolation in the vertical direction and the linear interpolation in the horizontal direction is shown.

Since the method of calculating an amplitude value of a pixel using the linear interpolation is employed, amplitude values of respective pixels can be properly calculated even when light of the respective pixels of the SLM 4 are not cast on ideal positions on the image sensor 11 because of optical distortion and the like.

5) Data Distinguishing

By performing position identifying (calculation) and amplitude value calculation described above regarding positions of the pixels in a page, amplitude values of the respective pixels in the page can be obtained. That is to say, data in the page can be resampled to 1×1. In this case, as above, the data in the page is subjected to sparse encoding in increments of symbol, so the final values of respective recording bits of "0" and "1" can be detected by performing data distinguishing by sort detection corresponding thereto.

The sparse code is decoded for each of the symbols to ultimately convert the detected bit values from 1 symbol into 1 byte, i.e., 8 bits. Recording data can be reproduced by outputting the data for 1 symbol (1 byte) decoded in this way in the order of data Nos. of the symbols. Consequently, reproduced data can be obtained.

6) Internal Configuration of Resampling Unit

Figure 17:
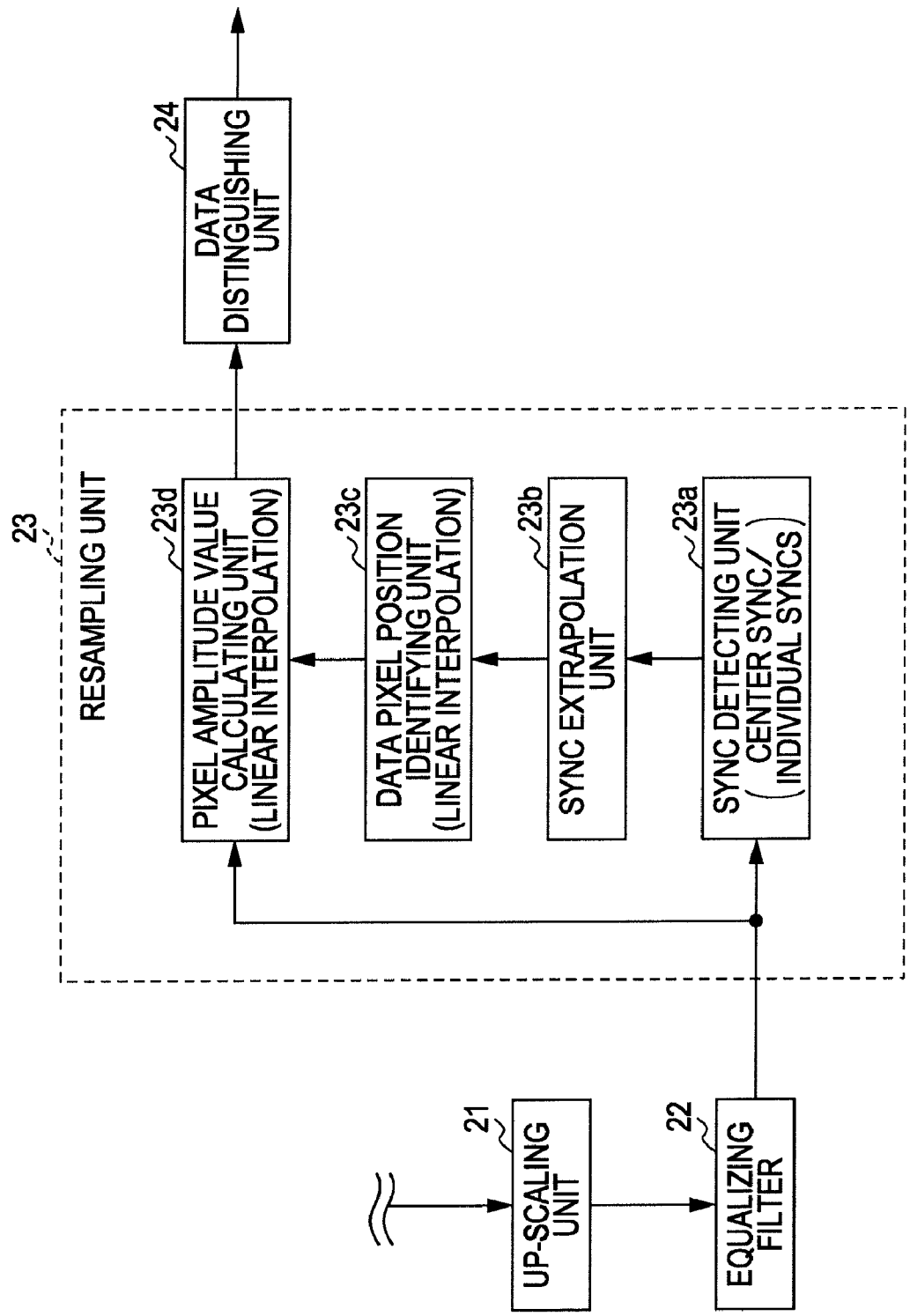
FIG. 17 is a block diagram illustrating a configuration for realizing reproducing operation based on the resampling technique according to the first embodiment.

FIG. 17 shows the internal configuration of the resampling unit 23 shown earlier in FIG. 8, for realizing resampling processing according to the first embodiment described above. Note that in FIG. 17, the up-scaling unit 21, equalizing filter 22, and data distinguishing unit 24, shown in FIG. 8, as also shown along with the resampling unit 23. As shown in FIG. 17, the resampling unit 23 includes a sync detecting unit 23a, a sync extrapolation unit 23b, a data pixel position identifying unit 23c, and a pixel amplitude value calculating unit 23d.

First, as described with FIG. 8 earlier, image signals following equalization processing at the equalizing filter 22 are input to the resampling unit 23. At the resampling unit 23, the image signals are input to the sync detecting unit 23a. The sync detecting unit 23a performs detection of the sync position, based on the input signals input from the equalizing filter 22 and information of the recording format determined beforehand. Specifically, the position of the sync at the center of the page (center sync) is detected as described earlier with reference to FIG. 11. Thereupon, the positions of the syncs are detected as described earlier with reference to FIG. 12, based on the detected center sync position.

The sync extrapolation unit 23b performs sync extrapolation based on the information of the sync positions detected by the sync detecting unit 23a. Specifically, sync extrapolation is performed following the procedures described with reference to FIGS. 13A through 15D, using the information of the detected sync positions.

The data pixel position identifying unit 23c performs determination of the data pixel positions within the hologram page, based on the sync positions detected by the sync detecting unit 23a and the information of the sync positions extrapolated by the sync extrapolation unit 23b. Specifically, the integer part phi_int of the ordinate and the decimal part phi_flt of the ordinate, and the integer part phj_int of the abscissa and the decimal part phj_flt of the abscissa, are calculated by linear interpolation, following the procedures described with reference to FIG. 16A earlier.

The pixel amplitude value calculating unit 23d obtains by calculation the amplitude values at each data pixel position, from the image signals following the equalization processing at the equalizing filter 22, based on the information of the data pixel positions (phi_int, phi_flt, phj_int, and phj_flt for each data pixel) identified (calculated) by the data pixel position identifying unit 23c. Specifically, the amplitude value for each data pixel position is obtained by calculation, by performing the linear interpolation described earlier with reference to FIG. 16B, based on the integer part phi_int of the ordinate and the decimal part phi_flt of the ordinate, the integer part phj_int of the abscissa and the decimal part phj_flt of the abscissa, and the amplitude values rd_1, rd_2, rd_3, and rd_4.

As described earlier with reference to FIG. 8, the information of the data pixel positions obtained at the resampling unit 23 is supplied to the data distinguishing unit 24. This data distinguishing unit 24, and the sparse code decoding unit 25 shown in FIG. 8, have already been described in the description of FIG. 8, and accordingly description thereof will not be repeated here.

Figure 18:
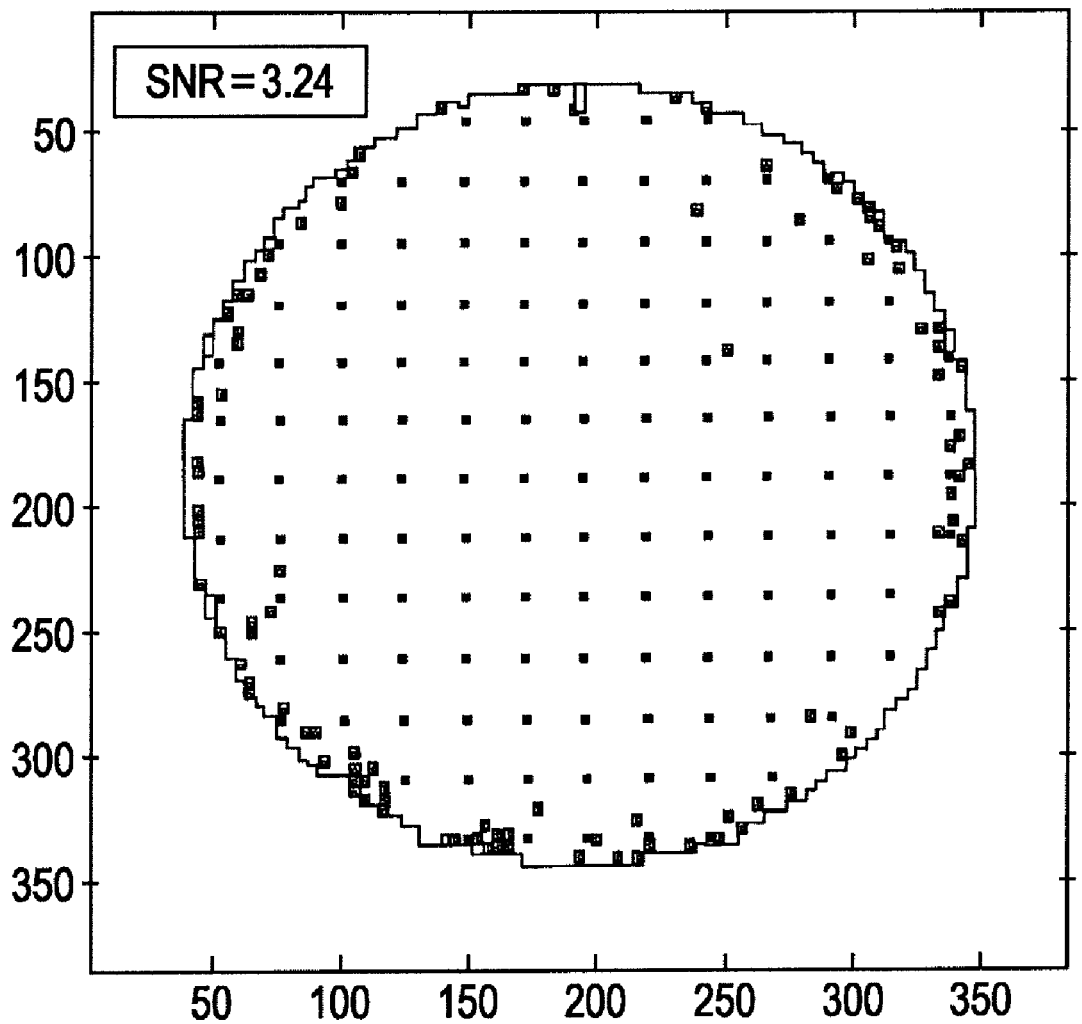
FIG. 18 is a diagram illustrating experiment results regarding in-page error distribution, SER, and SNR, in a case of applying the resampling technique according to the first embodiment.
Figure 19:
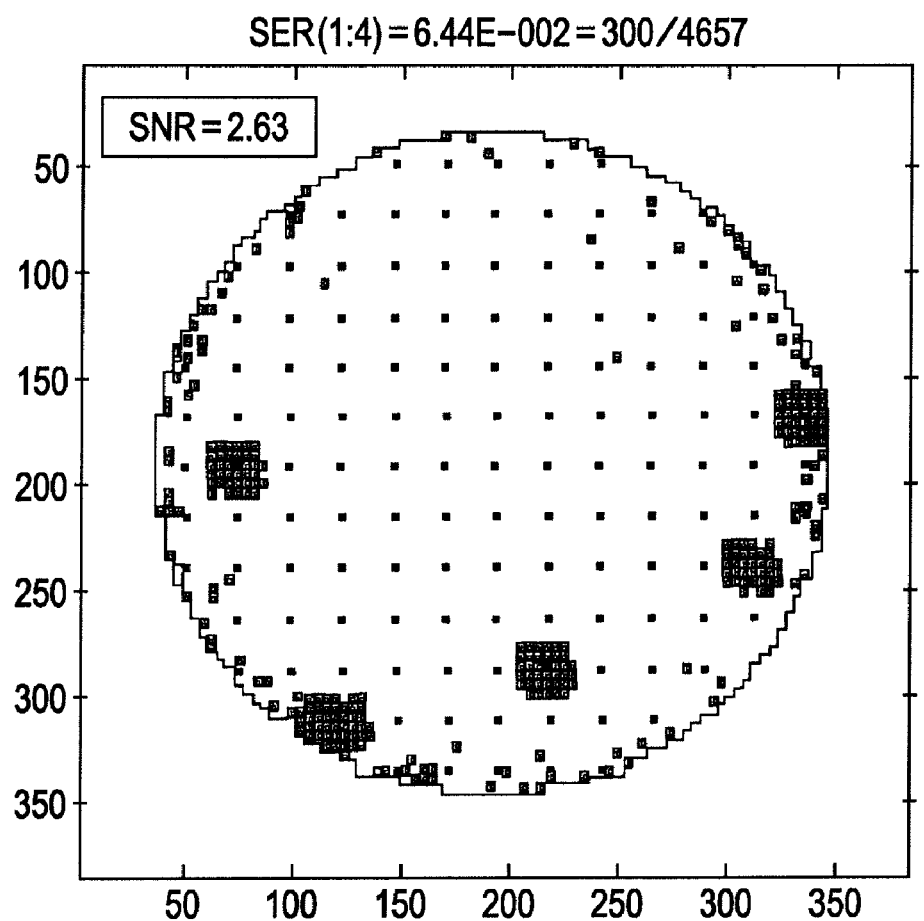
FIG. 19 is a diagram illustrating experiment results regarding in-page error distribution, SER, and SNR, in a case of applying a resampling technique according to the related art.
Figure 20:
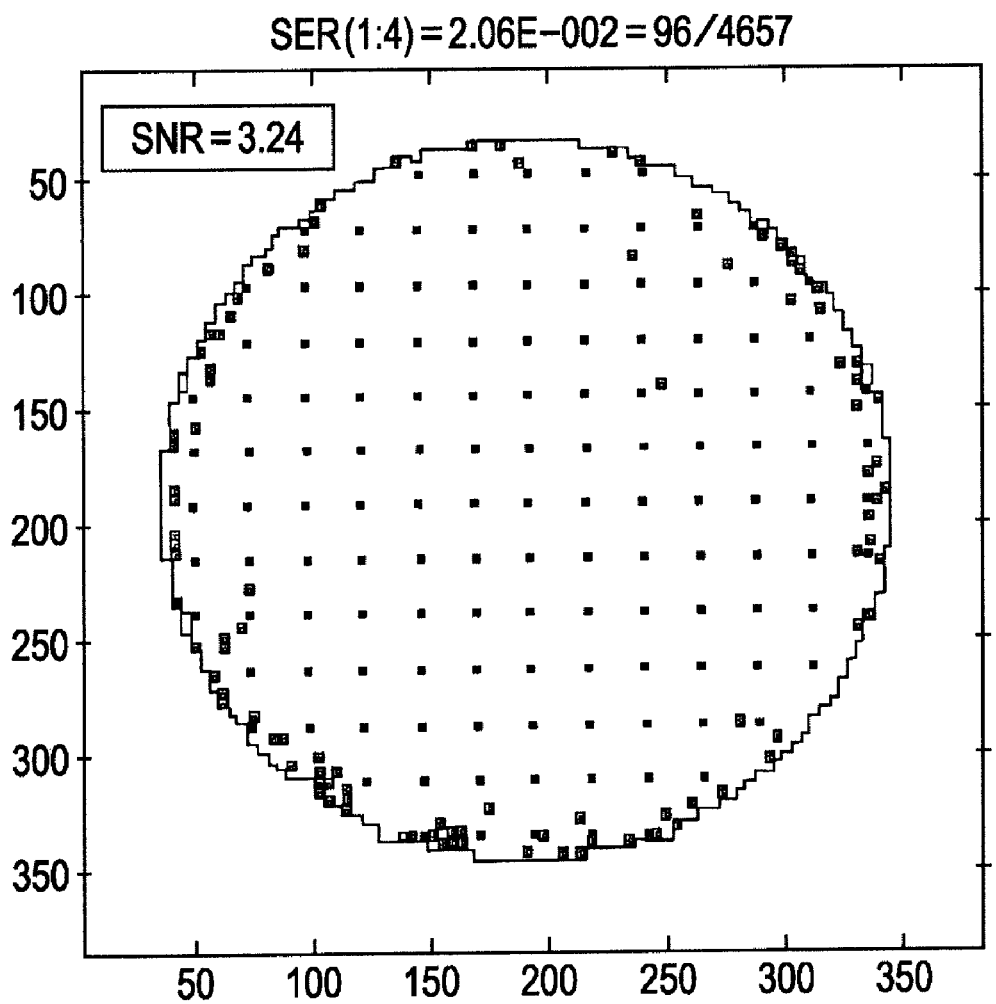
FIG. 20 is a diagram illustrating experiment results regarding in-page error distribution, SER, and SNR, in a case of performing detection of the syncs according to the first embodiment, and performing pixel position identifying, pixel amplitude value obtaining, and data distinguishing, according to the related art.

7) Experiment Results of Resampling Processing According to The First Embodiment FIGS. 18 to 20 illustrate experiment results (simulation results) for describing the effectiveness of the resampling technique according to the present embodiment explained above.

As results of experiments in which data recorded in the recording format according to the present embodiment is actually reproduced by performing resampling, the results of an experiment to which the reproducing technique according to the present embodiment has been applied are shown in FIG. 18, and results of an experiment in which the reproducing technique according to the related art has been applied are shown in FIG. 19. Also, the results of an experiment in which only the detection of the syncs (excluding detection of page center sync) of the reproducing technique according to the present embodiment has been applied, the technique according to the related art has been applied to subsequent data pixel position determination and amplitude value obtaining at the data pixel positions, are shown in FIG. 20. Specifically, as for data pixel position determination and amplitude value obtaining at the data pixel positions according to the related art, a technique was used wherein positions of object pixels were selected from a readout signal of 4×4 based on the closest syncs, and these values were taken as the amplitudes values.

In each of FIGS. 18 through 20, error distribution in a page, SER (Symbol Error Rate), and SNR (S/N ratio) are shown as specific experiment results. The error distribution in a page is indicated by outline squares in the figure. Double squares indicate errors in bit increments (bit error) at the inner frame thereof and errors in symbol increments (symbol error) at the outer frame thereof. As can be seen here, the results in the respective diagrams have been obtained by performing up to the data distinguishing following resampling. The technique for data distinguishing is the same as described above for both the case of the present embodiment and the related art.

First, looking at the case of employing the resampling method according to the related art shown in FIG. 19, it can be seen that errors occur around syncs that have not been successfully detected. In particular, the error rate is particularly high at the outer peripheral portion, to an extent that is practical use thereof would be difficult. In this case, the SNR was 2.63.

On the other hand, in a case of employing the resampling technique according to the present embodiment shown in FIG. 18, it can be seen that the concentration of errors due to failure in sync detection is markedly alleviated, and positions where errors occur are dispersed as well as the number of the errors being markedly reduced. In this case, the SNR was 3.25. From these results, it can be understood that the resampling technique according to the present embodiment described above is more capable of properly reproducing data as compared to the resampling technique according to the related art.

Also, comparing the results shown in FIG. 20 with the application of the entire resampling technique according to the present embodiment shown in FIG. 18 shows that, while errors slightly increase, distribution of errors is practically the same as that in the case of FIG. 18, and compared with the application of the technique according to the related art shown in FIG. 19, marked reduction in errors is realized. In this case, the SNR was 3.24. It can be understood from the results in FIG. 20, that it is effective to detect each of the syncs using multiple syncs, as with the present embodiment.

Concerning the method of detecting the sync at the page center using multiple syncs, the technique does not exhibit the advantages thereof alone, since this is not for determining final sync positions. However, when timing recovery is performed by extracting a later-described two-dimensional clock as with a second embodiment for example, the position of the page center is determined as the final positioning of a page, in which case it can be said that the technique of determining a page center position using multiple syncs as with the present embodiment excels over the technique of determining a page center position using only one sync.

Overall Reproducing Properties Including Up to Resampling Using Linear Interpolation The reproducing properties of having performed up to the resampling according to the first embodiment following signal readout with coherent addition, will be described with reference to FIGS. 21A through 23B.

Figure 21A:
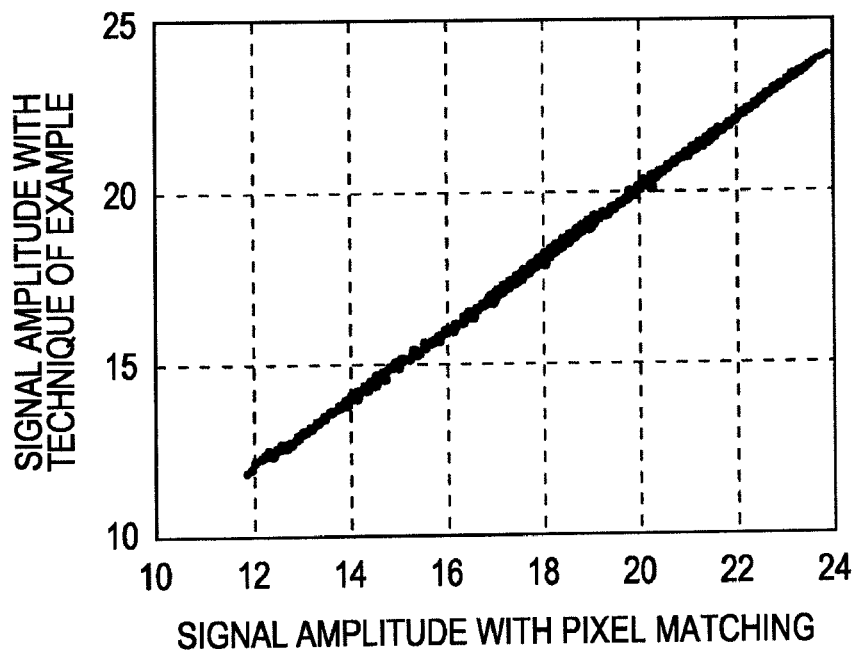
FIGS. 21A and 21B are diagrams illustrating the comparison results between a case of performing resampling according to the first embodiment, and a case wherein pixel matching has been performed.
Figure 21B:
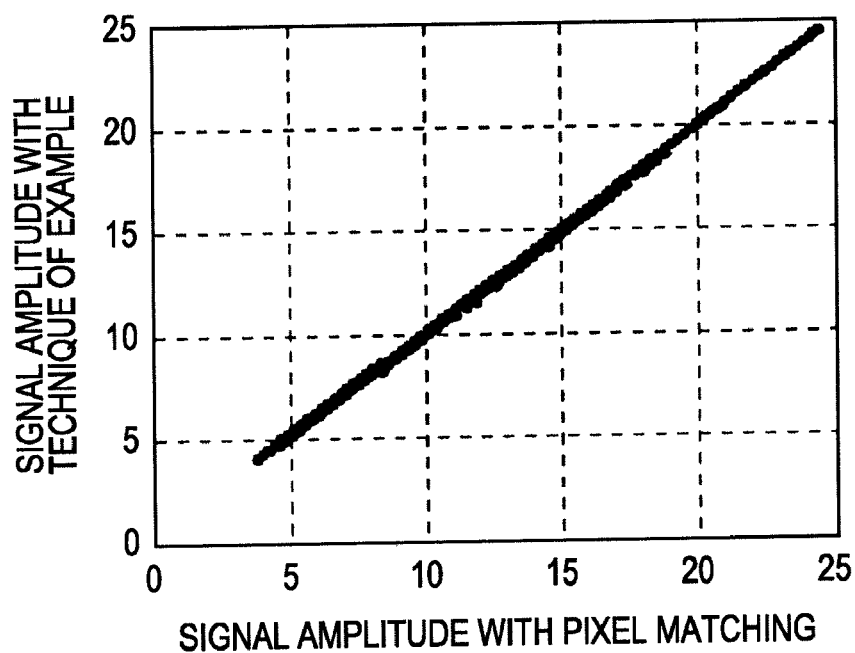

First, FIGS. 21A and 21B illustrate comparison results between a case wherein resampling according to the first embodiment has been performed, and a case wherein pixel matching has been performed. In FIGS. 21A and 21B, the horizontal axis is the amplitude value of 1×1 pixel obtained by performing simple thinning out of the 2×2 over-sampling results calculated in FIGS. 9A and 9B described above. Also, the horizontal axis is the results of having performed resampling using linear interpolation without performing optical pixel matching. Here, resampling results of a partway over-sampling rate of 1.33×1.33, which is not a multiple of an integer, show the effectiveness of resampling by linear interpolation.

Note that the resampling technique of data pixel position identifying and amplitude calculation, using the linear interpolation according to the first embodiment described above, can perform proper resampling even in a case that a partway over-sampling rate of 1.33×1.33, which is not a multiple of an integer, has been set, since linear interpolation is used. Also, the simulator used for obtaining the results shown in FIGS. 21A and 21B is the same as the simulator used with FIGS. 9A and 9B above. Also, no intentional positional shifting of the recording image has been performed in the simulation with this case as well, and accordingly the amplitude values based on the 2×2 over-sampling results on the horizontal axis in FIGS. 21A and 21B can be handled as being the same as a case wherein pixel matching has been performed.

FIG. 21A illustrates a case of no phase mask, and FIG. 21B illustrates a case with phase mask. In both FIGS. 21A and 21B, the values of the horizontal axis and vertical axis generally agree, as with the case of FIGS. 9A and 9B described earlier. This shows that even in a case wherein optical pixel matching is not performed, reproduction signal properties generally the same as a case wherein optical pixel matching is performed, in both cases of with/without phase mask, due to performing the resampling using linear interpolation according to the first embodiment described above.

Now, the evaluation value of "NMSE" (Normalized Mean Square Error) is defined to quantitatively estimate computation error of sampling using linear interpolation, in the following NMSE definition expression.

$$\text{NMSE} = \text{root mean square of } (A-B)/\text{mean power of } A$$

where A represents the amplitude value at a data pixel position obtained in a case where optical pixel matching has been performed, and B represents the amplitude value at a data pixel position calculated by resampling using the linear interpolation according to the present embodiment.

As can be understood from this definition expression, the smaller the deviation is from a case where optical pixel matching has been performed (i.e., the better the reproducibility is), the smaller the value of NMSE is.

Figure 22A:
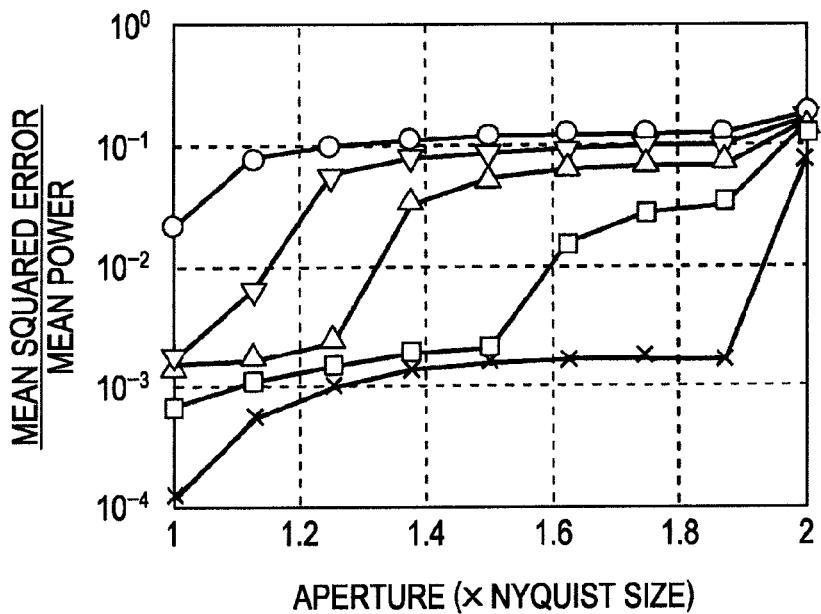
FIGS. 22A and 22B are diagram illustrating the relation between aperture size and over-sampling rate, in a case of performing coherent addition, by way of NMSE.
Figure 22B:
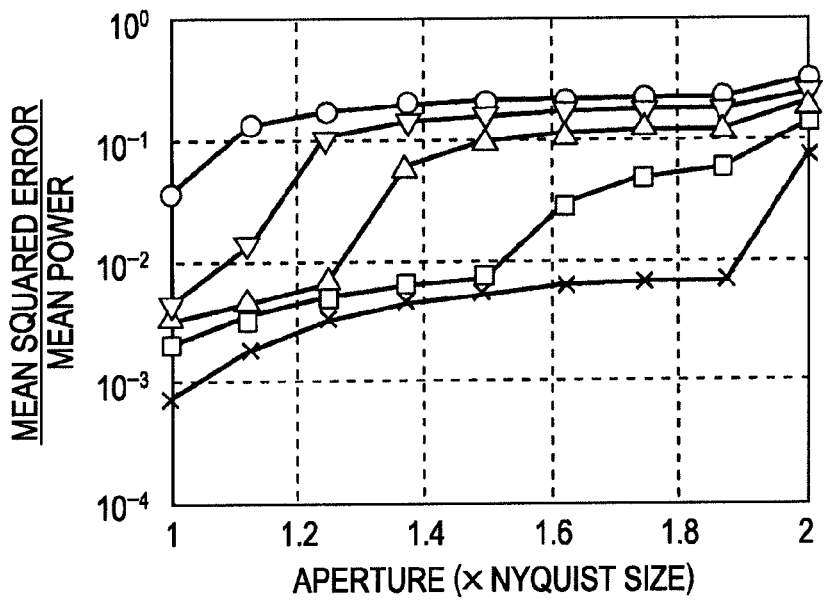

Now, let us consider the relation between aperture size and over-sampling, using such an NMSE. FIGS. 22A and 22B are diagrams illustrating the relation between aperture size and over-sampling rate by NMSE, and more specifically are graphs illustrating the change in the value in NMSE as to a range of aperture size 1.0 through 2.0 in the five cases of over-sampling rates having been set at 1.0×1.0, 1.143×1.143, 1.333×1.333, 1.6×1.6, and 2.0×2.0. In these diagrams, the horizontal axis is the aperture size of the Nyquist aperture ratio, and the vertical axis is the NMSE.

As shown in the diagrams, the results of the case of the over-sampling rate of 2.000 times (2.0×2.0) is plotted with crosses, the results of the case of the over-sampling rate of 1.600 times (1.6×1.6) is plotted with squares, the results of the case of the over-sampling rate of 1.333 times (1.333×1.333) is plotted with triangles, the results of the case of the over-sampling rate of 1.143 times (1.143×1.143) is plotted with inverted triangles, and the results of the case of the over-sampling rate of 1.000 times (1.0×1.0) is plotted with circles.

FIG. 22A illustrates a case of no phase mask, and FIG. 22B illustrates a case with phase mask. The results of both FIGS. 22A and 22B shown are for cases of performing sampling using linear interpolation after having performed linear readout by coherent addition according to the present embodiment. The simulator used here is the same as the simulator used with FIGS. 9A and 9B earlier.

Figure 23A:
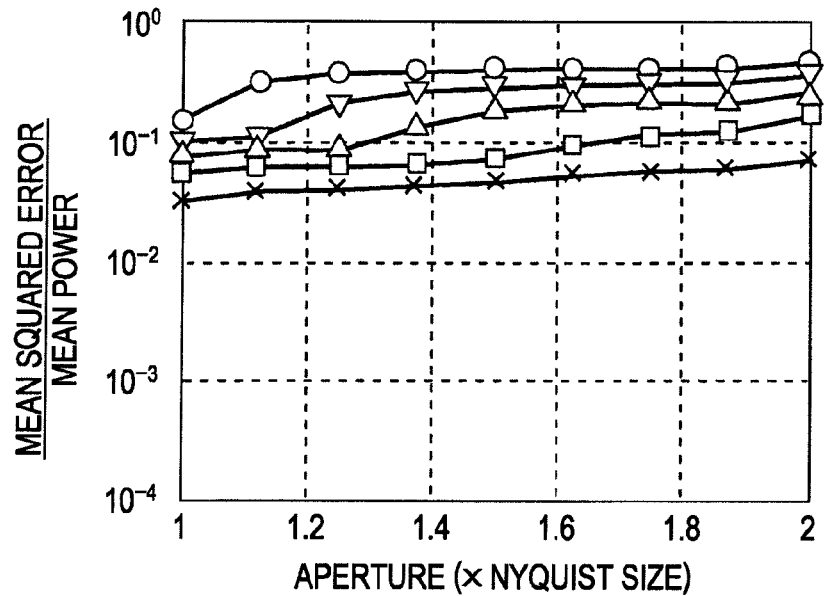
FIGS. 23A and 23B are diagram illustrating the relation between aperture size and over-sampling rate, in a case of not performing coherent addition according to the related art, by way of NMSE.
Figure 23B:
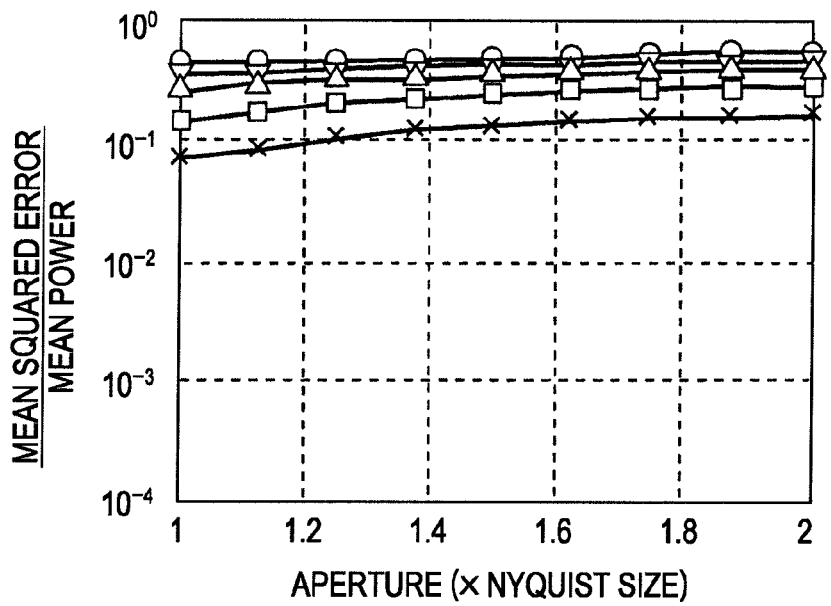

Also, as a comparison, FIGS. 23A and 23B illustrate the calculation results regarding NMSE the same as with the case of FIGS. 22A and 22B, but performing resampling using linear interpolation according to the first embodiment in a case of using the technique according to the related art where linear readout with coherent addition is not performed. FIG. 23A illustrates a case of no phase mask, and FIG. 23B illustrates a case with phase mask.

What is common between FIGS. 22A and 22B and FIGS. 23A and 23B is that the value of NMSE is smaller if the over-sampling rate is sufficiently great as to the aperture size. Specifically, it can be understood that in a case of the over-sampling rate of 2.0×2.0 plotted with crosses, and with an aperture size of 1.0, the NMSE is the smallest, and good reproduced signal prosperities can be obtained.

Taking this premise into consideration and looking at the results of the technique according to the related art shown in FIGS. 23A and 23B, in the case of no phase mask shown in FIG. 23A, the NMSE is around 5% in a case of over-sampling rate of 2.0×2.0 and aperture size of 1.0, which is a value at which practical use can be made. However, in this case, there is no way to perform high-density recording by multiplexing hologram pages using phase masks in this case, as a matter of course.

With the case of FIG. 23B with phase mask, setting an over-sampling rate of 2.0×2.0 and sufficiently reducing the aperture size still yields an NMSE value of around 10%. This means that in a case of performing phase modulation as a phase mask at the time of recording with the related art, the over-sampling rate has to be kept no lower than 2.0×2.0.

Conversely, with the case of performing the coherent addition according to the present embodiment as shown in FIGS. 22A and 22B, it can be seen that the NMSE value is lower overall as compared with that in FIGS. 23A and 23B, in both cases of no phase mask in FIG. 22A and with phase mask in FIG. 22B. Specifically, we can confirm that the value of NMSE is smaller than 1% if within the range of satisfying the condition of the Nyquist sampling theorem that "over-sampling rate>aperture size" holds.

From these results, we can understand that with the present embodiment, reproduced signal properties approximately the same as with a case of optical pixel matching can be obtained as long as the conditions of the sampling theorem are satisfied. In other words, even in cases where optical pixel matching is not performed, performing linear readout with coherent addition enables reproduced signal properties equivalent to a case of optical pixel matching to be obtained, by over-sampling and resampling processing.

Moreover, even in a case with no optical pixel matching and the over-sampling rate is set at a partway value that is not a multiple of an integer, data can be properly reproduced by sampling using linear interpolation.

Second Embodiment

Next, a second embodiment of the present invention will be described. The second embodiment is the same as the above first embodiment in that the above-described linear readout with coherent addition is performed, and differs from the first embodiment in that the resampling processing is performed with a different technique.

Resampling by Extracting Two-Dimensional Clock

With the resampling processing according to the first embodiment described above, a technique is employed wherein sync positions inserted in a hologram pages are detected, and the data pixel positions are identified based on the sync positions. That is to say, sync-dependent resampling is performed with the first embodiment.

However, in the case of performing such sync-dependent resampling, in actual practice, a great number of syncs are preferably embedded in the hologram in order to ensure determination precision of data pixel position at a certain level. In this sense, the technique of performing sync-dependent resampling encounters difficulties in enlarging the recording capacity of user data.

Further, with a case of performing sync-dependent resampling, of syncs are damaged, there is the possibility that effective resampling may not be performed. Moreover, while sync-dependent resampling is extremely effective regarding shifting in the planar direction of the received image, ensuring placement precision may be relatively difficult in the event that the image has been enlarged/reduced, and further, ensuring placement precision may be difficult regarding rotation of the image as well.

In the first place, syncs are intended to be used as information for sectioning predetermined data increments in a state where bit synchronization is realized (i.e., where bit sectioning is fixed for each 1T), but in the case of carrying out procedures of identifying the position of the syncs, and then identifying the position of the data pixels based on the sync positions, as with the first embodiment, the syncs are used for bit synchronization, meaning that this usage is different from the originally intended usage.

Accordingly, with the second embodiment, a technique is proposed wherein a two-dimensional clock is extracted form the readout image signals, and data pixel positions are identified based on the two-dimensional clock. Specifically, this involves extracting two-dimensional clocks in the x direction of the readout image (e.g., horizontal direction) and y direction (e.g., vertically direction), and identifying the positions of the data pixels from the intersections thereof. Identifying data pixel positions based on such two-dimensional clocks would do away with dependence on syncs for identifying the data pixel positions.

Configuration of Reproducing Device

The following is a description of the configuration of the recording/reproducing device according to the second embodiment. The recording/reproducing device according to the second embodiment differs from the recording/reproducing device 1 according to the first embodiment only in that the configuration of the data reproducing unit 13 is different, and other configurations are the same as those shown in FIGS. 1 and 3. Accordingly, in the following, the internal configuration of the data reproducing unit 13 which the recording/reproducing device according to the second embodiment has will be described.

Figure 24:
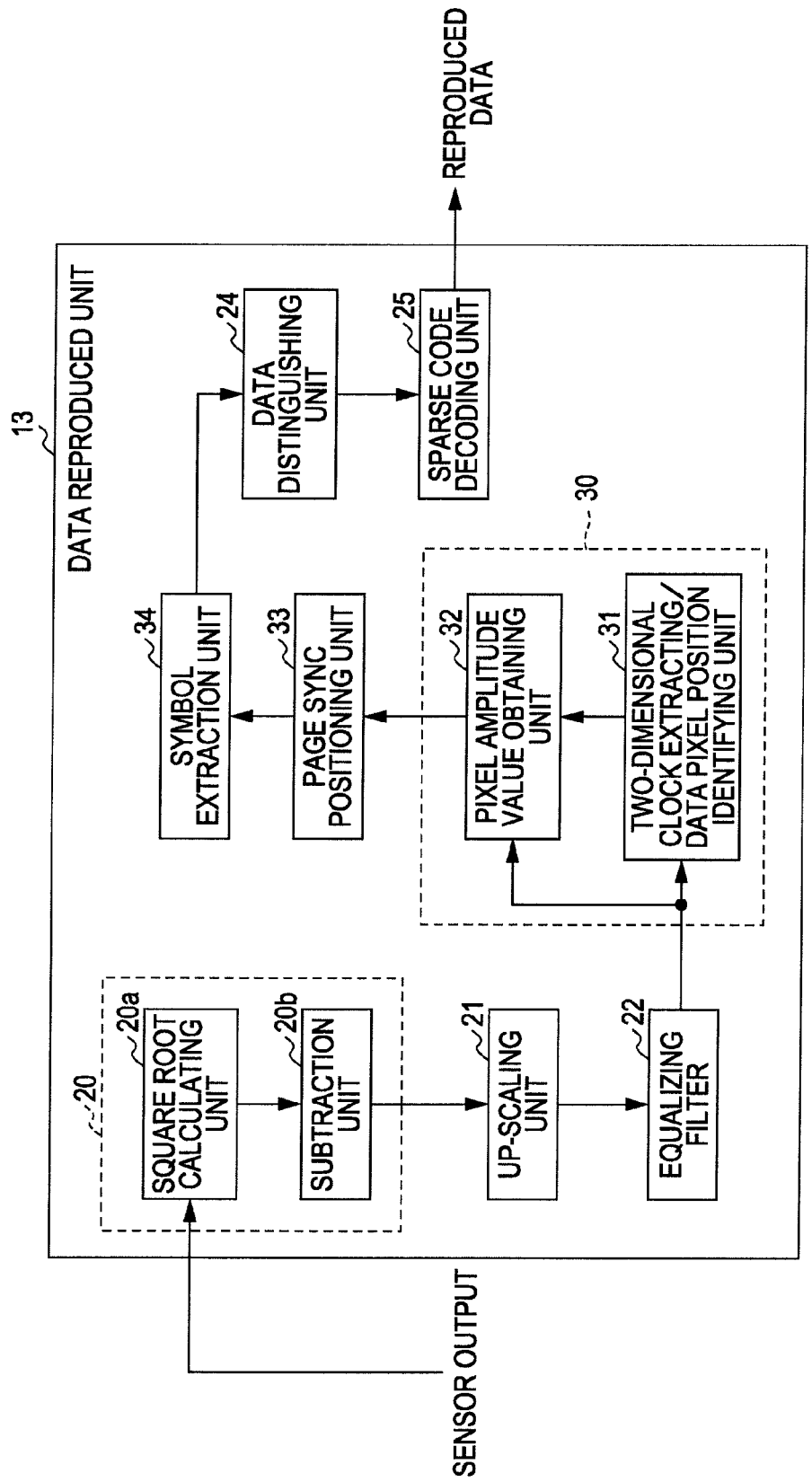
FIG. 24 is a block diagram illustrating the internal configuration of a data processing unit which a reproducing device according to a second embodiment includes.

FIG. 24 is a block diagram illustrating the internal configuration of the data reproducing unit 13 which the recording/reproducing device according to the second embodiment includes. Note that in FIG. 24, components which have already been described with FIG. 8 are denoted with the same reference numerals, and description thereof will be omitted.

As can be understood by comparing FIG. 24 with FIG. 8, the data reproducing unit 13 of the recording/reproducing device according to the second embodiment differs from the data reproducing unit 13 in that a resampling unit 30 has been provided instead of a resampling unit 23, and also a page sync positioning unit 33 and a symbol extracting unit 34 have been inserted between the resampling unit 30 and the data distinguishing unit 24.

Provided in the resampling unit 30 are a two-dimensional clock extracting/data pixel position identifying unit 31 and a pixel amplitude value obtaining unit 32. As shown in FIG. 24, the two-dimensional clock extracting/data pixel position identifying unit 31 is supplied with image signals following equalization processing from the equalizing filter 22. The two-dimensional clock extracting/data pixel position identifying unit 31 performs two-dimensional clock extracting processing from the image signals input from the equalizing filter 22, and data pixel position identifying based on the two-dimensional clock. Note that the specific processing of two-dimensional clock extracting and data pixel position identifying based on the two-dimensional clock performed by the two-dimensional clock extracting/data pixel position identifying unit 31, and the internal configuration thereof, will be described later.

Also, image signals from the equalizing filter 22 are input to the pixel amplitude value obtaining unit 32, and also input is information of the data pixel positions identified by the two-dimensional clock extracting/data pixel position identifying unit 31. The pixel amplitude value obtaining unit 32 obtains the amplitude values at the data pixel positions in the image signals from the equalizing filter 22, based on the information of the data pixel positions from the two-dimensional clock extracting/data pixel position identifying unit 31. The specifics of the amplitude value obtaining processing performed by the pixel amplitude value obtaining unit 32 will also be described later.

The page sync positioning unit 33 performs page sync positioning processing based on the information of amplified values at the data pixel positions obtained by the pixel amplitude value obtaining unit 32. That is to say, the page sync positioning unit 33 identifies at which position on the recording format that the identified data pixels (more particularly, the amplitude values thereof) correspond to. Also, the symbol extracting unit 34 extracts the symbols within the hologram page based on the information of the data pixels on the recording format that has been identified by the page sync positioning unit 33.

In the case of the second embodiment, the amplitude values for each of the data pixels are grouped into increments of symbols by the symbol extracting unit 34, and input to the data distinguishing unit 24. Note that the specifics of page sync positioning processing performed by the page sync positioning unit 33 and the symbol extracting processing performed by the symbol extracting unit 34 will also be described later.

Specific Example of Resampling Processing by Two-Dimensional Clock Extraction

The following is a description regarding the specifics of the resampling processing according to the second embodiment. Description will proceed in the following order.
1. X-Directional and Y-Directional Differentiation
2. Non-linear Processing
3. Two-Dimensional Fourier Transform Processing
4. Extracting Clock Signal Component
5. Phase Shift Processing
6. Inverse Fourier Transform Processing
7. Zero Cross Line Extraction
8. Zero Cross Line Grid Point Extraction It should be noted that in the following description, the term "clock signal" is used in the sense that a "signal" is two-dimensional having a scalar quantity, and accordingly is equivalent to a two-dimensional image. The coordinate system in expressions of the image will be represented in the drawings with the X-direction toward the right and the Y-direction toward the bottom.

1. X-Directional and Y-Directional Differentiation

Figure 25:
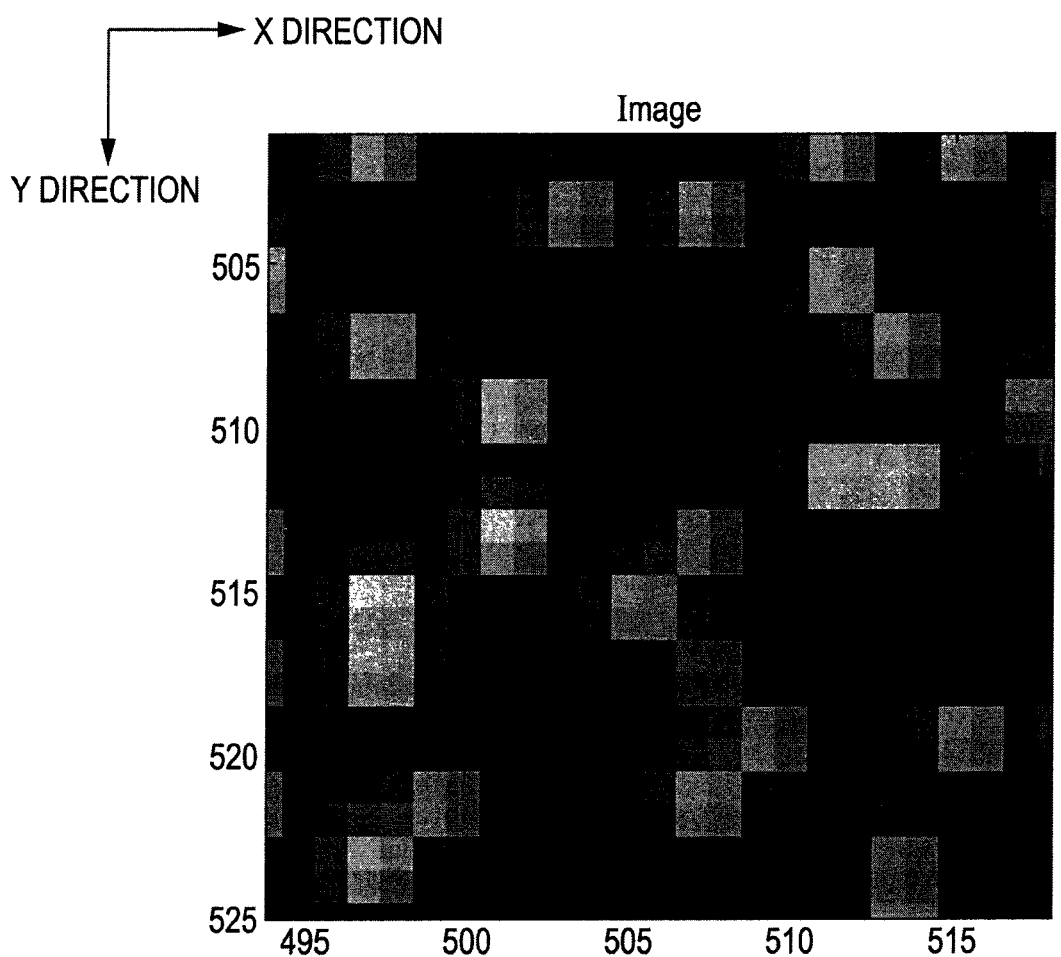
FIG. 25 is a diagram illustrating a sensor output image.
Figure 26:
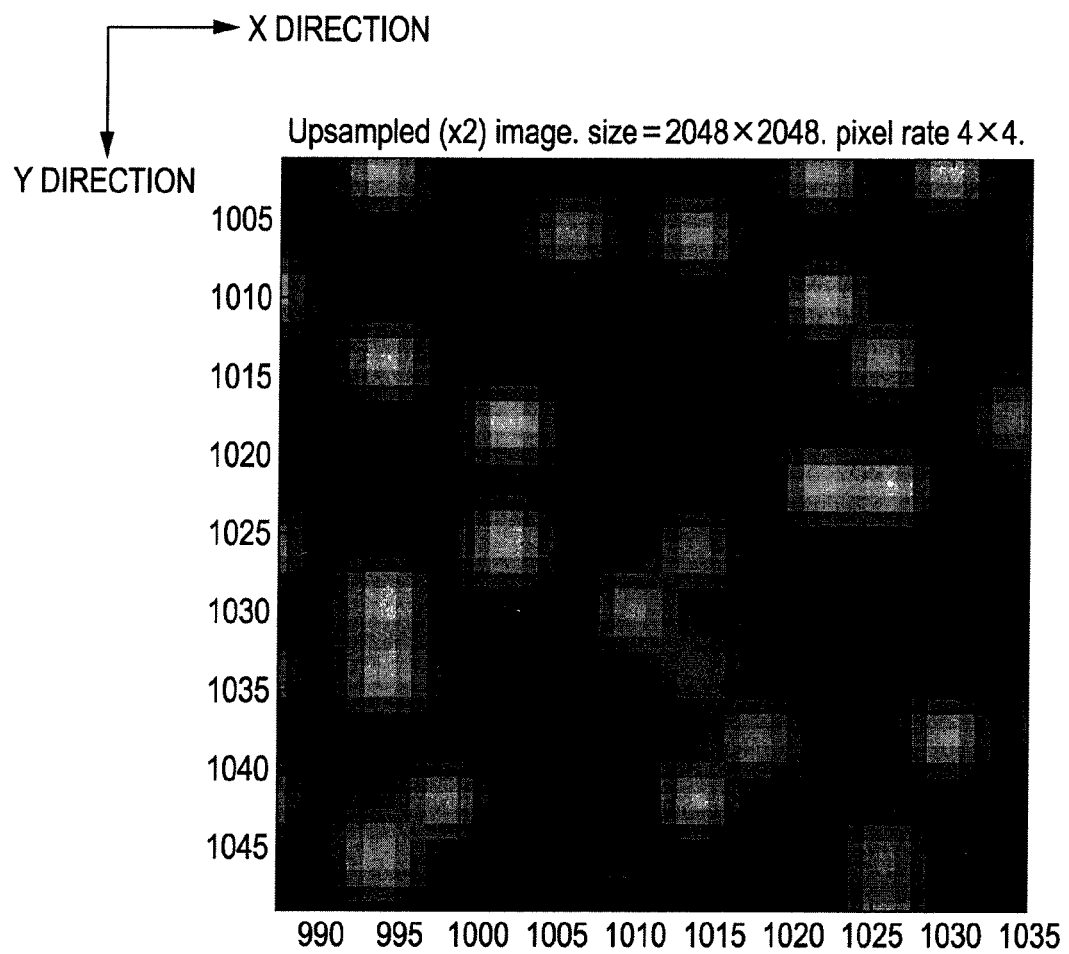
FIG. 26 is a diagram illustrating an image following up-scaling.

First, FIGS. 25 and 26 illustrate a sensor output image serving as detected image signals of the image sensor 11, and an up-scaled image from the up-scaling unit 21, respectively. Note that with FIGS. 25 and 26, and other images in the drawings which will be referred to later, the overall image is difficult to grasp in detail, so the same position of the image will be used in enlarged form among the drawings.

First, as a prerequisite for the following description, we will say that the image size of the sensor output image shown in FIG. 25 is 1024×1024 pixels. In line with the description of the first embodiment given earlier, the over-sampling rate in this case is 2×2, so this means that 2×2 pixels of the image sensor 11 correspond to one pixel of the SLM 4. That is to say, one pixel worth of image at the SLM 4 is received with four pixels of the image sensor 11.

While this ratio can be considered to be generally constant, the states (phases) of positioning vary widely, and there is fluctuation within the image as well. Also, even if the ratio is generally constant, the over-sampling rate changes, and there is fluctuation within the image as well. Further, it should be noted that there are various types of fluctuation, distortion, and deterioration within the sensor output image.

Also, as can be understood from the relation between the image size of the sensor output image and the over-sampling rate, the number of valid pixels of the SLM 4 in this case is 512×512 pixels.

Comparing the sensor output image in FIG. 25 and the image following up-scaling in FIG. 26 shows that the image in FIG. 26 has higher resolution than the image in FIG. 25. In this case, the up-scaling rate is 2×2, so the image size of the image shown in FIG. 26 is 2048×2048 pixels, which is double horizontally/vertically the 1024×1024 pixels of the image shown in FIG. 25. Also, it can be understood that this image size of 2048×2048 pixels in FIG. 26 is four times horizontally/vertically the 512×512 pixels of the SLM 4 described earlier. This is due to 4×4 up-scaling having been performed overall as a result of 2×2 sampling and then 2×2 up-scaling having been performed.

With the present embodiment, two-dimensional signals (image) following up-scaling such as shown in FIG. 26 are processed to extract the X-direction clock and Y-direction clock included in the image, and data pixel position identification is performed based on the extracted clocks. That is to say, the positions of each of the pixels in the SLM 4 are identified in the image.

Figure 27A:
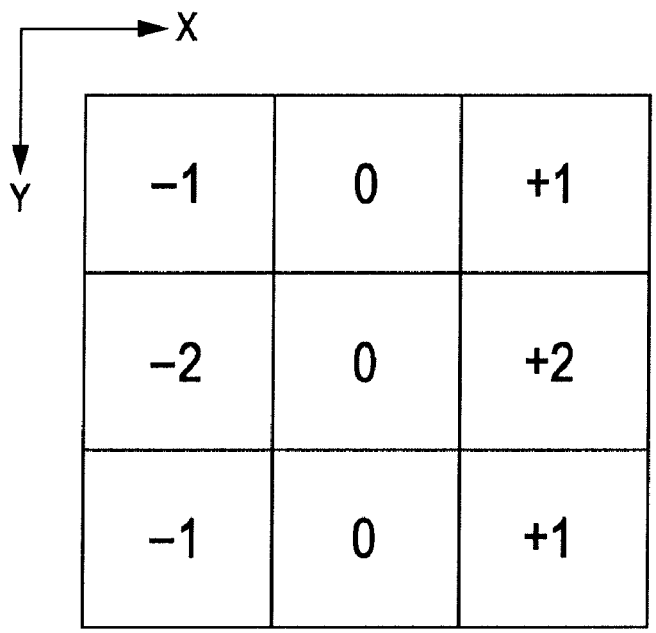
FIGS. 27A and 27B are diagrams illustrating image masks for differentiation processing.
Figure 27B:
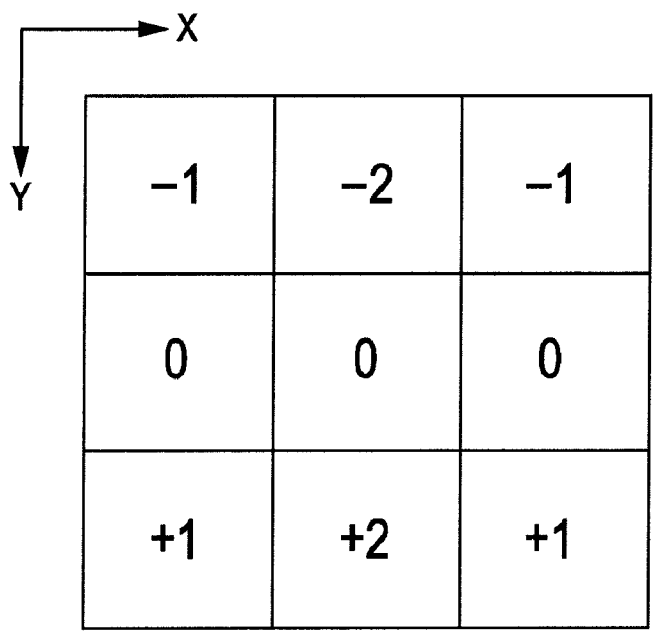

To this end, first, the two-dimensional signals following up-scaling are subjected to each of X-direction differentiation processing and Y-direction differentiation processing. FIGS. 27A and 27B illustrate image processing masks used in the differentiation processing in this case. FIG. 27A illustrates an X-direction differentiation mask used for X-direction differentiation, and FIG. 27B illustrates a Y-direction differentiation mask used for Y-direction differentiation. As shown in FIGS. 27A and 27B, these masks are two-dimensional impulse responses with the center position as the origin, and convolution thereof as to the image performs X-direction differentiation and Y-direction differentiation, respectively.

It is widely understood that the term "image processing mask" may also be called "operator". These masks are X-direction differentiation and Y-direction differentiation making up a Sobel operator for image processing as described alter, and is widely used in differentiation processing.

Specifically, the size of these masks is a total of 9 pixels of 3×3 pixels, and the X-direction differentiation mask pattern is "−1, 0, +1", "−2, 0, +2", "−1, 0, +1", for the X-direction lines (rows) in order from the top. Also, the Y-direction differentiation mask pattern is "−1, 0, +1", "−2, 0, +2", "−1, 0, +1", for the Y-direction lines (columns) in order from the left.

As for differentiation processing using these masks, X-direction differentiation using the X-direction differentiation mask and Y-direction differentiation using the Y-direction differentiation mask are performed independently with the present embodiment. That is to say, the two-dimensional image signals following up-scaling are distributed to two systems, with one performing convolution with the X-direction differentiation mask, and the other performing convolution with the Y-direction differentiation mask. That is to say, the two systems of two-dimensional image signals subjected to X-direction differentiation processing and two-dimensional image signals subjected to Y-direction differentiation processing are obtained as a result of the differentiation processing in this case.

As for the specific contents of differentiation processing, in the two-dimensional image signals following up-scaling, the center of the mask is aligned with one object pixel, and the values of the corresponding positions of the mask are multiplied on the values of the object pixel and the surrounding pixels. The nine values obtained as a result are added up, and the results thereof are the differentiation processing results for the object pixel. This processing is preformed on each pixel in the two-dimensional signals following up-scaling.

An image obtained as the result of such differentiation processing having been performed is an image wherein the greater the change in amplitude value (i.e., gradient of luminance) of a portion of the image following up-scaling is, the greater the absolute value of the amplitude at that portion is. In other words, with an image following differentiation processing that is obtained in this way, the greater the absolute value is at a portion, the greater the gradient of luminance is at that portion. Such a portion where the gradient of luminance is great, is called an "edge". The edge component is an important information source for clock extraction.

Now, the masks shown in FIGS. 27A and 27B have smoothing effects, so a balance with other filter processing should also be taken into consideration. Also note that there are many masks having differentiation effects, other than those described here, and these may be selected and used as suitable. Moreover, the masks described here are 3×3 in size, which is odd number x odd number, meaning that there is no offset of the position (phase) of the pixel of interest even after convolution. This is preferable in that separate alignment does not have to be taken into consideration.

2. Non-Linear Processing.

The above-described differentiation processing yields two-dimensional image signals having been subjected to X-direction differentiation, and two-dimensional image signals having been subjected to Y-direction differentiation. These two-dimensional image signals are further subjected to non-linear processing. In this case, processing for obtaining absolute values (absolute value processing) is performed as the non-linear processing.

Figure 28:
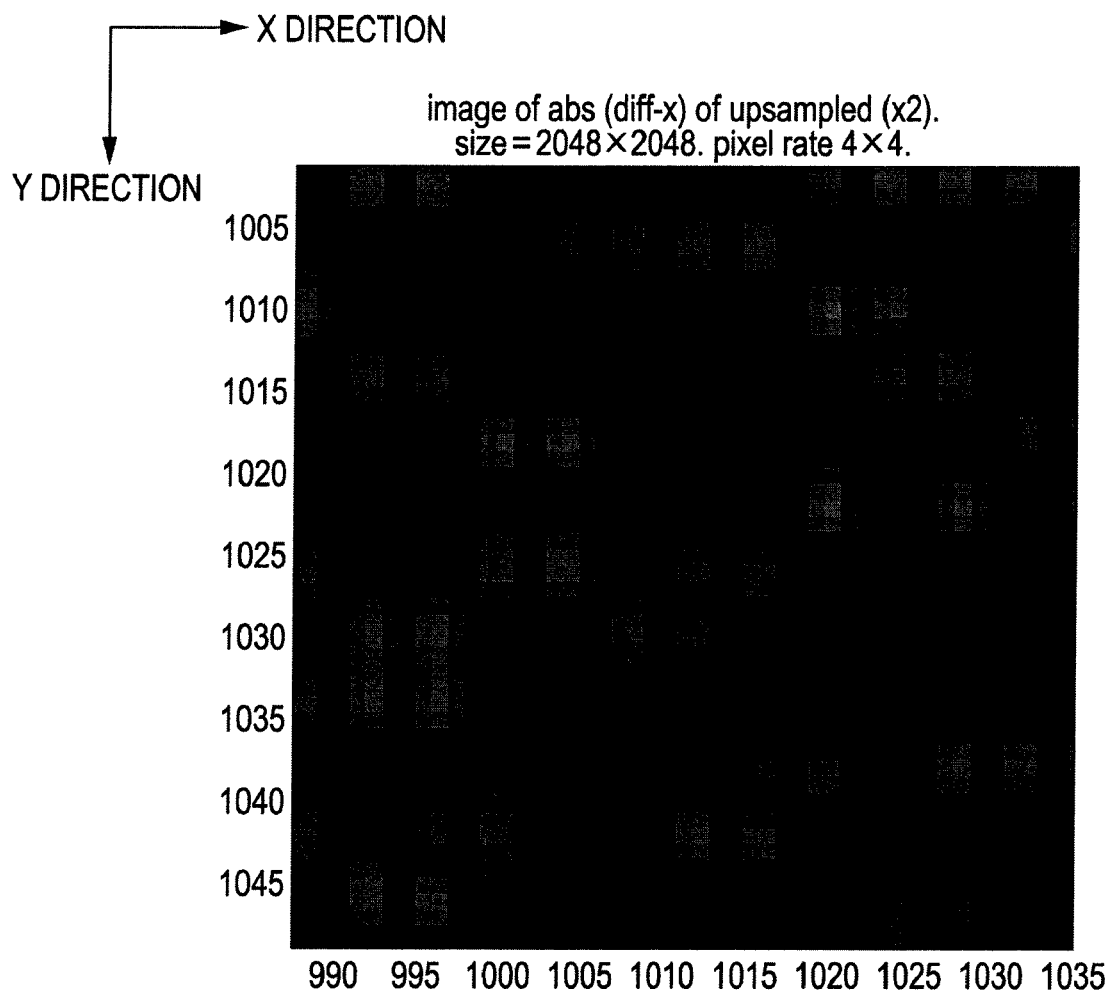
FIG. 28 is a diagram illustrating an image as X-direction timing pulse signals.
Figure 29:
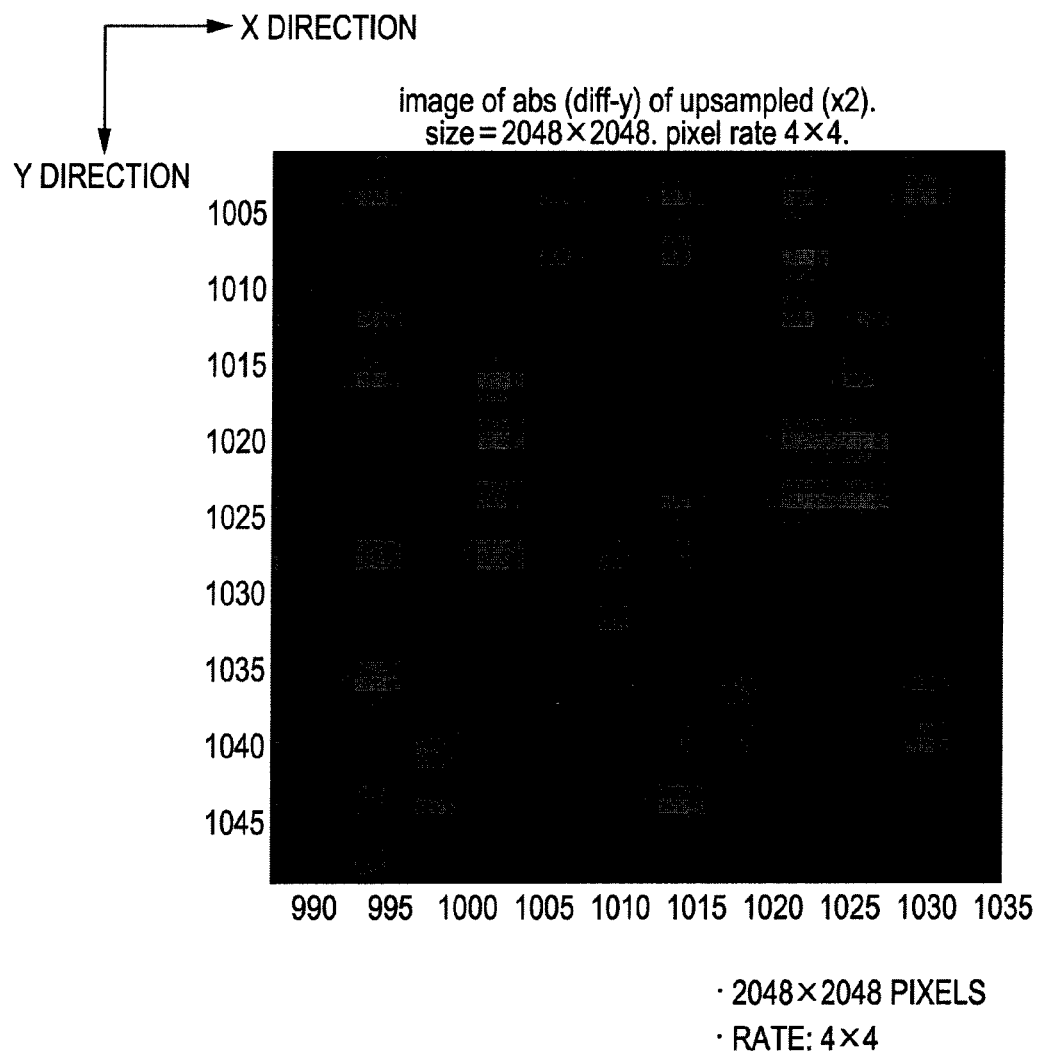
FIG. 29 is a diagram illustrating an image as Y-direction timing pulse signals.

FIGS. 28 and 29 illustrate images which are timing pulse signals obtained following such absolute value processing. FIG. 28 illustrates X-direction timing pulse signals obtained by absolute value processing being performed on the two-dimensional image signals following the X-direction differentiation, and FIG. 29 illustrates Y-direction timing pulse signals obtained by absolute value processing being performed on the two-dimensional image signals following the Y-direction differentiation.

First, as can be seen from these drawings, the X-direction timing pulse signals and the Y-direction timing pulse signals are not binary signals but multi-value signals (i.e., grayscale image). This may be binarized of course, but with the present embodiment, clock extraction is performed from multi-value signals. The reason is thus: the sampling rate is 4×4, which is relatively small, so maintaining the intensity and waveform of the edge signals by keeping multi-value rather than binarizing suitably maintains the phase information (timing information) thereof. The clock signals are suitably extracted as fitting thereto in later processing.

As can be understood from comparing FIG. 28 with the above-described FIGS. 25 and 26, the X-direction differentiation and absolute value processing extracts portions in the original image which change from white to black or from back to white in luminance in the X direction. That is to say, edge portions in the X direction are extracted. In the same way, comparing FIG. 29 with the above-described FIGS. 25 and 26 shows that Y-direction differentiation and absolute value processing extracts edge portions in the Y direction.

3. Two-Dimensional Fourier Transform Processing

The X-direction timing pulses obtained by the X-direction differentiation and absolute value processing above, and the Y-direction timing pulses obtained by the Y-direction differentiation and absolute value processing, are each subjected to two-dimensional Fourier transform processing so as to perform frequency analysis. The X-direction clock component and Y-direction clock component can be extracted from the analysis results thereof.

In the case of the present embodiment, FFT (Fast Fourier Transform) is performed for the Fourier transform. FFT is a widely-used algorithm for obtaining the same results as DFT (Discrete Fourier Transform) at high speeds.

Figure 30:
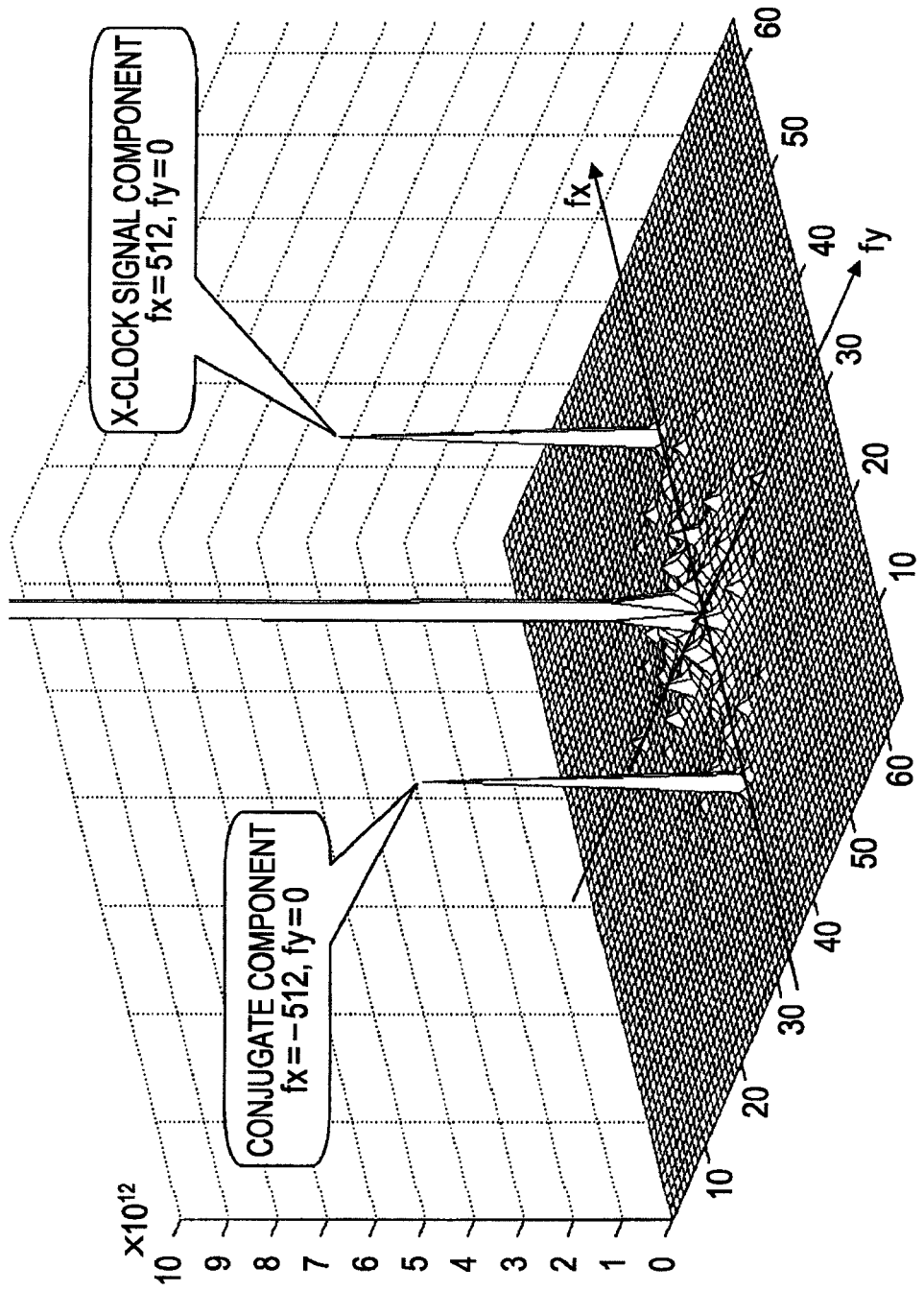
FIG. 30 is a diagram illustrating analysis results according to two-dimensional FFT regarding X-direction timing pulse signals.
Figure 31:
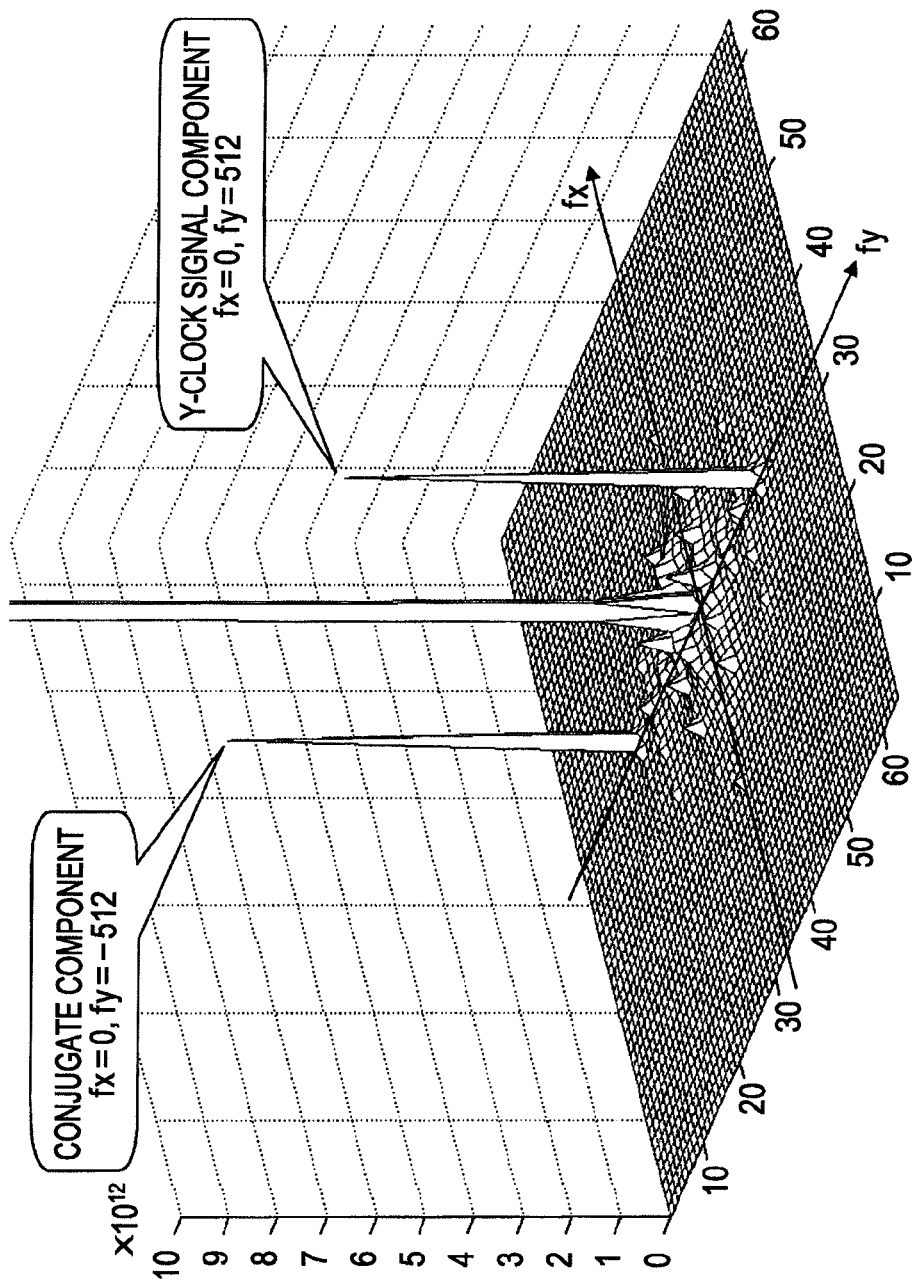
FIG. 31 is a diagram illustrating analysis results according to two-dimensional FFT regarding Y-direction timing pulse signals.

FIGS. 30 and 31 illustrate analysis results of the X-direction timing pulse signals by two-dimensional FFT, and analysis results of the Y-direction timing pulse signals by two-dimensional FFT, respectively. Now, the X-direction timing pulse signals and the Y-direction timing pulse signals are each 2048×2048 pixels in size, and when subjected to two-dimensional FFT, this yields complex number arrays 2048×2048 pixels in size. Before describing the analysis results of two-dimensional FFT, the description of the concept of two-dimensional FFT will be given here.

Definition

The definitions of DFT and IDF (Inverse DFT, i.e., Inverse Discrete Fourier Transform), which serve as the basis for FFT and IFFT (Inverse FFT, i.e., Inverse Fast Fourier Transform) are as shown in Expression 1 and 2.

$$F(f_x, f_y) = \frac{1}{M \cdot N} \sum_{x=0}^{M-1} \sum_{y=0}^{N-1} f(x, y) \exp\left\{-2\pi j\left(f_x \cdot \frac{x}{M} + f_y \cdot \frac{y}{N}\right)\right\} \quad \text{Expression 1}$$

$$f(x, y) = \sum_{f_x=0}^{M-1} \sum_{f_y=0}^{N-1} F(f_x, f_y) \exp\left\{2\pi j\left(f_x \cdot \frac{x}{M} + f_y \cdot \frac{y}{N}\right)\right\} \quad \text{Expression 2}$$

where M represents the X-directional image size, and N represents the Y-directional image size. Both are 2048 pixels in this case.

Also, f(x, y) represents an image of 2048×2048 pixels. With the x axis toward the right and the y axis toward the bottom, x=integers of 0, 1, . . . , 2047, and
y=integers of 0, 1, . . . , 2047, having grayscale values at each of the coordinates.

F(fx, fy) represents the results of transform by FFT, which are complex numbers. The fx and fy are variables of frequency regions, with fx representing X-directional frequency and fy representing Y-directional frequency, wherein fx=integers of 0, 1, . . . , 2047, and
fy=integers of 0, 1, . . . , 2047.

Frequency

Basically, while frequency should be defined in terms of how many cycles of sine waves fit into a unit length, here, the provided image size will be taken as the unit length, to facilitate the following description. With the X-directional frequency as an example, how many cycles fit into a length equivalent to the width of the image in the X direction (M pixels, i.e., 2048 pixels) is the X-directional frequency. In the same way for the Y-directional frequency, how many cycles fit into a length equivalent to the height of the image in the Y direction (N pixels, i.e., 2048 pixels) is the Y-directional frequency.

Positive and Negative Frequencies

Now, fx and fy are non-negative integers by definition as described above, but the upper half thereof match negative frequency components.

Demonstration

Substituting fx=−k and fx=M−k (where k and x are an integers) into Expression 1 yields $F(-k, fy)=F(M-k, fy)$ which are equal.

This arrangement wherein the upper half is viewed as negative frequencies is more readily understandable since the frequencies have origin symmetry, and this agrees with having the center of a later-described power spectrum bird eye's view as frequency zero. Accordingly, hereinafter, the upper half will be viewed as negative frequencies.

Now, this may be understood as taking the upper half of fx=0, 1, . . . , 1023, 1024, . . . , 2046, 2047 and viewing the upper half as negative frequencies as fx=0, 1, . . . , 1023, −1024, . . . , −2, −1 and further moving the upper half to the front to transform into the frequency order of fx=−1024, . . . , −1, 0, +1, . . . , +1023.

This holds true for fy as well, so the frequency analysis results of the 2048×2048 points can be understood as analysis results of positive and negative frequencies of fx=−1024, . . . , −1, 0, +1, . . . , +1023
fy=−1024, . . . , −1, 0, +1, . . . , +1023 due to index transform of the array as suitably implementable.

Note that the frequency +1024 might be kept at +1024 instead of changing to the negative −1024, but will be taken as negative here.

Meaning of F(fx, fy)

As with the Expression 2 above, the image can be broken down into various frequency components, and conversely is represented as the sum thereof. The frequency components are the items within the Σ in Expression 2, and are expressed by the following Expression 3

$$F(f_x, f_y) = \exp\left\{2\pi j\left(f_x \cdot \frac{x}{M} + f_y \cdot \frac{y}{N}\right)\right\}$$ Expression 3 where the exponential portion is a plane wave wherein X-direction frequency=fx and Y-direction frequency=fy. F(fx, fy) provides intensity and phase to the pane wave.

Conjugate Component

While Expression 3 is complex numbers, in this case frequency analysis is performed of a grayscale image which is real numerical values, so the origin symmetrical negative frequency component F(−fx, −fy) is a complex conjugate with F(fx, fy), and taking the sum of these eliminates the imaginary number portion and yields the real number. Accordingly, the complex numbers of Expression 3 can be understood as being the frequency component, and only the positive frequencies should be noted. The real part can be taken when individual waveforms of the frequency component are called for.

Plane Waves

In terms of real numbers, the plane wave is as shown in Expression 4

$$A \cdot \cos\left\{2\pi\left(f_x \cdot \frac{x}{M} + f_y \cdot \frac{y}{N}\right) + \theta\right\}$$ Expression 4 where A=|F(fx, fy)| holds, and θ is the argument of F(fx, fy). A should be doubled if the complex conjugate component of F(fx, fy) is included, but with the present embodiment, the absolute value of amplitude is irrelevant, and accordingly will be ignored.

Frequency

The wavefront of the above plane wave is linear, the normal direction thereof is the direction of vector (fx/M, fy/N), and the frequency L is as shown in the following Expression 5.

$$L = \frac{1}{\sqrt{\left(\frac{f_x}{M}\right)^2 + \left(\frac{f_y}{N}\right)^2}}$$ Expression 5

Frequency Analysis

By performing frequency analysis using two-dimensional FFT in this way, to break down the provided grayscale image into components which are plane waves of various frequencies with Expression 1, the configuration breakdown thereof can be found out. Obtaining the sum of all components as with Expression 2 restores the original image.

Description will now return to FIGS. 30 and 31. In FIG. 30, the intensities of the frequency components (F(fx, fy) squared) obtained by two-dimensional FFT of the X-directional timing pulse signals shown in FIG. 28 are shown in a bird eye's view. Also, in FIG. 31, the intensities of the frequency components obtained by two-dimensional FFT of the Y-directional timing pulse signals shown in FIG. 29 are shown in a bird eye's view.

As shown in these drawings, with the analysis results of two-dimensional FFT, the frequency axes are the two axes of fx and fy, and the point of origin is the intersection of the two axes. Also, fx and fy each have both positive and negative frequencies.

Also, the results of two-dimensional FFT are 2048×2048 points, but attempting to put all that information into a drawing would result in a complicated drawing that would not be meaningful, so FIGS. 30 and 31 are shown with the resolution reduced to 1/32. As a matter of course, the resolution does not have to be reduced with the actual internal processing.

Also, while only intensity is indicated as a power spectrum to facilitate understanding of the drawing, and the phase information of F(fx, fy) which are complex numbers is not shown, it should be noted that in the internal processing, complex numbers are handled as such and phase information is also handled without and not left out.

In the case of FIG. 30, there are great peaks at a frequency of fx=512, fy=0, and the origin symmetry position thereof. The peak portion at fx=512, fy=0 is the clock signal component in the X direction. The cycle of the plane wave equivalent to this frequency can be obtained by Expression 5 described above. In this case, M=N=2048 holds, so the cycle L=4. This is due to the over-sampling/up-scaling rate in this case being 4×4. Also, the normal direction of the wavefront of the plane wave has a Y component of "0" due to (512, 0), so this matches the X axis, which is logical. To begin with, the image in FIG. 28 which is the input image to the two-dimensional FFT has a great number of X-directional edge components. The basic interval of the X-directional edges in the X direction is 4, and while the inter-edge interval distances may be short or long, they are multiples of this basic interval 4. The reason is that the overall scale due to over-sampling and up-scaling is four times, and the positions at which edges occur are at boundaries of data pixels of the SLM 4 (i.e., sections of data pixel increments). Such marked features have resulted in the peak at fx=512, fy=0 in the analysis in FIG. 30.

Now, obtaining the IFFT of the sum of all analyzed frequency components would restore the original X-direction timing pulse shown in FIG. 28, and restricting components would obtain waveforms of the relevant components. For example, performing IFFT on just the center component of the peak portion, a plane wave can be obtained as a clock signal corresponding to the waveform of the center component of the X-direction edge signal, which is the X-direction timing pulse signal. That is to say, while edges are scattered throughout the image, the center component is such that a single plane wave waveform is extracted which has a cycle of 4 and which is synchronized with the edge occurrence position.

Also, performing IFFT of the center component of the peak portion and the surrounding frequency components would obtain a plane wave as a clock signal corresponding to the primary components of the X-direction. In this way, in the event of performing IFFT of not only one frequency component contributing to the peak but also the surrounding frequency components as well, not a single plane wave but a plane wave close to it is obtained. The surrounding frequency components are sideband components, which contribute to slight fluctuation in the amplitude and phase of the single waveform. These fluctuations can be said to reflect jittering within the image. Accordingly, performing IFFT including these sidebands as well enables clock signals to be obtained which faithfully reflect various types of fluctuations within the image (enlargement/reduction, rotation, distortion).

With the description above, description has been made with clear-cut numerical values wherein the overall scale of over-sampling and up-scaling is four times, the cycle is 4, and the X-directional clock signal component is fx=512, fy=0, but these are design values, and in reality there is fluctuation from these values, and generating clock signals which follow such fluctuations is the original intent.

Also, the analysis results regarding the Y-direction timing pulse signals shown in FIG. 31 is the same as the case in FIG. 30 except for the difference of X direction and Y direction. That is to say, the peak portion of the power spectrum is centered on fx=0, fy=512. This peak component is the clock signal component in the Y direction.

4. Extracting Clock Signal Component
Search Range of Clock Signal Component

When searching for a peak portion from the analysis results of two-dimensional FFT as described above, a predetermined search range is set beforehand. Specifically, a predetermined range centered on the point of fx=512, fy=0 in the two-dimensional FFT analysis results in FIG. 30 is set for such a search range, and a predetermined range centered on the point of fx=0, fy=512 in the two-dimensional FFT analysis results in FIG. 31 is set.

Now, it should be noted that with a hologram recording/reproducing system, how many pixels of the image sensor 11 will receive image light for one pixel worth of the SLM 4 is determined, and the number of valid pixels of the SLM 4 generating the signal light is determined, so how many pixels of the SLM 4 will fit into the image sensor 11 from edge to edge in the X direction and Y direction. Accordingly, a position where a peak portion will appear in the frequency analysis results can be estimated to a certain degree from the information thereof. Specifically, with a hologram recording/reproducing system, the optical system has been designed such that basically, the range of all valid pixels of the image sensor 11 match the range of all valid pixels of SLM 4, so ideally, it is foreknown that 512 data pixels fit into the X direction and Y direction on the image sensor, with point fx=512, fy=0 being the ideal peak position in the X-direction analysis results, and point fx=0, fy=512 being the ideal peak position in the Y-direction analysis results.

However, in reality, there are fluctuations in the image such as enlarging/reduction, rotation, distortion, and so forth, so the peak position will appear at a position offset from this ideal point, which serves as a reference, in accordance with such fluctuation. At this time, the distance from the point of origin of the peak position is the frequency of the clock signal, and the direction of the peak position with the point of origin as a reference matches the normal direction of the plane wave which is the clock signal. In a typical example, if the reproduced image is enlarged or reduced, the frequency of the clock signal falls or rises, and the distance from the point of origin to the peak position decreases or increases. Also, in the event that the reproduced image is rotated, the normal direction of the plane wave serving as the clock signal rotates by the same angle, so the peak position is offset from the axis.

Note that the results shown in FIGS. 30 and 31 assume a clean image with no fluctuation, and accordingly are illustrated with the peaks at the ideal positions of fx=512, fy=0, and fx=0, fy=512, respectively.

Taking these into consideration, with the present embodiment, a predetermined range with fx=512, fy=0 as a reference is set as the peak search range for the X-direction timing pulse signal analysis results, and a predetermined range with fx=0, fy=512 as a reference is set as the peak search range for the Y-direction timing pulse signal analysis results, whereby peak portion search is performed at each.

It should be noted that there is a tradeoff in setting such a search range size. For example, if the search range is too narrow, the range of handling fluctuations in the reproduced image tends to be narrow, but error in peak search will tend to be smaller. Conversely, if the search range is too wide, the range of handling fluctuations in the reproduced image tends to be wide, but the probability of erroneous peak detection increases.

In light of this, with the present embodiment, rectangular regions of around ±10% of the reproduced image range, centered on each reference point, are set as search ranges. The values of the reference points are fx=512, fy=512, so 10% thereof is roughly 50 (512×0.1), and accordingly in this case a rectangular region of 101 (50+1+50)×101 (50+1+50) is set as the search range. Also note that the size of the search range may be optionally set, and is not restricted to the above side. Also, the shape of the search range is not restricted to a rectangle, and may be other shapes, such as a circle, or the like.

Extraction of X Clock Component and Y Clock Component

As a result of the above search, peak portions are detected from each of the X-direction analysis results and the Y-direction analysis results. Next, center component of the detected peak portion and the surrounding components are combined to extract X-direction and Y-direction clock signal components. Note that the combined center component of the detected peak portion and the surrounding components thereof will be referred to as "X clock signal component" and "Y clock signal component" in the present embodiment.

Figure 32:
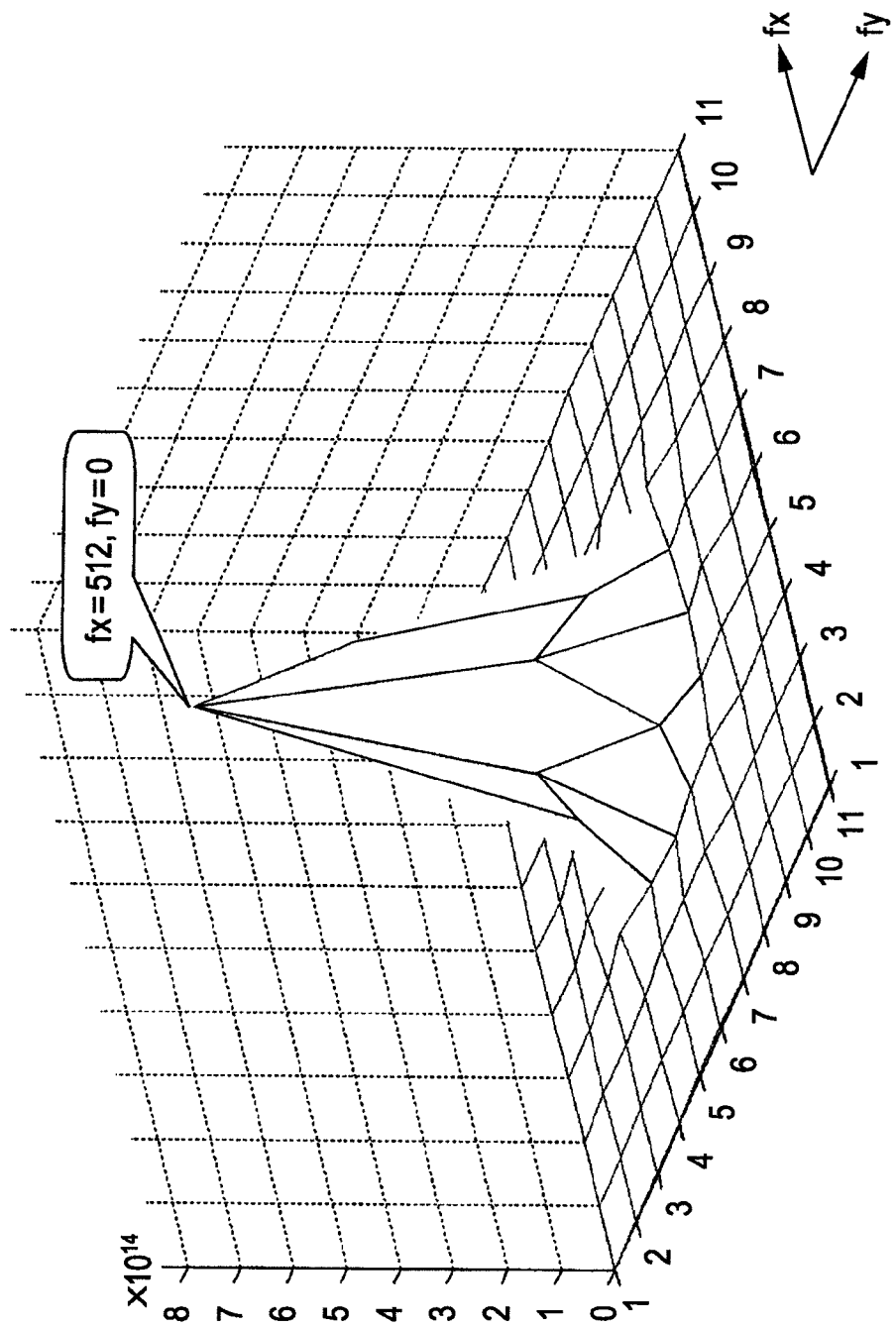
FIG. 32 is a diagram illustrating extraction results of X-clock signal components.
Figure 33:
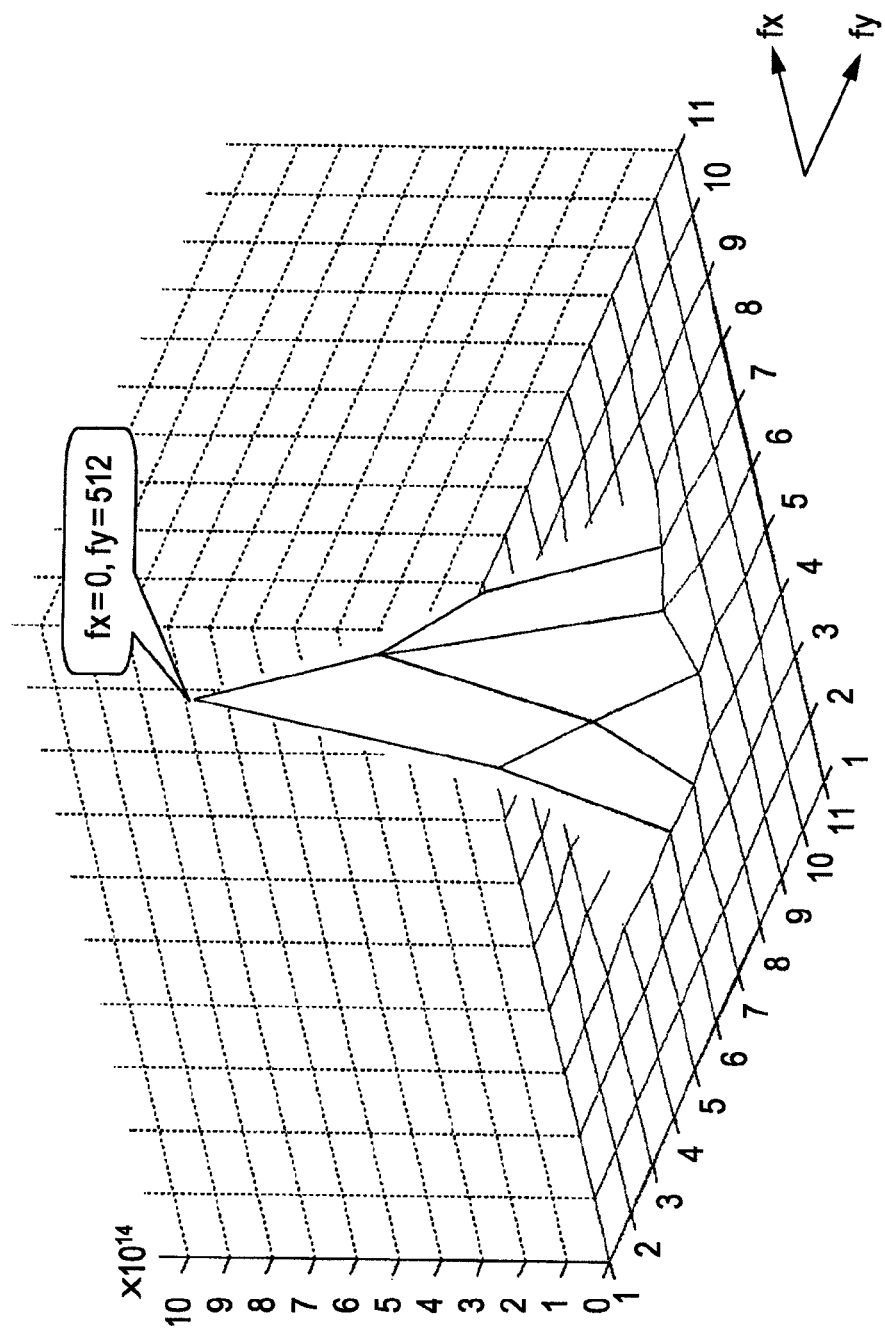
FIG. 33 is a diagram illustrating extraction results of Y-clock signal components.

FIGS. 32 and 33 illustrate the results of extracting the X clock signal component and the results of extracting the Y clock signal component, respectively. As shown in these diagrams, a rectangular region of 11×11 in size, for example, with the center as the reference thereof, is set for the peak portion detected by the search. This number 11 is reached by taking the sideband size on the positive and negative sides each as 5, and also counting the center point as 1, i.e., 2×5+1=11. It should be further noted that the shape of the extracting range is not restricted to a rectangle, and may be other shapes, such as a circle, or the like.

It should be noted that there is a tradeoff in setting such a extracting range size, and accordingly should be determined appropriately so as to correspond to the system design. For example, if the size is too small, handling position irregularities within the image becomes more difficult, but there is the advantage that there is little disturbance due to noise. On the other hand, if the size is too large, position irregularities within the image can be handled well, but the probability of reacting to noise and being disturbed increases.

5. Phase Shift Processing

Multiplication of $j\omega_x$, Multiplication of $j\omega_y$

The X clock signal component and the Y clock signal component extracted as described above are subjected to processing which each are subjected to IFFT for transforming into an actual image and obtaining X clock signals and Y clock signals, which will be described later. However, the clock signals obtained as the result of IFFT of the extracted clock signal components as they are will result in the edge timing being represented at the amplitude peak portion, and will be difficult to handle at the later-performed edge timing sampling. Accordingly, phase shift processing, more specifically differentiation processing, is performed such that the edge timing can be obtained at the zero cross timing, which is easier to handle.

Figure 34:
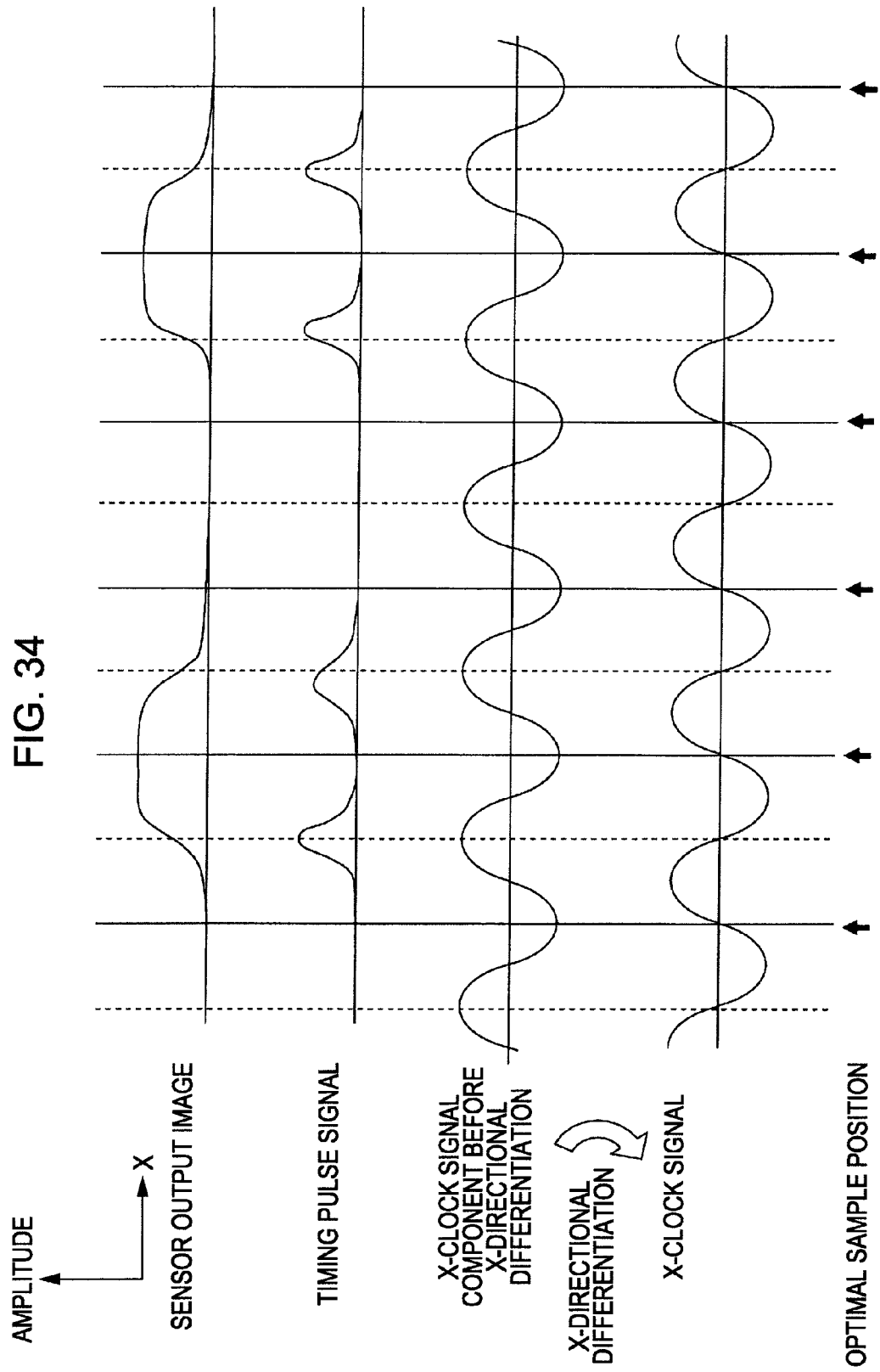
FIG. 34 is a diagram for describing phase shift processing.

FIG. 34 describes the phase shift processing by illustrating the waveforms of the sensor output image, X-direction timing pulse signals, X-direction clock signals before X-direction differentiation, and X-direction clock signals after X-direction differentiation. Note that FIG. 34 cross-cuts the waveforms of the signals so as to be illustrated as one-dimensional signals, since two-dimensional waveforms will be difficult to comprehend in the drawing. That is to say, the waveforms of each of the signals in FIG. 34 represent the waveform of a cross-section taken along a plane perpendicular to the Y-axis of the two-dimensional image (signals). While FIG. 34 only illustrates the X direction, the Y direction can be considered in the same way.

First, as can be understood from the above description, an X-direction timing pulse signal has a waveform where the peak is obtained at a portion where the luminance gradient is high in the sensor output image, as shown in FIG. 34. This X-direction timing pulse signal is subjected to two-dimensional FFT to extract the clock signal, and the subjected to IFFT, whereby a cosine wave such as shown in FIG. 34 as the X-direction clock signal before X-direction differentiation is reproduced.

At this time, the ideal sample data is at the center of the data pixel, and is at the position of the vertical solid lines in FIG. 34. It can be seen here that with the clock signal before X-direction differentiation, the position is the negative peak position. While this negative peak position might be able to be detected in the subsequent processing, detection at the zero cross position is more preferable from the perspective of ease of detection. Accordingly, the cosine wave is differentiated to shift the phase.

While such differentiation processing can be performed in the actual image region (i.e., following IFFT), here, we will performing processing equivalent to differentiation in the frequency region in light of ease of computation.

Differentiation in the frequency region is equivalent to multiplying by the imaginary number $j\omega$. Accordingly, the clock signal component at the frequency region which has been obtained in the previous steps is multiplied by $j\omega$. This $j\omega$ is multiplied in accordance with the frequencies of the components within the extracted clock signal component. The direction of differentiation differs depending on the clock signal component, with the X clock signal component being differentiated in the X direction, and the Y clock signal component being differentiated in the Y direction. Accordingly, these are multiplied by X-direction frequency $j\omega_x$ and Y-direction frequency $j\omega_y$.

Performing such $j\omega$ multiplication on the clock signal component extracted at the frequency region enables the phase of the clock signal obtained following IFFT to be shifted so as to be an optimal sample position at the zero cross position, as with the X clock signal waveform following differentiation as shown in FIG. 34, for example. Note that the positive zero cross position is encountered when transitioning the zero cross position from the negative side to the positive side.

6. Inverse Fourier Transform Processing

X Clock Signal, Y Clock Signal

With the case of the present embodiment, clock signals of the actual image can be obtained by performing inverse Fourier transformation of the clock signal components at the frequency region obtained by peak search from the analysis results by two-dimensional Fourier transformation as described above. In this case, the frequency analysis has been performed by FFT, so inverse Fourier transformation is performed by IFFT. AS for specific processing, the X clock signal component and Y clock signal component which have been multiplied by $j\omega$ as described above are each subjected to IFFT.

Figure 35:
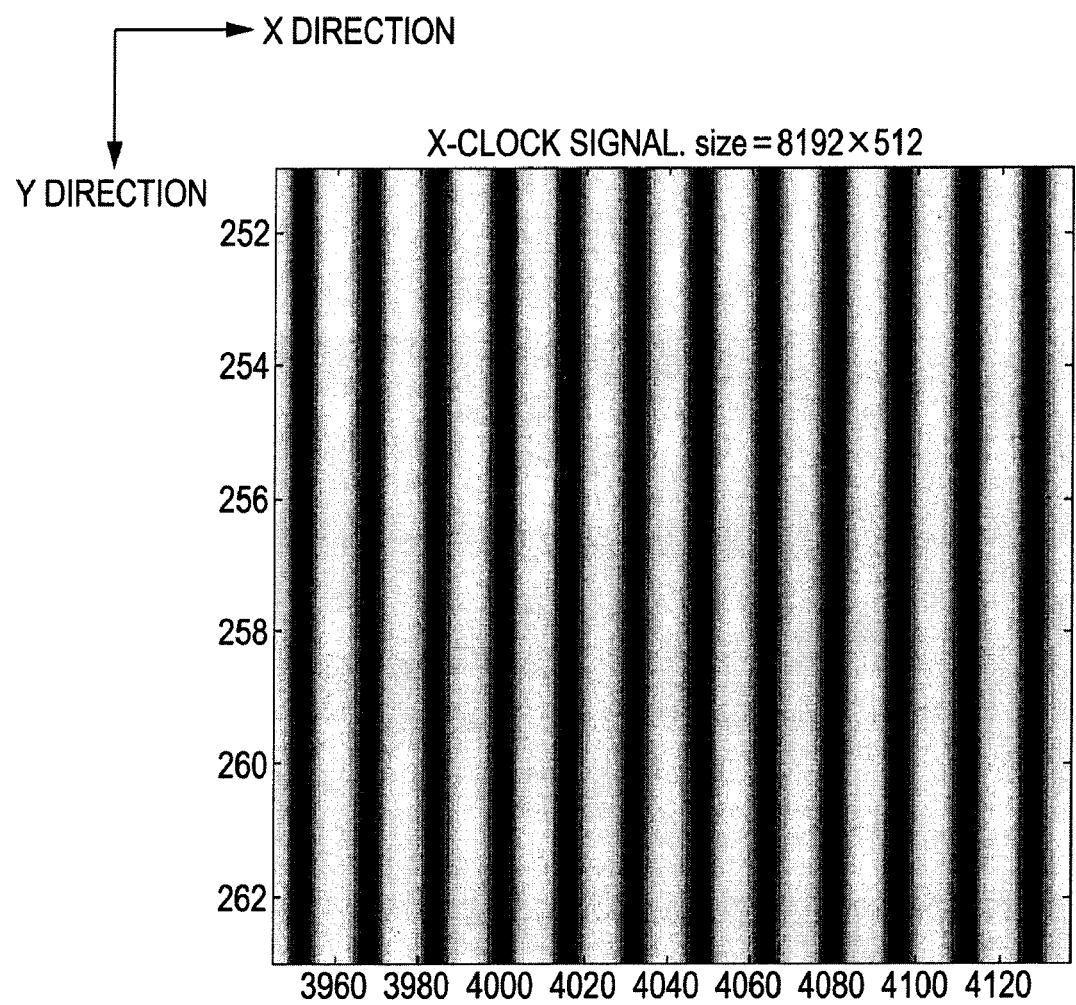
FIG. 35 is a diagram illustrating an image as X-clock signals.
Figure 36:
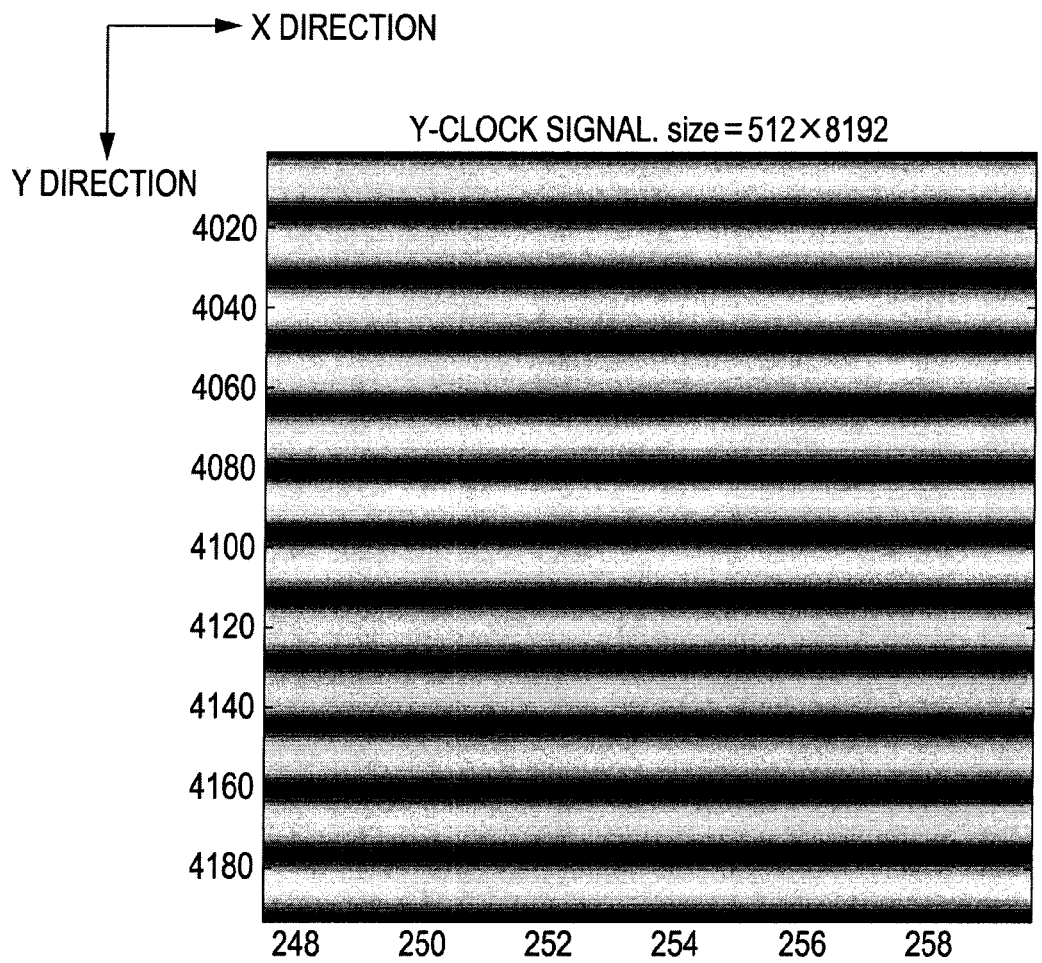
FIG. 36 is a diagram illustrating an image as Y-clock signals.

FIGS. 35 and 36 illustrate an image obtained by IFFT of the X clock signal component, and an image obtained by IFFT of the Y clock signal component, respectively. The signal levels in this case are grayscale as well, with white taking a greater value than black. As can be understood from the above description, these images include information of the cycle, phase, and normal direction, of waves which are the principal component in the X direction and Y direction, regarding the edge position and intensity included in each sensor output image. With the present embodiment, images obtained by peak components extracted from the analysis results by two-dimensional Fourier transformation (X clock signal component and Y clock signal component) being subjected to inverse Fourier transformation are called X clock signals and Y clock signals, respectively.

As described above, multiplication by $j\omega$ has been performed at the frequency region, so the positive zero cross positions (black→white) in these images provide the positions which should be sampled. That is to say, with the X clock signals shown in FIG. 35, the positive zero cross positions thereof represent the sectioning of the data pixel increments (the center position of each data pixel) in the X direction. In the same way, with the Y clock signals shown in FIG. 36, the positive zero cross positions thereof represent the sectioning of the data pixel increments in the Y direction. This can be comprehended by comparing FIGS. 35 and 36 with the earlier-described FIGS. 25 and 26.

Thus, the sample positions in increments of data pixels in the X direction and the sample positions in increments of data pixels in the Y direction can be identified in the images, by the positive zero cross lines of the X clock signals and the Y clock signals. In other words, the positive zero cross lines of the X clock signals are lines representing the data pixel cycle in the X direction in the original reproduced image (X-direction cycle lines), and the positive zero cross lines of the Y clock signals are lines representing the data pixel cycle in the Y direction in the original reproduced image (Y-direction cycle lines). Accordingly, by extracting the zero cross lines of the X clock signals and Y clock signals, and obtaining the intersection thereof, as described later, resampling positions can be identified.

X-Directional and Y-Directional Resolution when Restoring Clock Signals

Now, when performing zero cross line extracting processing, the processing is performed such that the X-directional and Y-directional resolutions differ. That is to say, before searching the images in FIGS. 35 and 36 and obtaining the zero cross positions, processing is performed in which the resolution in the direction of searching the zero cross position is raised, and the resolution in the other direction is lowered. Specifically, the X-directional resolution is raised for the X clock signals, and the resolution in the Y direction is lowered. Also, the Y-directional resolution is raised for the Y clock signals, and the resolution in the X direction is lowered.

The purpose of raising the resolution is to enable processing for searching and deciding the zero cross position to be performed easily and accurately. If the resolution is not raised, the sample rate in this case is 4×4 including up-scaling, so the basic cycle of the clock signal is around four pixels in the design reference value on the image data. That is to say, the waveform of one cycle of a clock signals is represented with grayscale values of approximately four pixels. Extracting the positive zero cross position from such a signal waveform is not unrealistic, but is not easy, either. Accordingly, the resolution is raised several times, so as to enable accurate results to be obtained with easy processing.

On the other hand, the purpose of lowering the resolution in the direction which is not the direction of searching the zero cross position is to prevent increased calculation amount due to the increased resolution. If the resolution is not lowered in the other direction at this time, zero cross position information is calculated at a rate of four per data pixel in this direction since the sample rate is 4×4, which is excessive. A fraction thereof is sufficient.

In this direction, there are no cases wherein the data pixel sample positions occur at very short cycles or change rapidly to the extent that the zero cross positions have to be obtained at a cycle shorter than the data pixel cycle, meaning that the zero cross lines do not have to be able to represent such change. Accordingly, with the present embodiment, at the time of performing IFFT of clock signals components into image signals, the resolution is increased in the direction of searching for zero cross positions and the resolution is reduced in the other direction.

Specifically, in the case of the present embodiment, the resolution of the X clock signals in the X direction is raised fourfold (2048×4=8192) and the resolution of the Y clock signals in the Y direction is raised fourfold. On the other hand, the resolution of the X clock signals in the Y direction is quartered (2048/4=512), and the resolution of the Y clock signals in the X direction is quartered.

It should be noted that changing the resolution in the x direction and Y direction to perform IFFT is extremely easy to realize. Specifically, in the case of raising the resolution in the X direction, the number of points in the fx direction in the frequency region is extended fourfold in the highband side, with the increased portions being filled in with zeroes. Also, in the case of lowering the resolution in the Y direction, the number of points in the fy direction in the frequency region is reduced to ¼ that at the lowband side. The result is 8192×512 points, and IFFT thereof enables X clock signals to be generated. The Y clock signals also can handled by adjusting the number of points to 8192×512 points using the same technique, and performing IFFT thereof.

Raising the X-directional resolution for the X clock signals and raising the X-directional resolution for the X clock signals in this way enables the detection precision of sample positions in the X direction and the detection precision of sample positions in the Y direction to each be raised. Also, raising one fourfold and reducing the other to ¼ as in the specific example enables the processing load to be suppressed to around the same as with a case wherein normal IFFT with no raised resolution is performed.

It can be understood from the enlargement scale of the resolution described above that in this case, the sample rate as to the original image (512×512) can be made to be 16 times in both the X direction and the Y direction. That is to say, zero cross position detection can be performed at 16 times the resolution for the data pixel positions in the original image.

7. Zero Cross Line Extraction

Figure 37A:
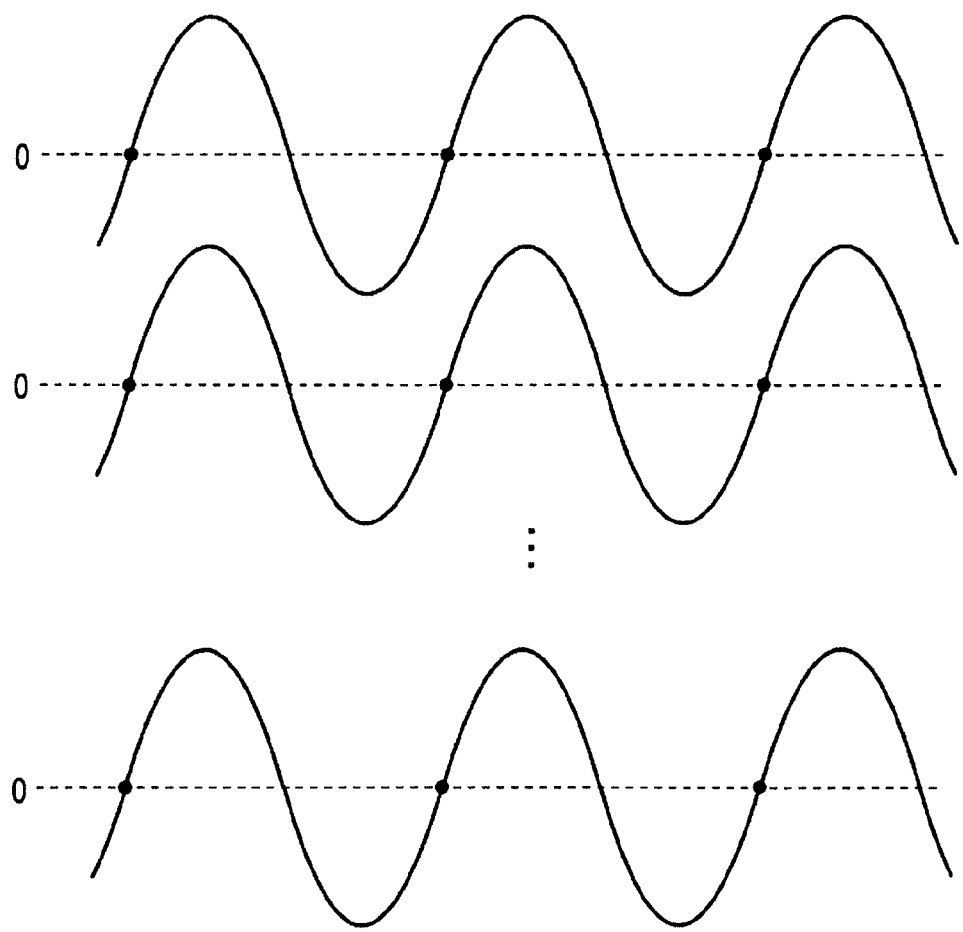
FIGS. 37A and 37B are diagrams for describing an extraction technique for the zero cross lines of clock signals.
Figure 37B:
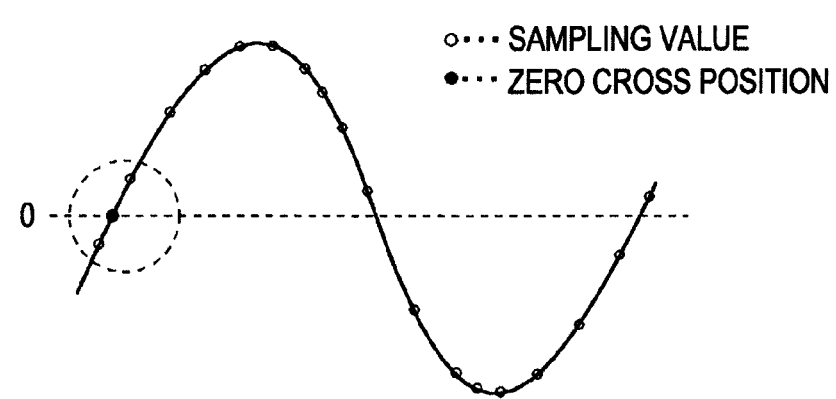

Upon obtaining X clock signals and Y clock signals with IFFT as described above, positive zero cross lines are extracted therefrom. FIGS. 37A and 37B illustrate a technique for extracting the zero cross lines.

Due to the above-describe resolution raising processing, the X clock signals are formed of 8192 sample values per row in the X direction, and the X-direction row is formed of 512 sample values in the Y direction. In the same way, the Y clock signals are formed of 8192 sample values per column in the Y direction, and the Y-direction column is formed of 512 sample values in the X direction.

FIG. 37A shows the sample values of each column in waveforms. That is to say, with X clock signals, each waveform shown in FIG. 37A includes one row worth of sample values in the X direction, and there are 512 of these in the Y direction. Also, with Y clock signals, each waveform includes one column worth of sample values in the Y direction, and there are 512 of these in the X direction.

The zero cross lines can be understood as being formed by extracting the positive zero cross points of the waveforms for each X direction row for the X clock signals and each Y direction column for the Y clock signals, and connecting the zero cross points of each of the rows and each of the columns.

FIG. 37B schematically illustrates a positive zero cross point extraction technique. As shown here, due to the above-described resolution increasing processing, there are 16 sample values (sampling values) within one cycle of a waveform corresponding to the cycle of one data pixel. Specifically, zero cross point extracting is performed using linear interpolation. That is to say, two points are found sandwiching a point of polar transition from negative to positive in the waveform of each row or each column, and the intersection between a line connecting the sampling values of these two points and the zero level is extracted as a positive zero cross point.

Figure 38:
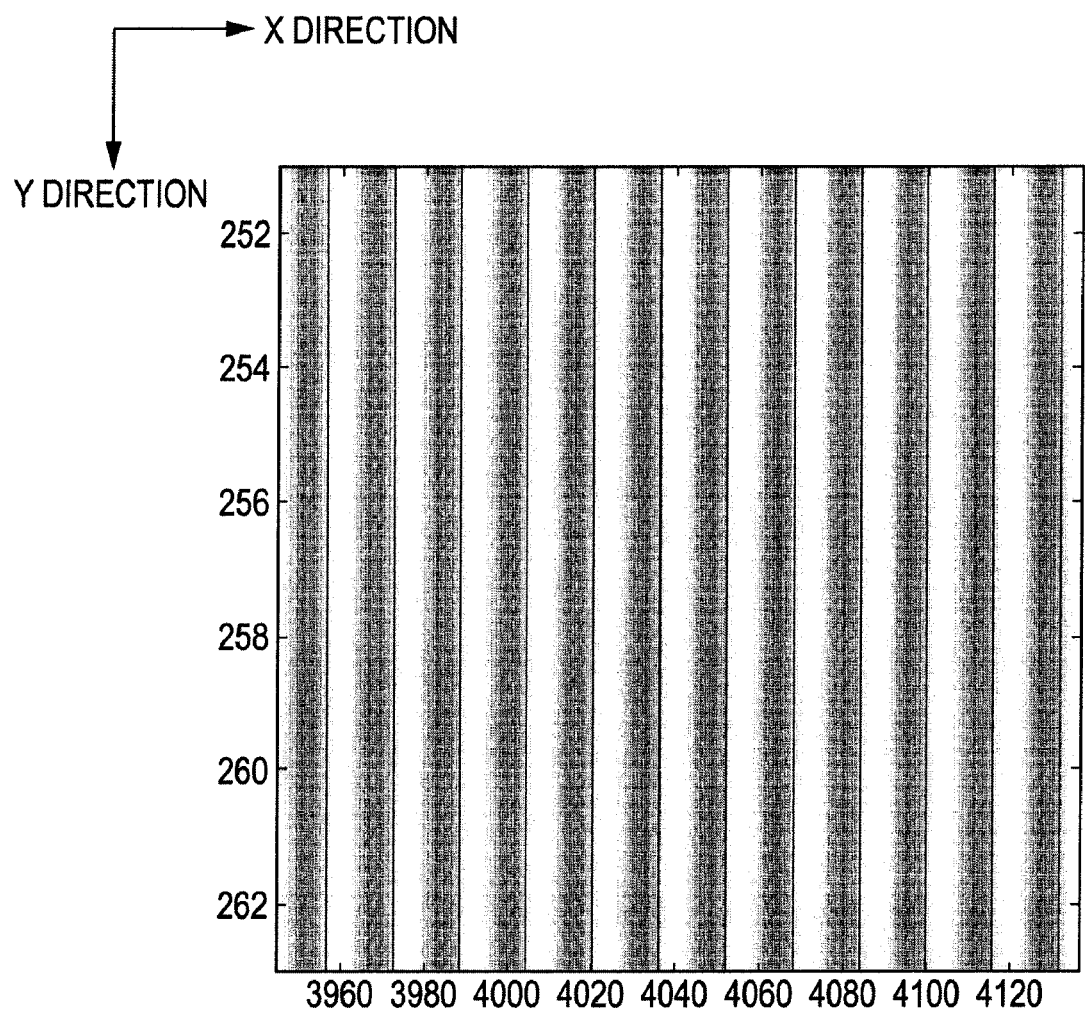
FIG. 38 is a diagram illustrating extraction results of positive zero cross lines of X-clock signals.

Extraction processing for such positive zero cross points is performed for each row with regard to the X clock signals, and for each column with regard to Y clock signals. Connecting each of the positive zero cross points obtained for each row for the X clock signals in the Y direction obtains positive zero cross lines for the X clock signals, such as shown in FIG. 38. Also, connecting each of the positive zero cross points obtained for each column for the Y clock signals in the X direction obtains positive zero cross lines for the Y clock signals, such as shown in FIG. 39.

Figure 39:
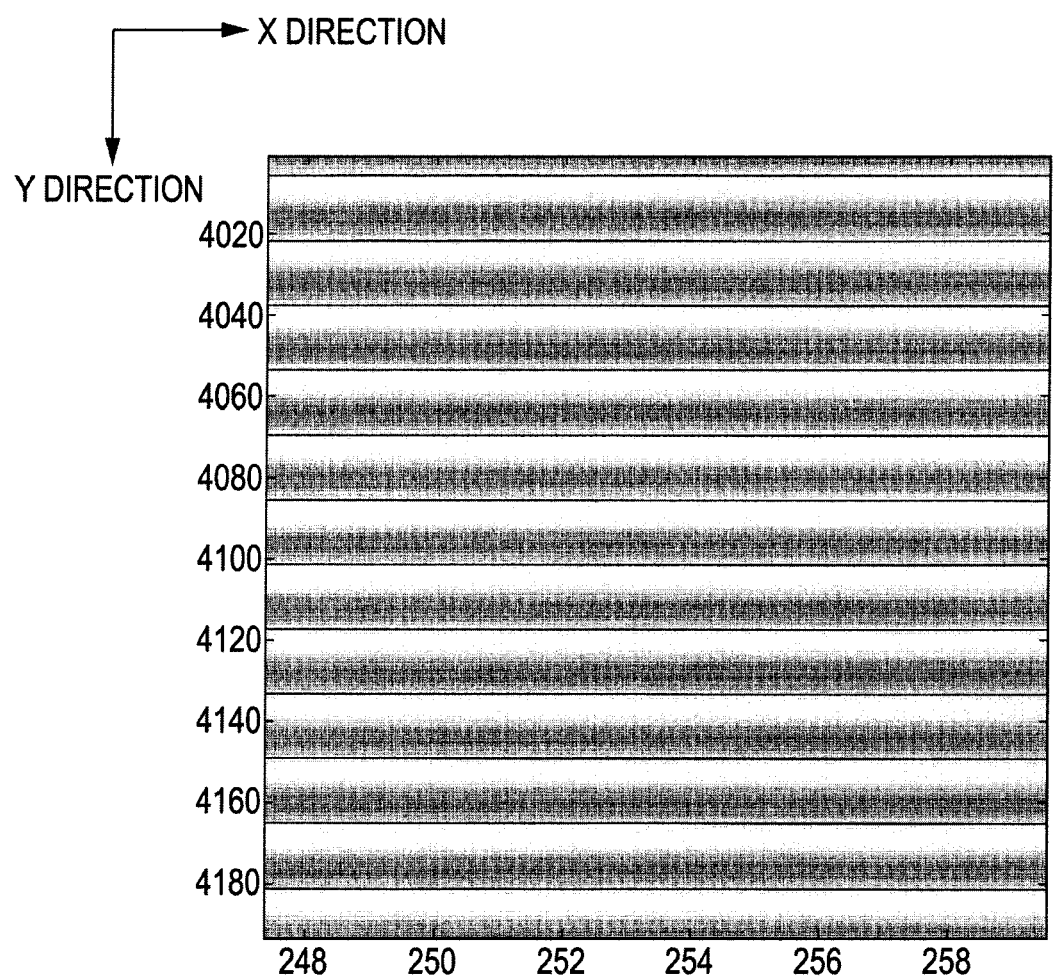
FIG. 39 is a diagram illustrating extraction results of positive zero cross lines of Y-clock signals.

It should be noted that in FIGS. 38 and 39, the positive zero cross lines are represented by solid lines, and the background shows the X clock signal image and Y clock signal image the same as that shown in FIGS. 35 and 36, respectively.

Data Expression Format for Zero Cross Line Data of Clock Signals

The above processing obtains a positive zero cross line group of X clock signals and a positive zero cross line group of Y clock signals, the results of which are stored in an array variable as shown next.

For example, in the case of the X clock signals, this is expressed as $$clkx\_timing\,(i, j)$$

which is a real number variable of a size of 512×512. This indicates the positive zero cross position (real number) of the j'th X clock signal from the left in the y=i'th row.

That is to say, the Y coordinate holds the positive zero cross position in the X-direction clock as a real number which is not an integer, as an integer coordinate. Thus, the X-direction timing line group can be held while matching the reduction in resolution in the Y direction, with no problem in precision either.

This is true for the positive zero cross line groups for the Y clock signals as well. That is, the x and y are simply exchanged. Specifically, these are stored in an array variable as shown next.

$$clky\_timing\,(i, j)$$

which is a real number variable of a size of 512×512. This indicates the positive zero cross position (real number) of the i'th Y clock signal from the top in the x=j'th row.

Holding a timing line group with an expression format such as described above allows information to be grasped regarding the No. of each zero cross line in the whole, so the order relation of each of the data pixel positions obtained from the grid points of zero cross lines stored in this way can be correctly grasped for both the X direction and the Y direction, which will be described later. That is to say, this enables each pixel amplitude value obtained from the data pixel values to be obtained in a state maintaining the order relation. This means that the cycle slip phenomenon, which has occurred with the PLL circuit type clock reproduction method in storage device according to the related art, does not occur.

About Zero Cross Point Extraction Processing

Processing for detecting the zero cross points of the clock signals and storing the zero cross points in a data format such as described above while detecting, is preferably performed as described in detail below.

First, one zero cross position is found near a position estimated to be the center position of the signal light area A2. Then, relying on this, processing is performed wherein zero cross positions are traced vertically or horizontally. Gradually enlarging detection of the zero cross points from around the center enables a correct zero cross line group, wherein the order relation of zero cross positions in the signal light area match, to be extracted easily and in a sure manner. This can be understood from the relation between the image sensor 11 and signal light.

Figure 41:
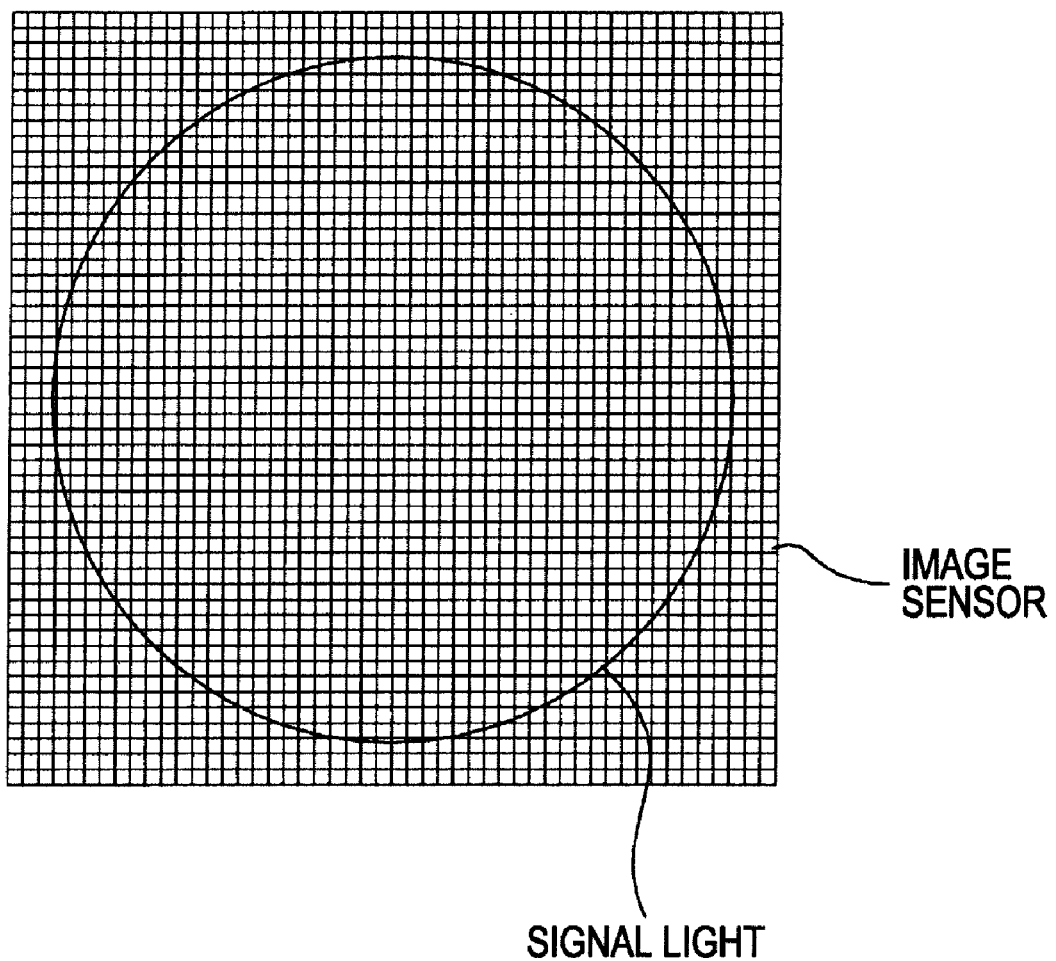
FIG. 41 is a diagram illustrating the positional relation between the image sensor and signal light.

For example, as shown in FIG. 41, the shape of the image sensor 11 is square, while the shape of the signal light area A2 is generally circular, so it can be expected that the recording data which is the signal light at the perimeter portion will not be reflected very much in the image obtained as X clock signals, and rather reflect a flat background with low grayscale values. Accordingly, the probability is high that the zero cross points obtained at the perimeter of the X clock signal and Y clock signal images will be low in reliability.

Accordingly, thus gradually enlarging extracting of the zero cross points from around the center enables a correct zero cross line group, wherein the order relation of zero cross positions in the signal light area match, to be extracted easily and in a sure manner.

8. Zero Cross Line Grid Point Extraction

Figure 40:
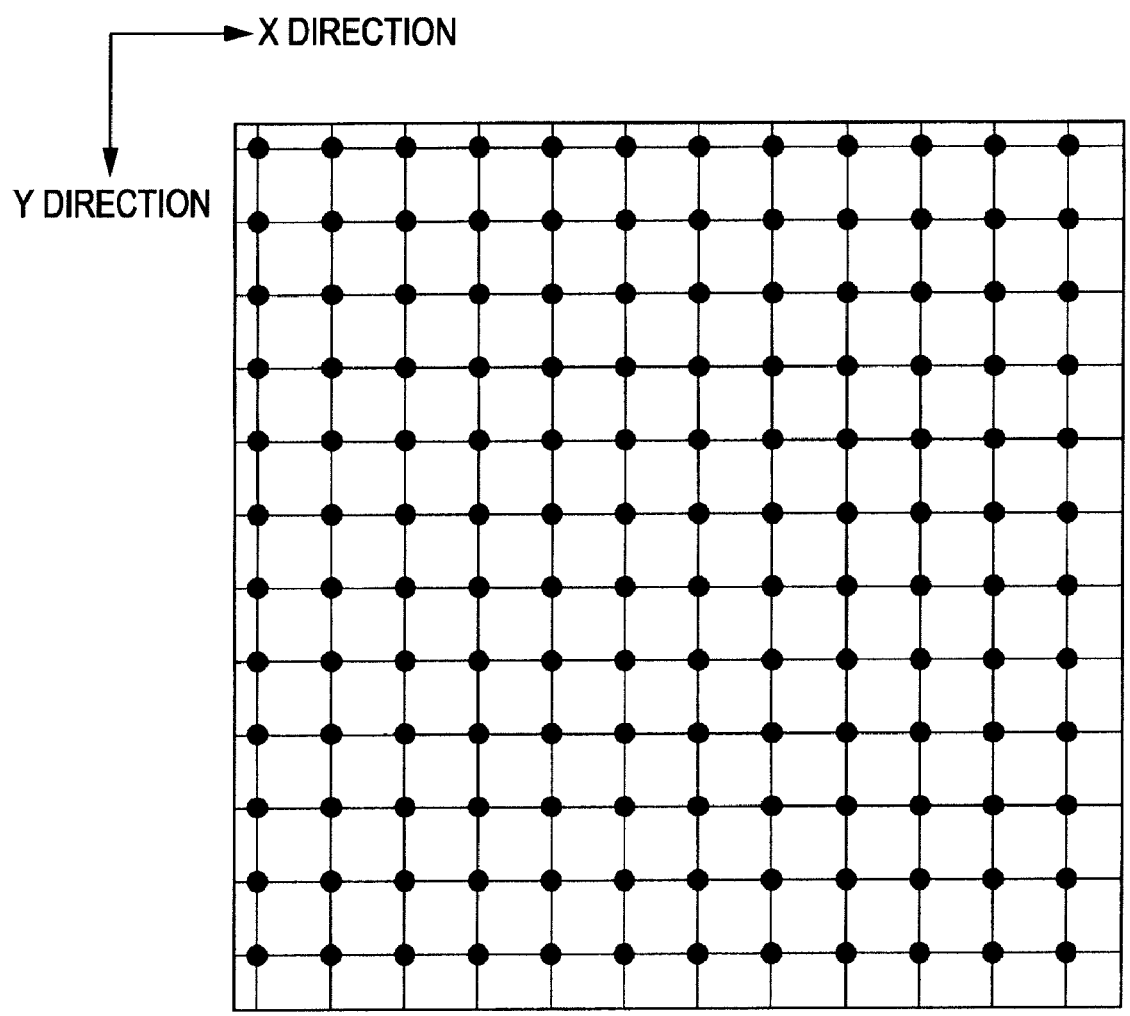
FIG. 40 is a diagram illustrating extraction results of grid points of the zero cross line groups.

The above processing obtains information of the zero cross line groups of X clock signals and zero cross line groups of Y clock signals, and the No. of each zero cross line in the X direction/Y direction (specifically, the No. thereof out of the 512 lines) in the image. Thereafter, obtaining the intersections (grid points) of the zero cross line groups of X clock signals and zero cross line groups of Y clock signals enables the positions of the data pixels to be each determined. FIG. 40 illustrates the grid points where the zero cross line groups intersect with black dots. In FIG. 40, the zero cross lines of the X clock signals and the zero cross lines of the Y clock signals are shown together with solid lines.

Resampling to 1×1

Thus, the data pixel positions (resampling positions) are identified by the grid points. Thereafter, obtaining the grayscale values (amplitude values) of the reproduced image at the resampling positions identified by the grid points in the up-scaled image shown in FIG. 26 allows the amplitude values to be obtained in data pixel increments at the SLM 4. Thus, 1×1 resampling is completed.

Figure 42:
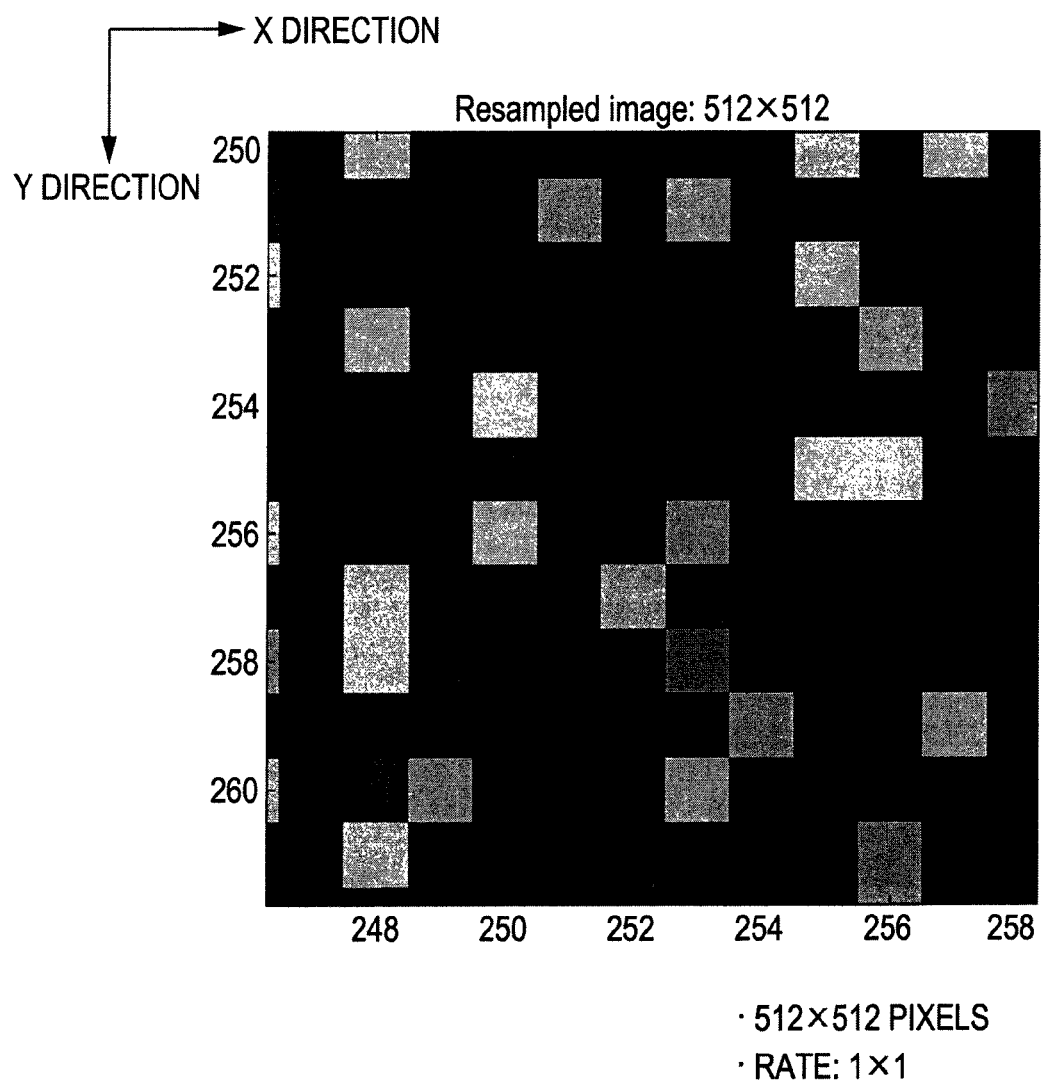
FIG. 42 is a diagram exemplarily illustrating an image from the results of resampling.

Note that the amplitude value obtaining processing at the data pixel positions, based on the information of resampling positions identified as described above, is performed at the pixel amplitude value obtaining unit 32 shown in FIG. 24, which will be described in the next section. For reference, an image obtained as the result of the resample processing is shown in FIG. 42.

Figure 43:
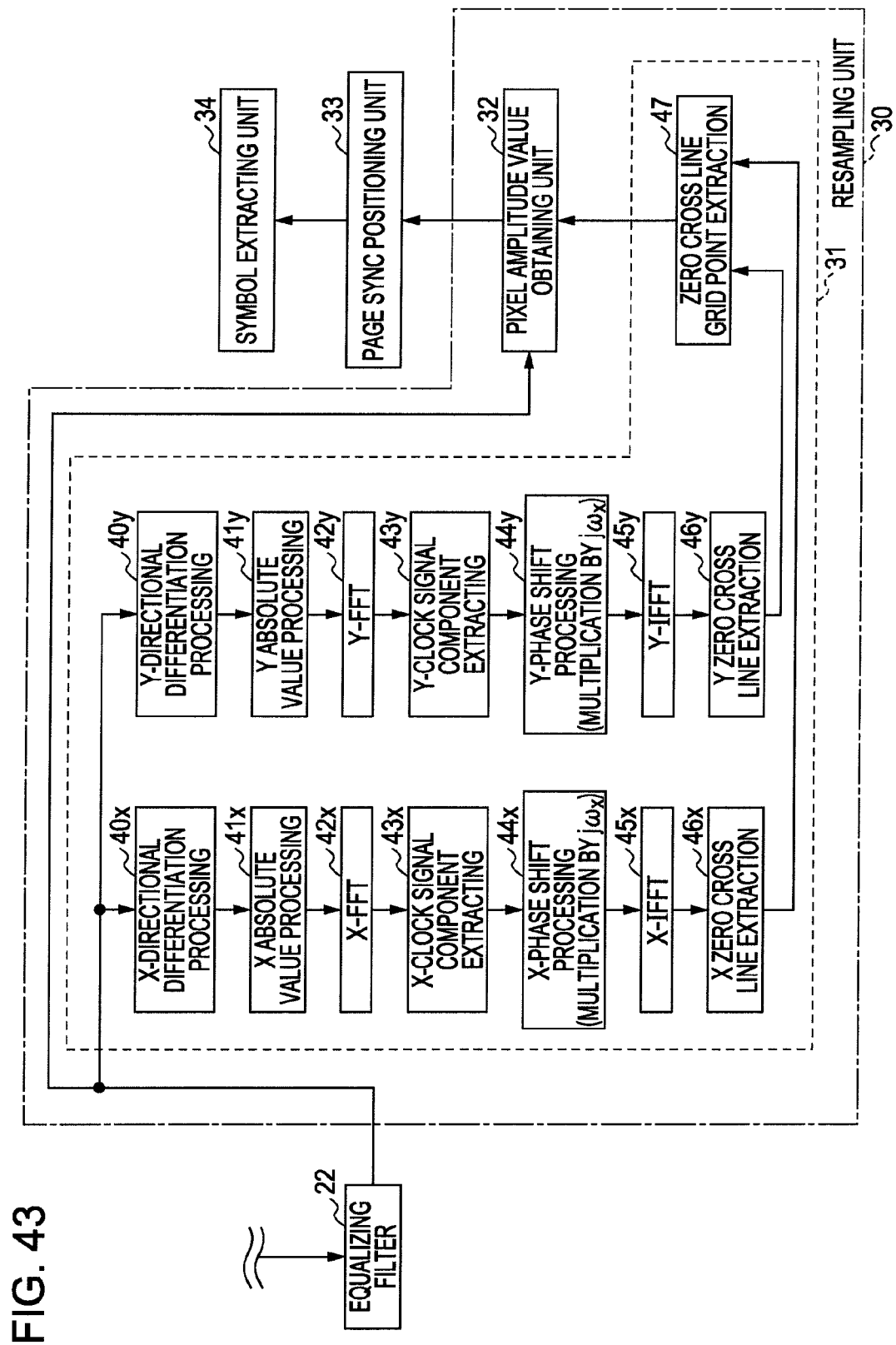
FIG. 43 is a block diagram illustrating a configuration for realizing the reproducing operations based on the resampling technique according to the second embodiment.

Configuration for Realizing the Resampling Processing According to the Second Embodiment Next, the internal configuration of the two-dimensional clock extracting/data pixel position identifying unit 31 for realizing the resampling processing according to the second embodiment described above will be described with reference to FIG. 43. Note that FIG. 43 shows the equalizing filter 22, pixel amplitude value obtaining unit 32, page sync positioning unit 33, and symbol extracting unit 34, along with the internal configuration of the two-dimensional clock extracting/data pixel position identifying unit 31. Specific operations of the pixel amplitude value obtaining unit 32, page sync positioning unit 33, and symbol extracting unit 34 will be described with FIG. 43 along with the operations of the two-dimensional clock extracting/data pixel position identifying unit 31.

In FIG. 43, the two-dimensional clock extracting/data pixel position identifying unit 31 internally includes an X-directional differentiation processing unit 40x, a Y-directional differentiation processing unit 40y, an X absolute value processing unit 41x, a Y absolute value processing unit 41y, an X-FFT processing unit 42x, a Y-FFT processing unit 42y, an X-clock signal component processing unit 43x, a Y-clock signal component processing unit 43y, an X-phase shift processing unit 44x, a Y-phase shift processing unit 44y, an X-IFFT processing unit 45x, a Y-IFFT processing unit 45y, an X zero cross line extraction processing unit 46x, a Y zero cross line extraction processing unit 46y, and a zero cross line grid point extraction unit 47.

First, the X-directional differentiation processing unit 40x and Y-directional differentiation processing unit 40y each input image signals from the equalizing filter 22, and execute the above-described X-directional differentiation processing and Y-directional differentiation processing. That is to say, the X-directional differentiation processing unit 40x performs X-directional differentiation processing using the X-directional differentiation mask such as shown in FIG. 27A, and the Y-directional differentiation processing unit 40y performs Y-directional differentiation processing using the Y-directional differentiation mask such as shown in FIG. 27B.

The X absolute value processing unit 41x performs processing for obtaining absolute values of the values in the image following the X-directional differentiation processing performed by the X-directional differentiation processing unit 40x above, and supplies the results thereof to the X-FFT processing unit 42x. The Y absolute value processing unit 41y also performs processing for obtaining absolute values of the values in the image following the Y-directional differentiation processing performed by the Y-directional differentiation processing unit 40y above, and supplies the results thereof to the Y-FFT processing unit 42y.

The X-FFT processing unit 42x and Y-FFT processing unit 42y each subject the images following absolute value processing (i.e., X-direction timing pulse signals and Y-direction timing pulse signals) that are supplied from the X absolute value processing unit 41x and Y absolute value processing unit 41y respectively, to two-dimensional FFT processing. The results are the analysis results such as shown in FIGS. 30 and 31 as described earlier.

The X-clock signal component processing unit 43x subjects the analysis results obtained by two-dimensional FFT by the X-FFT processing unit 42x to peak portion searching of the power spectrum within a predetermined search range (rectangular region of 101×101) centered on a reference point fx=512, fy=0 such as described above. The center component and surrounding components of the peak portion detected as a result of the search are extracted as X-clock signal components. That is to say, as described above, a 11×11 rectangular region with the center of the detected peak portion as the center thereof, is extracted as X-clock signal components.

The X-clock signal component processing unit 43y also in the same way subjects the analysis results obtained by two-dimensional FFT by the Y-FFT processing unit 42y to peak portion searching of the power spectrum within a predetermined search range (rectangular region of 101×101) centered on a reference point fx=0, fy=512, and a 11×11 rectangular region with the center of the detected peak portion as the center thereof, is extracted as Y-clock signal components.

The X-phase shift processing unit 44x multiplies the X-clock signal components extracted at the X-clock signal component processing unit 43x by jω. That is to say, the X-clock signal components are multiplied by the X-direction frequency $j\omega_x$ in accordance with the frequency of each of the components, such that the phase of the X-clock signals obtained by IFFT of the X-clock signal components is shifted as described with FIG. 34.

In the same way, the Y-phase shift processing unit 44y multiplies the Y-clock signal components by the Y-direction frequency $j\omega_y$ in accordance with the frequency of each of the components, such that the phase of the Y-clock signals obtained by IFFT of the Y-clock signal components is shifted as described with FIG. 34.

The X-IFFT processing unit 45x performs IFFT of the X-clock signal components processed by the X-phase shift processing unit 44x so as to convert the X-clock signal components into X-clock signals serving as an actual image. In the same way, the Y-IFFT processing unit 45y performs IFFT of the Y-clock signal components processed by the Y-phase shift processing unit 44y so as to convert the Y-clock signal components into Y-clock signals serving as an actual image. As can be understood from the above description, the X-IFFT processing unit 45x at this time performs IFFT wherein the resolution in the X direction is fourfold, and wherein the resolution in the Y direction is ¼. Also, the X-IFFT processing unit 45y at this time performs IFFT wherein the resolution in the Y direction is fourfold, and wherein the resolution in the X direction is ¼.

The X zero cross line extraction processing unit 46x detects the positive zero cross points for each row in the X direction from the X clock signals obtained from the X-IFFT processing unit 45x, using the technique described in FIG. 37, and stores these in the array variable (clkx_timing (i, j)) as described earlier. Extracting of the zero cross point is first performed from around the position estimated to be the center position of the signal light area A2, and is gradually enlarged to the surroundings thereof.

In the same way, the Y zero cross line extraction processing unit 46y detects the positive zero cross points for each column in the Y direction from the Y clock signals obtained from the Y-IFFT processing unit 45y, using the technique described in FIG. 37, and stores these in the array variable (clky_timing (i, j)) as described earlier. Extracting of the zero cross point is first performed from around the position estimated to be the center position of the signal light area A2, and is gradually enlarged to the surroundings thereof, in the case of this zero cross point extraction for Y clock signals as well.

The zero cross line grid point extraction unit 47 extracts the intersections (grid points) of the zero cross lines obtained from the results of extracting the zero cross points by the X zero cross line extraction processing unit 46x and Y zero cross line extraction processing unit 46y.

Now, in the state wherein the zero cross points have been stored in the array variables by the X zero cross line extraction processing units 46x and 46y, these are only sets of zero cross points for each row and each column, but the sets of zero cross points for each row and each column can be handled as zero cross lines. Specifically, the sets of zero cross points stored for each row and each column can be subjected to linear interpolation to obtain information for each zero cross line.

The zero cross line grid point extraction unit 47 performs such processing to obtain a zero cross line group of the X clock signals and a zero cross line group of the Y clock signals, and extract intersections thereof (grid points). These grid points serve to obtain the positions of data pixels of the SLM 4 within the image, i.e., resampling positions are obtained.

Storing each zero cross point in the array variable as described above enables the zero cross lines generated from sets of zero cross points to be identified regarding which No. line each line is in the X direction/Y direction. That is to say, the data pixel positions identified as grid points of such zero cross line groups can be identified as being which No. grid point it is in the X direction/Y direction.

The information of the data pixel positions obtained by the zero cross line grid point extraction unit 47 are supplied to the pixel amplitude value obtaining unit 32. The pixel amplitude value obtaining unit 32 takes as input the information of the data pixel positions obtained as the results of processing by the two-dimensional clock extracting/data pixel position identifying unit 31, and the image signals input from the up-scaling unit 21 (image signals), and obtains the amplitude values of each data pixel position in the image signals (1×1 resampling).

The amplitude value obtaining processing following having obtained such data pixel positions can be performed by interpolation of the two-dimensional signals following the resampling theorem. Alternatively, interpolation processing widely used in the field of image processing according to the related art may be performed. Examples which may be used for this interpolation processing include the nearest neighbor method, the bi-linear interpolation method, the cubic convolution interpolation method, and the bicubic spline method.

Of the above methods, the nearest neighbor method is effective when the over-sampling rate is great, since the readout signal with the closest timing is selected as the amplitude value for that pixel. The nearest neighbor method is also advantageous in that processing time can be reduced, since calculation processing based on functions and so forth does not have to be performed.

Also, the cubic convolution interpolation method, or interpolation by cubic convolution, involves piecewise cubic polynomial approximation of the function $\sin(x)/x$ used for interpolation based on the sampling theorem, and while the processing load is greater than that of the nearest neighbor method, it is advantageous in that high-precision results can be obtained. The present embodiment employs this cubic convolution interpolation method (hereinafter may be abbreviated to "cubic interpolation") for amplitude value obtaining processing.

The page sync positioning unit 33 performs positioning processing based on the information of amplitude values of the data pixel positions obtained at the pixel amplitude value obtaining unit 32, and information of a predetermined data pattern serving as page syncs set in a recording format beforehand. That is to say, the positions on the recording format (i.e., the positions within the hologram page stipulated by the format) of the identified data pixels are identified.

The processing for positioning using page syncs can be performed using techniques according to the related art. That is to say, the hologram page in this case has at least one sync embedded as a page sync, and template matching by correlation computation based on the predetermined data pattern serving as the page syncs, so as to identify the position of the data pixels on the format. Specifically, range of page syncs can be estimated to a certain extend based on the recording format, so correlation values as to the predetermined data pattern are calculated within the estimated range, and the position with the greatest correlation value is identified. Once the position of the page sync in the image signals is obtained, the positions of the data pixels on the format can be identified following the information of the recording format.

Now, positioning processing using syncs in the case of the second embodiment differs from the case of the first embodiment in that positioning processing is performed on an image wherein the amplitude has already been obtained in increments of data pixels (i.e., at a rate of 1×1), so syncs can be used in the originally intended usage. Also, the amount of calculation for the positioning processing can be markedly reduced as compared with the case of the first embodiment wherein positioning processing has to be performed on an image following 4×4 up-scaling.

The symbol extracting unit 34 performs extraction of the symbols within the hologram page using the information of the positions of the data pixels on the format, identified by the page sync positioning unit 33. The amplitude values of the data pixels are supplied to the data distinguishing unit 24 shown in FIG. 24 in increments of the extracted symbols.

Now, description of the data distinguishing unit 24 performing data differentiation by sort detection based on the amplitude values of the data pixels in increments of symbols will be omitted here, since this is the same as with the case of the first embodiment. Also, description of the sparse code decoding unit 25 performing decoding processing of the sparse code in increments of symbols to obtain the reproduced data will be omitted here, since this is the same as with the case of the first embodiment.

Also, though omitted from FIGS. 43 and 24, a configuration may be added to the data reproducing unit 13 for performing basic pre-processing normally used in image processing, as suitable. For example, a signal processing unit may be provided which performs AGC (Automatic Gain Control) for removing irregularities in shade, bright level correction, dark level correction, and so forth.

Also, with the description given above, the zero cross line grid point extraction unit 47 has been described as performing the processing for generating the X-clock signal zero cross line groups and Y-clock signal zero cross line groups from the sets of zero cross points for each row and each column stored in the array variables, but an arrangement may be made wherein the X zero cross line extraction processing unit 46x and the Y zero cross line extraction processing unit 46y respectively perform this processing.

Also, description has been made with reference to FIGS. 43 and 24 that the equalizing filter 22 branches to the two-dimensional clock extracting/data pixel position identifying unit 31 and the pixel amplitude value obtaining unit 32, for the sake of convenience in description, but in reality, an arrangement can be made wherein the image signals following processing by the equalizing filter 22 are stored in memory, with the two-dimensional clock extracting/data pixel position identifying unit 31 and the pixel amplitude value obtaining unit 32 sharing the image within the memory.

Advantages of Resampling Technique According to Second Embodiment

With the resampling technique according to the second embodiment described above, the X clock signals (X-clock information) serving as information representing the cycle, phase, and direction of the X-directional clock components in the image, and the Y clock signals (Y-clock information) serving as information representing the cycle, phase, and direction of the Y-directional clock components in the image, can each be obtained from the peak portion of the power spectrum within a first predetermined range and the peak portion of the power spectrum within a second predetermined range having been extracted from analysis results obtained by two-dimensional Fourier transformation regarding readout image signals. Based on the X-clock signals and the Y-clock signals, the pixel data positions within the hologram page recorded on the hologram recording medium HM can be identified, and the amplitude values of the data pixels can be obtained based on the position information thereof.

At this time, the X-clock signals and the Y-clock signals obtained based on the analysis results also include information regarding the cycle and phase, and also the direction, of the waves, regarding the X-direction clock components and Y-direction clock components. Thus, the data pixel positions are identified based on the X-clock signals and the Y-clock signals, and accordingly the data pixel positions can be identified so as to handle rotation of the image, as well. Of course, the data pixel positions can be identified so as to handle enlarging/reducing of the image size as well. Moreover, the data pixel positions can be identified so as to properly handle distortion, such as in cases that the clock frequencies are not the same in the X direction and Y direction, for example.

Also, with the resampling technique according to the second embodiment described above, the data pixel positions can be identified without using syncs inserted in the hologram page. According to this, the recording capacity of the user data can be increased. That is to say, the recording density of user data can be improved.

Also, with the resampling technique according to the second embodiment, the data pixel positions can be identified using not only the sync portions within the image signals but also the data of the entire image including user data. That is to say, in the case of a technique employing resampling dependent on syncs, in the event that a certain portion of an image serving as a sync is damaged, data pixel position identification is not properly performed at that region, and there is the possibility that all data within that region may be lost, but with the second embodiment, the data pixel positions can be identified using the entirety of obtained image signals, and in this sense more robust readout can be enabled.

Also, enabling data pixel positions to be identified without position identification which uses syncs, normal sync usage can be employed wherein bit synchronization is performed, upon which frame synchronization is performed according to syncs for identifying what position on the recording format each bit value is situated.

As can be understood from the point that syncs do not have to be inserted for identification of data pixel positions, restrictions on the recording format scheme can be alleviated with the second embodiment. Also, the data pixel positions are identified using the entire image, without distinguishing between syncs and user data as described above, so there is no restriction on recording modulation encoding whatsoever. From the above, it can be understood that with the second embodiment, freedom in recording format design can be markedly improved with the second embodiment.

Also, with the second embodiment, at the time of extracting the X-clock component and Y-clock component, each image is subjected to differentiation processing for edge enhancement, and then non-linear processing (absolute value processing), and the images are then subjected to analysis by two-dimensional FFT. This enables the peak level of the clock signal components obtained as the results of analysis to be obtained in a more sure manner, whereby erroneous detection of clock signal components can be firmly prevented.

Also, with the second embodiment, the image following up-scaling is divided to two systems, and the processing of X-direction differentiation, non-linear processing, two-dimensional FFT, and X-clock signal component extraction, and Y-direction differentiation, non-linear processing, two-dimensional FFT, and Y-clock signal component extraction, are performed independently for the X direction and Y direction, which enables clock signal components to be extracted well without interference from the other. That is to say, this enables the X-clock signals and Y-clock signals to be obtained as clock signals with higher precision.

Also, with the second embodiment, at the time of extracting the clock signal components, not only the center portion of the peak portion of the spectrum but also the surrounding components can be taken together for IFFT to generate clock signals, and including the surrounding sidebands in this way enables jittering to be expressed, and clock signals can be reproduced including minute fluctuations in the actual reproduced image. That is to say with the present embodiment where data pixel position identification is performed based on clock signals in this manner, high-precision position identification is realized which fan follow minute fluctuations in the actual reproduced image.

In light of the point that minute fluctuations in the actual reproduced image can be followed, and the point that enlargement/reduction, rotation, and so forth, for the reproduced image can be followed as described above, pixel matching in the strict sense (optical pixel matching) where the pixels at the image sensor 11 side and the element of the SLM 4 are strictly matched does not have to be performed with the second embodiment. Thus, freedom of design of the optical system increases with regard to system design, and also increases in costs for increased precision can be suppressed.

Figure 44:
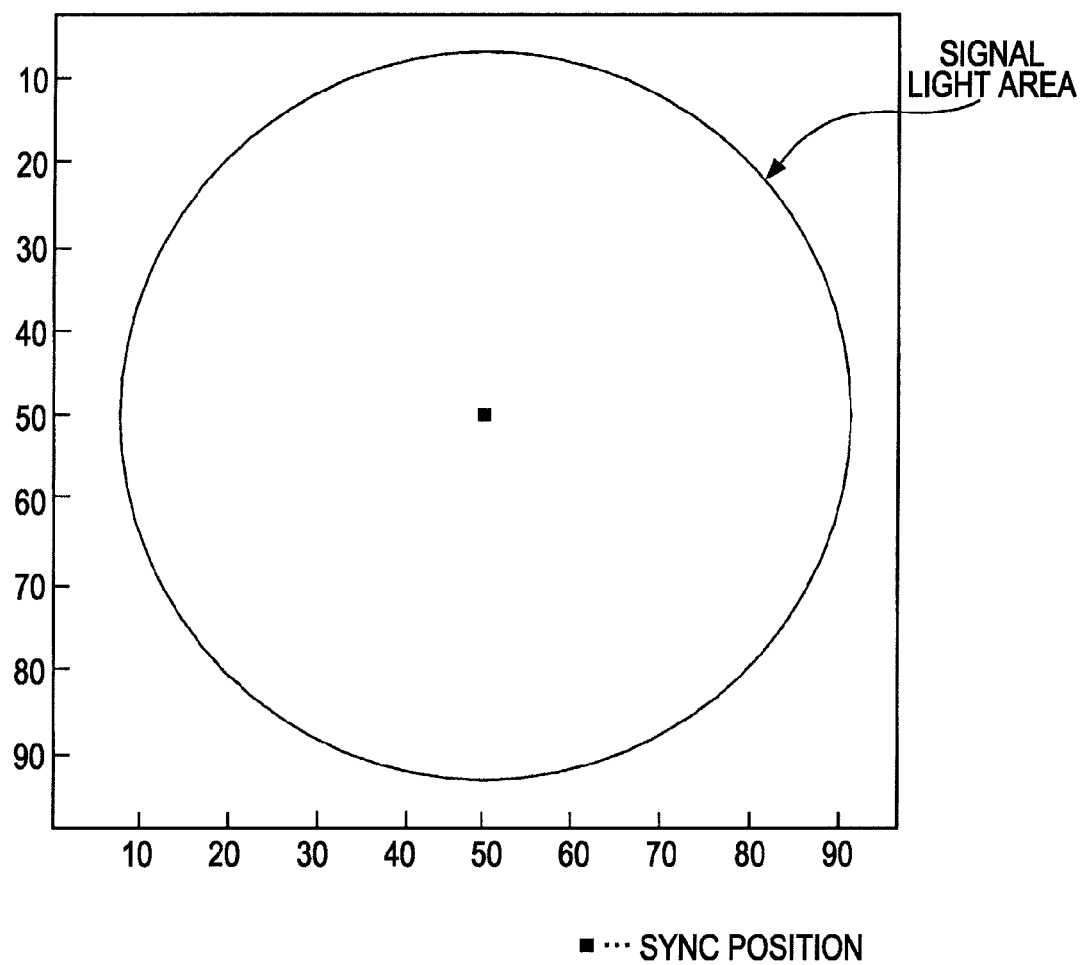
FIG. 44 is a diagram illustrating an array example of page syncs.

Note that while description has been made above that the data pixel positions can be identified without using syncs with the case of the second embodiment, it can be clearly understood from the earlier description that even if the data pixel positions are identified, at that point, which position in the hologram corresponding to the signal light area A2 these data pixel positions belong to. Accordingly, the positioning is performed with the page syncs as described above, to identify the positions on the format (page sync positioning unit 33), and at this time, the number of page syncs for such positioning on the format only has to be 1, as shown in FIG. 44 next.

Figure 45:
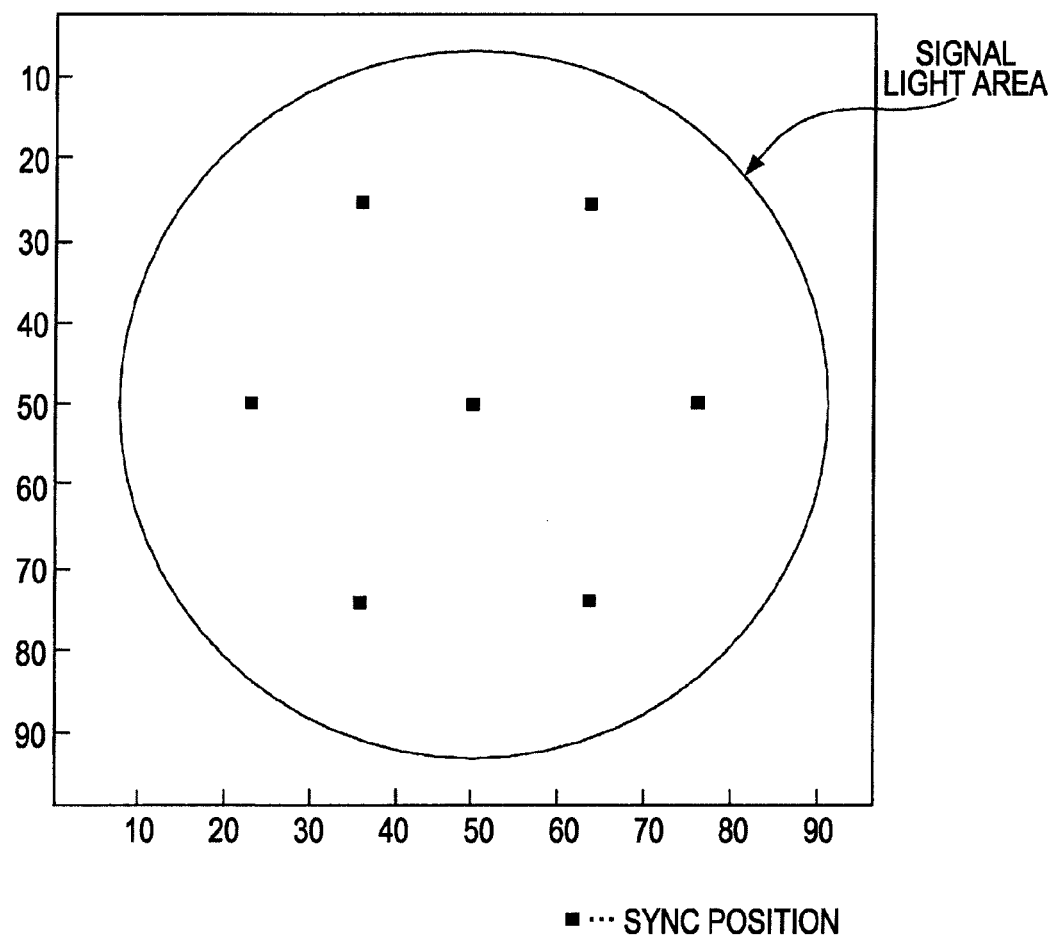
FIG. 45 is a diagram illustrating another array example of page syncs.

Alternatively, multiple page syncs may be inserted, as shown in FIG. 45. In the event of inserting the multiple page syncs as shown in FIG. 45, the page sync positioning unit 33 integrates these multiple page syncs even though they are scattered in position so as to be handled as an integrated page sync (template), and performs positioning by template matching using correlation computation.

Also, in the event of inserting multiple page syncs, these are integrated and function as an integral page sync, so there is not problem whatsoever even if each page sync pattern is different. In fact, such an arrangement may be intentionally made, to improved the correlation properties of the integral page sync.

Now, in the event that there is a single page sync, and that sync is damaged, the information of the entire page will become undecodable. On the other hand, the arrangement of dispersing multiple page syncs as described above is advantageous in that effects of several of these being damaged can be dismissed regarding results of page positioning processing, and accordingly information of the entire page is not lost.

Now, with a resampling technique wherein sync-dependent data pixel position identification is performed, the sync size has to be made relatively large so that the syncs will be detected in a sure manner. With the case of the second embodiment as well, page syncs have to be used for confirming the position on the format at the final stage, but at the time of this positioning, identifying if the data pixel positions identified and obtaining (resampling) of amplitude values have already been completed, and positioning is performed as to this resampled data, so the sync size does not have to be made as great as with a case wherein sync-dependent data pixel position identification is performed. In this way as well, the recording density of user data can be improved according to the second embodiment.

It should be noted that the second embodiment performs linear readout with coherent addition at the time of reproducing, the same as with the first embodiment. Accordingly, the second embodiment has the same advantages as with the first embodiment regarding this point, such as reduction in aperture size and reduction of over-sampling rate as compared with a non-linear recording/reproducing system according to the related art, consequently enabling high recording density of data as to the hologram recording medium HM, and improved data transfer rate.

Experiment Results of Resampling Processing According to the Second Embodiment

FIGS. 46 through 49 illustrate experiment results for demonstrating the effectiveness of the resampling technique according to the second embodiment described above. Note that the recording format set for obtaining the experiment results shown in FIGS. 46 through 49 is as follows.

Data minimum laying unit: 1 symbol (4×4 bits=16 bits)
Sync size: 1 symbol
Sync interval i_sper: 48 pixels
Radius i_rad of signal light area A2: 169 pixels Note that in this case, the sync interval i_sper is twice the interval in the case in the first embodiment, and the number of syncs arrayed in a page is markedly reduced. Incidentally, the data amount which can be laid in one page in this case is 5,555 symbols (bytes).

Figure 46:
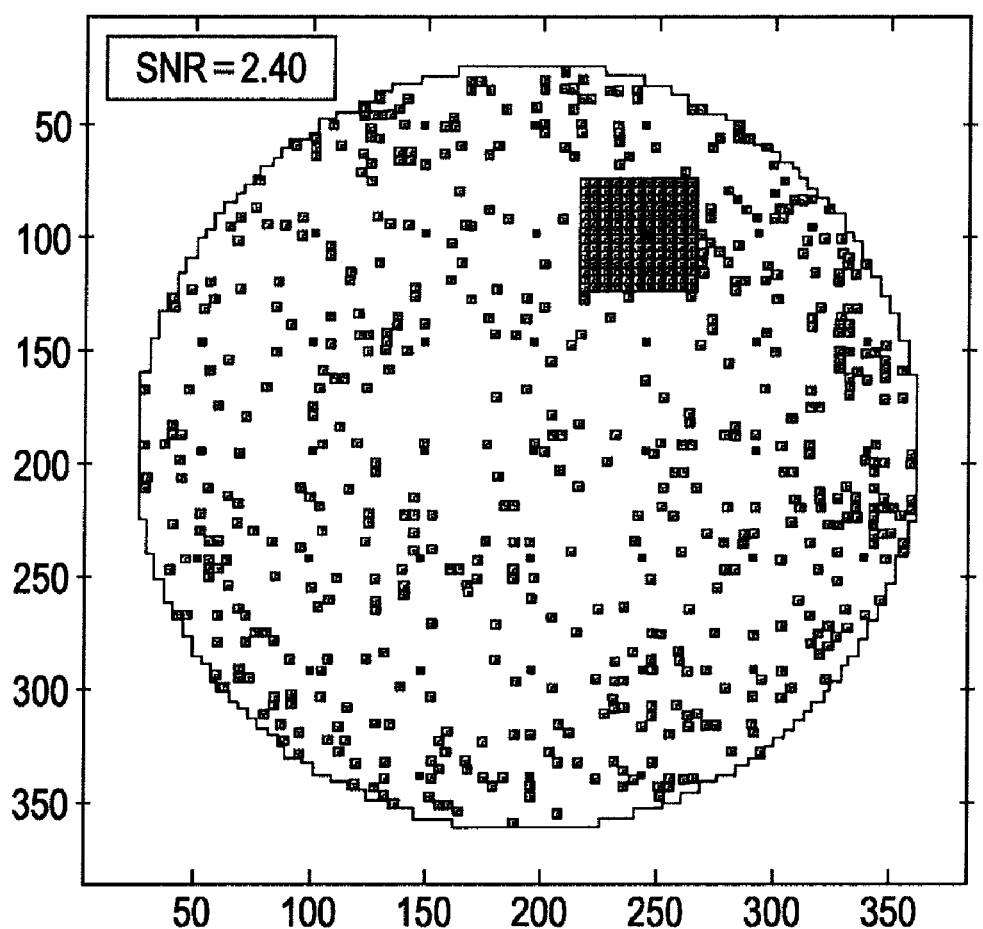
FIG. 46 is a diagram illustrating experiment results regarding in-page error distribution, SER, and SNR, in a case of applying a resampling technique according to the related art.

FIG. 46 illustrates the error distribution, SER (symbol error rate), and SNR (S/R ratio) within a page in a case wherein data reproduction has been performed with a resampling technique according to the related art on a hologram recording medium HM where data recording has been performed according to the above-described format. This "resampling technique according to the related art" here is the same as the technique according to the related art described in FIG. 19 above. Specifically, this is a technique wherein a data pixel position is selected from 4×4 readout signals, and the value thereof is taken as the amplitude value.

Figure 47:
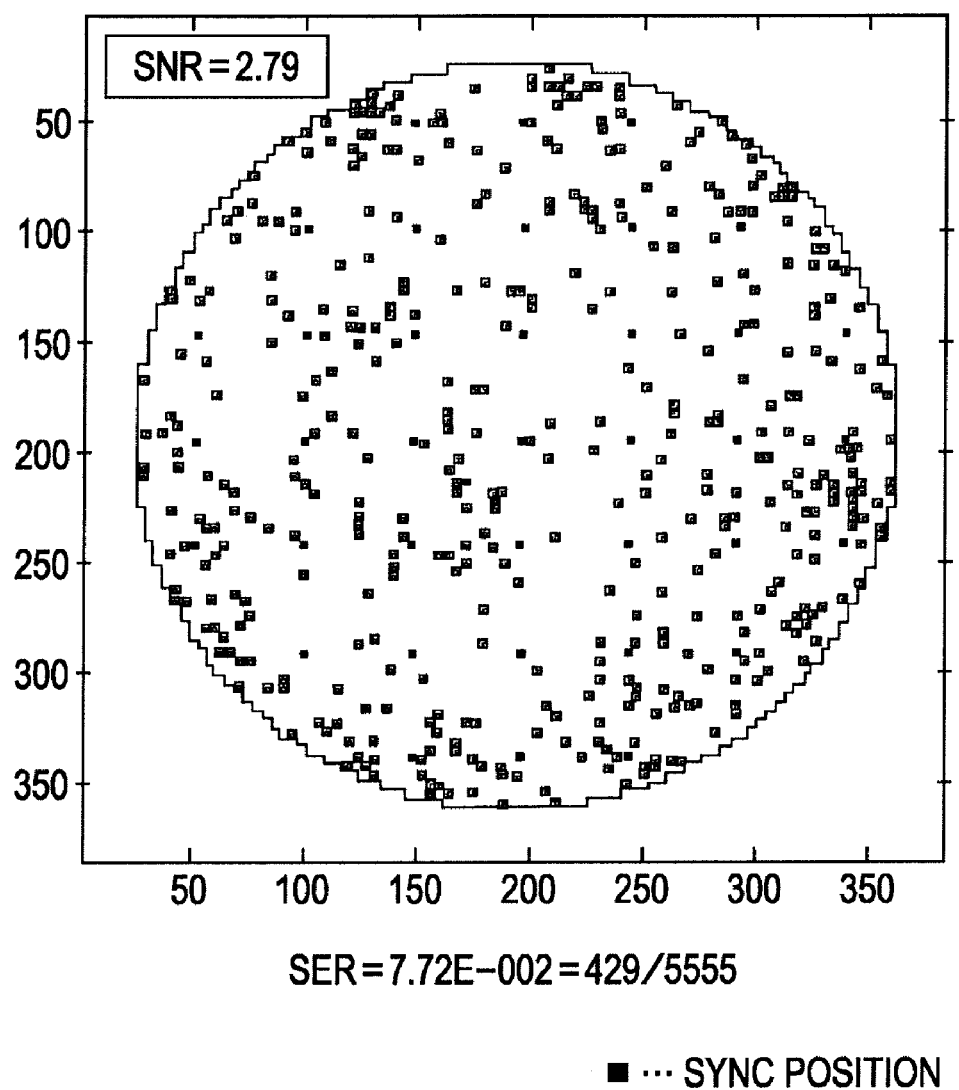
FIG. 47 is a diagram illustrating experiment results regarding in-page error distribution, SER, and SNR, in a case of applying the resampling technique according to the second embodiment.

Also, FIG. 47 illustrates the error distribution, SER (symbol error rate), and SNR (S/R ratio) within a page in a case wherein data reproduction has been performed with the resampling technique according to the second embodiment. In these drawings, the in-page errors are indicated by outline squares, and double squares indicate errors in bit increments (bit error) at the inner frame thereof and errors in symbol increments (symbol error) at the outer frame thereof.

First, in the case of the resampling technique according to the related art shown in FIG. 46, we can see an entire sub-page in error at a region at the upper right portion, for example. This indicates that around a sync regarding which detection has failed is all in error together. In this case, the SER was 704 symbols out of 5,555 symbols, for 1.27E-001. Also, SNR was 2.40.

Conversely, with the case of the second embodiment shown in FIG. 47, we can see that there is no concentration of error due to failed sync detection such as with the related art (i.e., resampling technique wherein sync-dependent data pixel position identification is performed). Positions where errors have occurred are dispersed, and the number thereof is smaller as well. In this case, the SER was 429 symbols out of 5,555 symbols, for 7.72E-002, and the SNR was 2.79.

From these results, we can understand that higher reproduction signal quality can be obtained with the second embodiment than with the resampling technique of sync-dependent data pixel position identification according to the related art. In other words, this means that with the second embodiment, in a case where higher density recording of user data is performed than with the related art, deterioration in reproduction signal quality can be suppressed.

Figure 48:
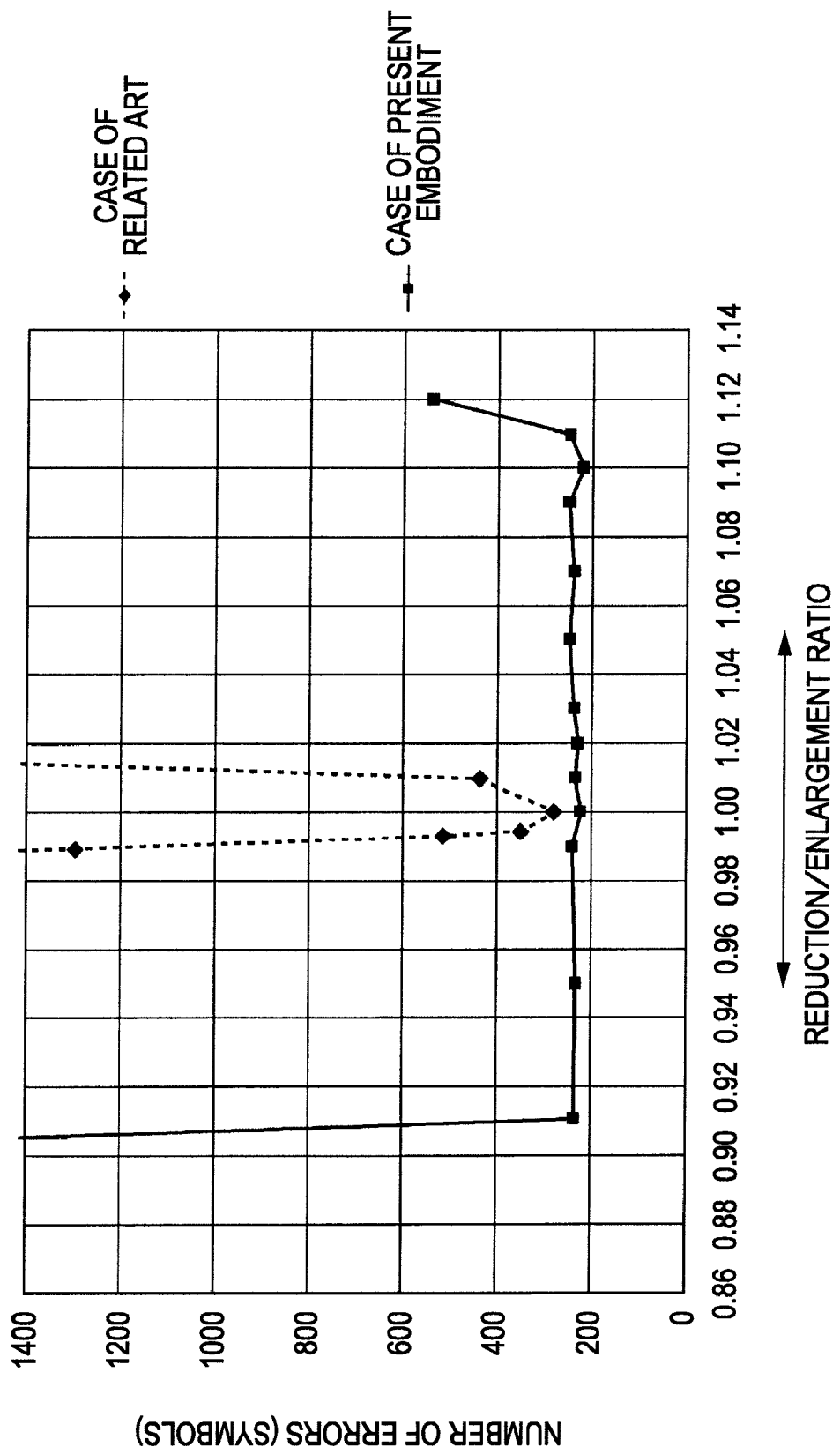
FIG. 48 is a diagram illustrating experiment results regarding margin properties as to enlargement/reduction of the image.

Also, FIG. 48 illustrates the margin properties regarding enlargement/reduction of the reproduced image. In this drawing, the horizontal axis represents the enlargement/reduction of the reproduced image, and the vertical axis represents the number of errors (number of symbol errors). The dotted line shows the results of a case where the resampling technique according to the related art was employed, and the solid line shows the results of a case where the resampling technique according to the second embodiment was employed.

As can be seen where, in the case of the technique according to the related art, the number of errors suddenly increases at around ±1% enlargement/reduction rate. In other words, with the technique according to the related art, the enlargement/reduction rate margin is restricted to around ±1%. On the other hand, with the case of the second embodiment, the number of errors is almost unchanged to around ±9% enlargement/reduction rate, so we can see that the enlargement/reduction rate margin has been markedly widened as compared with the related art.

Figure 50A:
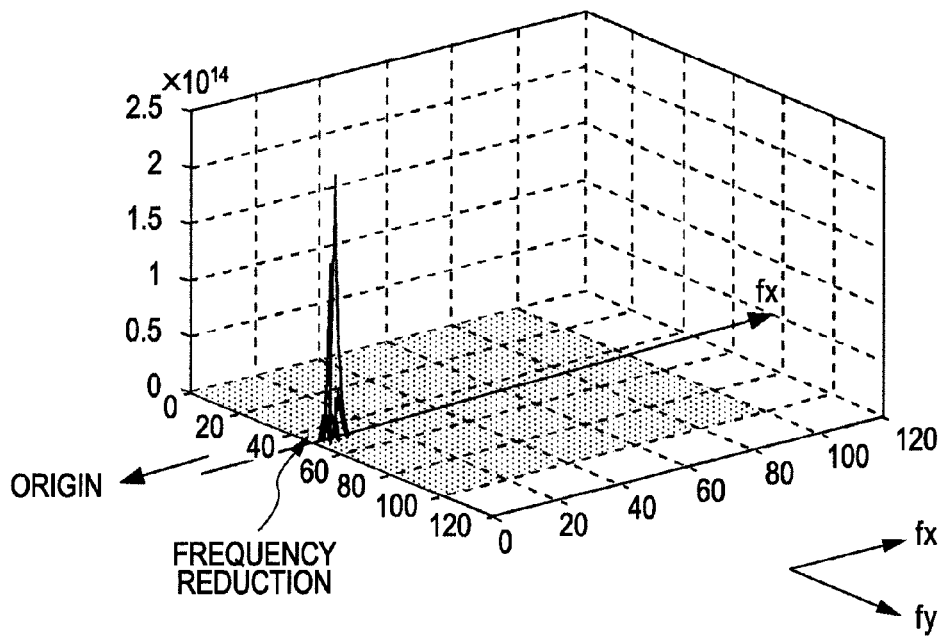
FIGS. 50A and 50B are diagrams illustrating analysis results by two-dimensional FFT with an enlarged image (1.1 times)
Figure 50B:
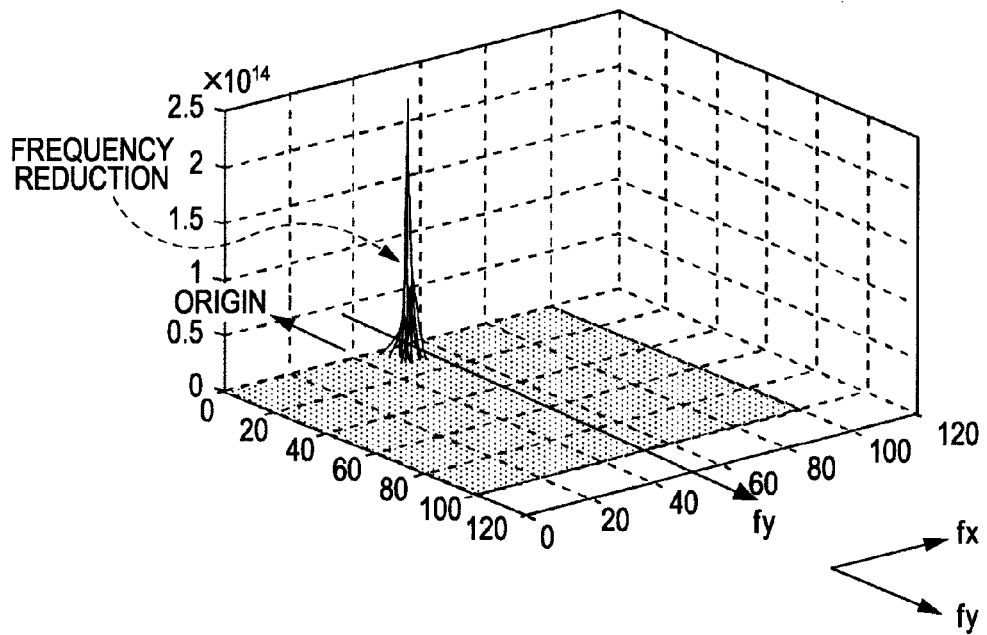

For reference, FIGS. 50A and 50B illustrate analysis results with two-dimensional FFT in a case of enlargement to 1.1 times. FIG. 50A has extracted only nearby the X axis, and the toned portion therein represents the range of peak search. Also, FIG. 50B has extracted only nearby the Y axis, and the toned portion therein also represents the range of peak search. As can be seen from these drawings, the peak of the peak component moves in a direction inversely proportionate on the axis to enlargement/reduction of the original image (i.e., in the direction of reduced frequency in the case of enlargement).

Referencing the search ranges and peak portions in these drawings, we can see that the enlargement/reduction margin value (around ±9%) described above has been determined by the search range. That is to say, with the earlier-described search rage (101×101) settings, the margin is around ±9%, meaning that a wider search range would allow for an even greater enlargement/reduction margin. This can also be clearly understood from the properties diagram in FIG. 48 that while with the technique according to the related art, the increase of the number of errors becomes marked when there is enlargement/reduction, with the technique according to the second embodiment the number of errors hardly changes up to the edge of the margin.

Figure 49:
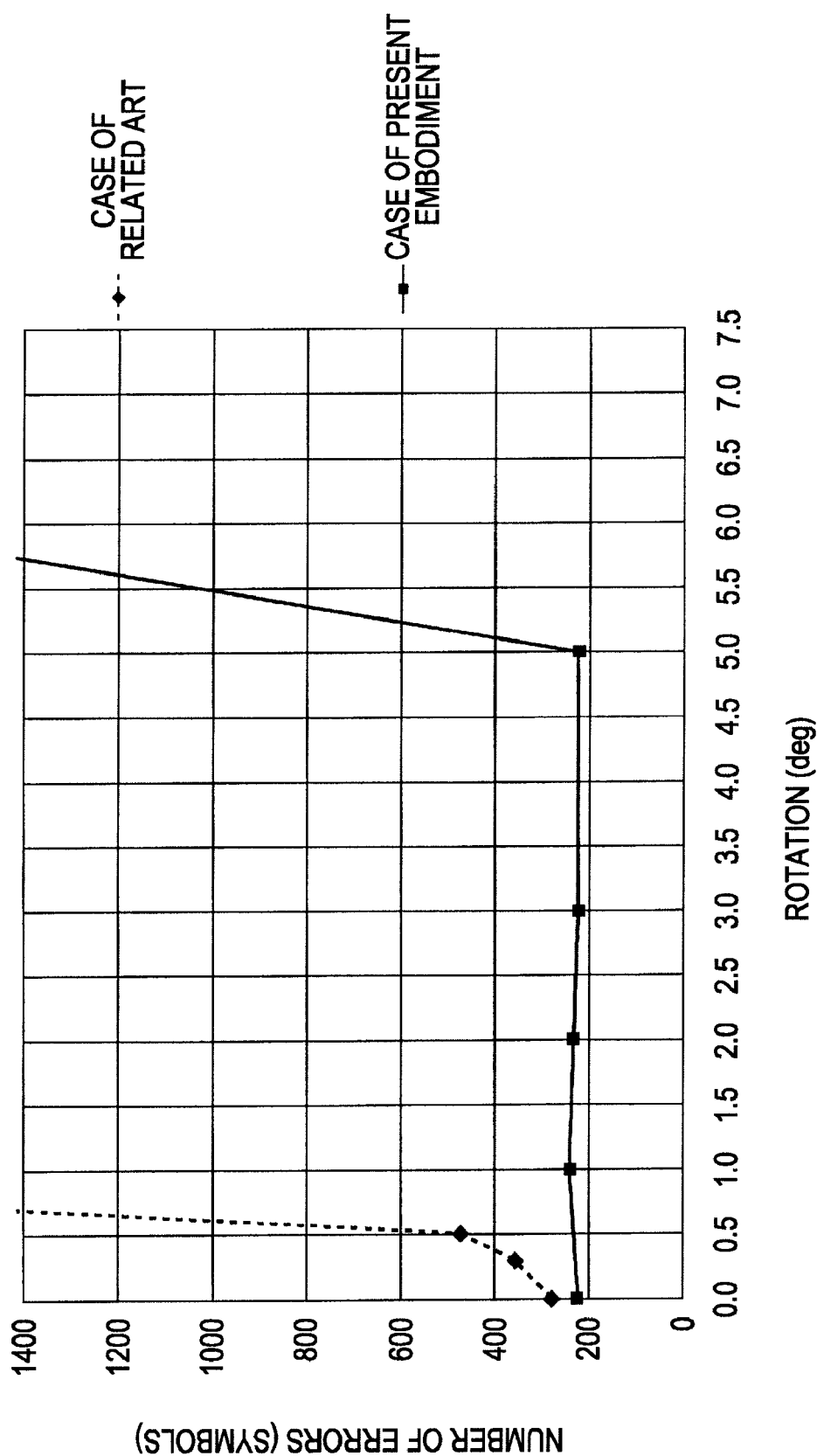
FIG. 49 is a diagram illustrating experiment results regarding margin properties as to rotation of the image.

Further, FIG. 49 illustrates margin properties as to rotation of the reproduced image. In this drawing as well, the horizontal axis represents the image rotation, and the vertical axis represents the number of errors (number of symbol errors). The dotted line shows the results of a case where the resampling technique according to the related art was employed, and the solid line shows the results of a case where the resampling technique according to the second embodiment was employed.

As can be seen from this drawing, the margin regarding rotation has also been markedly improved over the technique according to the related art. With the technique according to the related art, the properties show a sudden increase in errors at around 0.5 degree in rotational angle. On the other hand, with the case of the second embodiment, the number of error hardly changes to around 5 degrees, meaning that the margin as to rotation has been enlarged by around tenfold as compared to the technique according to the related art.

Figure 51A:
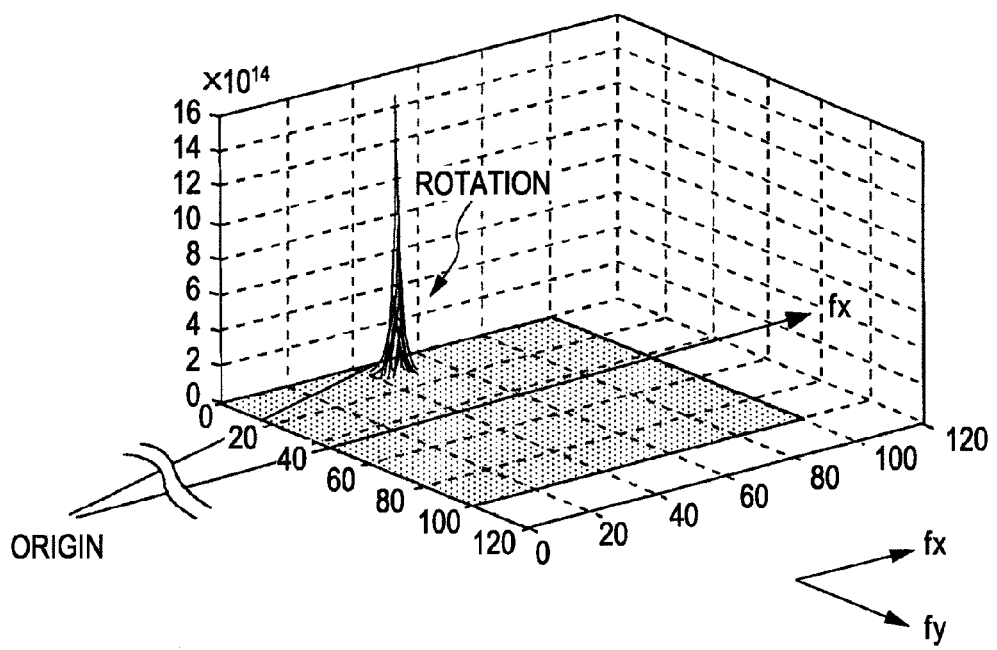
FIGS. 51A and 51B are diagrams illustrating analysis results by two-dimensional FFT with a rotated image (5 degrees)
Figure 51B:
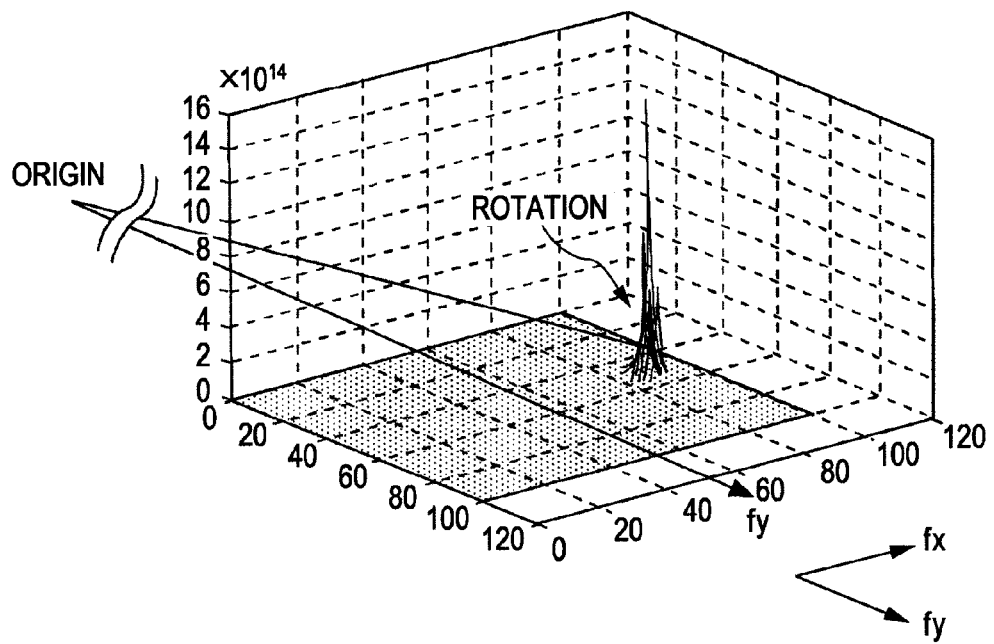

FIGS. 51A and 51B illustrate analysis results with two-dimensional FFT in a case of rotation of 5 degrees. FIG. 51A has extracted only nearby the X axis, and the toned portion therein represents the range of peak search. Also, FIG. 51B has extracted only nearby the Y axis, and the toned portion therein also represents the range of peak search. As can be seen from these drawings, the peak portion obtained at the time of rotation shifts in a direction off of the axis, in accordance with the rotational direction of the image, with no change in the frequency thereof. Due to such a phenomenon, it can be understood that the direction and amount of the peak portion shifting off of the axis from the reference point in the analysis results represent the direction of rotation and the rotation angle, respectively.

Also, it can be sent by referencing FIGS. 51A and 51B that the margin value of 5 degrees described above has been determined by the peak search range. That is to say, a wider search range would allow for an even greater margin as to rotation as well.

From these results, we can see that the second embodiment is more robust as to image deformation, distortion, and rotation.

Modifications of the Resampling Method According to the Second Embodiment

First Modification

With the description so far, at the time of identifying the data pixel positions, a peak portion is searched from the analysis results of two-dimensional FFT, and the peak portion is subjected to IFFT so as to obtain clock signals as a two-dimensional image, but data pixel position identification can be performed even without obtaining clock signals from a two-dimensional image in this way.

First, with the first modification, the processing up to performing peak search from the analysis results by two-dimensional FFT is the same, but clock information is directly obtained from the peak portion detected as a results of the search.

As described earlier, the center component of the peak portion corresponds to a single plane wave approximating the clock signals, and the cycle and phase and normal direction are determined from the peak position and value (complex number) on the Fourier region. That is to say, the distance from the origin of the peak position is the frequency, and the reciprocal thereof is the cycle. Also, the direction of the peak position with the origin as a reference is the normal direction. Further, the value (complex number) at the peak position determines the phase of the plane wave. Accordingly, clock information can be obtained from the position and value of the center component of the peak portion obtained as a result of the search.

Thus, in the case of obtaining the clock information based on the center position of the peak, the resampling position can be obtained relatively easily with the following calculation $$P(m, n) = P0 + m*Lclky + n*Lclkx$$

where m and n are integers, P(m, n) represents the coordinate of the resampling position n'th in the X direction and m'th in the Y direction, P0 represents a reference point for the resampling position coordinates, as one solution for the optimal sample position obtained from the X-direction clock and Y-direction clock (while there are many solutions, it is natural to select one near the middle of the image with m and n as integers), Lclkx represents the fundamental period vector of the X-direction clock (single plane wave), and Lclky represents the fundamental period vector of the Y-direction clock (single plane wave). Note that the fundamental period vector is a vector of which the magnitude is equal to the wavelength, and the direction matches the direction of propagation.

While the way to obtain P0 may differ according to the method for generating the timing pulse signals, in the event of performing differentiation and taking the absolute value, a negative peak position is an optimal sample position as shown earlier with FIG. 34, so one near the middle of the image can be selected.

A feature of the first modification is that only the center component of the peak portion obtained as the result of searching the analysis results. That is to say, using the single plane wave corresponding to the center component as the clock signal allows the coordinates of the data pixel positions to be easily obtained by linear computation as described above, based on the information of the cycle and phase and normal direction (vector). Accordingly, the calculation processing load can be markedly alleviated, such as IFFT which has a relatively great processing burden not having to be performed for identifying data pixel positions.

It should be noted that the data pixel position identifying technique according to the first embodiment may be performed on the entire page image, but in this case, the single-cycle plane wave will be used as clock signals, so the capability to following minute deviations will deteriorate. Of course, this is effective regarding change in the entire image, such as rotation, enlargement/reduction, and so forth.

Accordingly, in the case of handling minute deviations using the technique according to the first modification, the image can be divided into multiple regions, and the series of processing performed on each region. This division makes the size of each range to be handled smaller, is the clock cycle within each region can be viewed as being a single cycle. That is to say, identifying the resampling positions by the above-described linear computation for each region allows the capability to following minute deviations to be ensured to a certain extent.

As for specific processing, first, two-dimensional FFT is performed for each region, and peak search is performed in each region. The above-described linear computation is performed based on the center component of the peak in each region, and the data pixel positions are determined. In the case of dividing into regions to performing the processing in this way, the same processing is performed for each region, so multiple signal processing device can be arrayed and calculation performed in parallel. Such a hardware configuration would realize marked reduction in processing time.

Note that the technique for region division is also applicable to a case of performing IFFT and reproducing clock signals as the actual image, as described above. That is, in that case two-dimensional IFFT is performed for each region, peak search is performed for each region, IFFT is performed the peak component for each region, and the clock signals are obtained for each region. Up to the subsequent zero cross line extraction is performed by regions, but extraction of grid lines is performed for the entire image using the zero cross lines extracted for each region. In this case as well, the processing can be made the same for each region up to extraction of the zero cross lines, so a hardware configuration for parallel processing thereof can reduce the processing time.

Also, in either of a case of handling clock signals as single plane waves and a case of handling as an actual image, a format can be defined wherein the hologram page is divided into multiple regions and the format is a set of small independent pages, and each region (small page) is subjected to the series of processing in parallel, so as to reduce the processing time.

Second Modification

The second modification is for generally positioning an irradiation area of signal light on the image sensor (i.e., valid reproduction area), using lowband components of the frequency analysis results. With the second embodiment, FFT is performed on timing pulse signals to obtain frequency analysis results, and in this process, lowband components are also obtained. This is applied to obtaining a low-resolution image, and perform rough position based thereupon.

Figure 52A:
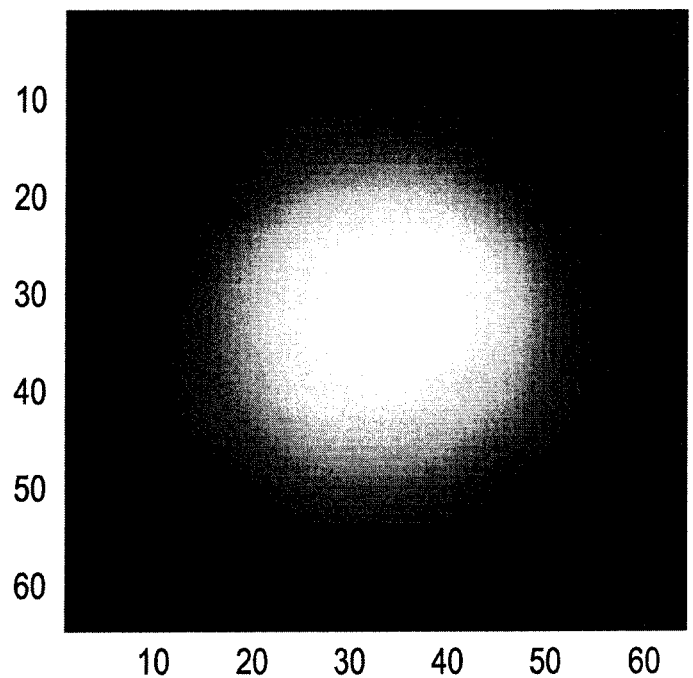
FIGS. 52A and 52B are diagrams for describing a second modification of the second embodiment.

The second modification will be described with reference to FIGS. 52A and 52B. FIG. 52A is a low-resolution image obtained by performing IFFT of the lowband component obtained from the frequency analysis results. Note that in FIG. 52A, an example is shown wherein the frequency components of 3 or lower have been extracted from the two-dimensional FFT results, and a 64×64 size image has been formed by IFFT. The image size is small, so the amount of calculation which has to be performed here is scant as compared to the entirety.

Figure 52B:
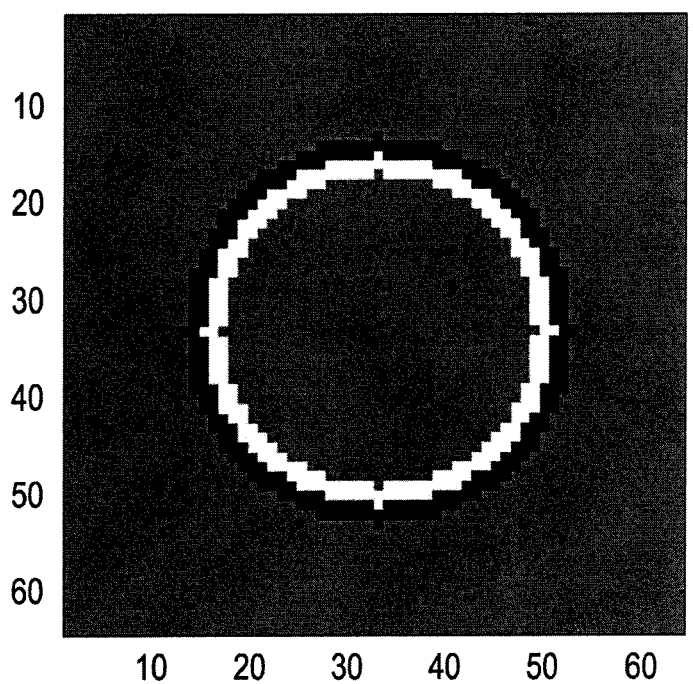

Also, in the second modification, a ring-shaped template is prepared beforehand as shown in FIG. 52B. This ring-shaped template can be understood as having been created after the generally circular shape in accordance with the signal light area A2. That is to say, the signal light irradiation area on the image sensor 11 is identified based on the results of having performed correlation calculation between this ring-shaped template and the image generated as shown in FIG. 52A.

As for the ring-shaped template, the value of the outer perimeter or the ring is "−1" (the black portion in the drawing), the value of the ring portion adjacent thereto on the inner side is "+1" (the white portion in the drawing), and all other values are "0" (the gray portions in the drawing). The shape of the signal light area A2 is generally circular, and this aims to perform positioning only at the edge portions of the grayscale image, so as to not be affected by irregularities in grayscale value corresponding to the internal recording data.

Such rough positioning processing can be performed applying apportion of the frequency analysis results, so there is almost no increase in the amount of calculation. Also, a low-resolution image of a size around 64×64 is sufficient such as shown above for example, and increase in the amount of calculation can be suppressed in this way as well.

To realize the positioning processing as this second modification, first, one of the FFT processing units 42 (either 42x or 42y) performs peak component searching and lowband component extraction. Though omitted from the drawings, a positioning unit can be added which obtains a low-resolution image such as shown in FIG. 52A by performing IFFT of the low-resolution component extracted at the FFT processing unit 42, performs correlation calculation with the ring-shaped template prepared beforehand, and obtains a position which yields the maximum value thereto as the position information of the signal light area (valid reproduction area). Once a valid area has been identified, this information can be used to perform reproduction processing of the entirety in a more robust manner. The following is an example thereof.

First, an arrangement can be conceived for using at the time of detecting page syncs. That is to say, the search range of the page sync positioning unit 33 sets the page sync search range, based on the position information identified at the positioning unit. Once the general position of the valid reproduction area has been found, the search range for page sync detection can be restricted to a narrower range based on the position information. Accordingly, a more robust arrangement can be realized while reducing the amount of calculation.

Alternatively, an arrangement can be conceived for using at the time of zero cross point extraction. According to the above description, extraction is started from a zero cross point near the center which is reliable. However, if the position of the valid reproduction area is identified beforehand, the general center position can be obtained based on the positional information thereof, so zero cross point extraction can be started from around that position. Specifically, each of the X zero cross line extraction processing unit 46x and Y zero cross line extraction processing unit 46y start zero cross point extraction based on the position information identified at the above-described positioning unit.

Third Modification

Next, a third modification will be described. In the description given above, an example has been illustrated wherein, at the time of performing a search for the peak portion from the analysis results of the two-dimensional FFT, the X-clock signal component processing unit 43x and the Y-clock signal component processing unit 43y each perform peak searching independently, but an arrangement may be made wherein, at the time of searching for X-direction and Y-direction peaks, the X-direction and Y-direction peak search may be performed comprehensively based on the respective components in orthogonal relation.

Figure 53:
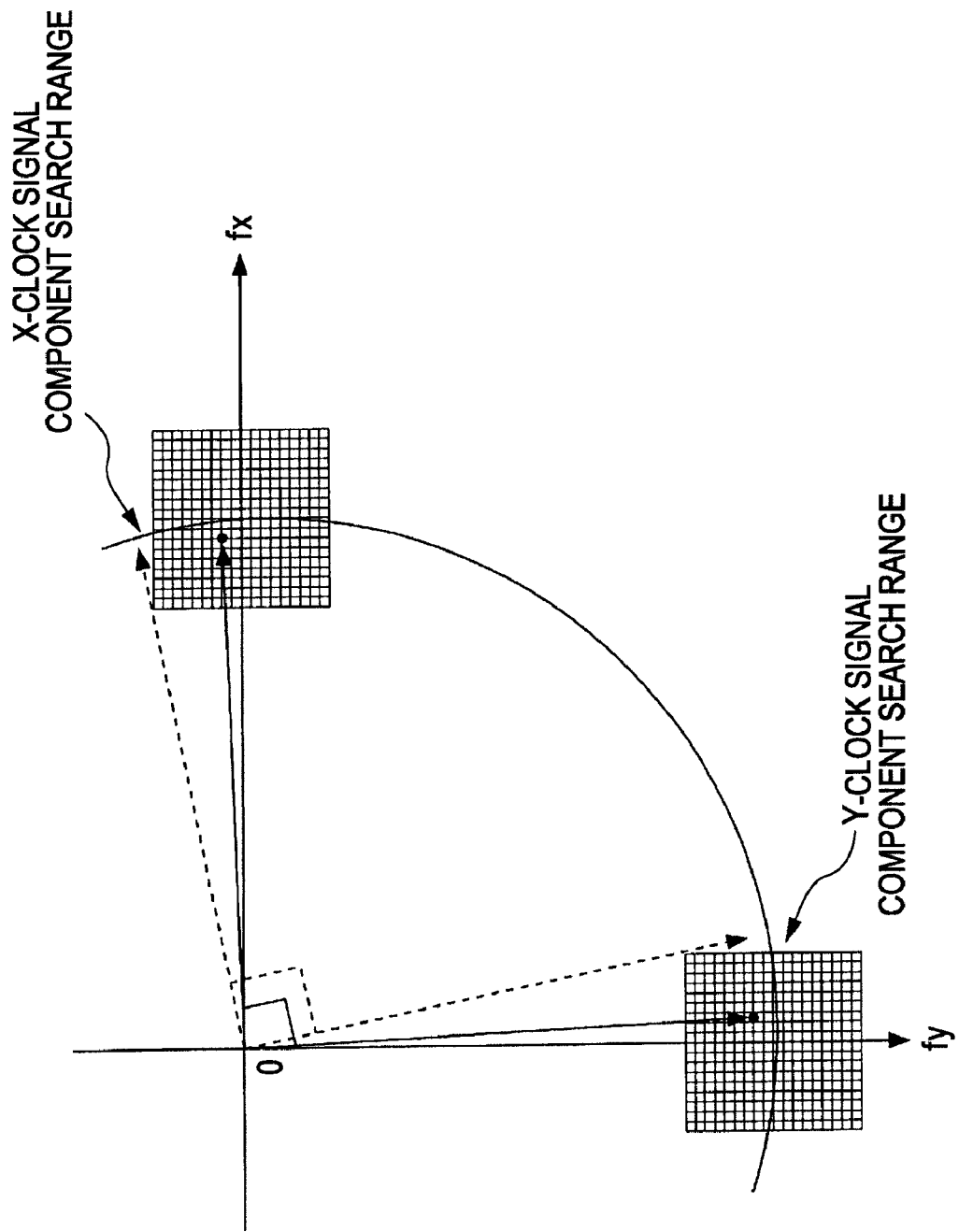
FIG. 53 is a diagram for describing a third modification of the second embodiment.

FIG. 53 is a diagram for describing the third modification performing such comprehensive peak search. Note that in this diagram, the relation between the X-clock signal component search range and the Y-clock signal component search range is illustrated based on the frequency axis fx and frequency axis fy.

Now with the present embodiment, the SLM 4 is 512×512 pixels to begin with, so the relation of the X-direction clock and Y-direction clock is approximately the same, i.e., fx=fy=512, and although these is some effect of minute fluctuation of the image, the normal vector of the wavefront of the plane waves thereof are in an approximately orthogonal relation.

Accordingly, we can apply a binding condition which says that "the X-direction clock and Y-direction clock have the same frequency and the wave directions are orthogonal", and perform comprehensive power spectrum evaluation for each set of points within the X-direction search range and points within the Y-direction search range which satisfy the binding condition, so as to obtain the points which yield the greatest evaluation value as the peak in the X-direction search range and the peak in the Y-direction search range.

Specifically, the sum, product, and so forth of the power spectrum are calculated as evaluation values for each set of points within the X-direction search range and points within the Y-direction search range which satisfy the binding condition, and the combination with the greatest value is obtained as the X-direction peak and Y-direction peak.

It should be noted, however, that while this technique is effective in cases where there is almost not distortion in the reproduced image, but there is no guarantee that the relation of each peak position will be orthogonal without fail. Accordingly, the peaks obtained as described above are taken as tentative peaks, and a more detailed peak search is performed independently for the X direction and Y direction again, within a narrower range set with the tentative peak positions as a reference, thereby obtaining the final peaks within the X-direction search range and Y-direction search range.

With such a technique, a search is first performed with an orthogonal relation as a condition, so detection can be performed without being confused by surrounding great false components which might be the above-described tentative peaks. Thereupon, a detailed search is performed based on the tentative peak position, thereby further improving the peak detection precision.

Now, a configuration for the above peak detection can be realized as follows. First, an order for detecting power spectrums is determined beforehand, with regard to combinations of points within the X-direction search range and Y-direction search range satisfying the above binding condition. The X-clock signal component processing unit 43x and Y-clock signal component processing unit 43y each detect the power spectrum within the respective search ranges in the determined order. Then, one of the clock signal component processing units 43, or a newly and separately provided peak determining unit calculates evaluation values based on the power spectrum for each of the points obtained as described above, and the combination with the greatest evaluation value at the end is obtained as the X-direction peak and Y-direction peak.

Fourth Modification

A fourth modification adds improvisations to the differentiation processing. With the description so far, the differentiation processing is performed by branching the up-scaled image into X-direction differentiation and Y-direction differentiation to obtain images as independent timing pulse signals, but the X-direction differentiation and Y-direction differentiation can be performed at the same time on a common image following up-scaling.

Figure 54:
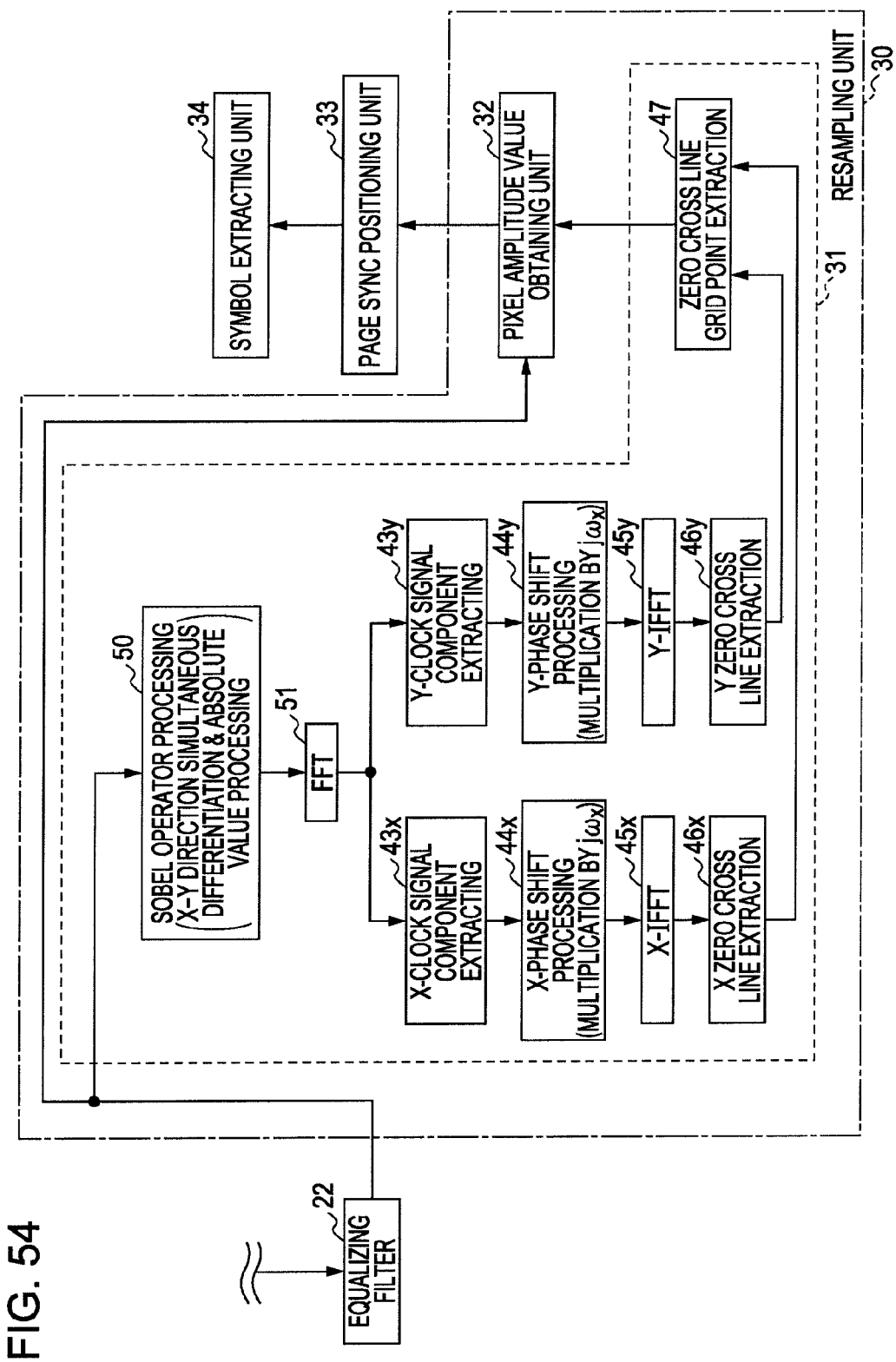
FIG. 54 is a block diagram illustrating the internal configuration (partially extracted) of a data reproducing unit according to a fourth modification of the second embodiment.

FIG. 54 illustrates the internal configuration of the data reproducing unit 13 for realizing the fourth embodiment. Note that in FIG. 54, only the equalizing filter 22, resampling unit 30, page sync positioning unit 33, and symbol extracting unit 34 have been shown, but the other configurations within the data reproducing unit 13 are the same as with the case of FIG. 24 described earlier. Also, portions in FIG. 54 which have already been described with reference to FIG. 43 are denoted with the same reference numerals and description thereof will be omitted.

In this case, the X-directional differentiation processing unit 40x, Y-directional differentiation processing unit 40y, X absolute value processing unit 41x, Y absolute value processing unit 41y, X-FFT processing unit 42x, and Y-FFT processing unit 42y are omitted, and instead a Sobel operator processing unit 50 and FFT processing unit 51 are provided.

The Sobel operator processing unit 50 performs Sobel operator processing on the image signals from the equalizing filter 22. The Sobel operator processing is processing equivalent to simultaneously performing the X-direction differentiation processing and Y-direction differentiation processing described above. Also, the Sobel operator processing also includes processing equivalent to the absolute value processing. Note that Sobel operators are discussed in "Gazo Ninshiki-ron" by Makoto Nagao, Published by CORONA PUBLISHING CO., LTD., first printing Feb. 15, 1983.

Figure 55:
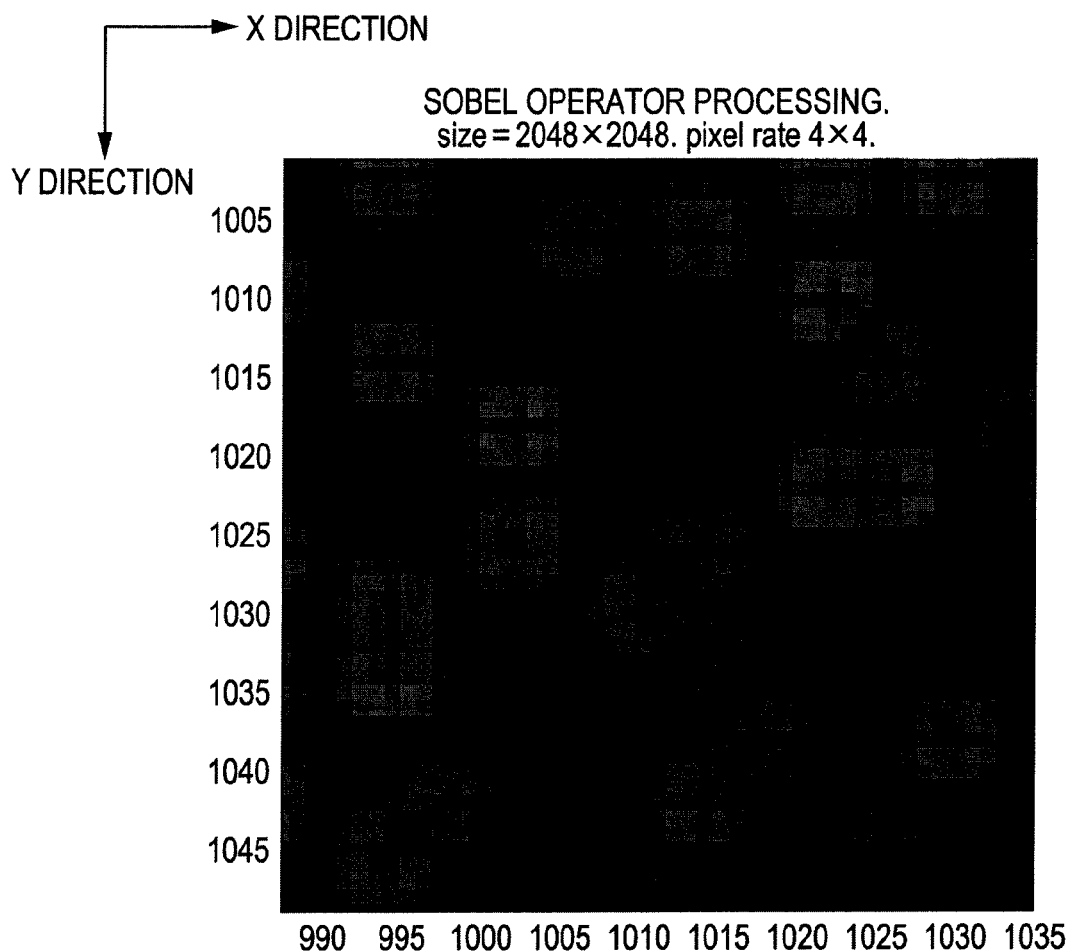
FIG. 55 is a diagram illustrating Sobel operator processing results.

Now, FIG. 55 shows an image as the results of Sobel operator processing. From this diagram, we can see that an image can be obtained from Sobel operator processing where X-direction edges and Y-direction edges have been merged. This can be understood by comparing FIG. 55 with the images of X-direction timing pulse signals and Y-direction timing pulse signals shown in FIGS. 28 and 29 earlier. The FFT processing unit 51 shown in FIG. 54 performs two-dimensional FFT processing on the processing results by the Sobel operator processing unit 50 which are equivalent to such a shared image being subjected to simultaneous X-direction differentiation and Y-direction differentiation (and absolute value processing).

Figure 56:
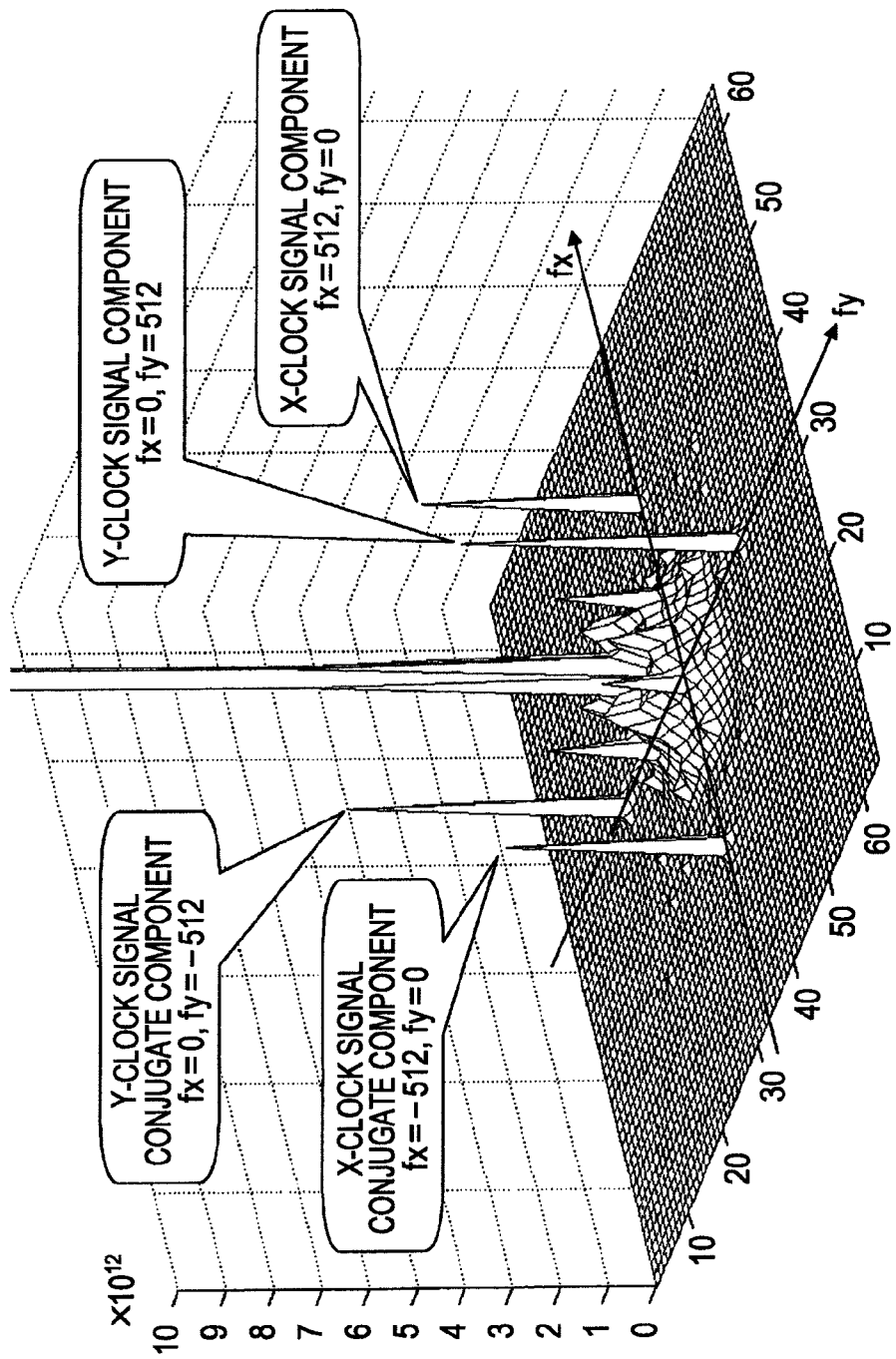
FIG. 56 is a diagram illustrating analysis results obtained by two-dimensional FFT of an image following Sobel operator processing.

FIG. 56 illustrates the results of analysis where two-dimensional FFT has been performed on the Sobel operator processing results shown in FIG. 55. It can be seen that by performing two-dimensional FFT on the Sobel operator processing results, peaks clearly exist at positions predicted from the design thereof, near the X-axis and near the Y-axis on the same Fourier plane. Accordingly, we can understand that the X-direction clock signal components and Y-direction clock signal components can be extracted without problem from the analysis results wherein two-dimensional FFT has been performed on the Sobel operator processing results.

In FIG. 54, the X-clock signal component processing unit 43x and Y-clock signal component processing unit 43y perform peak searches within each of the search range near the X-axis and search range near the Y-axis that have been determined beforehand, from the analysis results wherein two-dimensional FFT has been performed on the Sobel operator processing results obtained at the FFT processing unit 51. Subsequent processing is the same as that described above, and accordingly description thereof will be omitted.

According to the fourth modification, the two-dimensional FFT processing for clock extraction can be reduced from twice to one time, which is advantageous in that the calculation amount can be markedly reduced. Also, while the technique according to the fourth modification increases the factor of mutual signal interference in the X direction and Y direction, it should be noted that timing pulse signals are basically in an orthogonal positional relation, so there should be no problem overall.

Fifth Modification

Description has been made so far that timing pulse signal generation involves both differentiation processing and non-linear processing (absolute value processing), but timing pulse signals can be generated by performing only non-linear processing, without performing the differentiation processing. Performing the differentiation processing can prompt extraction of clock signals which are more accurate, by enhancing the edge accompanying the clock component, but the read intent of extracting the clock signal components in the frequency region is in order to expand the spectrum over a wide range in according to the image by way of non-linear processing, so clock signal extraction generally equivalent to that of the above-described specific example can be performed by generating timing pulse signals by way of non-linear processing alone.

Figure 57:
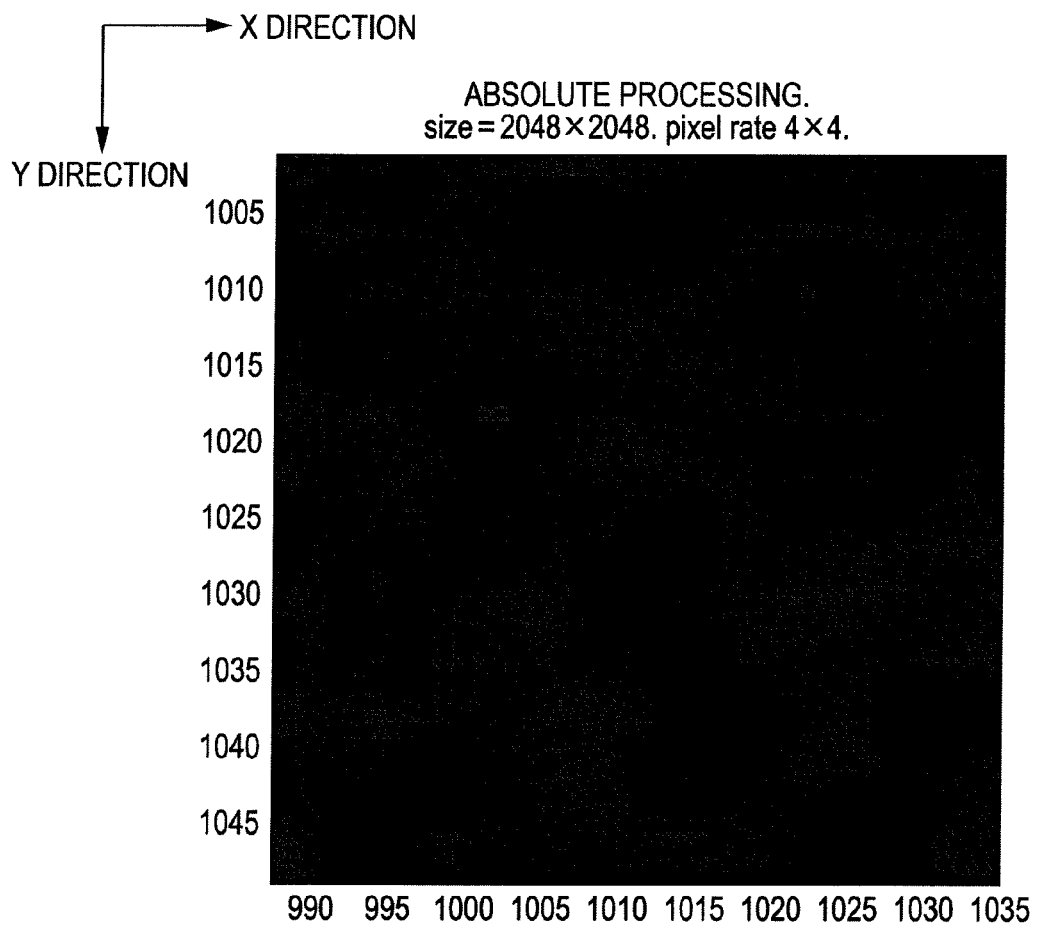
FIG. 57 is a diagram illustrating an image following up-scaling, subjected to absolute value processing as it is.
Figure 58:
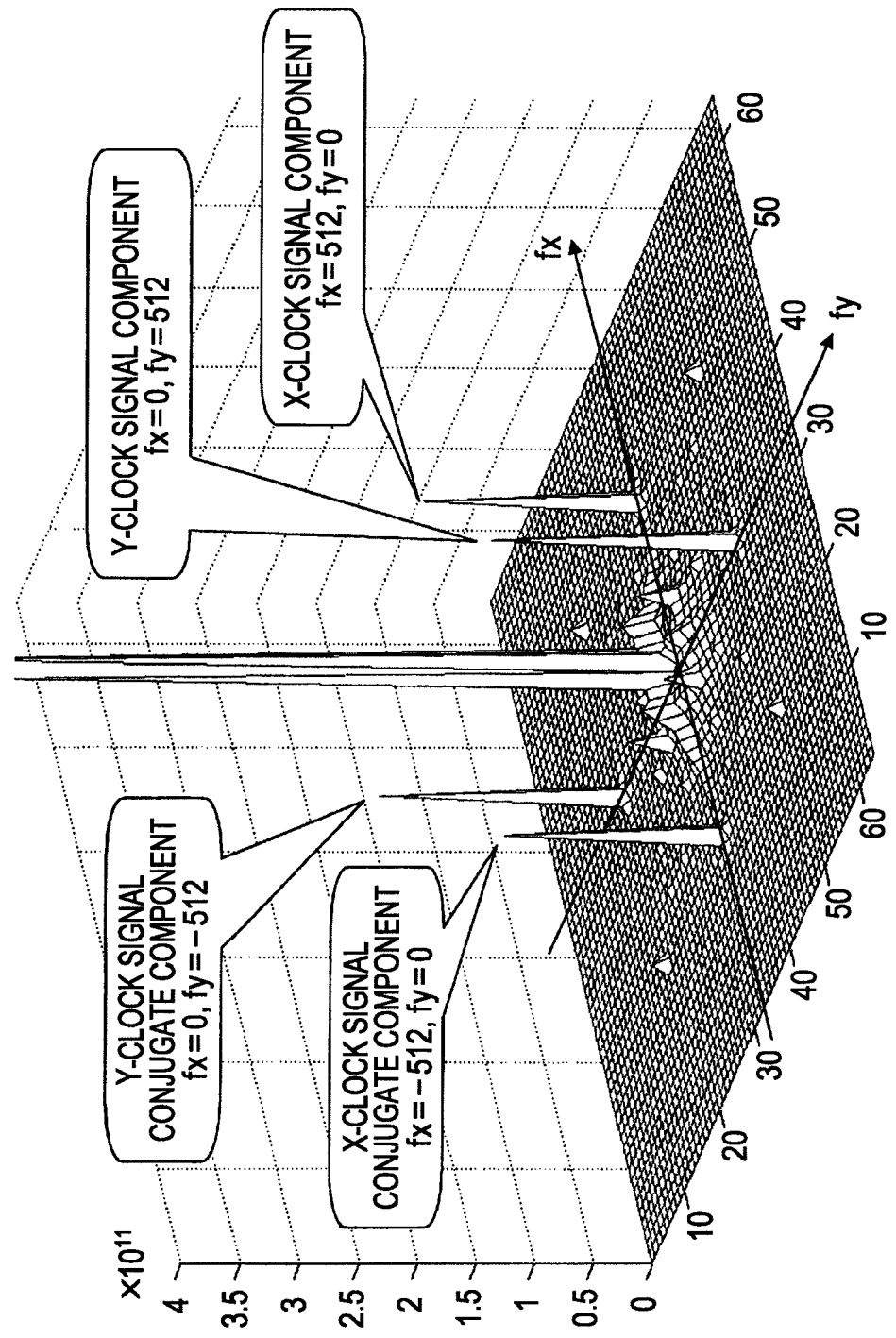
FIG. 58 is a diagram illustrating analysis results obtained by two-dimensional FFT of an image subjected to absolute value processing.

FIG. 57 illustrates an image wherein an up-scaled image has been subjected as it is to absolute value processing. Also, FIG. 58 illustrates the analysis results of two-dimensional FFT for an image following absolute value processing. As can be sent by comparing FIGS. 58 and 56, power spectrum peaks are obtained centered on reference points near the X-axis and near the Y-axis in the same way as when performing the differentiation processing, even if absolute value processing alone is performed.

Figure 59:
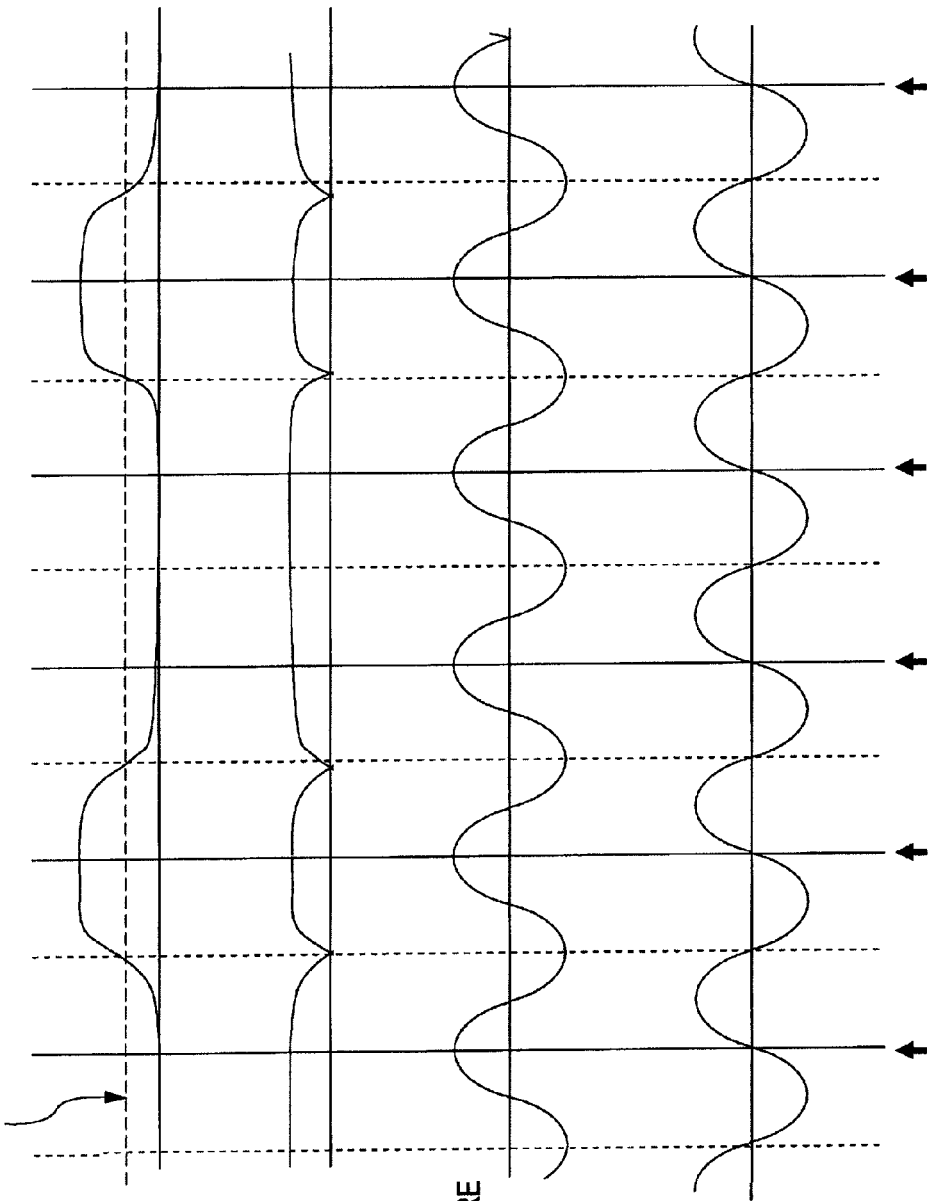
FIG. 59 is a diagram for describing phase shift processing in a case of a fifth modification of the second embodiment.

FIG. 59 describes operations in a case of generating timing pulse signals by absolute value processing alone according to the fifth modification such as described above, by illustrating the waveforms of the sensor output image, X-direction timing pulse signals, X-direction clock signals before X-direction differentiation, and X-direction clock signals after X-direction differentiation. Note that as with the case in FIG. 34, FIG. 59 cross-cuts the waveforms of the signals (the two-dimensional images) so as to be illustrated as one-dimensional signals, with the horizontal axis representing the X axis, and the vertical axis representing the grayscale value. While FIG. 59 only illustrates the X direction, the Y direction can be considered in the same way.

First, for absolute value processing, a reference level (zero level) is predetermined for absolute value processing regarding the sensor output image (actually image following up-scaling), as shown in the diagram, and timing pulse signals are generated by absolute value processing as shown in the diagram by taking absolute values based on this reference level. In this case, the reference level may be a local average value, or may be a center value between a local minimum and maximum.

The waveform of clock signals obtained by performing two-dimensional FFT on timing pulse signals obtained by this absolute value processing and performing peak searching, clock signal component extraction, and IFFT, are illustrated by the X-direction clock signals before X-direction differentiation in the drawing. Referencing the waveform here, unlike the case in FIG. 34 described earlier, the optimal sample position is a positive peak position. Accordingly, the phase has to be delayed to adjust the optimal sample position to the positive zero cross position, and consequently in this case the phase is shifted not by differentiation but by integration. Specifically, the imaginary number the clock signal component extracted in the frequency region is multiplied by the imaginary number $-j\omega$ such that the optimal sample position is at the positive zero cross position.

In order to realize the operations of such a fifth modification, in the configuration shown in FIG. 54 the Sobel operator processing unit 50 is replaced with an absolute value processing unit for performing absolute value processing on image signals following equalization processing (u-scaled image signals) from the equalizing filter 22. The subsequent configuration may be the same as that shown in FIG. 54, but the processing by the X-phase shift processing unit 44x and Y-phase shift processing unit 44y differs. That is to say, at the X-phase shift processing unit 44x in this case, the X-clock signal component obtained upstream is multiplied by the X-direction angular frequency $-j\omega_x$ in the X direction such that the positive zero cross position of the waveform following IFFT is at the optimal sample position. Also, at the Y-phase shift processing unit 44x in this case, the Y-clock signal component obtained upstream is multiplied by the Y-direction angular frequency $-j\omega_y$ in the Y direction such that the positive zero cross position of the waveform following IFFT is at the optimal sample position.

Sixth Modification

The sixth modification involves handling the up-scaled image as timing pulses as it is, without performing any explicit non-linear signal processing (processing such as performing differentiation and taking absolute values) for timing pulse signal generation. With the description so far, regarding X-direction and Y-direction timing pulse signals, the X-direction and Y-direction edges are enhanced by performing absolute value processing (non-linear processing) of the up-scaled images. However, clock signal component extraction can be performed using the latent non-linearity in the system, even without performing such explicit edge enhancing processing.

For example, the recording/reproducing system has electrically non-linear input/output properties, such as the γ properties of two-dimensional photoreceptor devices for example, so clock signal components can be extracted by performing frequency analysis of the read signals as they are, as well. Note that the term "non-linearity" as used here is different from non-linearity in the sense that phase information recorded in a hologram recording medium HM is not able to be reproduced.

Figure 60:
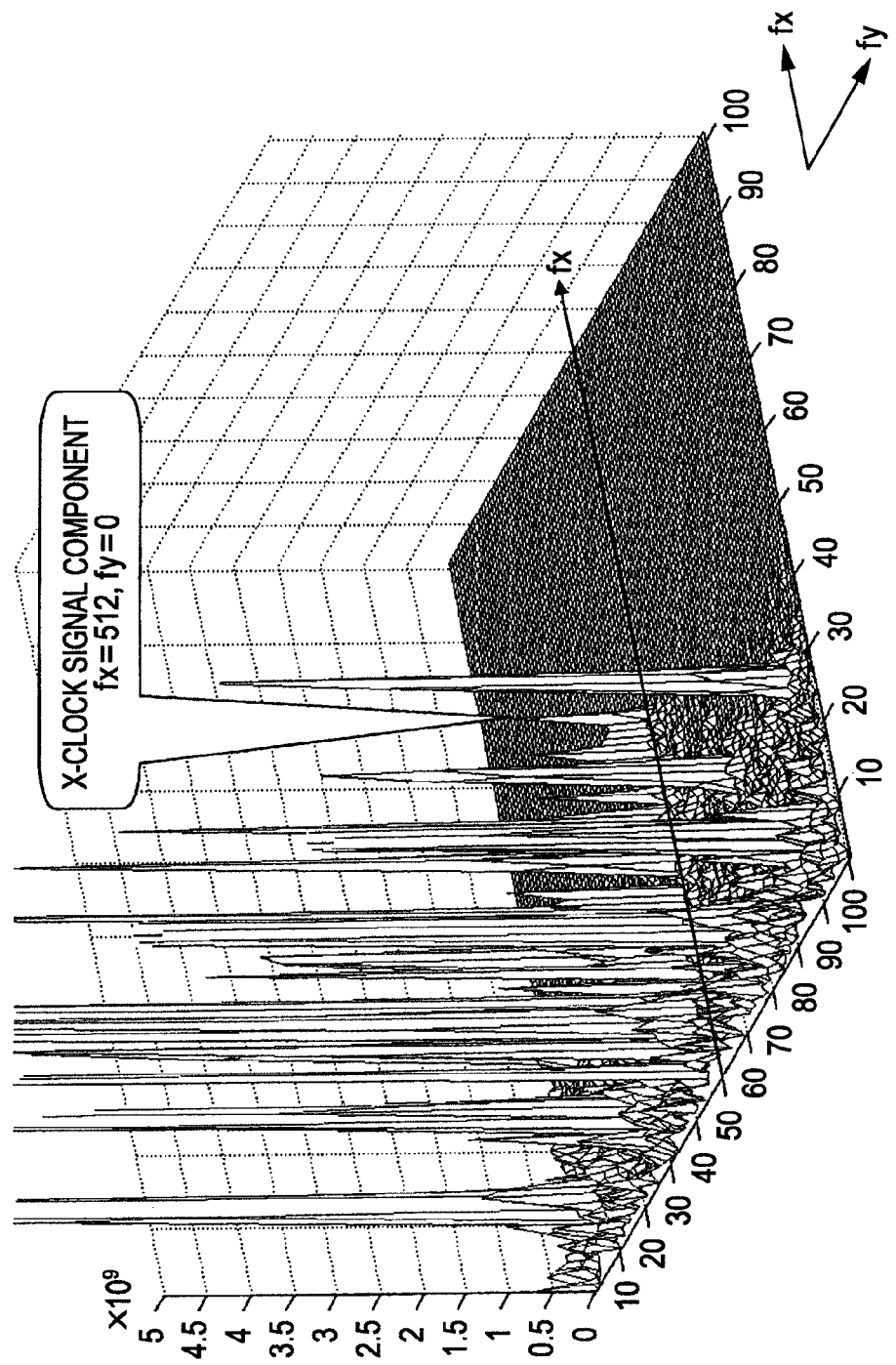
FIG. 60 is a diagram illustrating analysis results obtained by two-dimensional FFT of an image subjected to absolute value processing as it is (near X-clock signal component)
Figure 61:
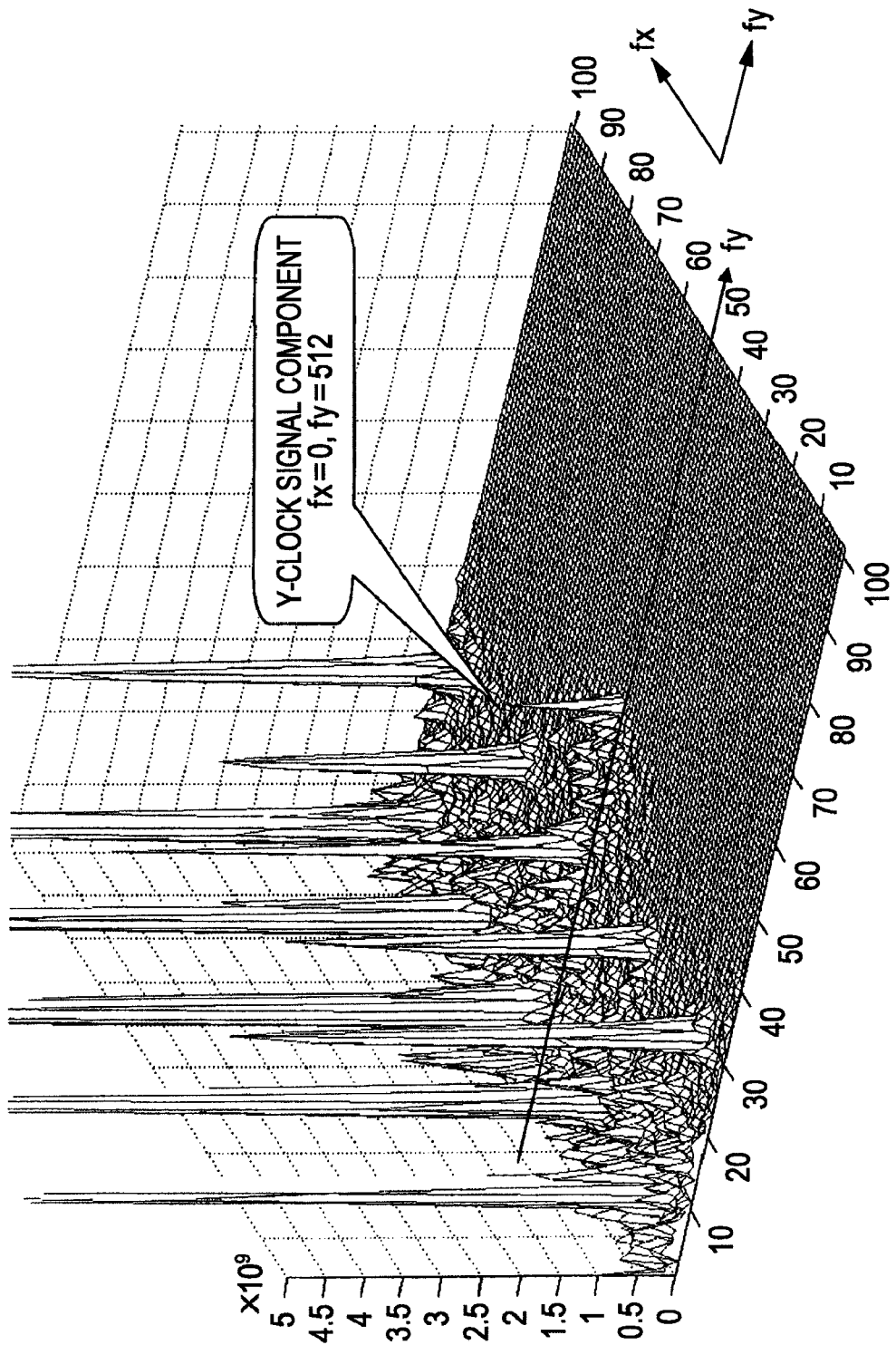
FIG. 61 is a diagram illustrating analysis results obtained by two-dimensional FFT of an image subjected to absolute value processing as it is (near Y-clock signal component)

FIGS. 60 and 61 illustrate analysis results of performing an up-scaled image to two-dimensional FFT as it is. FIG. 60 illustrates an enlarged view of nearby a reference point near the X axis (i.e., near the X-clock signal component), and FIG. 61 illustrates an enlarged view of nearby a reference point near the Y axis (near the Y-clock signal component). It can be seen from these drawings that in the case of performing two-dimensional FFT on an up-scaled image as it is, various types of frequency components are include reflecting the reproduced image, and there are many peaks present. However, upon closer observation, we can see that the clock signal components of each are present in the positions where they belong, however weak.

From these results, we can see that in a case where the peak search range can be restricted to an extremely narrow range, the clock signals components can be extracted. For example, in a case wherein the system design can be made very strict, and the amount of fluctuation is very small, the peak search range can be narrowed down. Accordingly, the technique according to the sixth embodiment can be suitably applied in a case where such conditions are satisfied.

To realize the sixth modification as such, an arrangement may be made wherein the configuration in FIG. 54 has the Sobel operator processing unit 50 omitted, such that the image following equalization processing at the equalizing filter 22 (i.e., an image equivalent to an up-scaled image) is subjected without change to two-dimensional FFT.

Seventh Modification

Figure 62:
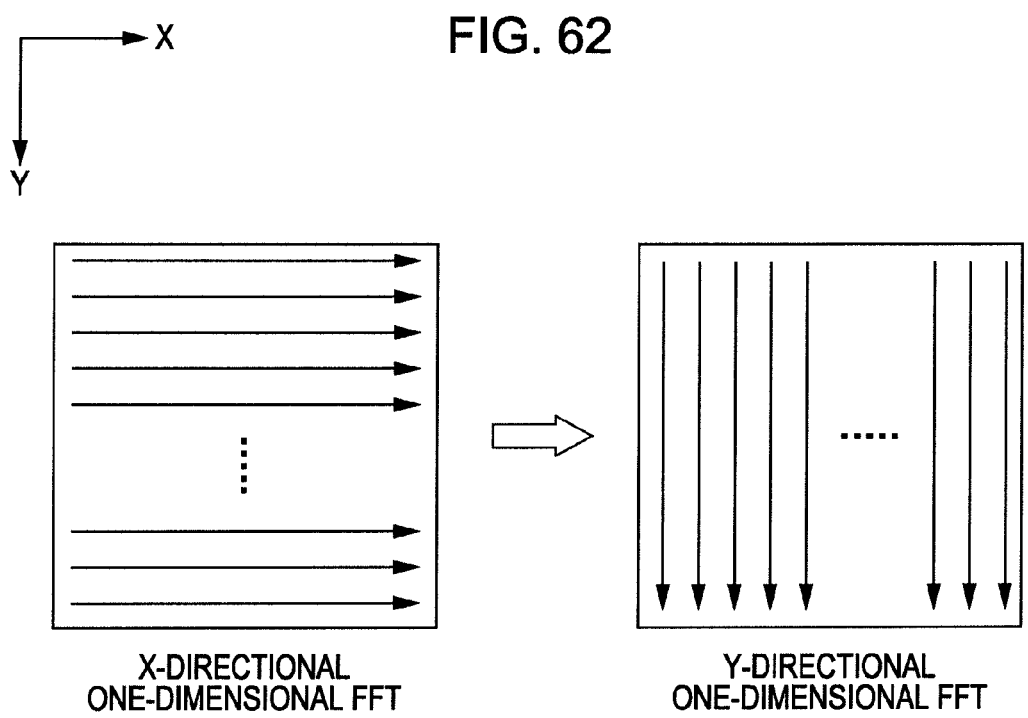
FIG. 62 is a diagram schematically illustrating a technique of two-dimensional FFT by matrix decomposition.

As can be understood from the description so far, at the time of extracting clock signal components, two-dimensional FFT is performed, and this two-dimensional FFT can be realized by repeating one-dimensional FFT in the row and column directions. This technique is also called matrix decomposition. FIG. 62 schematically illustrates a two-dimensional FFT technique using matrix decomposition. First, one-dimensional FFT is performed for each row in the X-direction, and next, one-dimensional FFT is performed for each column in the Y-direction.

The order of the calculation amount of one-dimensional FFT is N·log(N). With normal matrix factorization, one-dimensional FFT is performed N times for rows and N times for columns, meaning that a total of 2N times of one-dimensional FFT is performed, so the order of the calculation amount of two-dimensional FFT is $2N^2$ Log(N).

However, the object here is extracting clock components, and we can consider it to be sufficient to obtain analysis results at the search range of clocks signal components. Accordingly, one-dimensional FFT is performed within a relevant range for only one of X-direction and Y-direction, as shown in FIGS. 63A and 63B.

Figure 63A:
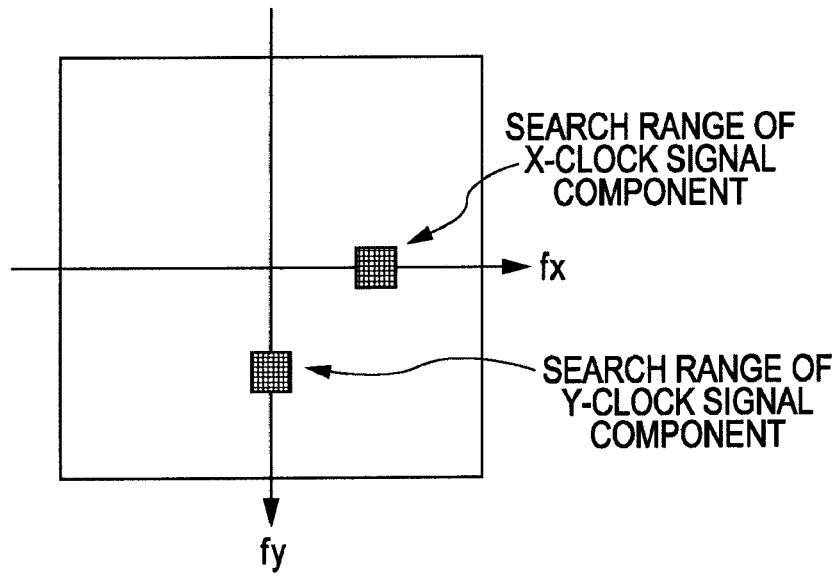
FIGS. 63A and 63B are diagrams for describing an FFT technique according to a seventh modification of the second embodiment.
Figure 63B:
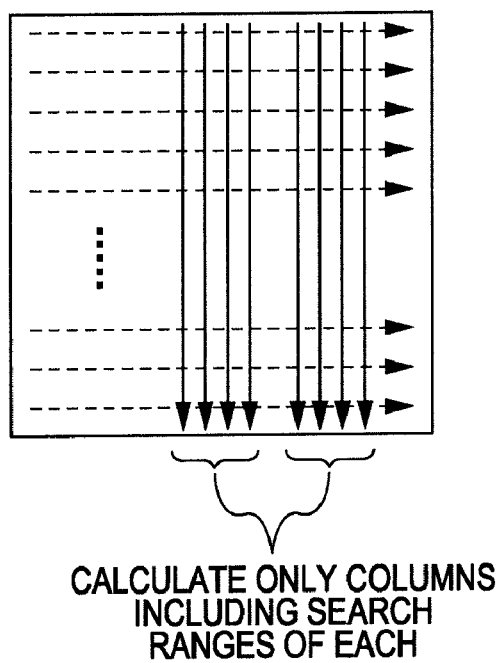
Figure 65A:
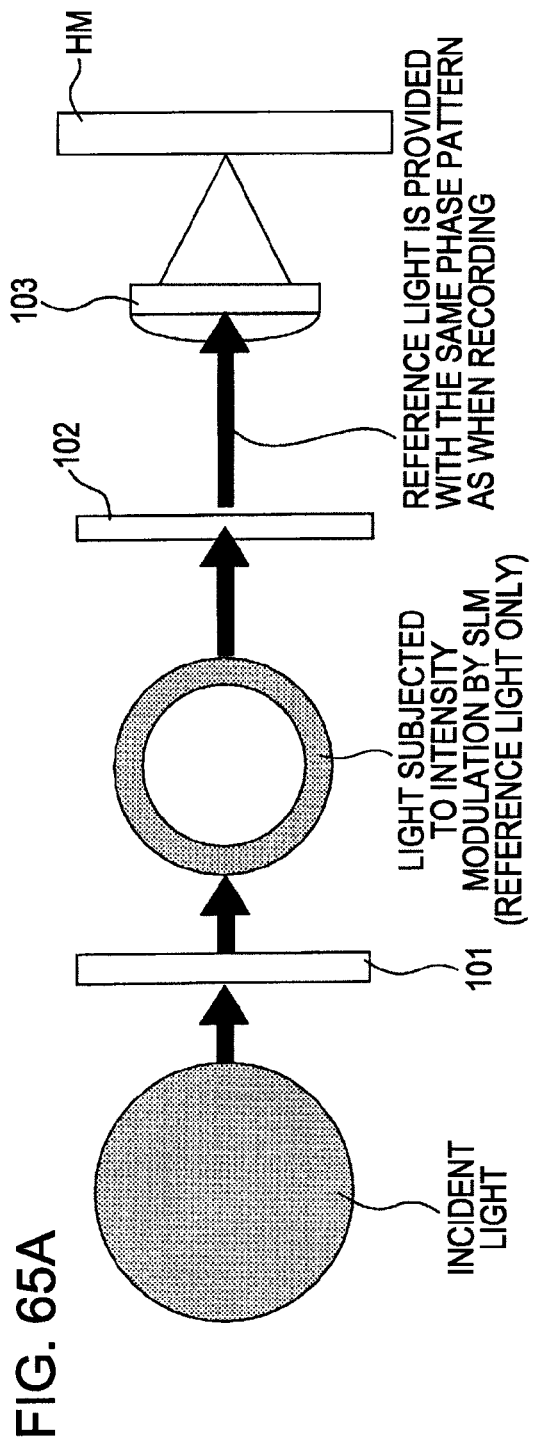
FIG. 65 is a diagram for describing a technique for reproducing recorded information of a hologram recording medium.
Figure 65B:
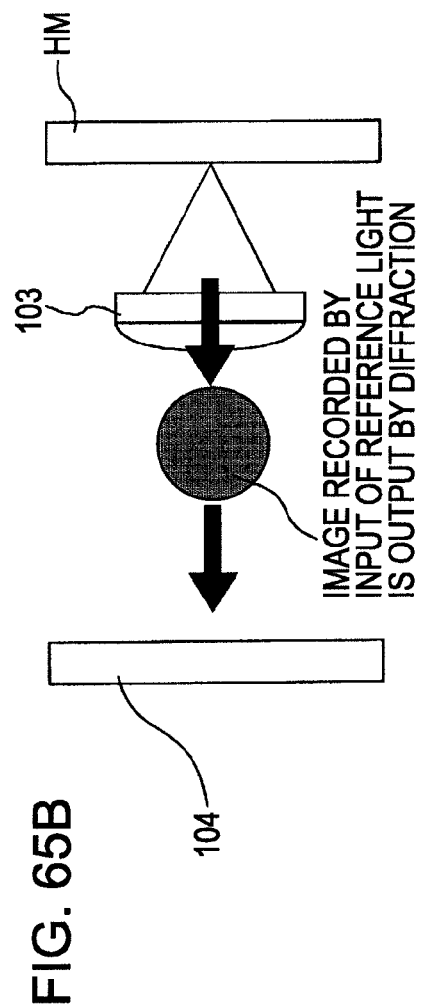
Figure 66:
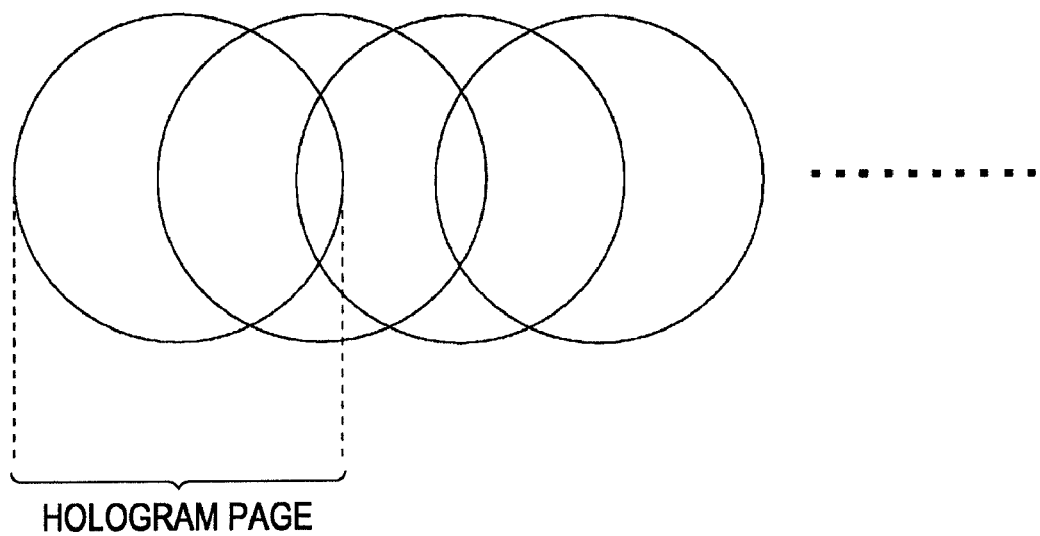
FIG. 66 is a diagram for describing multiplex recording of hologram pages.

FIG. 63A illustrates the search range of the X-clock signal component and the search range of the Y-clock signal component, and the analysis results used for extraction of clock signal components is only these portions. Accordingly, an arrangement is made as shown in FIG. 63B wherein, following performing one-dimensional FFT for each row in the X direction for example, one-dimensional FFT is performed only for the columns in the Y direction including each search range.

For example, if we say that each search range is 5% of the reproduced image width, the search ranges are the two of X and Y, which is 10% of the entirety, meaning that the one-dimensional FFT for each column is reduced to 10%. However, the one-dimensional FFT has to be performed for all rows, so the overall calculation amount is 50%+50%×10%=55%. In terms of order, the amount of calculation can be reduced to around half.

Also, the same sort of reduction should be able to be performed regarding one-dimensional FFT for each row, from the perspective of reduction in calculation amount, but this has already been markedly reduced by the FFT algorithm, so further marked reduction in calculation amount is difficult. However, an arrangement may be made wherein only the portions relating to the intended clock signal components are calculated near the final stage within the FFT processing unit, whereby substantial reduction in calculation amount can be realized. Also, this can be applied to this rows, the same can be further applied to the columns, reducing the amount of calculation accordingly even further.

Also, description has been made above assuming that one-dimensional FFT is performed on rows first and then one-dimensional FFT is performed on columns, but the amount of calculation can be reduced based on the same idea even if the order is inverted.

Also, the technique according to the seventh modification may be applied to cases of employing another Fourier transform technique other than FFT, such as DFT, for example. It should be noted that in the present Specification, the term "two-dimensional Fourier transform" collectively includes the technique of Fourier transform according to the seventh modification and normally-performed two-dimensional FFT using matrix decomposition. Also, it should be noted that "Fourier transform" as used here is not restricted to the exemplarily illustrated FFT, but rather includes two-dimensional vector radix FFT, and further beyond FFT includes methods for calculating DFT according to definition, methods for decomposing into frequency composition with a filter bank configuration, and all other techniques performing frequency analysis.

Other Modifications

Note that with the description so far, the processing of up-scaling and differentiation has been described in separate steps, but this is only consideration to facilitate description of algorithms, and is not restricted to this. For example a part of the described algorithm can be performed with further reduced calculation amount in the frequency region. Techniques enabling reduced calculation amount should be appropriately selected for the actual system regarding this point.

Specifically, the differentiation processing can be performed in the frequency region. The differentiation processing is a linear filter, and is represented by a convolution operator. Convolution operators are equivalent to obtaining a product for every frequency component in the frequency region, and the amount of calculation is not great, as widely recognized. Also, the differentiation processing can be convoluted to begin with, also reducing the amount of calculation. Moreover, it is widely recognized that up-scaling processing can be performed in the frequency region by expanding the size and filling with zeroes.

Combining the above, performing calculations beforehand which can be performed beforehand, and performing computation in the frequency region, further reduces the amount of calculation. Note, however, that in the case that the number of taps of the filter is small, there are cases that convolution in the actual image region may result in a smaller amount of calculation, so the more suitable should be selected.

Also, with the description so far, at the time of extracting the clock signal component at the frequency region, a predetermined range near the X axis is searched for X clock signals and a predetermined range near the Y axis is searched for Y clock signals so as to extract the clock signals, but this is just to say that this arrangement should be performed in the case that the X axis and Y axis of the SLM 4 and the image sensor 11 agree. If the relation in respective coordinate systems can be found beforehand regarding rotation angle and enlargement ratio and so forth, based on system design or operating state, a suitable first predetermined range and second predetermined range can be determined for extracting the clock signal components accordingly, so as to perform peak searching on these ranges to extract the clock signals.

Also, with the description so far, both the positive and negative edges of the differentiation processing results have been described as being used for timing pulse signals by performing absolute value processing, but clock extraction can be performed by one of the edges as well. Specifically, processing is performed wherein no absolute value processing is performed, just one of the positive and negative edges is kept from the differentiation results, and the other is set to 0.

While clocks can be extracted with this technique as well, the advantage of using both the positive and negative edges as with the case of performing absolute value processing will be lost. That is to say, if absolute value processing is performed, the clock signals are extracted so as to fit both the positive and negative edges, so positional identification can be performed in a precise manner with offset and deviation of the positive and negative edge positions having been cancelled out, with the sample positions not leaning toward one or the other, but the above technique lacks this precision. Also, performing absolute value processing is advantageous in that the amount of edge information is relatively doubled, is the intensity of clock signal components increases, thereby improving the S/N ratio. Moreover, it should be noted that absolute value processing as used here includes all processing equivalent to performing absolute value processing, such as squaring and so forth.

Modifications of the Embodiments

While embodiments of the invention have been described, the resent invention is not restricted to the examples described so far.

For example, with the first embodiment, an example has been described regarding a case of detecting individual syncs following detecting the sync at the page center, but an arrangement may be made wherein such detection of the page center position is not performed and individual syncs are detected. However, it should be noted that performing detection of the page center position beforehand enables the search range to be reduced at the time of detecting the individual syncs.

For example, with the first embodiment, an example has been described regarding a case wherein, at the time of detecting individual syncs, a cross-shaped pattern of five syncs centered on the object sync and including the vertically and horizontally adjacent syncs is the basic pattern, but the number of syncs and the pattern thereof used at the time of detecting individual syncs using multiple syncs can be optionally set. Moreover, while an example has been described regarding a case wherein the object sync is included in plurality of syncs used for detecting syncs, an arrangement may be made wherein multiple surrounding syncs besides the object sync are used to detect the object sync.

In any case, any arrangement regarding sync detection according to the first embodiment which enables detection of the object sync based on the position of multiple syncs selected based on the position of the object sync can suppress deterioration in sync position detection precision due to a lower ratio of syncs.

Also, description has been made regarding the first embodiment wherein, at the time of identifying (calculating) the position of data pixels, extrapolation of syncs is performed such that all data pixels positions within the page are surrounded by syncs from four directions, but the position of the data pixels can be calculated without performing such extrapolation of syncs.

In this case, in the event that a sync at of any one of the four positions surrounding the object data pixel is missing, the position of the object data pixel can be calculated based on the syncs which do exist, for example. Alternatively, a technique can be employed wherein the position of the data pixel is calculated based on just the sync position closets to the object data pixel position.

Also, while a case has been exemplarily described wherein multiple syncs are used for calculating such data pixel positions, an arrangement may be made wherein the position of the data pixel is calculated with one sync as a reference, as with the related art. For example, the position of a data pixel can be calculated based on the one sync which is the closest to the object data pixel position.

Also, it holds true for all of the embodiments that the format exemplarily illustrated above is only one example, and it is needless to say that various parameters, such as the minimum laying increment, the radius i_rad of the signal light area A2, the sync intervals i_sper, the sync size, and so forth, can be selected as suitable in accordance with actual embodiments.

Also, with the embodiments, a case has been exemplarily illustrated wherein, at the time of obtaining the bit values from the amplitude values of pixels calculated (obtained) at the end by resampling (i.e., at the time of performing data distinguishing), but the present invention can be applied to cases of code other than sparse code as well, in which case a decoding (data distinguishing) method corresponding to the encoding used should be employed instead of sort coding. Note that the decoding is common in that the amplitude values obtained for each resampling position with the technique according to the present embodiment are used.

Also, in the event that sparse coding is used, an arrangement may be performed for a correlation detection method wherein correlation calculation is performed between the amplitude values of each of the pixels of one symbol worth obtained by resampling, and all data patterns obtained as having occurred as data patterns for one symbol (represented in amplitude values), that detecting the data pattern with the greatest correlation value as the data pattern of that symbol.

Also, while description has been made regarding the embodiments assuming that up-scaling processing is performed regarding the readout image, up-scaling processing does not have to be performed in particular in the event that the number of pixels of the image sensor 11 is sufficiently great as compared to the number of pixels of the SLM 4 and the over-sampling rate is sufficiently great, for example.

Also, while description has been made regarding the embodiments of a case wherein the present invention is applied to a recording/reproducing device capable of both recording and reproducing, the present invention can be applied to a reproducing device capable of at least reproducing.

Also, while description has been made regarding the embodiments exemplarily illustrating a case of corresponding to a reflective hologram recording medium HM having a reflective film, the present invention can also be suitable applied to reproducing devices corresponding to transmissive hologram recording media not having a reflective film. A reproducing device in a case of handling such transmissive hologram recording media does not have to have the polarization beam splitter 8 (and also quarter wave plate 9) for guiding the reproduced image obtained as reflected light corresponding to the irradiated reference light to the image sensor. In this case, the reproduced image obtained in accordance with the irradiated reference light transmits through the recording medium itself, so a configuration can be made wherein another object lens is provided on the other side of the hologram recording medium as viewed from the emission point side of the laser beam, so as to guide the reproduced image which is the transmitted light, to the image sensor 11 side via this object lens.

Also, while description has been made regarding the embodiments exemplarily illustrating a case of employing the coaxial method in which recording is performed with the reference light and signal light disposed on the same axis, the present embodiment can be suitably applied to a case of employing the so-called double-beam method wherein signal light and reference light are separately irradiated at the time of recording.

In the case of employing the double-beam method, the reference light and signal light are cast onto the hologram recording medium HM from different angles at the time of recording, but at the time of reproducing, readout is performed with coherent light coaxially situated with the reference light, which is the same as with the above embodiments. That is to say, in the case of the double-beam method, in the event of a device configuration wherein both recording and reproducing is enabled as with the recording/reproducing device 1 according to the embodiments, this arrangement differs from that shown in FIG. 1 in that a set of a first laser diode for generating signal light for recording and a first SLM capable of intensity/phase modulation, and a set of a second laser diode for generating reference and a second SLM capable of intensity/phase modulation, are separately provided, and further the optical system is altered so as to guide the signal light and reference light generated at each to the hologram recording medium HM at different angles. However, with regard to reproducing along, this is the same configuration as with the embodiments in that reference light and coherent light are generated coaxially using the SLM for generating the reference light. Also, as can be understood from the above description, in the case of a device configuration dedicated to reproducing, a configuration the same as the configuration of the reproducing system shown in FIG. 1 is sufficient.

Also, while description has been made regarding the embodiments that a liquid crystal panel capable of variable intensity modulation in accordance with the driving voltage level is used for the intensity modulating device, in a case of setting the intensity of addition as coherent light to 1.0 for example, simple on/off control of the light would be sufficient. In this case, a DMD (Digital Micromirror Device) can be used as the intensity modulating device. Also, a reflective type liquid crystal panel may be used as the intensity modulating device, instead of the transmissive type liquid crystal panel exemplarily illustrated in the embodiments.

Also, while a case of using a transmissive type liquid crystal panel as the phase modulator has been exemplarily illustrated in the embodiments, any other device may be used instead as long as capable of variable modulating the phase in increments of pixels in accordance with the driving voltage level of individual pixels.

Also, while a case has been exemplarily illustrated in the embodiments wherein square root calculation is performed as to the output of the image sensor, following a value is subtracted from the results thereof corresponding to the addition amount of coherent light, thereby removing the component added by the coherent light, the added coherent light component may be removed by filter processing for removing DC components for example, beside such explicit subtraction processing.

The present application contains subject matter related to that disclosed in Japanese Priority Patent Application JP 2008-160661 filed in the Japan Patent Office on Jun. 19, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A reproducing device for performing reproduction regarding a hologram recording medium in which a hologram page is recorded in accordance with signal light, by interference between said signal light in which bit data is arrayed with the information of light intensity difference in pixel increments, and reference light, said reproducing device comprising:
  reference light generating means configured to generate said reference light to be irradiated when obtaining a reproduced image regarding said hologram page recorded in said hologram recording medium;
  coherent light generating means configured to generate coherent light of which the intensity is greater than the absolute value of the minimum value of the amplitude of said reproduced image, and the phase becomes the same phase as the reference phase within said reproduced image;
  an image sensor configured to receive an input image in pixel increments to obtain an image signal;
  an optical system configured to guide said reference light to said hologram recording medium, and also guide said reproduced image obtained from said hologram recording medium according to the irradiation of said reference light, and said coherent light to said image sensor, wherein the number of pixels of said image sensor side, and said optical system are adjusted such that an oversampling rate representing a ratio regarding whether to receive the image of one data pixel worth representing the information of one data bit worth within said reproduced image at the region of how many pixels worth of said image sensor side is greater than at least one;
  square root calculating means configured to input an image signal obtained based on light-receiving operation by said image sensor to calculate the square root of each value making up said image signal;
  removing means configured to remove the components of said coherent light from an image signal serving as the square root calculation result by said square root calculating means;
  pixel position identifying means configured to identify the position of each data pixel included in said reproduced image from an image signal after removal processing by said removing means;
  pixel amplitude value obtaining means configured to obtain the amplitude value at each data pixel position within said image signal based on the information of the position of each data pixel identified by said pixel position identifying means; and
  reproducing means configured to reproduce recorded data based on the amplitude value at each data pixel position obtained by said pixel amplitude value obtaining means.

2. The reproducing device according to claim 1, wherein said removing means subtract the value corresponding to the intensity of said coherent light from said square root calculation result to remove the components of said coherent light.

3. The reproducing device according to claim 2, wherein said reference light generating means and said coherent light generating means are configured so as to generate said reference light and said coherent light by employing a common spatial light modulator for modulating the intensity and phase of common incident light, respectively.

4. The reproducing device according to claim 3, wherein said spatial light modulator is configured by an intensity modulator for subjecting incident light to spatial light intensity modulation according to pixel increments, and a phase modulator for subjecting said incident light to spatial phase modulation according to pixel increments being combined integrally.

5. The reproducing device according to claim 4, wherein sync data according to a predetermined data pattern is inserted into a plurality of predetermined positions within said hologram page;
  and wherein said pixel position identifying means search a position having correlation with said predetermined data pattern within an image signal after removal processing by said removing means to identify the insertion position of each sync data within said image signal, and also identify the position of each data pixel based on the position of each sync data identified.

6. The reproducing device according to claim 5, wherein, at the time of identifying the insertion position of each sync data, said pixel position identifying means perform detection of correlation at each sync data position when moving a plurality of sync data selected with the insertion position of sync data to be identified as a reference, integrally within a predetermined range within said image signal, and as a result thereof, identify a position identified as having the greatest correlation as the insertion position of sync data.

7. The reproducing device according to claim 6, further comprising:
  sync extrapolating means configured to extrapolate said sync data such that the positions of all the data pixels included in said image signal are surrounded with said sync data from four directions.

8. The reproducing device according to claim 7, wherein said pixel position identifying means perform linear interpolation based on the positions of four pieces of sync data surrounding the position of a data pixel to be identified, and the position of said data pixel to be identified which is estimated from a recorded format to identify the position of said data pixel to be determined.

9. The reproducing device according to claim 8, wherein said pixel amplitude value obtaining means calculate and obtain the amplitude value of a data pixel position to be processed by linear interpolation employing the amplitude values of four positions surrounding the data pixel position to be processed.

10. The reproducing device according to claim 4, wherein said pixel position identifying means perform identifying of each data pixel position based on a result of two-dimensional clock information included in an image signal after removal processing by said removing means being extracted.

11. The reproducing device according to claim 10, wherein said pixel position identifying means perform
  analysis processing for performing two-dimensional Fourier transform regarding an image signal after removal processing by said removing means to perform frequency analysis regarding a plane-wave factor included in said image signal, and
  clock information obtaining processing for performing search of the peak portion of a power spectrum within each of a first predetermined range and a second predetermined range as to the analysis results by said analysis processing to obtain first-direction clock information representing the frequency, phase, and normal direction of a plane wave identified based on the peak portion detected within said first predetermined range, and second-direction clock information representing the frequency, phase, and normal direction of a plane wave identified based on the peak portion detected within said second predetermined range,
  and then identify the position of each data pixel within said image signal based on said first-direction clock information and said second-direction clock information.

12. The reproducing device according to claim 11, further comprising:
- differential processing means configured to subject an image signal from which the components of said coherent light were removed by said removing means to differential processing; and
- non-linear processing means configured to subject said image signal subjected to the differential processing by said differential processing means to non-linear processing;
- wherein, with said analysis processing by said pixel position identifying means, said image signal after non-linear processing by said non-linear processing means is subjected to said two-dimensional Fourier transform.

13. The reproducing device according to claim 12, said non-linear processing means execute processing for obtaining the absolute value or square value of said image signal as said non-linear processing.

14. The reproducing device according to claim 13, wherein said pixel position identifying means, as said clock information obtaining processing,
- obtain a first-direction two-dimensional clock image converted into a real image by components based on the peak portion detected within said first predetermined range being subjected to inverse Fourier transform, as said first-direction clock information, and obtain a second-direction two-dimensional clock image converted into a real image by components based on the peak portion detected within said second predetermined range being subjected to inverse Fourier transform, as said second-direction clock information,
- and also extract a first-direction cycle line which said first-direction two-dimensional clock image represents, and a second-direction cycle line which said second-direction two-dimensional clock image represents to obtain each of grating points where the respective cycle lines intersect, and then identify the position of each data pixel based on the position of each grating point.

15. The reproducing device according to claim 14, wherein said pixel position identifying means, as said clock information obtaining processing,
- obtain an actual image obtained by subjecting components including the center component of the peak portion detected within said first predetermined range, and the neighborhood components thereof to inverse Fourier transform, as a first-direction two-dimensional clock image, and obtain an actual image obtained by subjecting components including the center component of the peak portion detected within said second predetermined range, and the neighborhood components thereof to inverse Fourier transform, as a second-direction two-dimensional clock image,
- and also extract a first-direction cycle line which said first-direction two-dimensional clock image represents, and a second-direction cycle line which said second-direction two-dimensional clock image represents to obtain each of grating points where the respective cycle lines intersect, and then determine the position of each data pixel based on the position of each grating point.

16. The reproducing device according to claim 15, wherein said differential processing means subject an image signal from which the components of said coherent light were removed by said removing means to each of first-direction differential processing and second-direction differential processing,
- and wherein said non-linear processing means perform first-direction non-linear processing for subjecting an image signal after said first-direction differential processing to non-linear processing, and second-direction non-linear processing for subjecting an image signal after said second-direction differential processing to non-linear processing;
- and wherein said pixel position identifying means, as said analysis processing, subject each of an image signal after said first-direction non-linear processing, and an image signal after said second-direction non-linear processing by said non-linear processing means to said two-dimensional Fourier transform, and as said clock information obtaining processing, obtain said first-direction clock information based on the analysis results regarding the image signal after said first-direction non-linear processing obtained by said analysis processing, and obtain said second-direction clock information based on the analysis results regarding the image signal after said second-direction non-linear processing obtained by said analysis processing.

17. The reproducing device according to claim 16, wherein a predetermined data pattern determined beforehand as a page sync is inserted into said hologram page;
- and wherein said reproducing means identify the position of each data pixel on a recorded format based on the result of the search of the position of said page sync within said image signal based on the amplitude value of each data pixel obtained by said pixel amplitude value obtaining means, and said predetermined data pattern as a page sync, and also reproduce recorded data based on the information of the position of each identified data pixel on a recording format, and the information of the amplitude value of each data pixel.

18. The reproducing device according to claim 17, wherein a plurality of said page syncs are inserted;
- and wherein said reproducing means identify the position of each data pixel on a recorded format based on the result of the search with the plurality of page syncs as an integral page sync.

19. The reproducing device according to claim 18, wherein, with said clock information obtaining processing by said pixel position identifying means, search of a peak portion to obtain clock information within each of said first predetermined range and said second predetermined range each set with the clock frequency in the X direction and the clock frequency in the Y direction each estimated based on the number of pixels in the X direction and Y direction of a spatial light modulator for performing spatial light modulation according to pixel increments at the time of generation of said signal light, and the sampling rate in the X direction and Y direction at said image sensor.

20. The reproducing device according to claim 19, said pixel amplitude value obtaining means perform interpolation processing by employing values around the periphery of the position of the data pixel identified by said pixel position identifying means to obtain the amplitude value of each data pixel by calculation.

21. The reproducing device according to claim 5 or claim 10, further comprising:
- up-converting means configured to up-convert an image signal from which the components of said coherent light were removed by said removing means to a predetermined magnification by linear interpolation.

22. A reproducing method for performing reproduction regarding a hologram recording medium in which a hologram page according to signal light in which bit data is arrayed with the information of light intensity difference in pixel increments which is interfered with reference light is recorded by employing an image sensor for receiving an input image in pixel increments to obtain an image signal, said reproducing method comprising the steps of:

generating of said reference light to be irradiated when obtaining a reproduced image regarding said hologram page recorded in said hologram recording medium;

generating of coherent light of which the intensity is greater than the absolute value of the minimum value of the amplitude of said reproduced image, and the phase becomes the same phase as the reference phase within said reproduced image;

receiving, from said image sensor, said reproduced image obtained from said hologram recording medium according to said reference light generated by said generating of reference light being irradiated, and said coherent light generated by said generating of coherent light in a state in which an over-sampling rate representing a ratio regarding whether to receive the image of one data pixel worth representing the information of one data bit worth within said reproduced image at the region of how many pixels worth of said image sensor side is greater than at least one;

inputting of an image signal obtained at said image sensor in said receiving to calculate the square root of each value making up said image signal;

removing of the components of said coherent light from an image signal serving as the square root calculation result in said inputting;

identifying of the position of each data pixel included in said reproduced image from an image signal after removal processing by said removing;

obtaining of the amplitude value at each data pixel position within said image signal based on the information of the position of each data pixel identified by said identifying; and reproducing of recorded data based on the amplitude value at each data pixel position obtained by said obtaining.

23. A reproducing device for performing reproduction regarding a hologram recording medium in which a hologram page is recorded in accordance with signal light, by interference between said signal light in which bit data is arrayed with the information of light intensity difference in pixel increments, and reference light, said reproducing device comprising:

a reference light generating unit configured to generate said reference light to be irradiated when obtaining a reproduced image regarding said hologram page recorded in said hologram recording medium;

a coherent light generating unit configured to generate coherent light of which the intensity is greater than the absolute value of the minimum value of the amplitude of said reproduced image, and the phase becomes the same phase as the reference phase within said reproduced image;

an image sensor configured to receive an input image in pixel increments to obtain an image signal;

an optical system configured to guide said reference light to said hologram recording medium, and also guide said reproduced image obtained from said hologram recording medium according to the irradiation of said reference light, and said coherent light to said image sensor, wherein the number of pixels of said image sensor side, and said optical system are adjusted such that an over-sampling rate representing a ratio regarding whether to receive the image of one data pixel worth representing the information of one data bit worth within said reproduced image at the region of how many pixels worth of said image sensor side is greater than at least one;

a square root calculating unit configured to input an image signal obtained based on light-receiving operation by said image sensor to calculate the square root of each value making up said image signal;

a removing unit configured to remove the components of said coherent light from an image signal serving as the square root calculation result by said square root calculating unit;

a pixel position identifying unit configured to identify the position of each data pixel included in said reproduced image from an image signal after removal processing by said removing unit;

a pixel amplitude value obtaining unit configured to obtain the amplitude value at each data pixel position within said image signal based on the information of the position of each data pixel identified by said pixel position identifying unit; and a reproducing unit configured to reproduce recorded data based on the amplitude value at each data pixel position obtained by said pixel amplitude value obtaining unit.

* * * * *